US012535892B2

(12) United States Patent
Missig et al.

(10) Patent No.: US 12,535,892 B2
(45) Date of Patent: Jan. 27, 2026

(54) DEVICES, METHODS, AND GRAPHICAL USER INTERFACES FOR PROVIDING A HOME BUTTON REPLACEMENT

(71) Applicant: Apple Inc., Cupertino, CA (US)

(72) Inventors: Julian K. Missig, Burlingame, CA (US); Rachel L. Ciavarella, Pompton Plains, NJ (US); Jeffrey Traer Bernstein, San Francisco, CA (US); Linda L. Dong, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/202,862

(22) Filed: May 26, 2023

(65) Prior Publication Data

US 2024/0028133 A1   Jan. 25, 2024

Related U.S. Application Data

(63) Continuation of application No. 17/203,667, filed on Mar. 16, 2021, now Pat. No. 11,836,296, which is a
(Continued)

(51) Int. Cl.
*G06F 3/02* (2006.01)
*G06F 3/041* (2006.01)
(Continued)

(52) U.S. Cl.
CPC .............. *G06F 3/02* (2013.01); *G06F 3/0414* (2013.01); *G06F 3/04817* (2013.01);
(Continued)

(58) Field of Classification Search
CPC ...... G06F 3/02; G06F 3/0414; G06F 3/04817; G06F 3/0482; G06F 3/04847; G06F 3/04883
See application file for complete search history.

(56) References Cited

U.S. PATENT DOCUMENTS 7,657,849 B2 *   2/2010   Chaudhri .............. G06F 3/0488
                                                    345/173
9,069,458 B2 *   6/2015   Brewer ................... G06F 21/62
(Continued)

FOREIGN PATENT DOCUMENTS

CN       104169856 A      11/2014
CN       104731507 A       6/2015
(Continued)

OTHER PUBLICATIONS

U.S. Appl. No. 10/165,108 filed Dec. 25, 2018, Douglas.
(Continued)

*Primary Examiner* — Tadesse Hailu
(74) *Attorney, Agent, or Firm* — Morgan, Lewis & Bockius LLP

(57) ABSTRACT

An electronic device with a display and an embedded fingerprint sensor displays a lock screen on the display. While displaying the lock screen, the electronic device detects a first touch input on the embedded fingerprint sensor. In response to detecting the first touch input on the embedded fingerprint sensor: the electronic device, in accordance with a determination that first timing criteria are met, displays content of a plurality of messages; and the electronic device, in accordance with a determination that second timing criteria, different from the first timing criteria are met, ceases to display the lock screen and displaying a home screen use interface for the electronic device with a plurality of application icons.

39 Claims, 103 Drawing Sheets

Related U.S. Application Data continuation of application No. 16/521,433, filed on Jul. 24, 2019, now Pat. No. 10,996,766, which is a continuation of application No. 15/814,051, filed on Nov. 15, 2017, now Pat. No. 10,365,814.

(60) Provisional application No. 62/506,837, filed on May 16, 2017.

(51) Int. Cl.

| | |
|---|---|
| *G06F 3/04817* | (2022.01) |
| *G06F 3/0482* | (2013.01) |
| *G06F 3/04847* | (2022.01) |
| *G06F 3/04883* | (2022.01) |
| *G06F 21/32* | (2013.01) |
| *H04M 1/67* | (2006.01) |
| *H04M 1/72403* | (2021.01) |
| *H04M 1/72466* | (2021.01) |

(52) U.S. Cl.
CPC ........ *G06F 3/0482* (2013.01); *G06F 3/04847* (2013.01); *G06F 3/04883* (2013.01); *G06F 21/32* (2013.01); *H04M 1/72403* (2021.01); *G06F 2203/04105* (2013.01); *H04M 1/67* (2013.01); *H04M 1/72466* (2021.01)

(56) References Cited

U.S. PATENT DOCUMENTS

| | | | |
|---|---|---|---|
| 9,477,404 B2* | 10/2016 | Chaudhri | G06F 3/04883 |
| 10,082,892 B2* | 9/2018 | Foss | G06F 3/0481 |
| 10,165,108 B1* | 12/2018 | Douglas | G06Q 30/0262 |
| 10,235,014 B2* | 3/2019 | Yang | G06F 16/64 |
| 10,324,590 B2* | 6/2019 | Yang | G06F 3/002 |
| 10,884,592 B2* | 1/2021 | Everitt | G06F 3/0354 |
| 11,644,911 B2* | 5/2023 | Foss | G06F 3/0362 |
| | | | 345/184 |
| 2006/0101281 A1 | 5/2006 | Zhang et al. | |
| 2006/0282679 A1 | 12/2006 | Nicholson et al. | |
| 2008/0122796 A1 | 5/2008 | Jobs et al. | |
| 2009/0007017 A1 | 1/2009 | Anzures et al. | |
| 2009/0058595 A1 | 3/2009 | Mainguet et al. | |
| 2009/0327744 A1* | 12/2009 | Hatano | G06F 21/32 |
| | | | 726/19 |
| 2011/0080260 A1* | 4/2011 | Wang | G06F 21/32 |
| | | | 340/5.83 |
| 2012/0088553 A1 | 4/2012 | Nunes | |
| 2012/0126941 A1 | 5/2012 | Goggill | |
| 2012/0284673 A1 | 11/2012 | Lamb et al. | |
| 2013/0135236 A1 | 5/2013 | Yano | |
| 2013/0324089 A1 | 12/2013 | Kim et al. | |
| 2014/0068504 A1 | 3/2014 | Sun et al. | |
| 2014/0267103 A1 | 9/2014 | Chaudhri | |
| 2014/0283142 A1 | 9/2014 | Shepherd et al. | |
| 2014/0313307 A1 | 10/2014 | Oh et al. | |
| 2014/0344764 A1 | 11/2014 | Brewer | |
| 2014/0380032 A1* | 12/2014 | Takahashi | G06F 1/3234 |
| | | | 713/100 |
| 2015/0074615 A1 | 3/2015 | Han et al. | |
| 2015/0135108 A1 | 5/2015 | Pope et al. | |
| 2015/0149967 A1* | 5/2015 | Bernstein | G06F 3/04817 |
| | | | 715/854 |
| 2015/0169071 A1 | 6/2015 | Jitkoff | |
| 2015/0185979 A1 | 7/2015 | Zhang et al. | |
| 2015/0264169 A1* | 9/2015 | Yim | G06F 1/3265 |
| | | | 455/418 |
| 2015/0339012 A1 | 11/2015 | Yuan et al. | |
| 2015/0350414 A1 | 12/2015 | Park et al. | |
| 2015/0363066 A1 | 12/2015 | Lemay et al. | |
| 2015/0378595 A1* | 12/2015 | Jung | H04L 63/0861 |
| | | | 715/835 |
| 2015/0381617 A1* | 12/2015 | Jung | H04L 63/0861 |
| | | | 455/411 |
| 2016/0062608 A1 | 3/2016 | Foss et al. | |
| 2016/0170542 A1* | 6/2016 | Park | G06F 3/0414 |
| | | | 345/173 |
| 2016/0219210 A1* | 7/2016 | Ito | H04N 23/663 |
| 2016/0224817 A1* | 8/2016 | Yang | G06F 1/163 |
| 2016/0232726 A1* | 8/2016 | Zizi | G07C 9/257 |
| 2016/0259459 A1* | 9/2016 | Yang | G06F 3/041 |
| 2016/0259528 A1 | 9/2016 | Foss et al. | |
| 2016/0291813 A1 | 10/2016 | Lee et al. | |
| 2016/0299556 A1 | 10/2016 | Jueng et al. | |
| 2016/0306491 A1* | 10/2016 | Lee | G06F 3/0346 |
| 2016/0314291 A1 | 10/2016 | de Luna | |
| 2016/0364025 A1 | 12/2016 | Bernstein et al. | |
| 2016/0371691 A1 | 12/2016 | Kang et al. | |
| 2016/0379039 A1* | 12/2016 | Dagan | H04M 1/67 |
| | | | 382/124 |
| 2017/0061109 A1* | 3/2017 | Takenouchi | G06F 21/32 |
| 2017/0061191 A1* | 3/2017 | Naruse | G06V 10/7515 |
| 2017/0091512 A1* | 3/2017 | Kumano | G09G 5/003 |
| 2017/0103246 A1 | 4/2017 | Pi et al. | |
| 2017/0109011 A1 | 4/2017 | Jiang | |
| 2017/0242993 A1 | 8/2017 | Hama et al. | |
| 2017/0357440 A1 | 12/2017 | Tse | |
| 2017/0372122 A1* | 12/2017 | Shim | H04W 12/065 |
| 2018/0063309 A1* | 3/2018 | Mizumoto | H04L 63/0861 |
| 2018/0260803 A1* | 9/2018 | Seol | H04M 1/72403 |
| 2018/0335936 A1 | 11/2018 | Missig et al. | |
| 2018/0365477 A1* | 12/2018 | Seol | G06F 21/84 |
| 2019/0311175 A1* | 10/2019 | Zhang | G06V 40/1347 |
| 2019/0347001 A1 | 11/2019 | Missig et al. | |
| 2020/0082377 A1* | 3/2020 | Song | H02J 50/20 |
| 2021/0200325 A1 | 7/2021 | Missig et al. | |

FOREIGN PATENT DOCUMENTS

| | | |
|---|---|---|
| CN | 104820566 A | 8/2015 |
| CN | 104850345 A | 8/2015 |
| CN | 104866212 A | 8/2015 |
| CN | 105607827 A | 5/2016 |
| WO | WO 2014/105279 A1 | 7/2014 |

OTHER PUBLICATIONS

Anonymous, "Lock Screen Without Turning Off", https://stackoverflow.com/questions/20607989/lock-screen-without-turning-off, Dec. 20, 2013, 1 page.

Hoffman, "Everything You Need to Know About Customizing Android's Lock Screen", https://www.howtogeek.com/165507/everything-you-need-to-know-about-customizing-android-lock-screen, Dec. 8, 2016, 10 pages.

Sweeney, "XDA Spotlight: Button Mapper, an App to Remap Your Phone's Hardware Buttons, https://www.xda-devlopers.com/xda-spotlight-button-mapper-an-app-to-remap-your-phones-hardware-button", Jan. 21, 2017, 10 pages.

Notice of Allowance, dated Mar. 15, 2019, received in U.S. Appl. No. 15/814,051 (7464), 8 pages.

Office Action, dated May 26, 2020, received in Chinese Patent Application No. 201880031259.9, which corresponds with U.S. Appl. No. 15/814,051, 4 pages.

Office Action, dated Feb. 4, 2021, received in Chinese Patent Application No. 201880031259.9, which corresponds with U.S. Appl. No. 15/814,051, 1 page.

Office Action, dated Jun. 3, 2021 received in Chinese Patent Application No. 201880031259.9, which corresponds with U.S. Appl. No. 15/814,051, 1 page.

Office Action, dated Mar. 31, 2021, received in European Patent Application No. 18729781.7, which corresponds with U.S. Appl. No. 15/814,051, 9 pages.

Office Action, dated Feb. 23, 2023, received in European Patent Application No. 18729781.7, which corresponds with U.S. Appl. No. 15/814,051, 5 pages.

Intent to Grant, dated Jun. 19, 2023, received in European Patent Application No. 18729781.7, which corresponds with U.S. Appl. No. 15/814,051, 9 pages.

(56) References Cited

OTHER PUBLICATIONS

Notice of Allowance, dated Jan. 6, 2021, received in U.S. Appl. No. 16/521,433, 8 pages.
Office Action, dated Oct. 17, 2022, received in U.S. Appl. No. 17/203,667, 12 pages.
Notice of Allowance, dated Feb. 6, 2023, received in U.S. Appl. No. 17/203,667, 7 pages.
Notice of Allowance, dated Jul. 14, 2023, received in U.S. Appl. No. 17/203,667, 9 pages.
Invitation to Pay Additional Fees, dated Aug. 22, 2018, received in International Patent Application No. PCT/US2018/030693, which corresponds with U.S. Appl. No. 15/814,051, 13 pages.
International Search Report and Written Opinion, dated Oct. 18, 2018, received in International Patent Application No. PCT/US2018/030693, which corresponds with U.S. Appl. No. 15/814,051, 19 pages.
Grant Decision, dated Nov. 3, 2023, received in European Patent Application No. 18729781.7, which corresponds with U.S. Appl. No. 15/814,051, 3 pages.
Notice of Allowance, dated Jul. 15, 2024, received in Chinese Patent Application No. 201880031259.9, which corresponds with U.S. Appl. No. 15/814,051, 4 pages.
Extended European Search Report, dated May 23, 2024, received in European Patent Application No. 23212363.8, 8 pages.
Patent, dated Oct. 8, 2024, received in Chinese Patent Application No. 201880031259.9, which corresponds with U.S. Appl. No. 15/814,051, 5 pages.

* cited by examiner

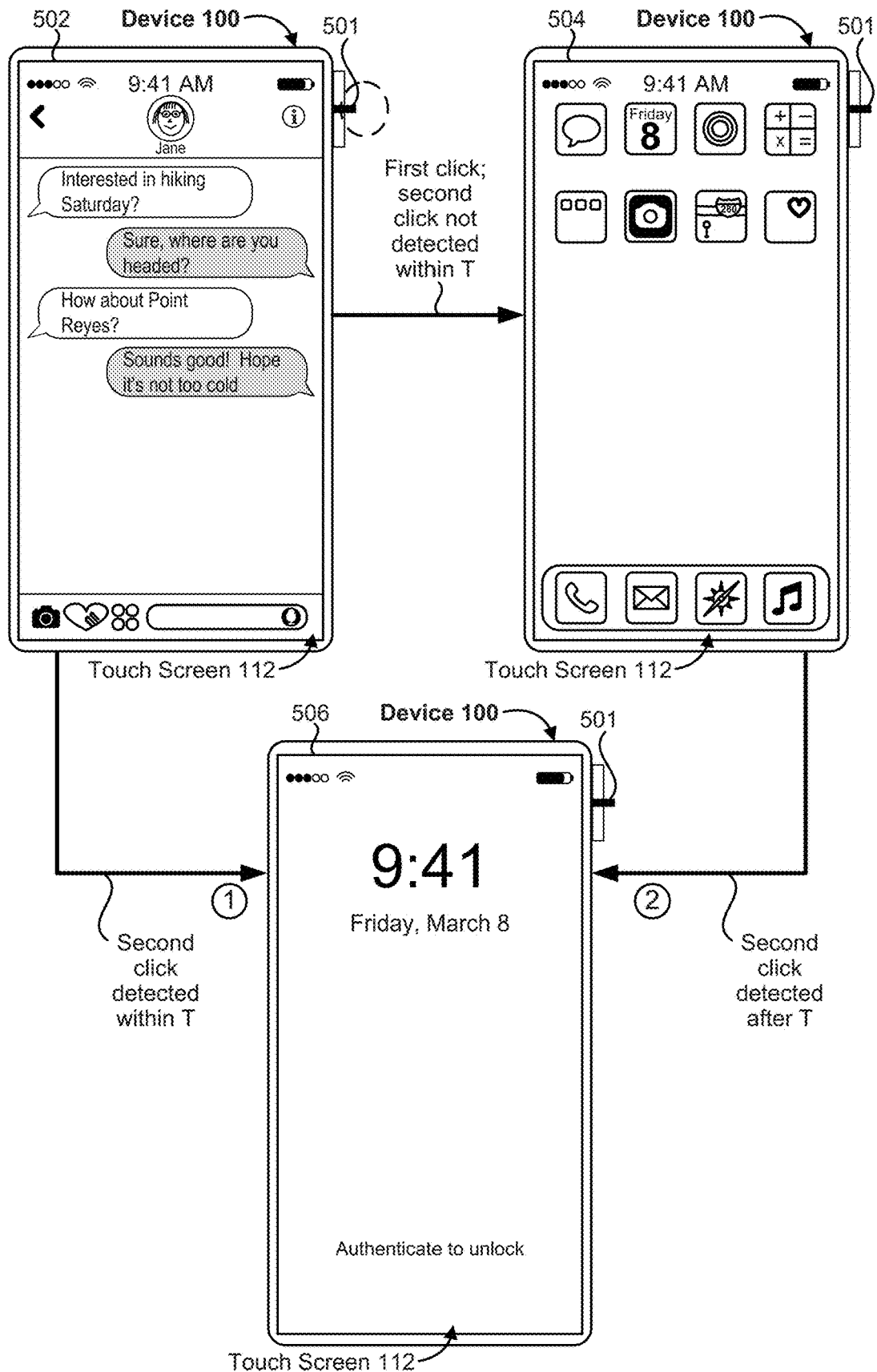
Figure 5A1

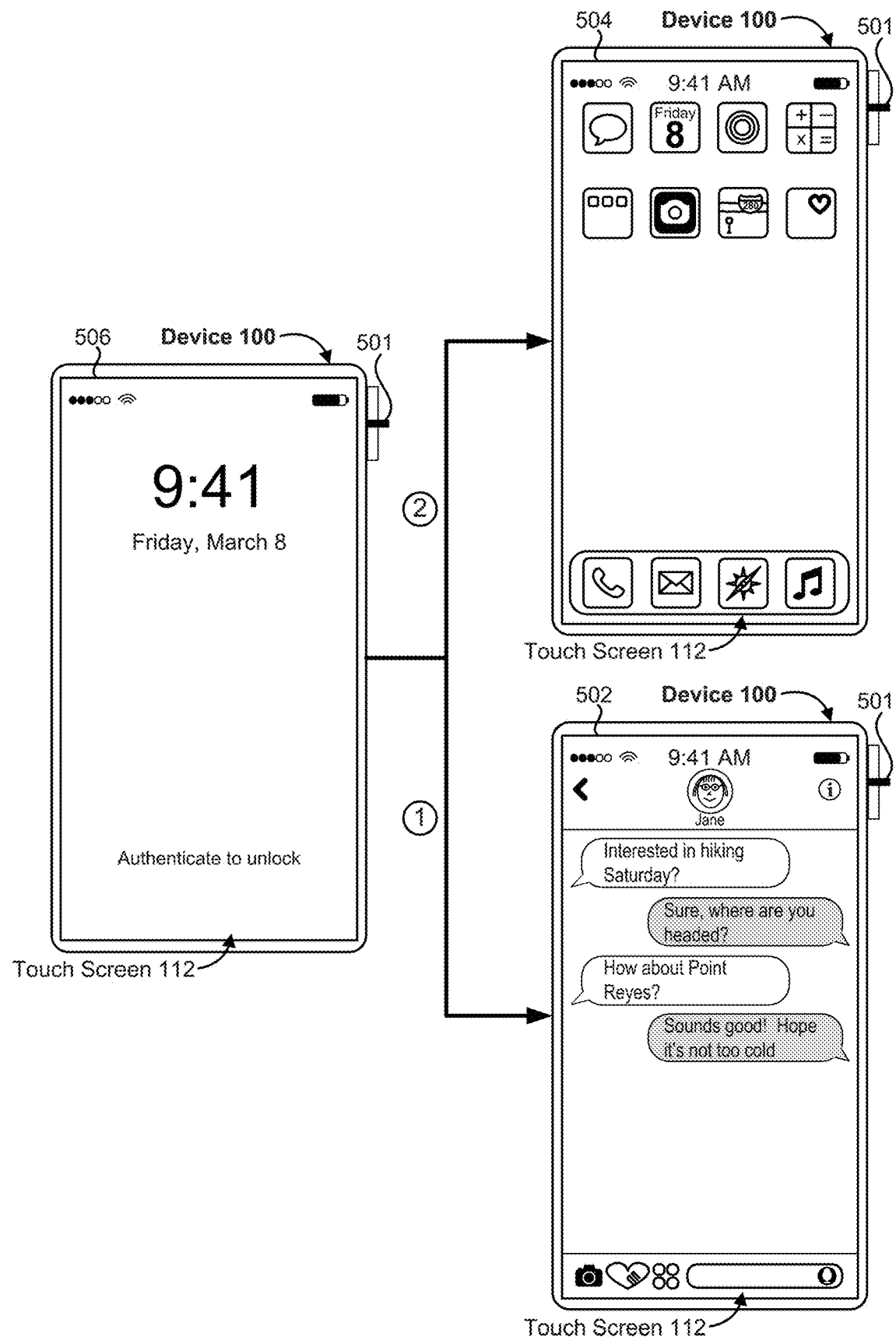
Figure 5A2

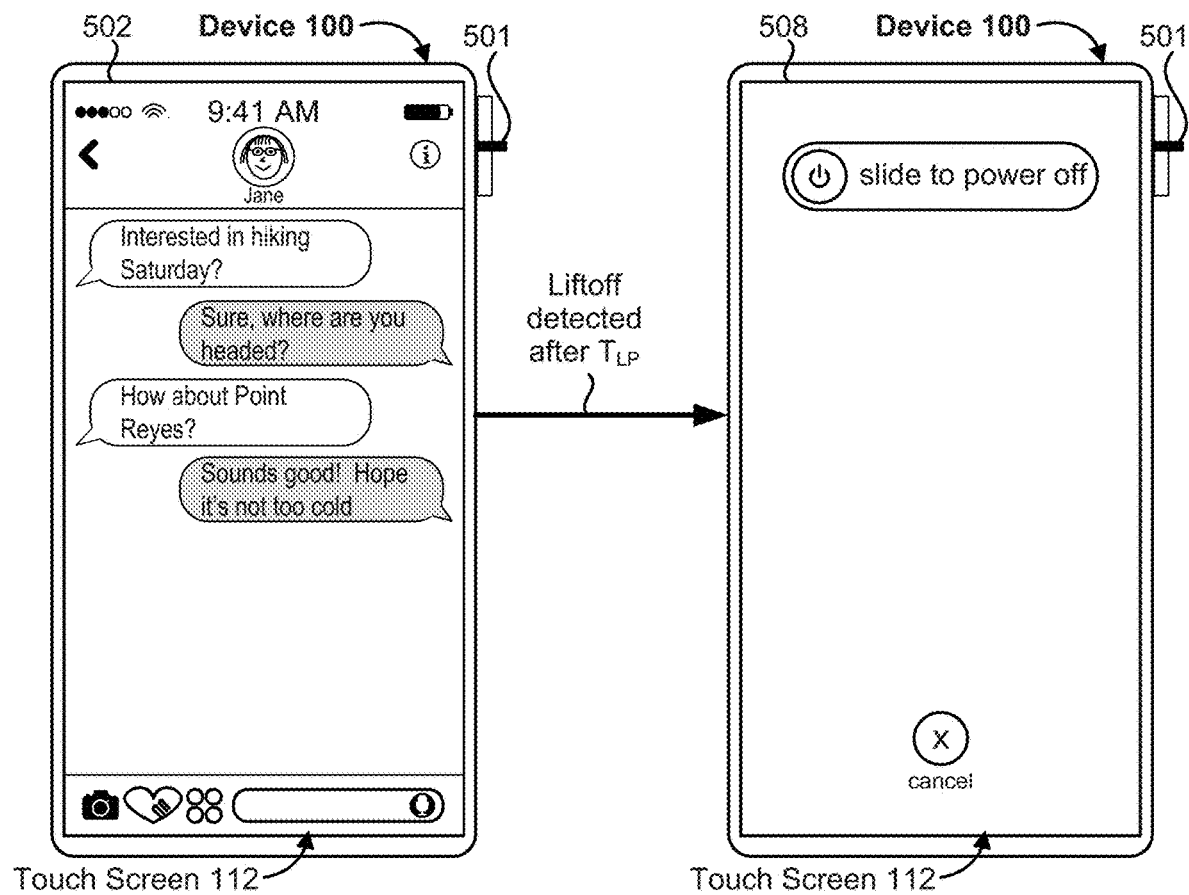
Figure 5A3

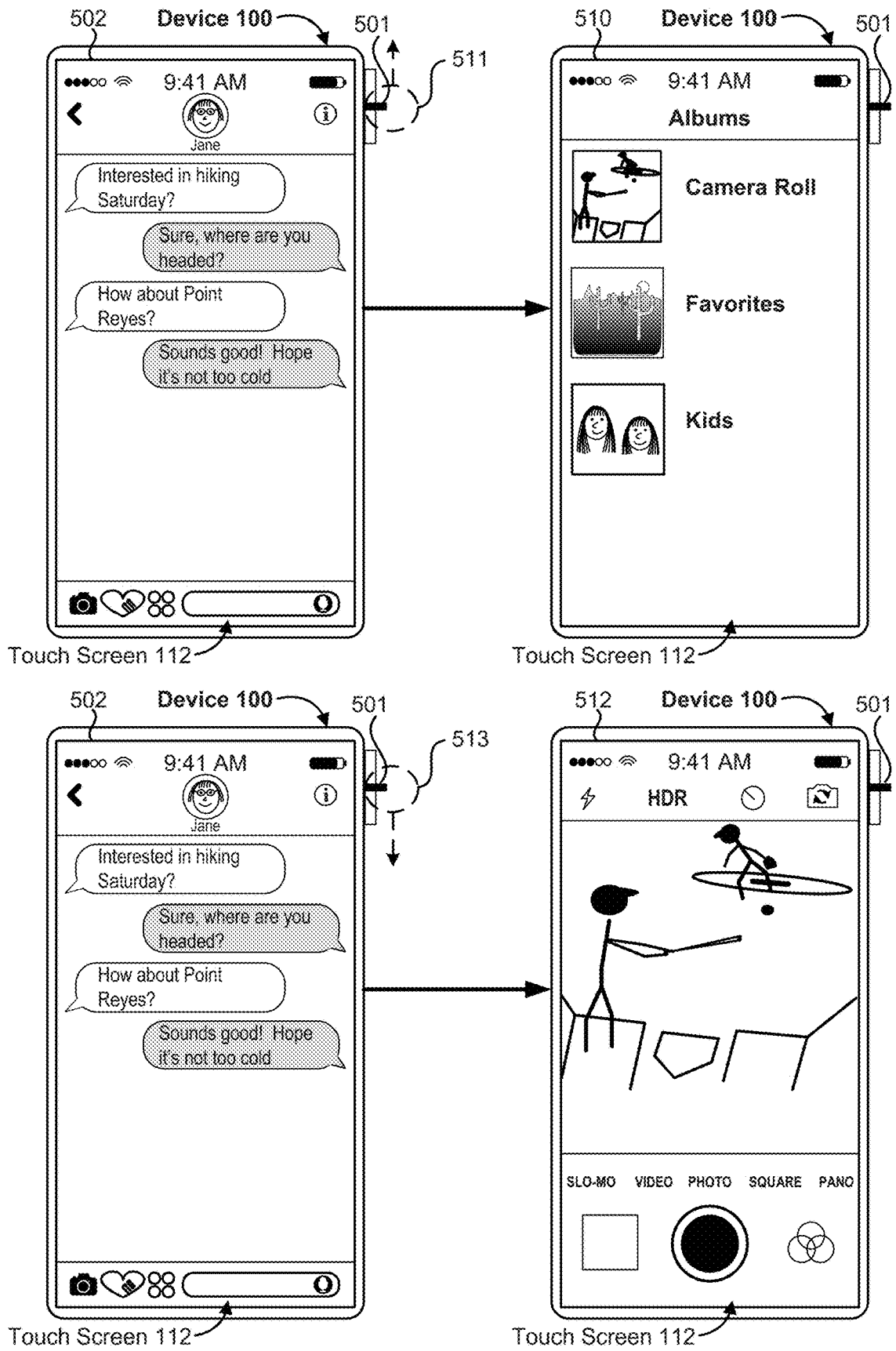
Figure 5A4

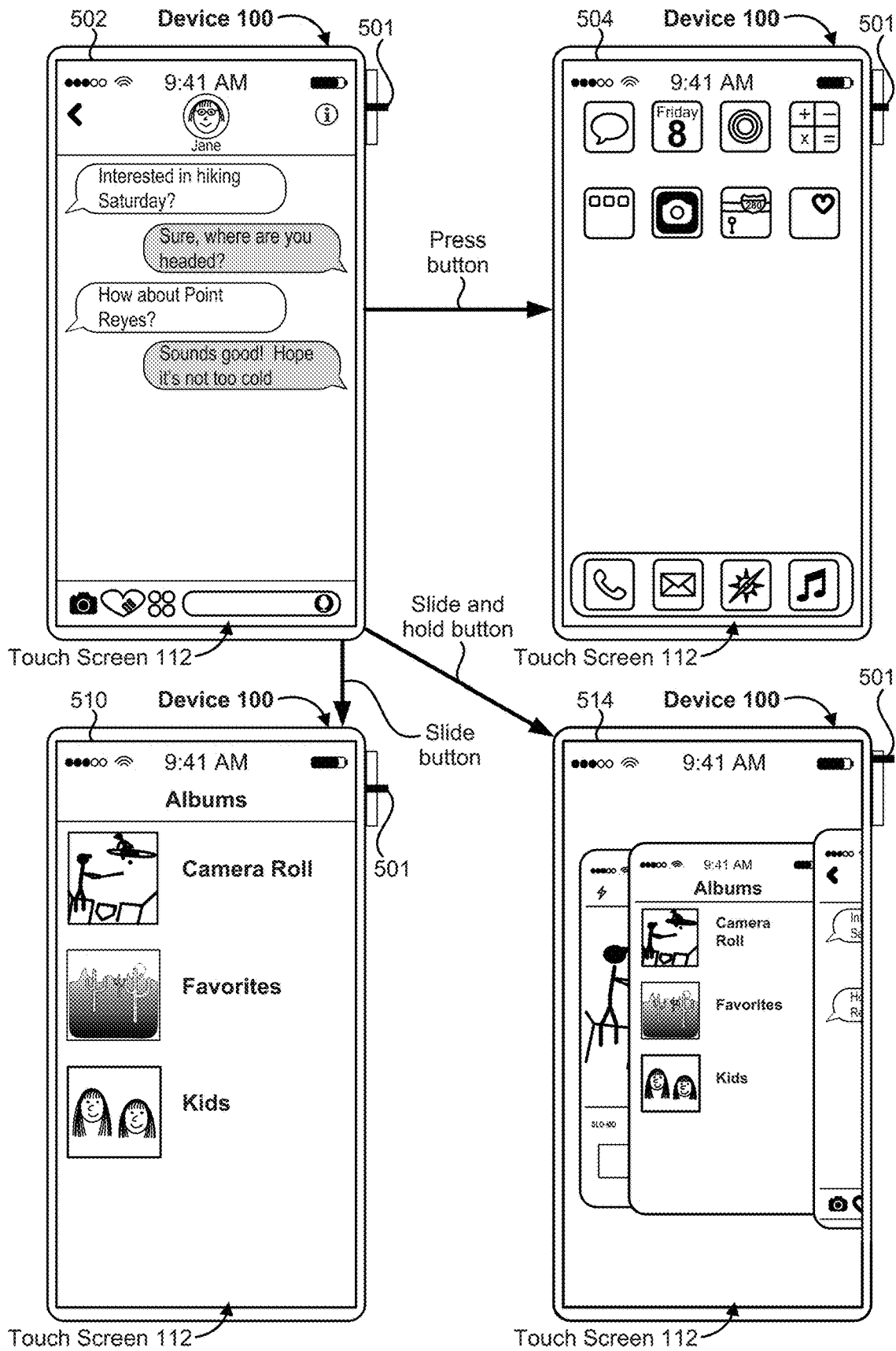
Figure 5A5

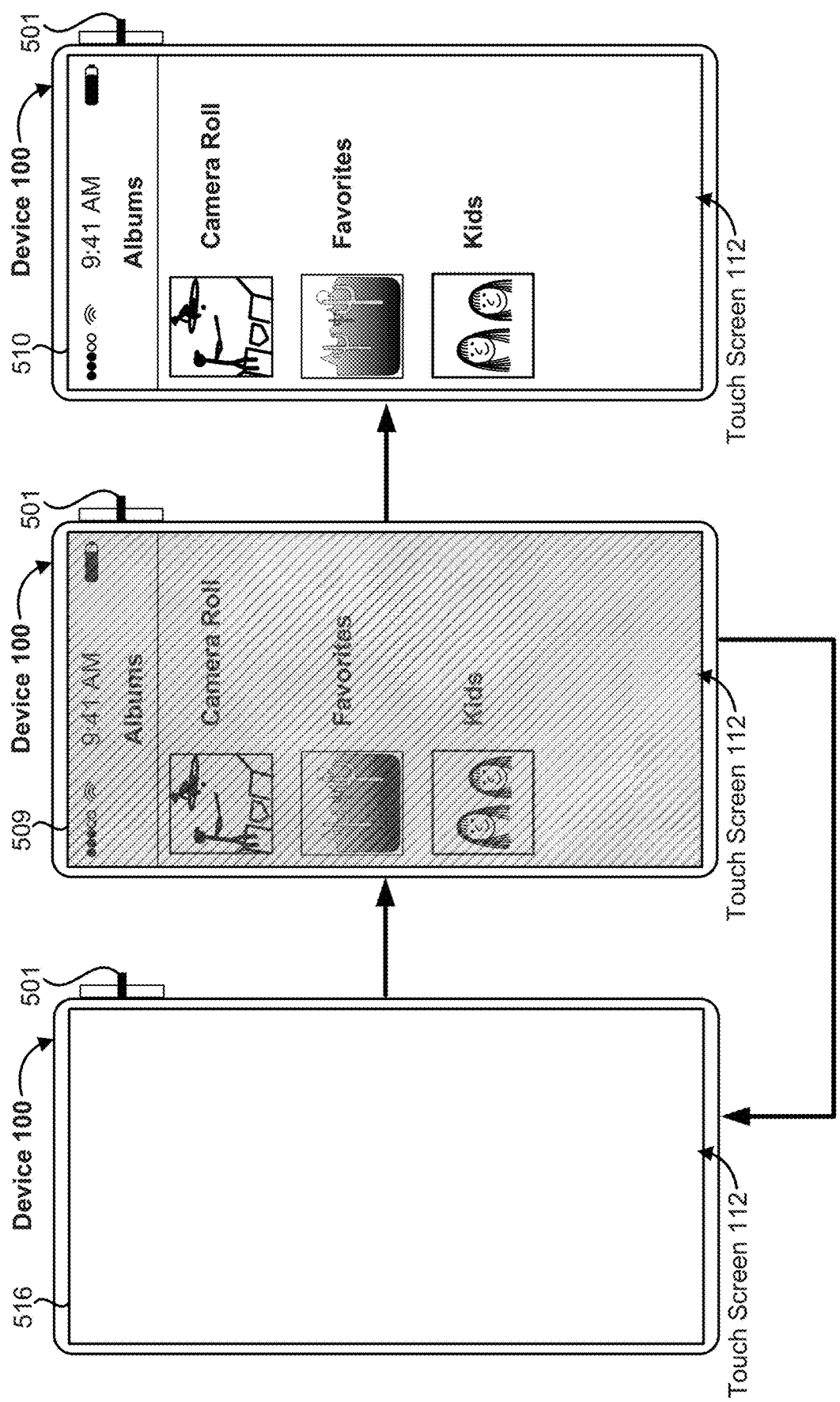
Figure 5A6

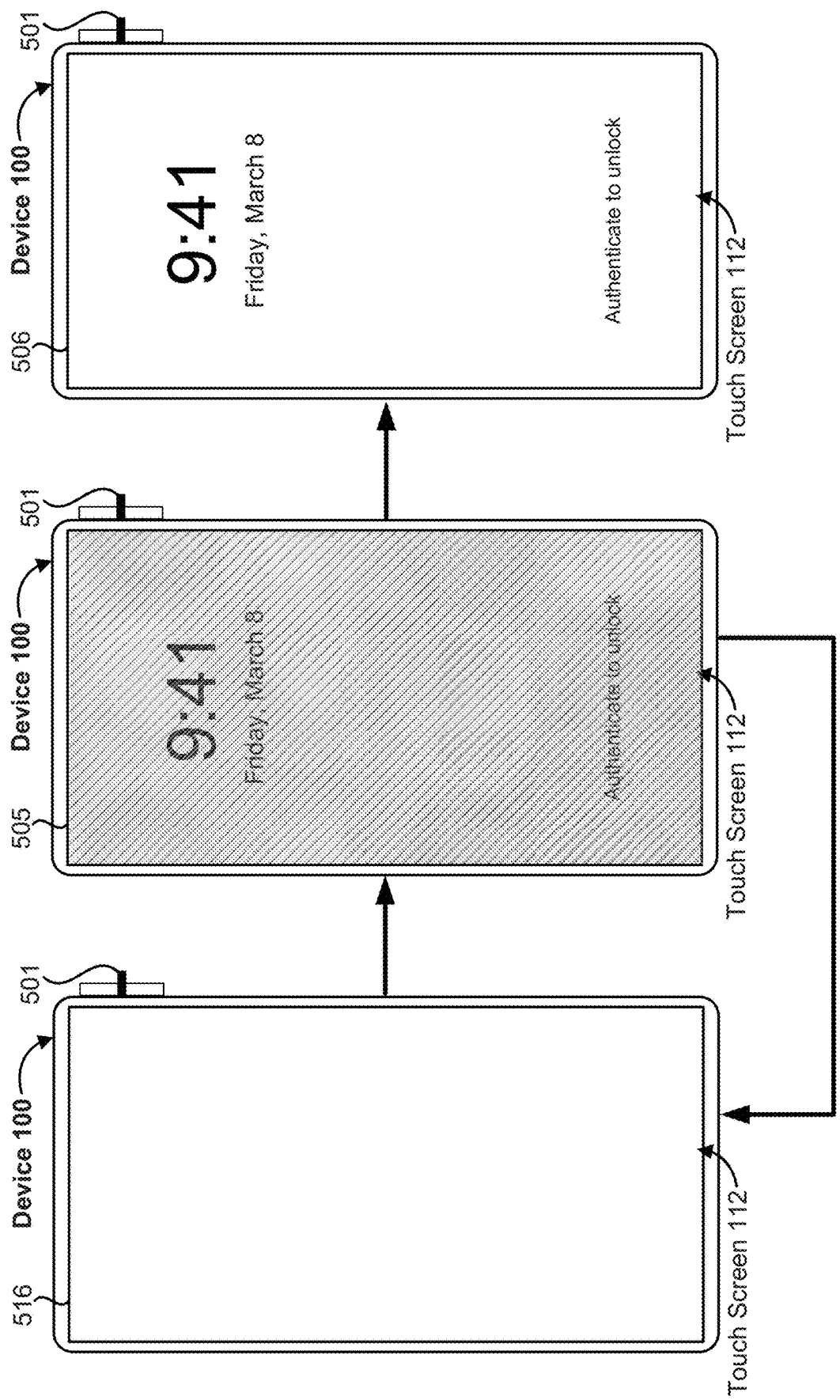
Figure 5A7

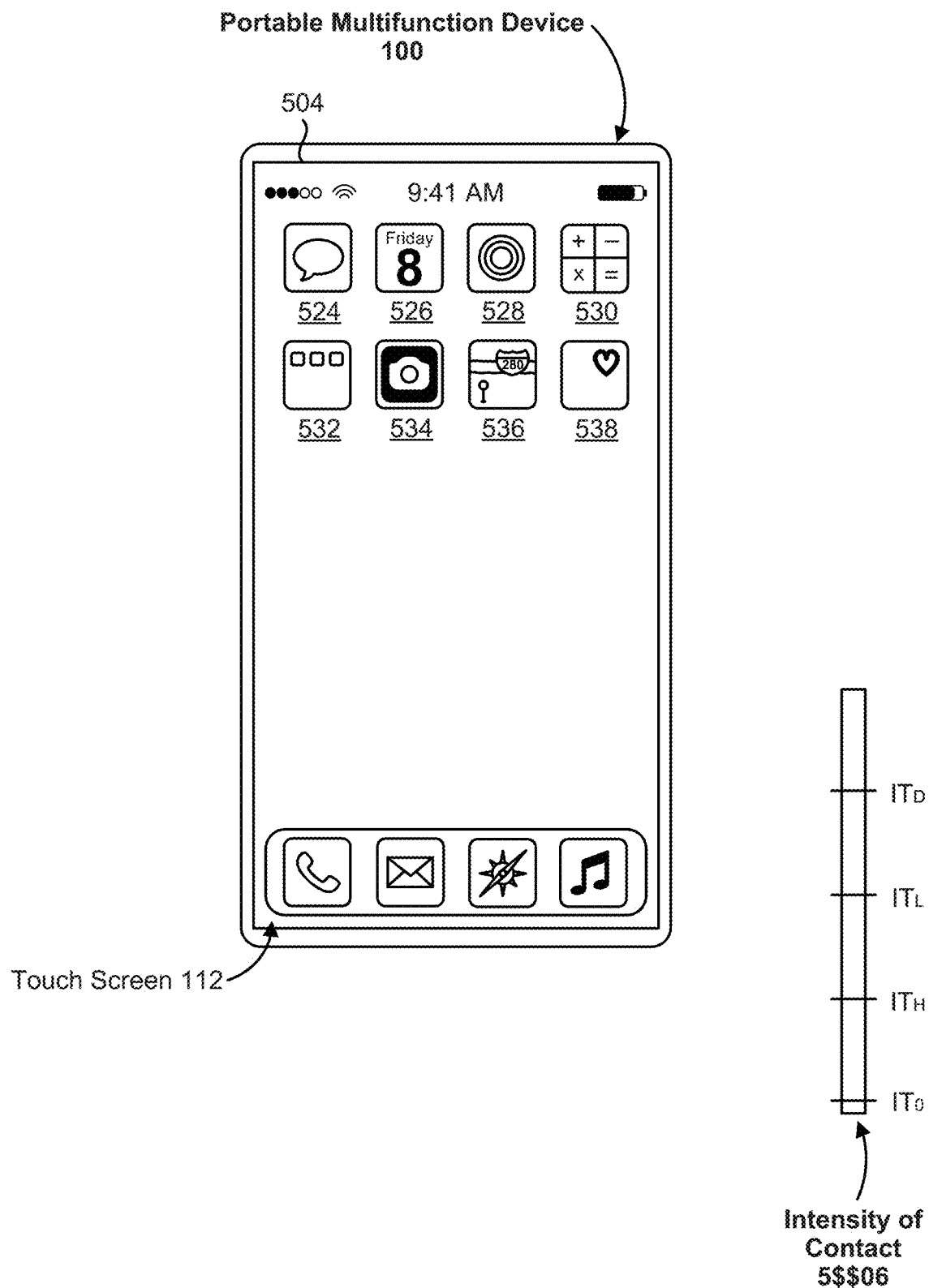
Figure 5B1

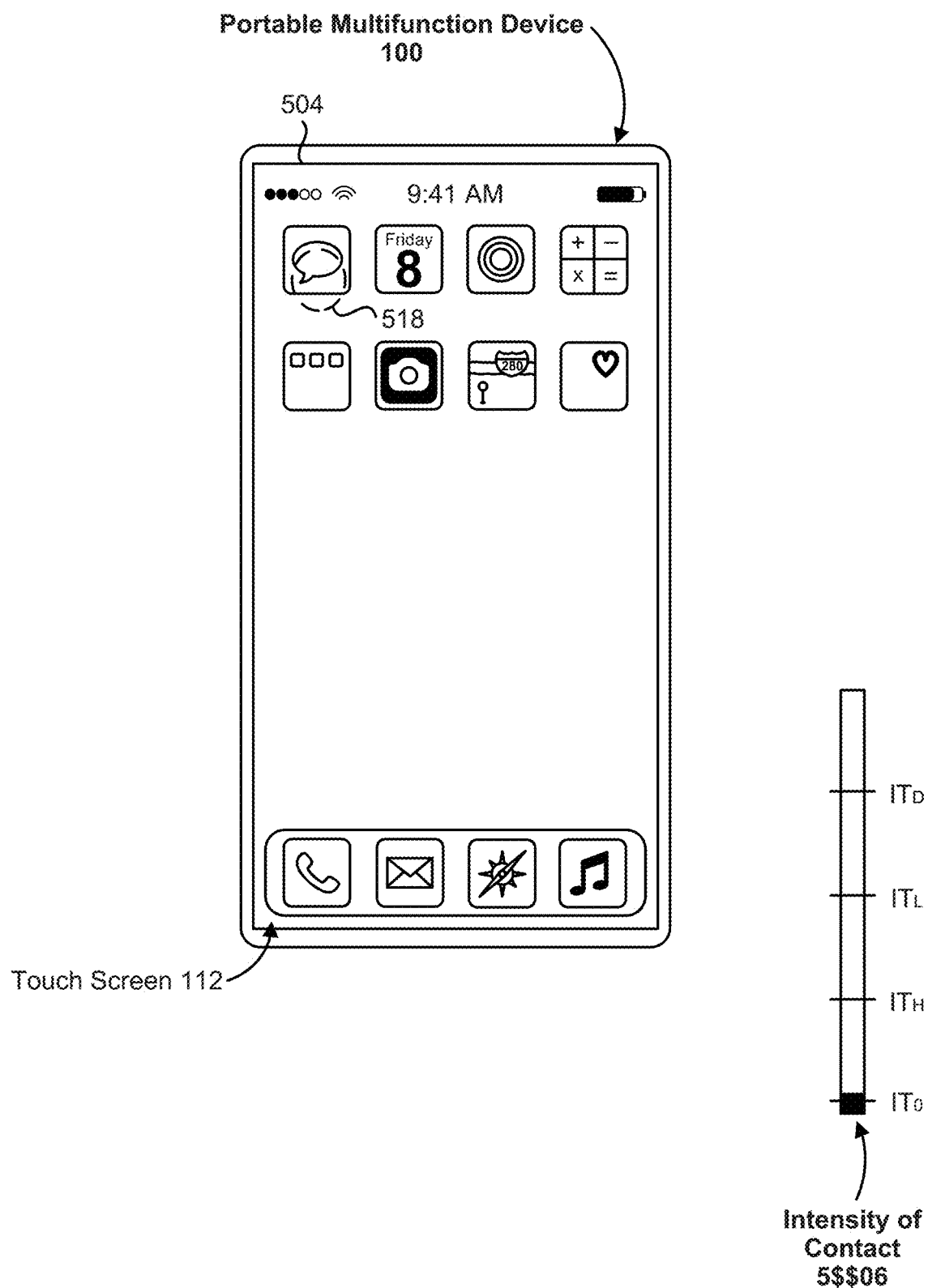
Figure 5B2

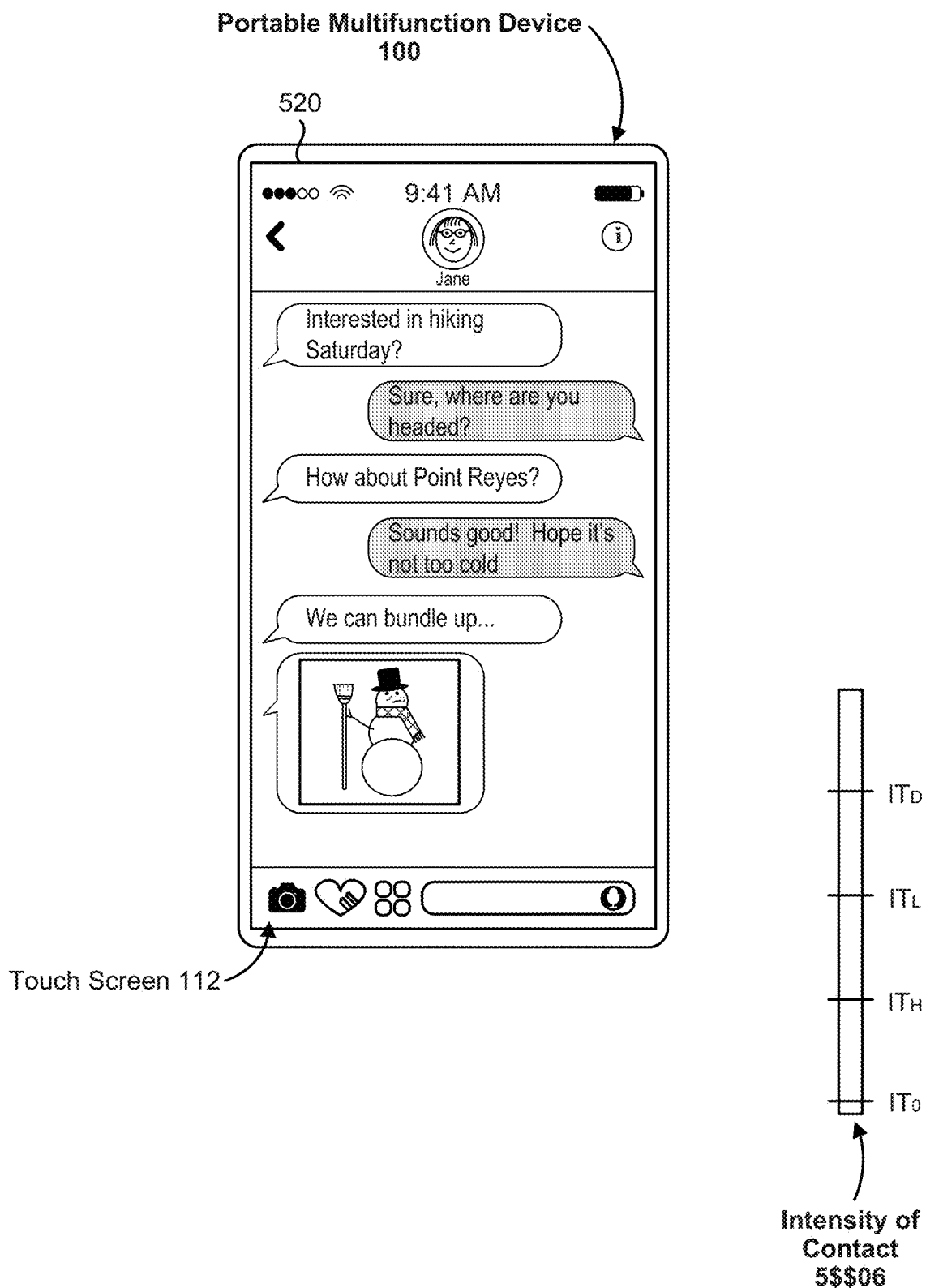
Figure 5B3

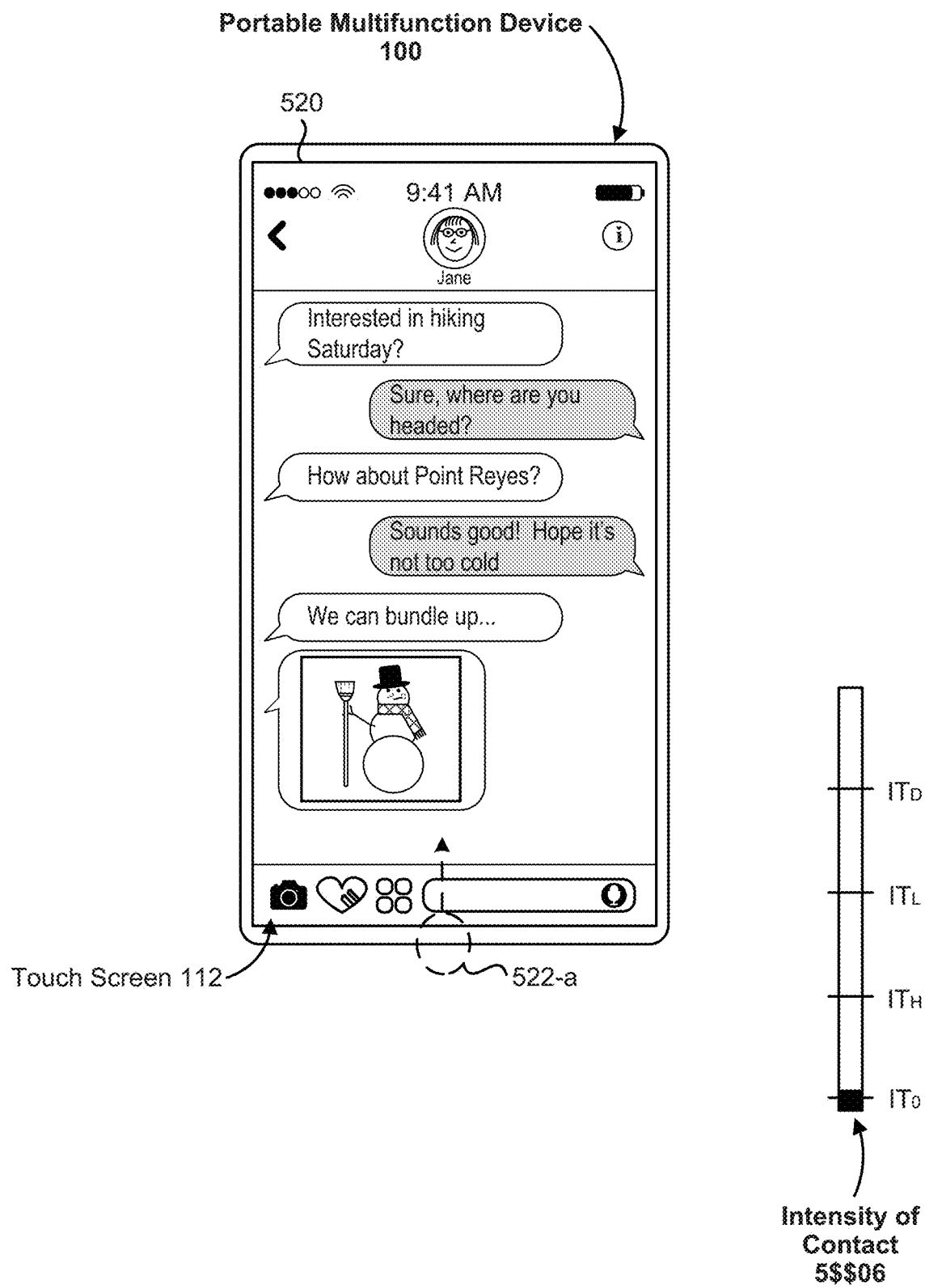
Figure 5B4

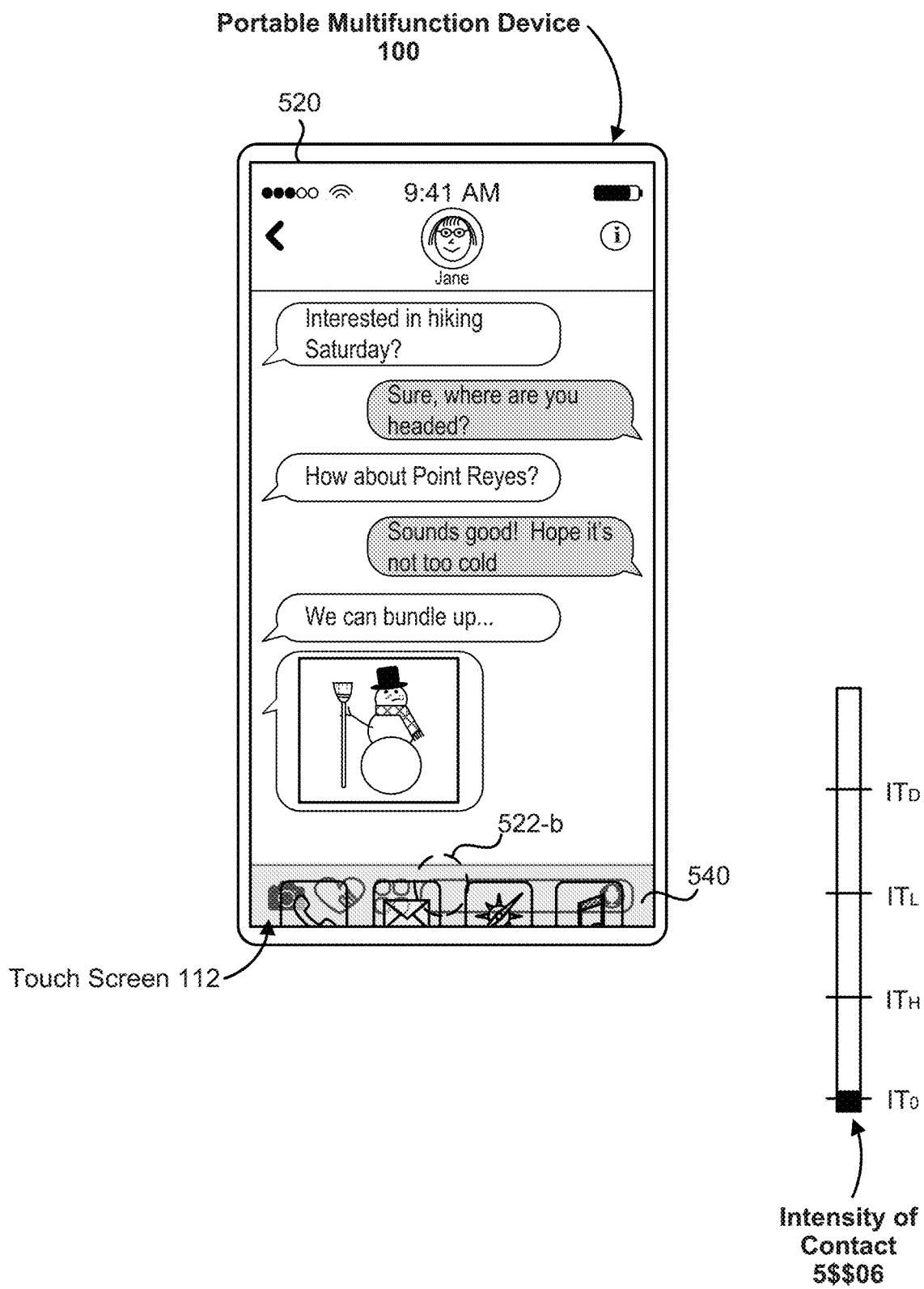
Figure 5B5

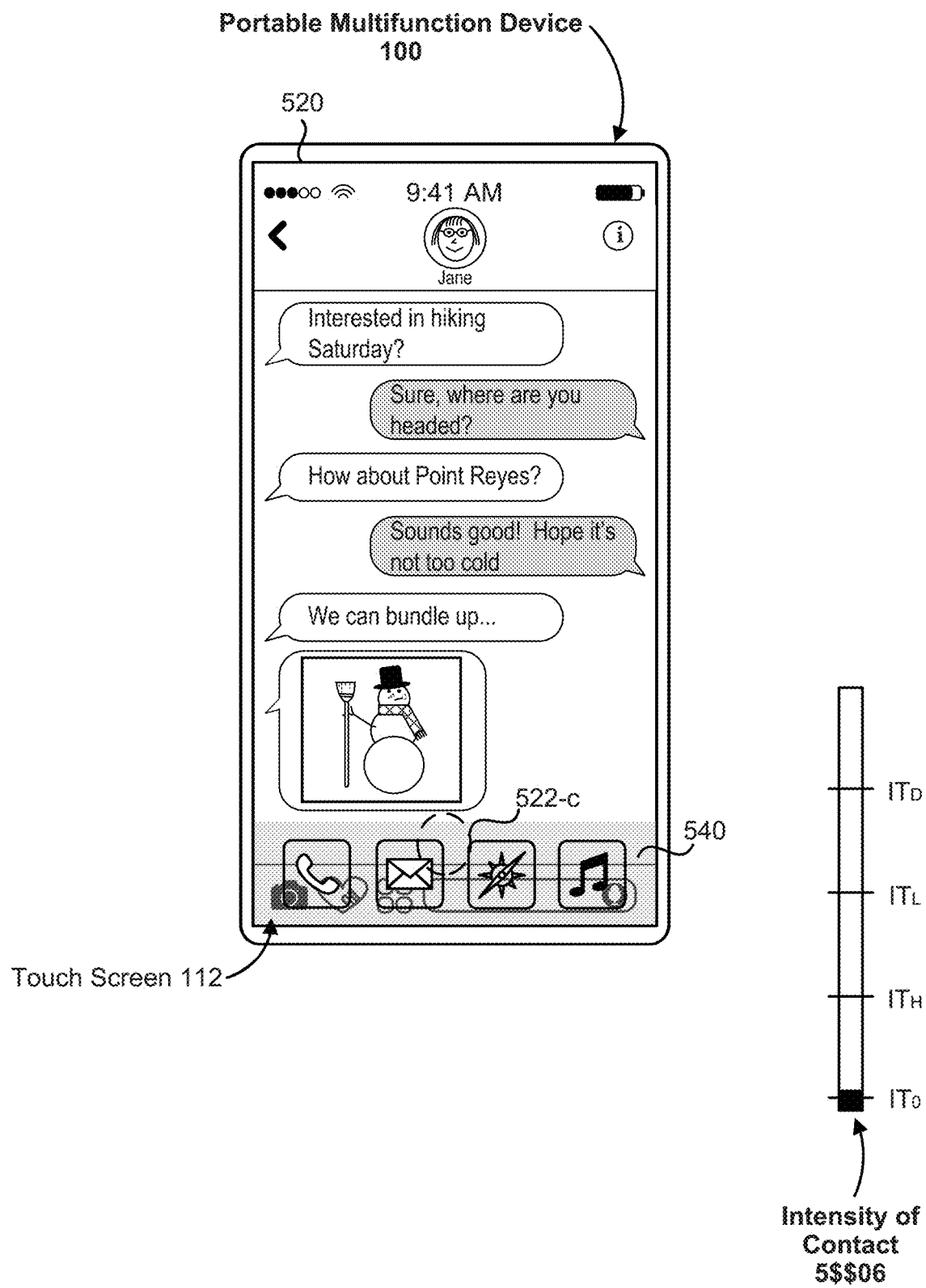
Figure 5B6

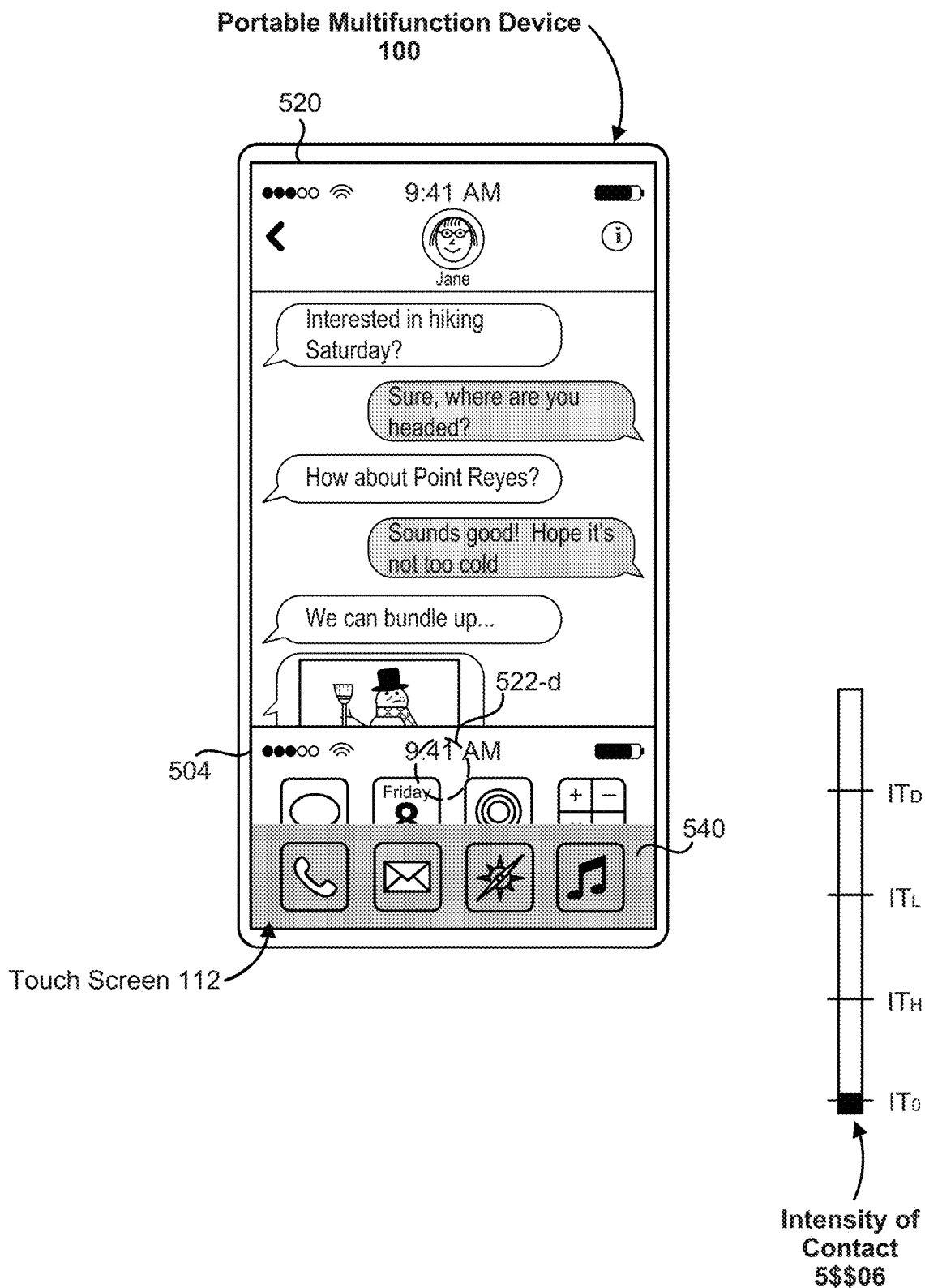
Figure 5B7

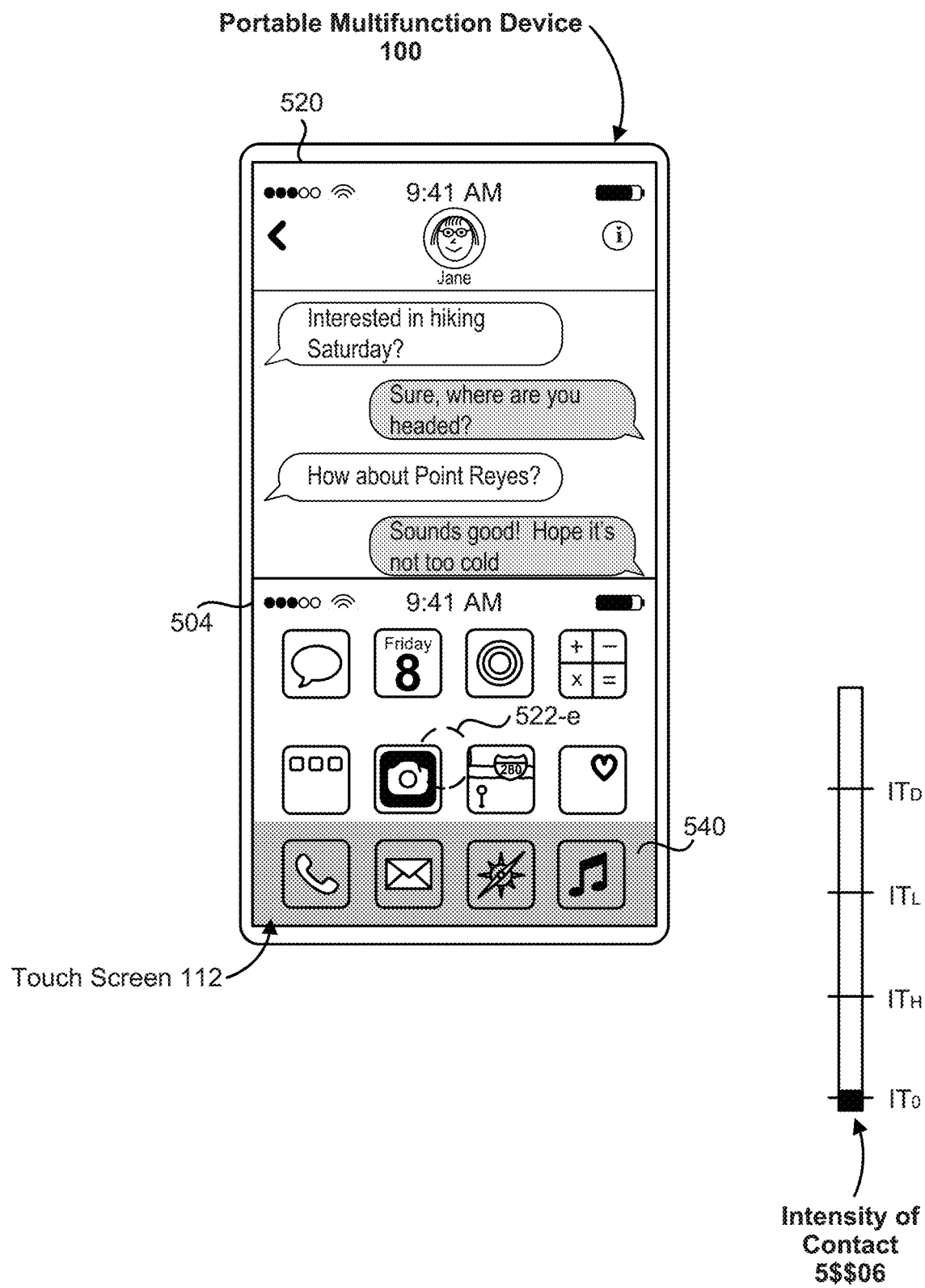
Figure 5B8

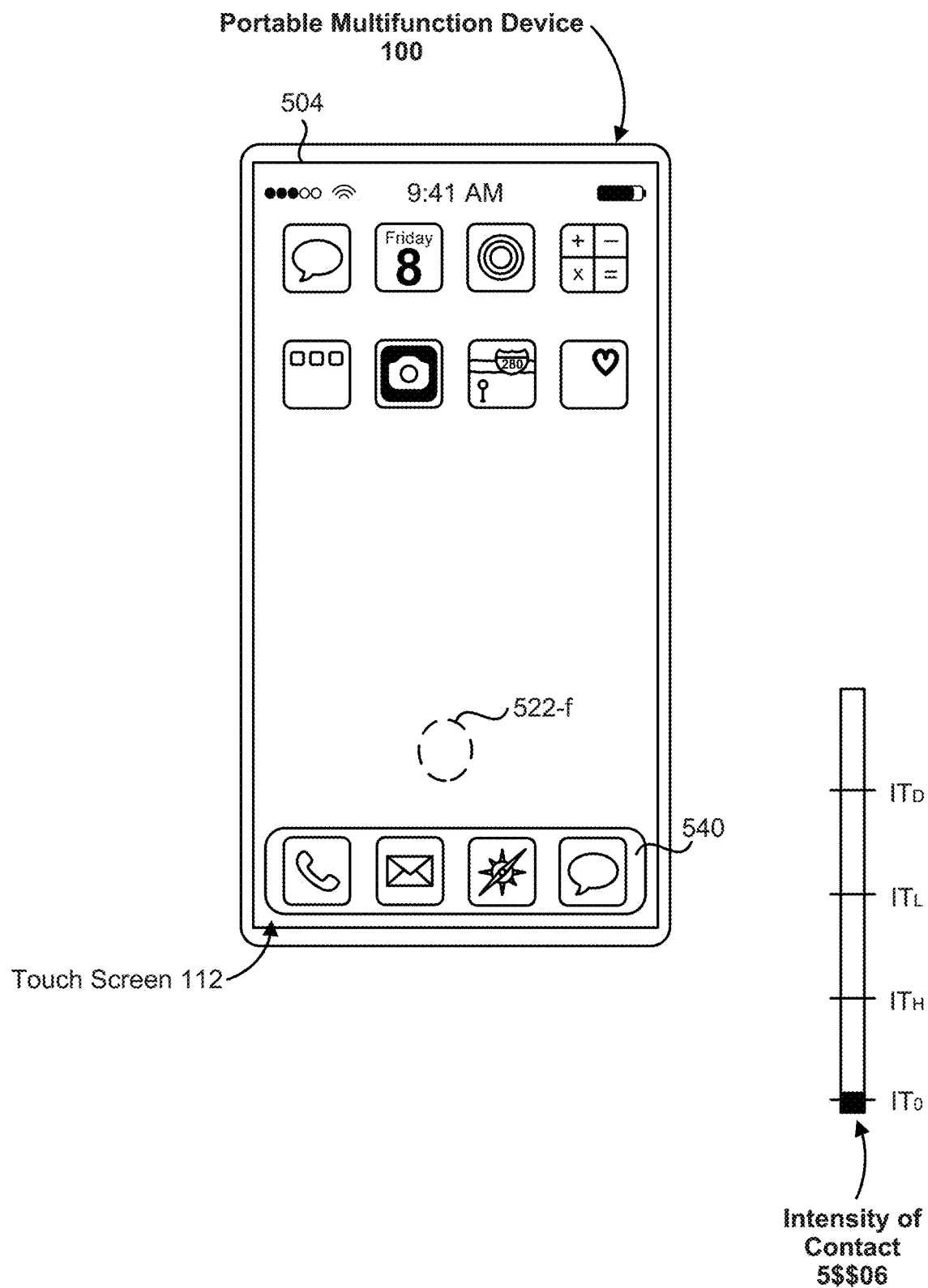
Figure 5B9

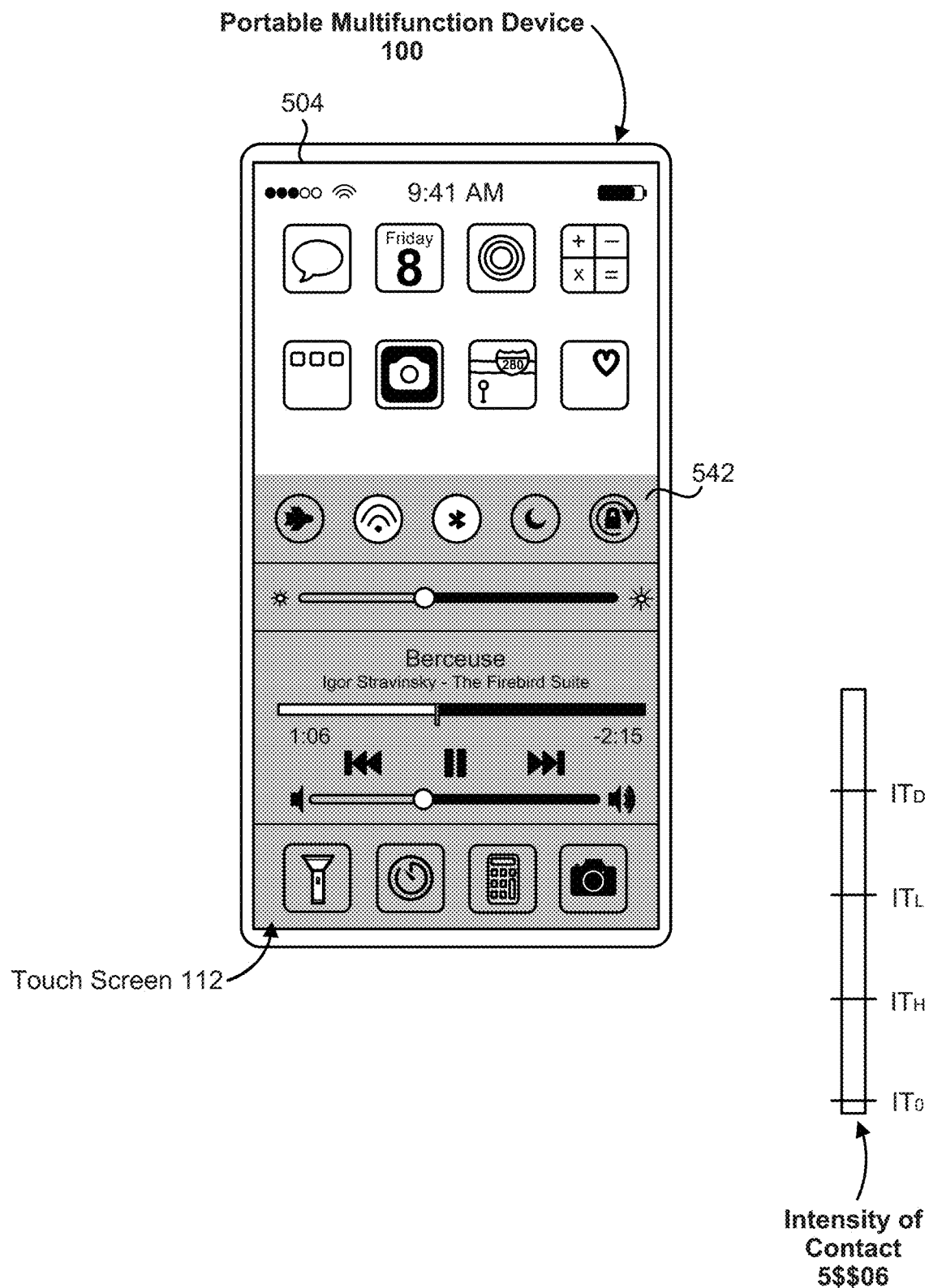
Figure 5B10

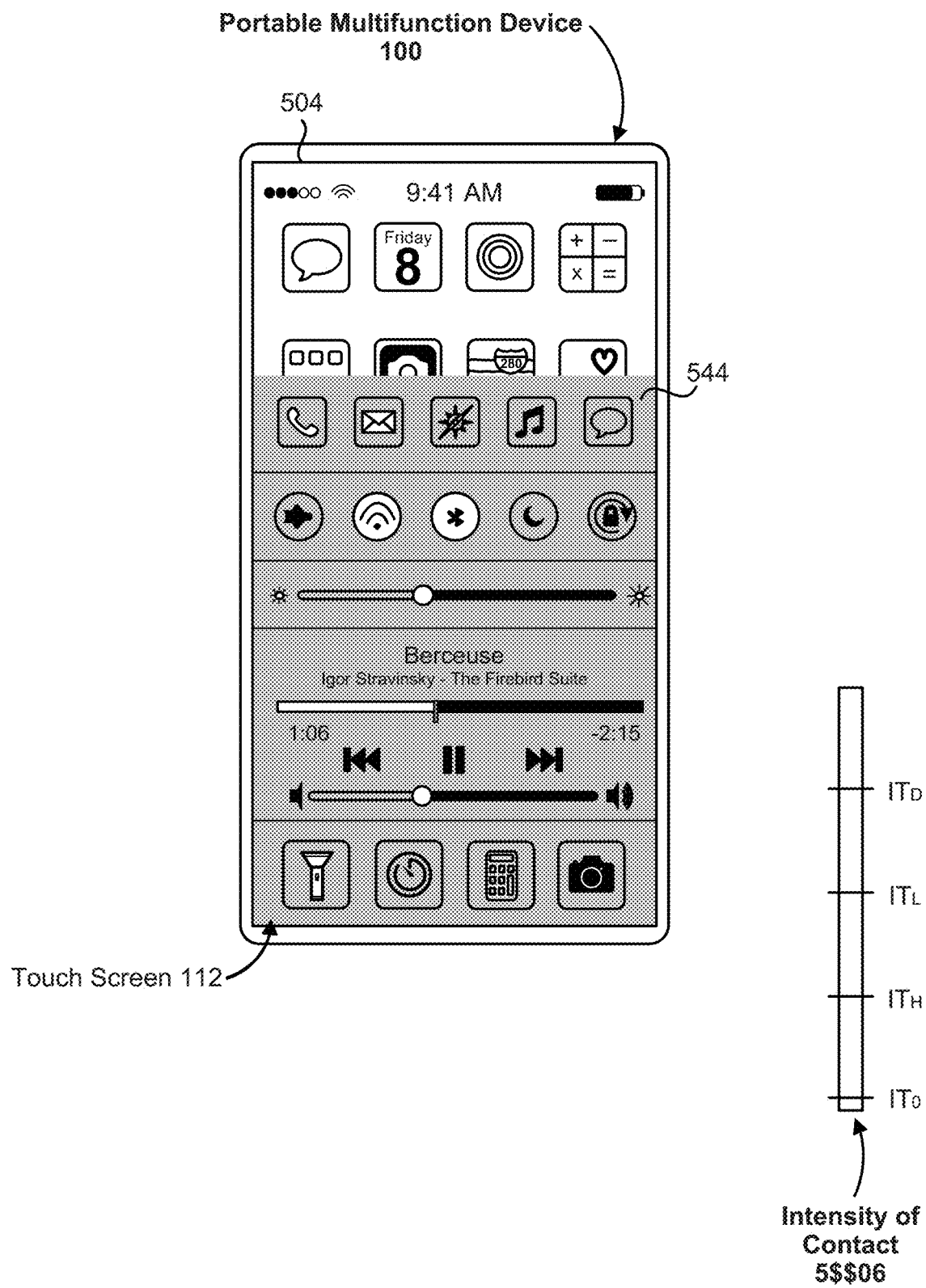
Figure 5B11

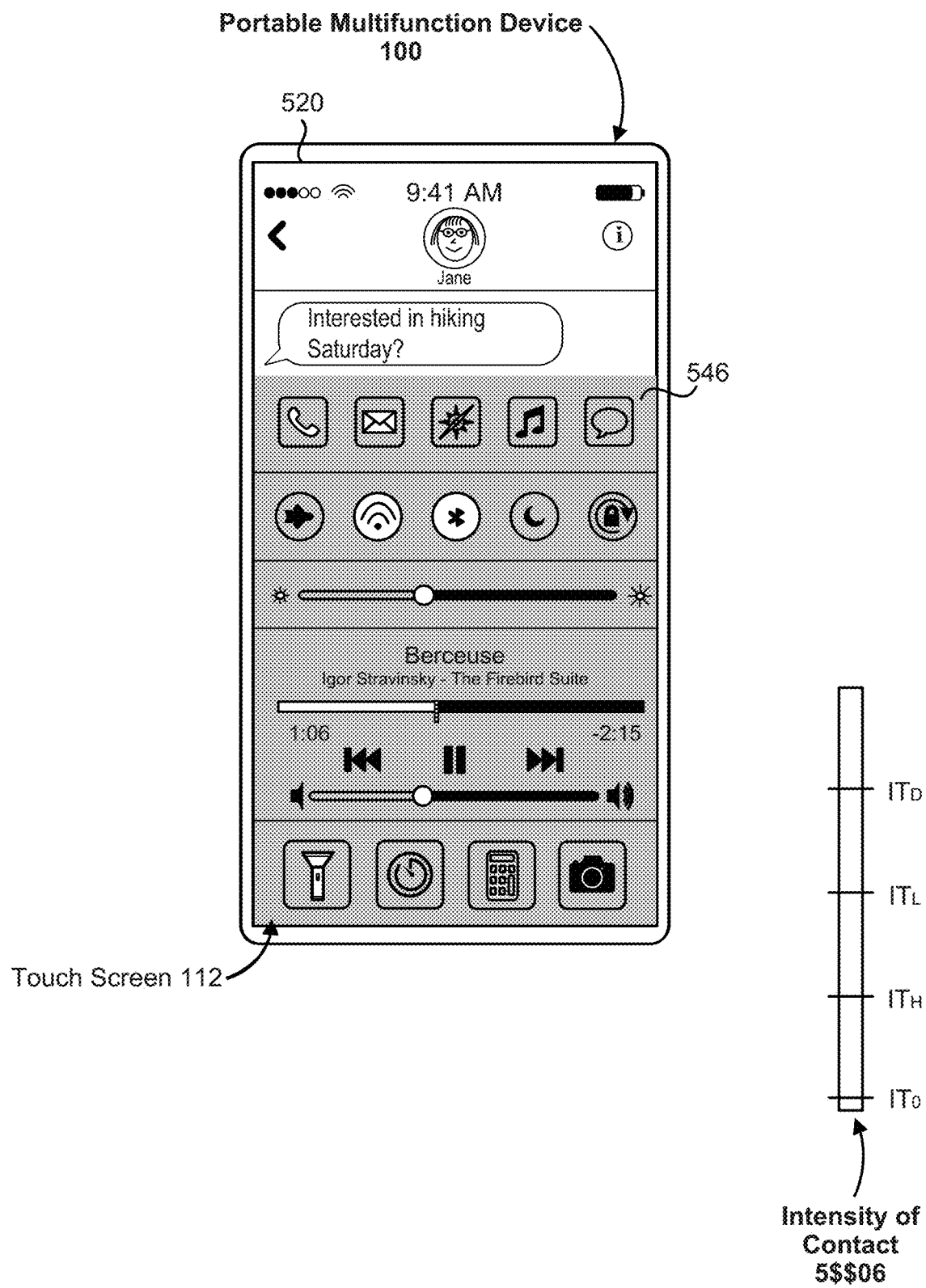
Figure 5B12

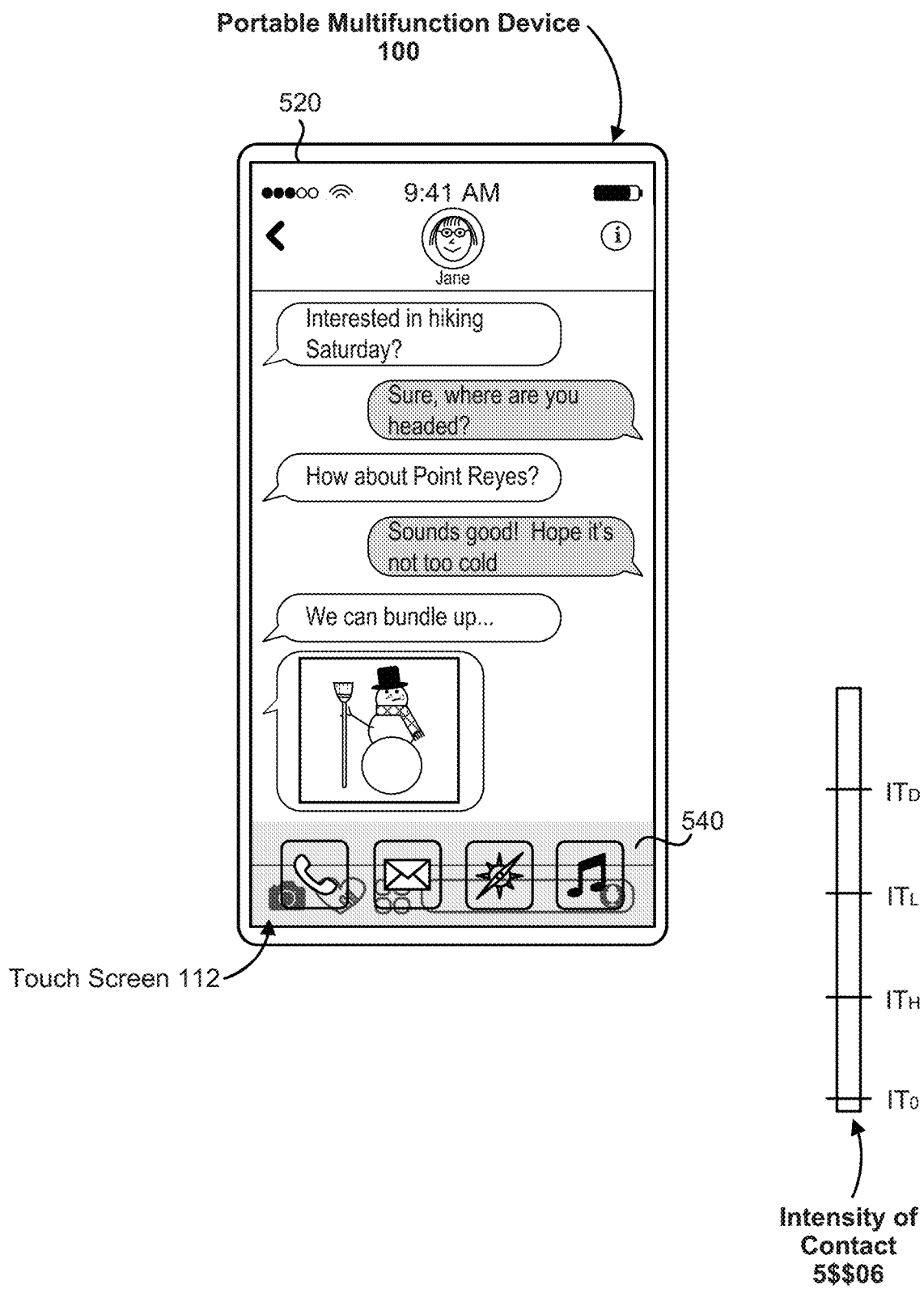
Figure 5B13

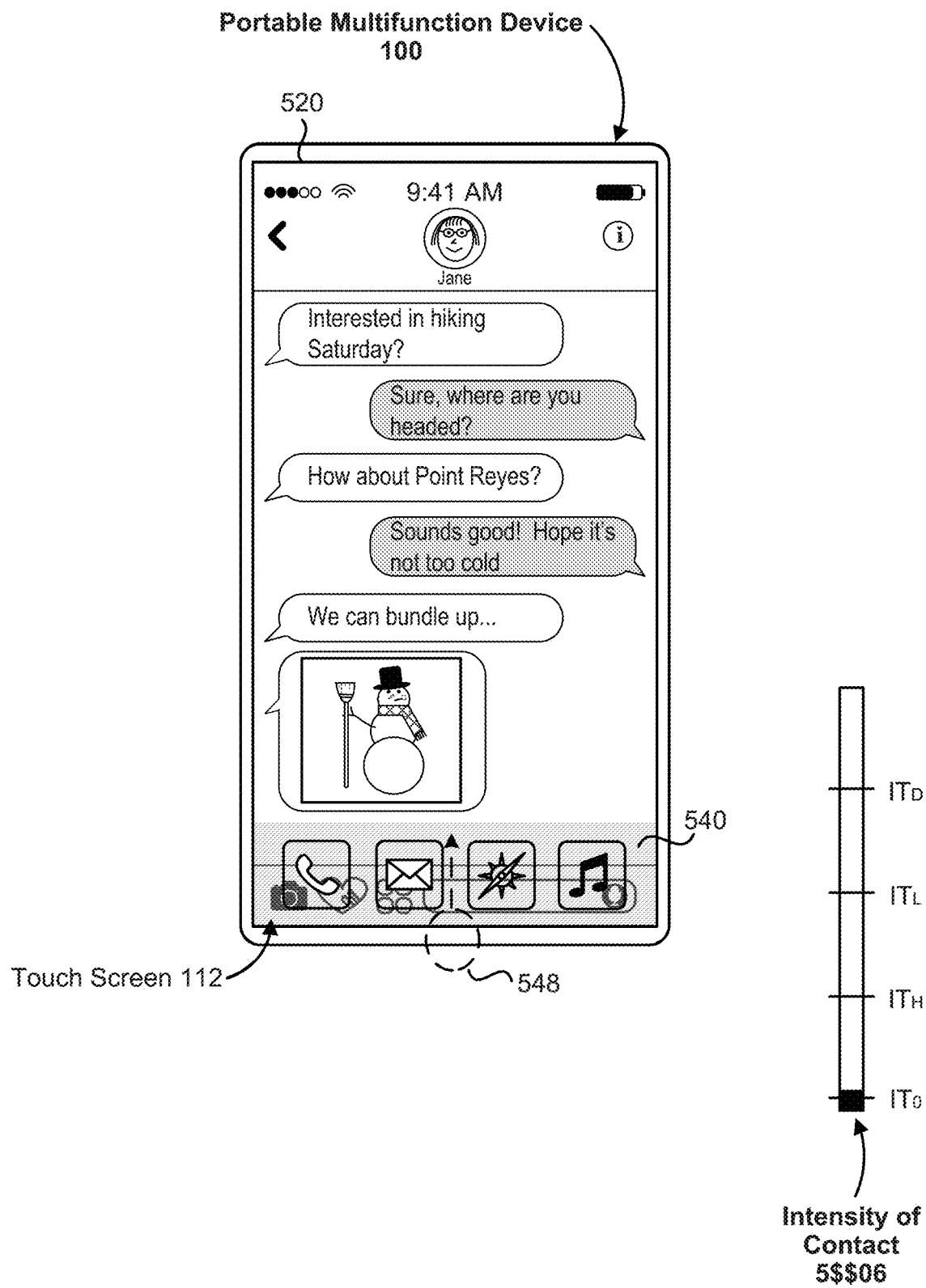
Figure 5B14

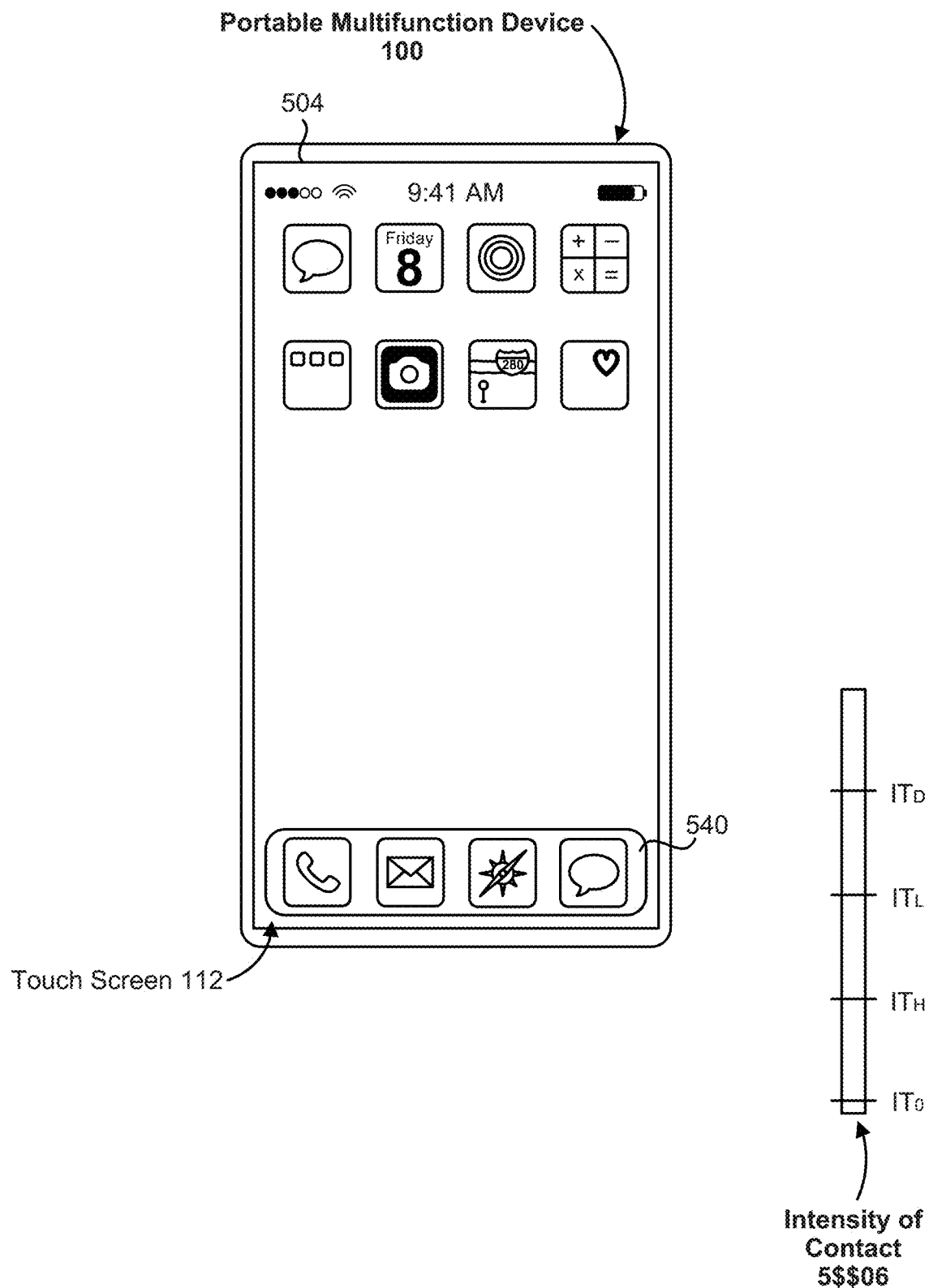
Figure 5B15

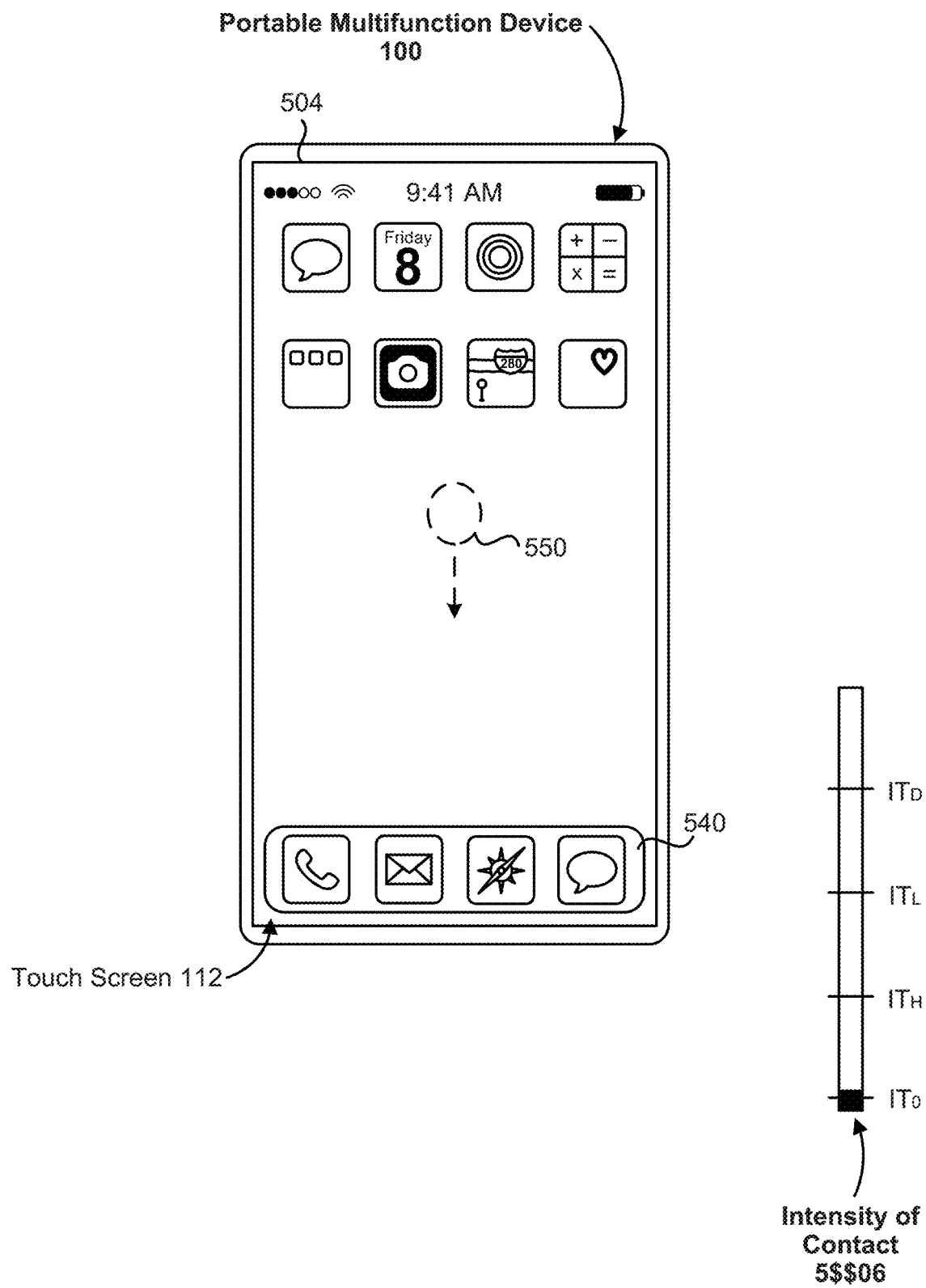
Figure 5B16

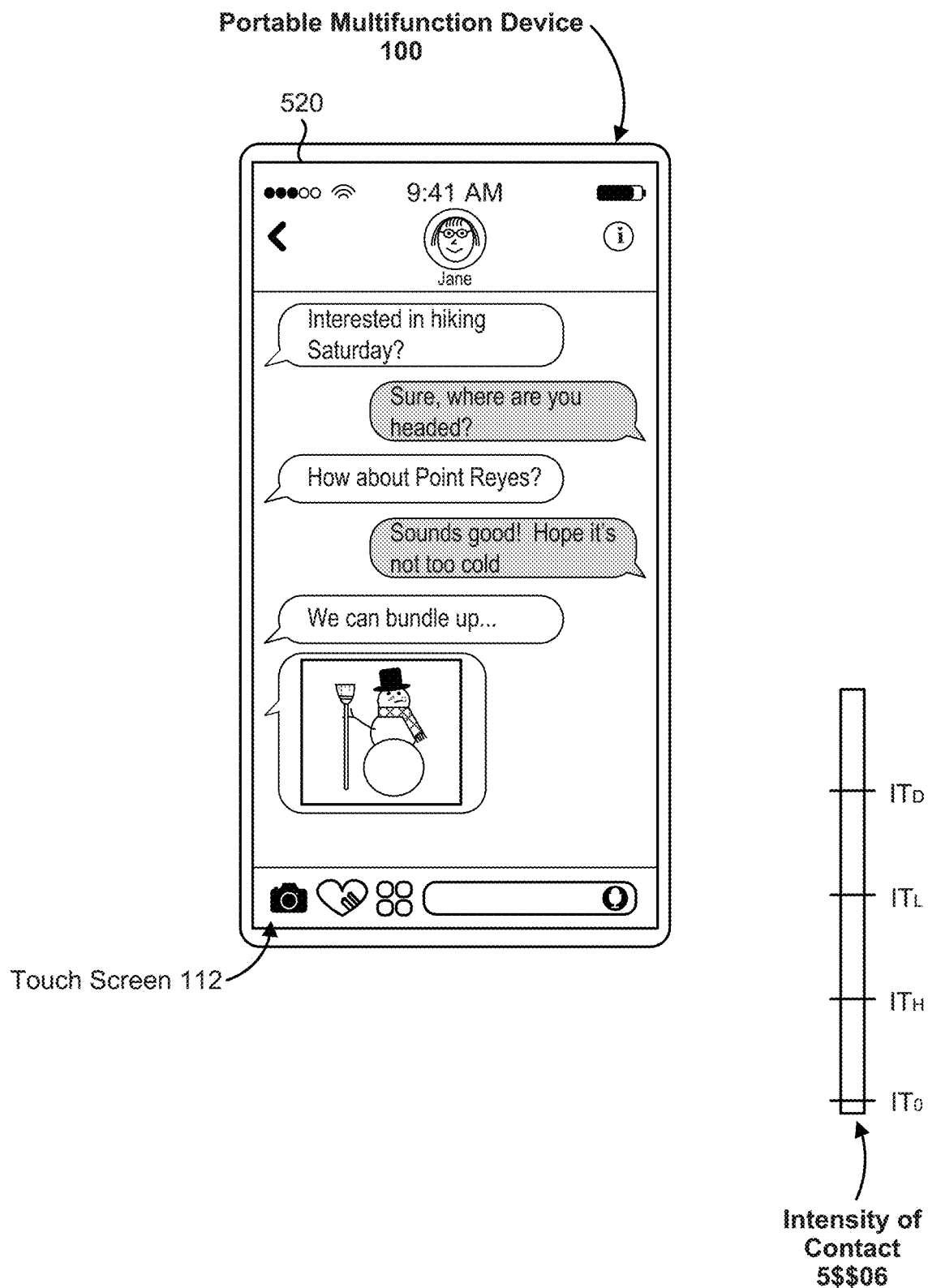
Figure 5B17

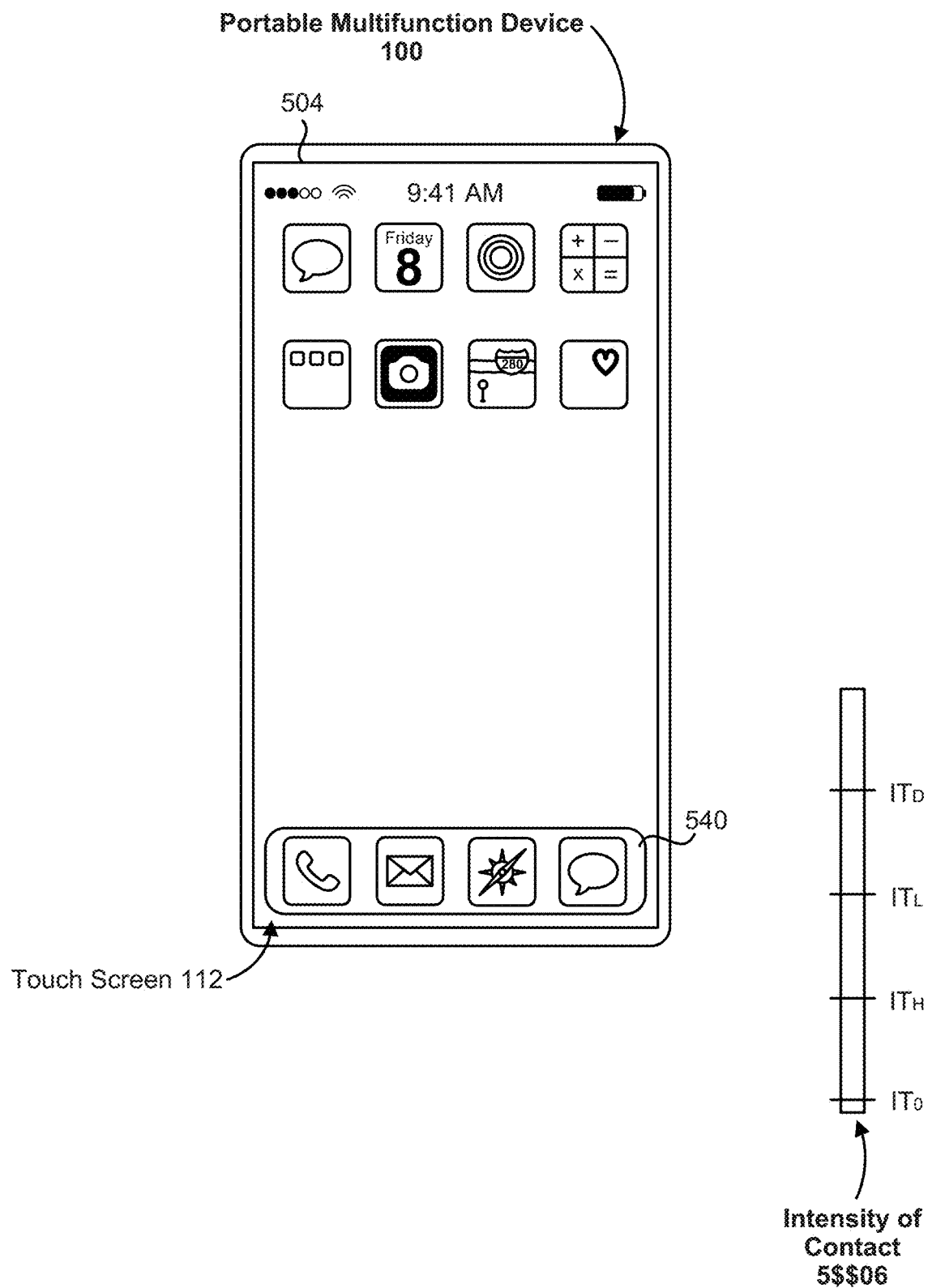
Figure 5B18

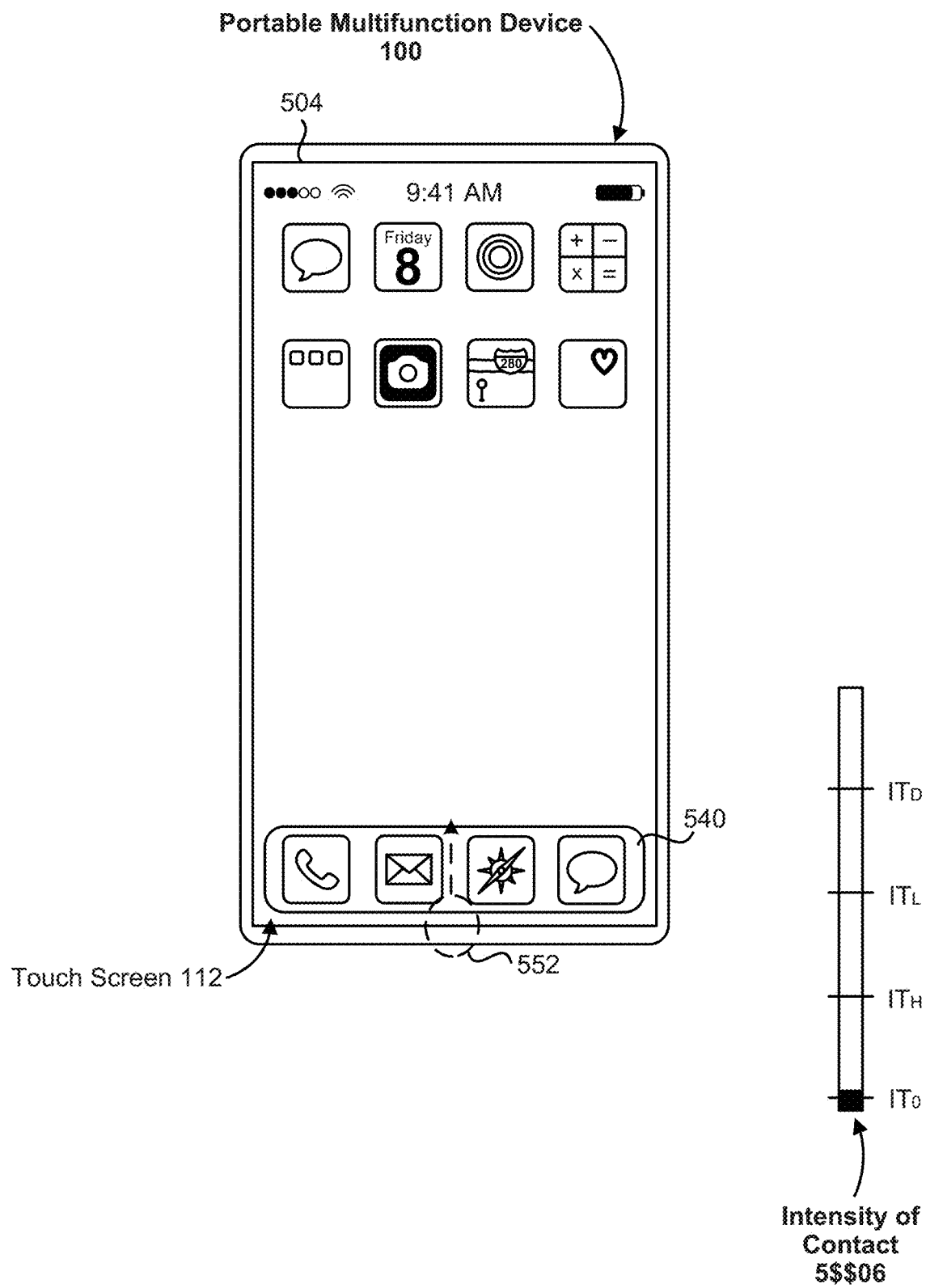
Figure 5B19

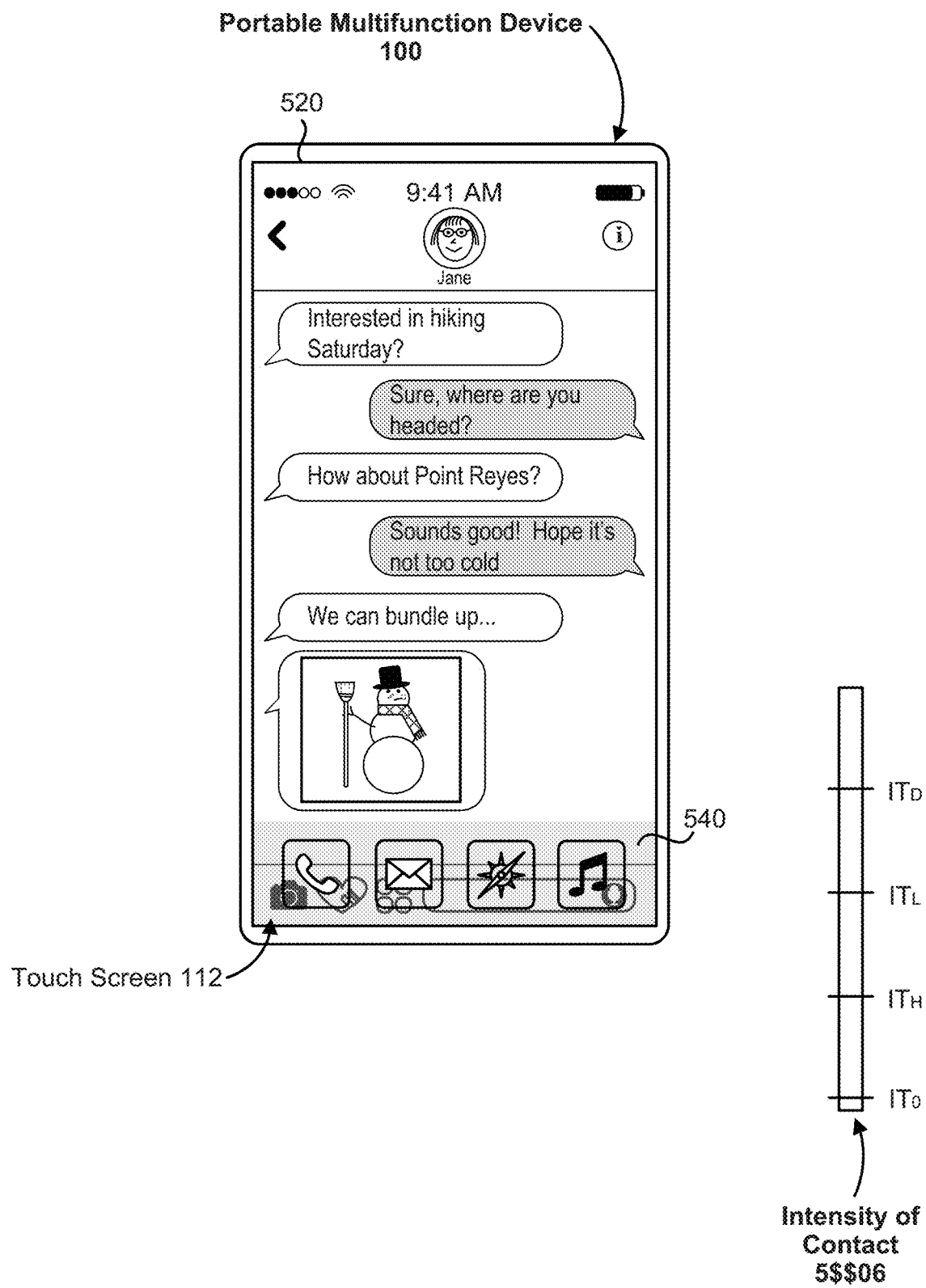
Figure 5B20

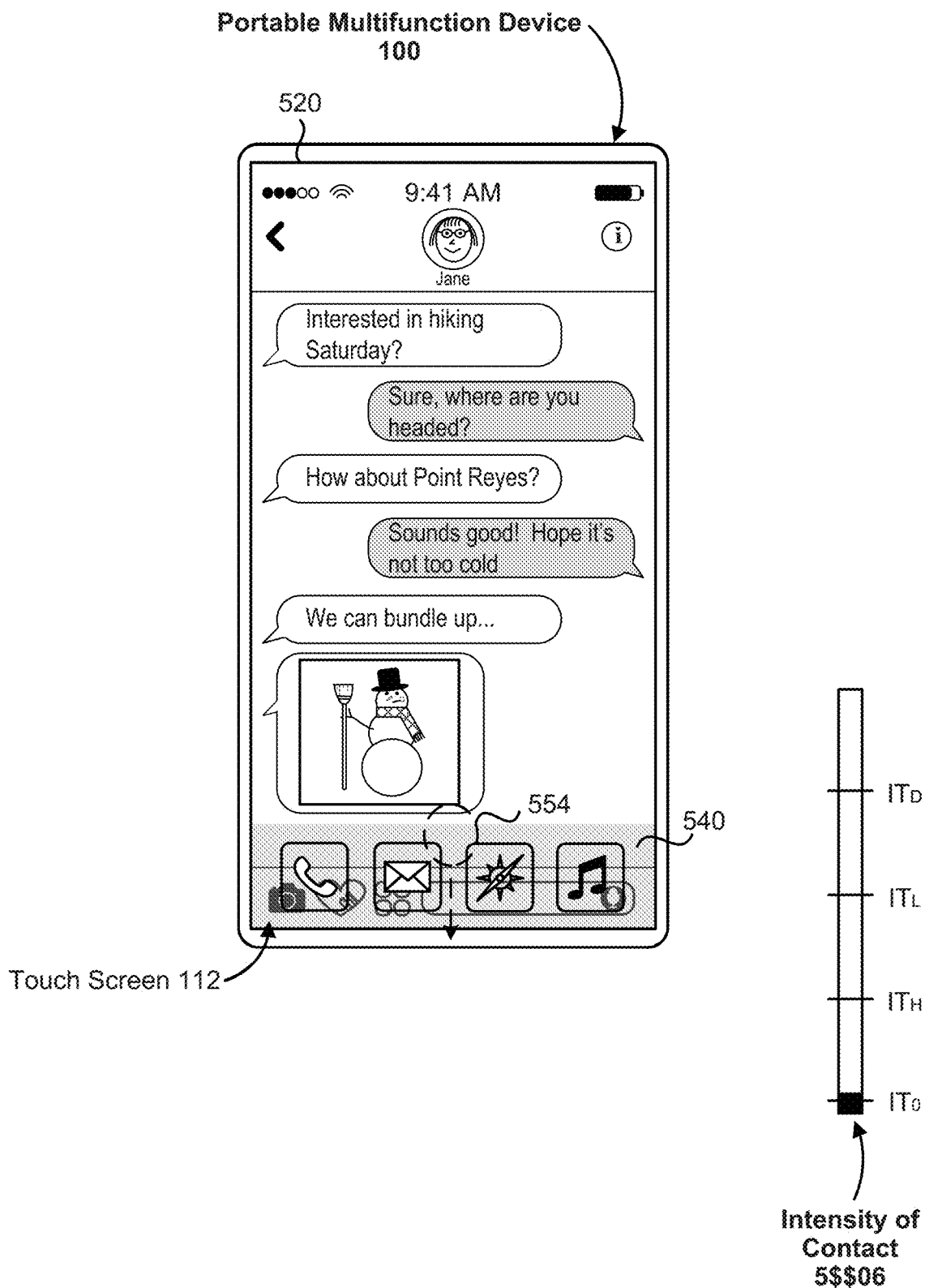
Figure 5B21

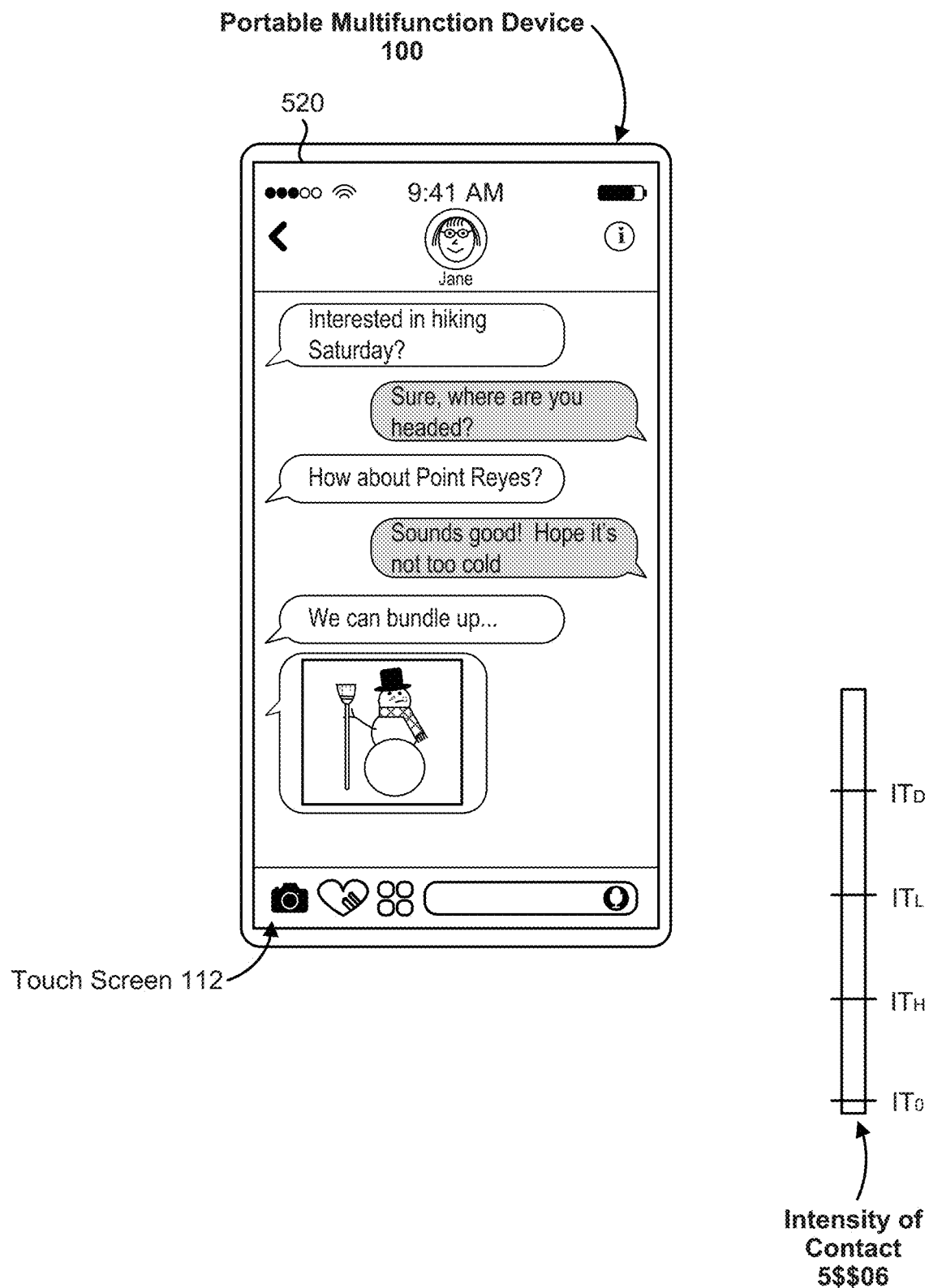
Figure 5B22

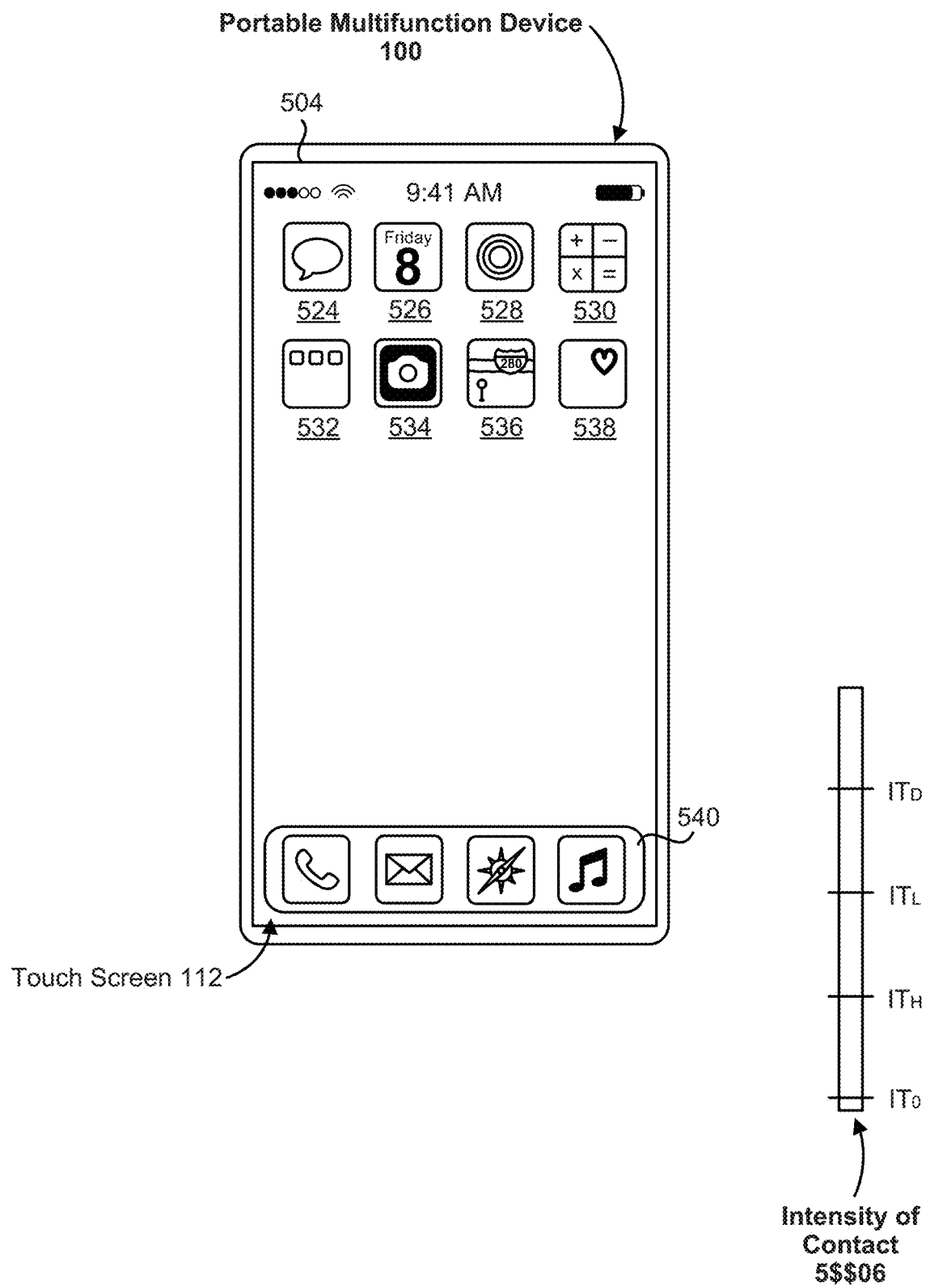
Figure 5C1

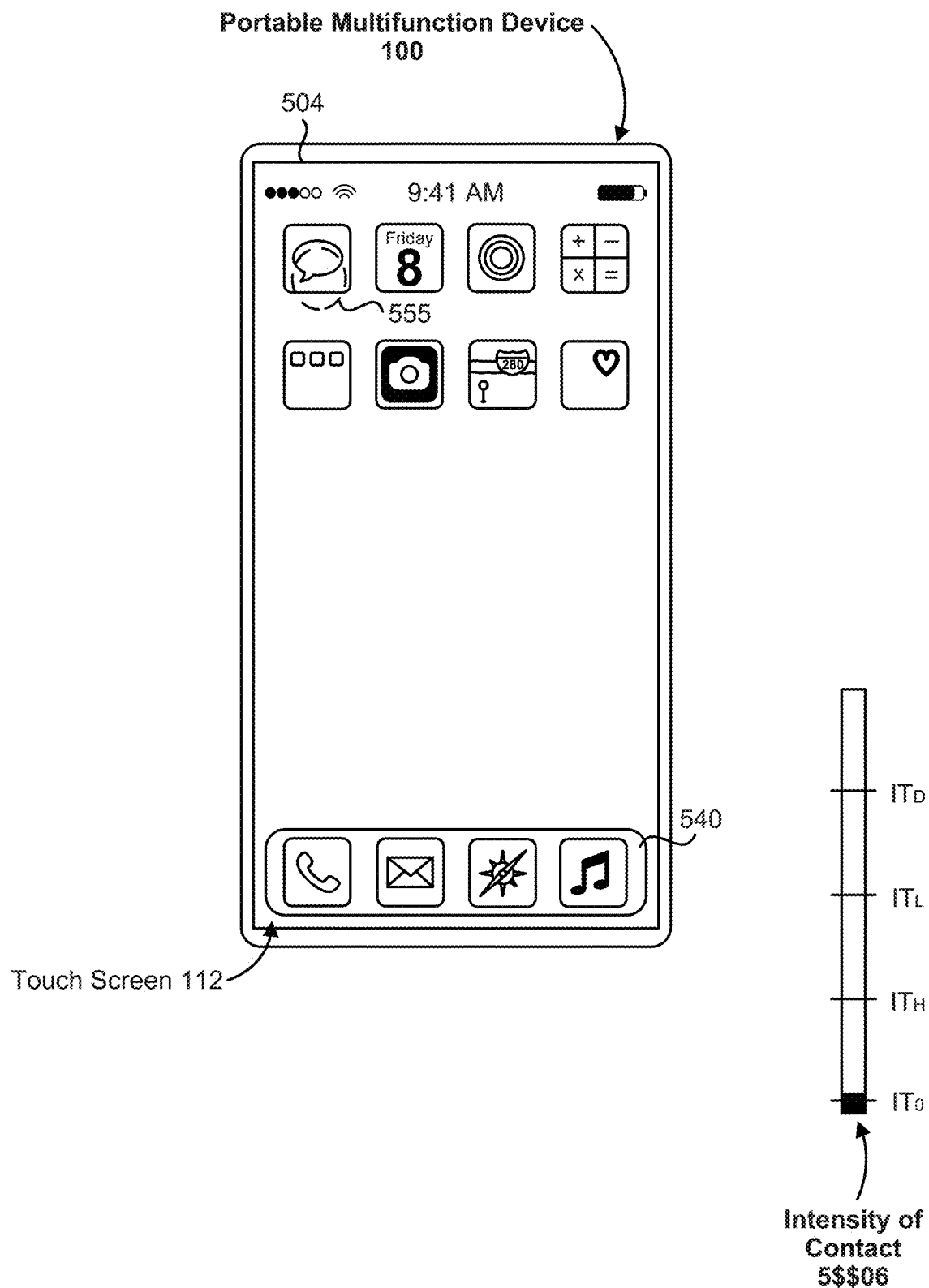
Figure 5C2

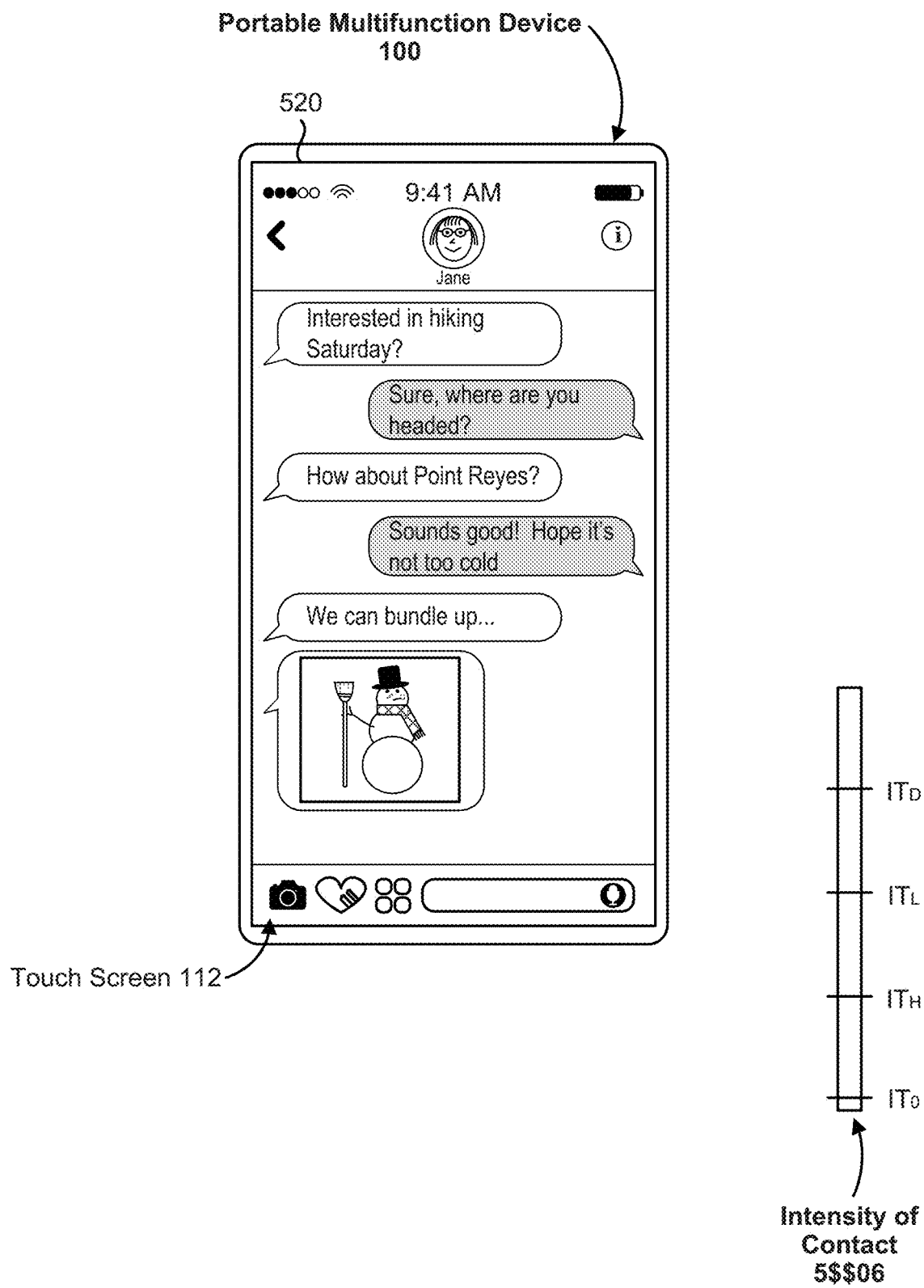
Figure 5C3

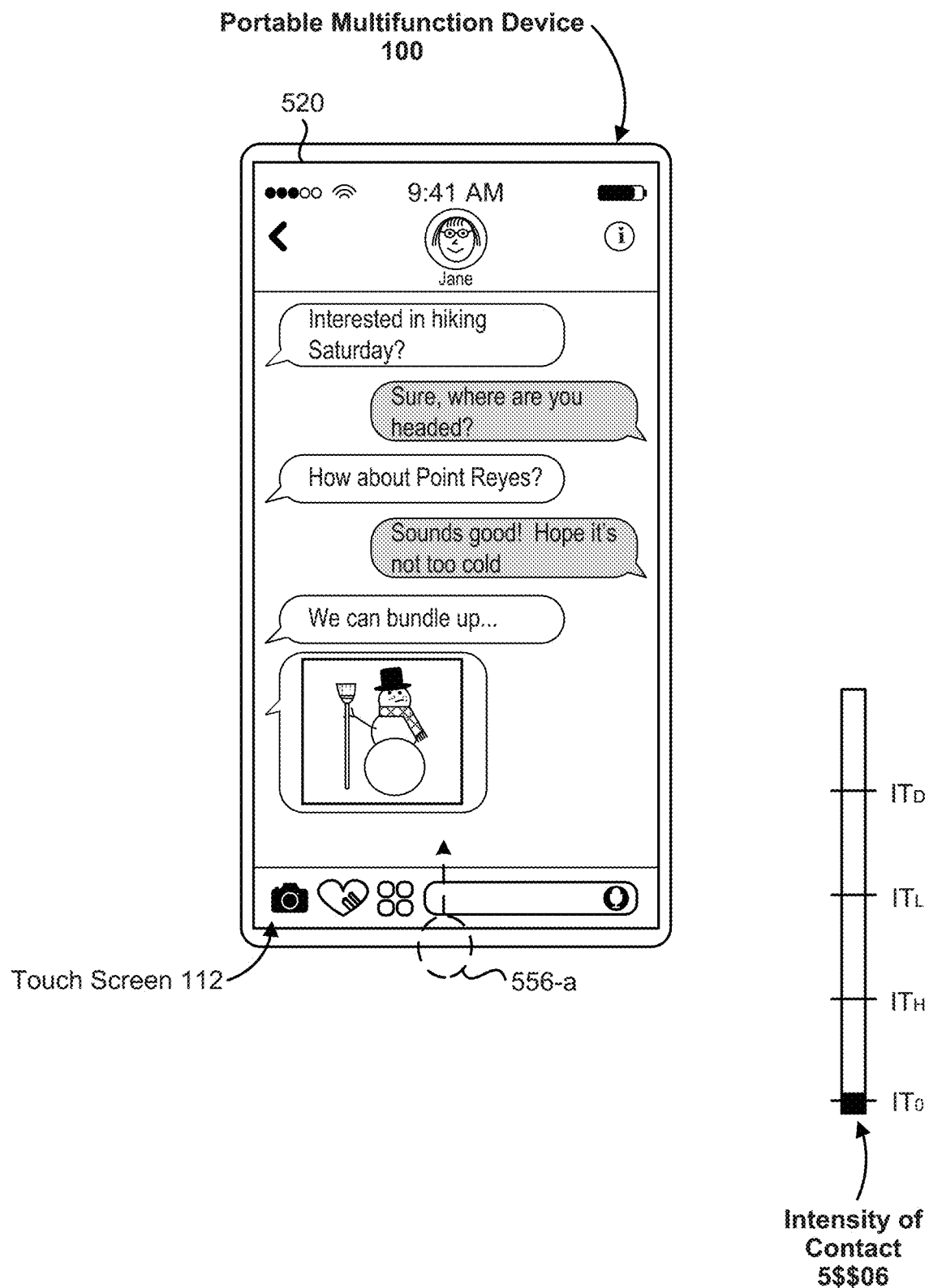
Figure 5C4

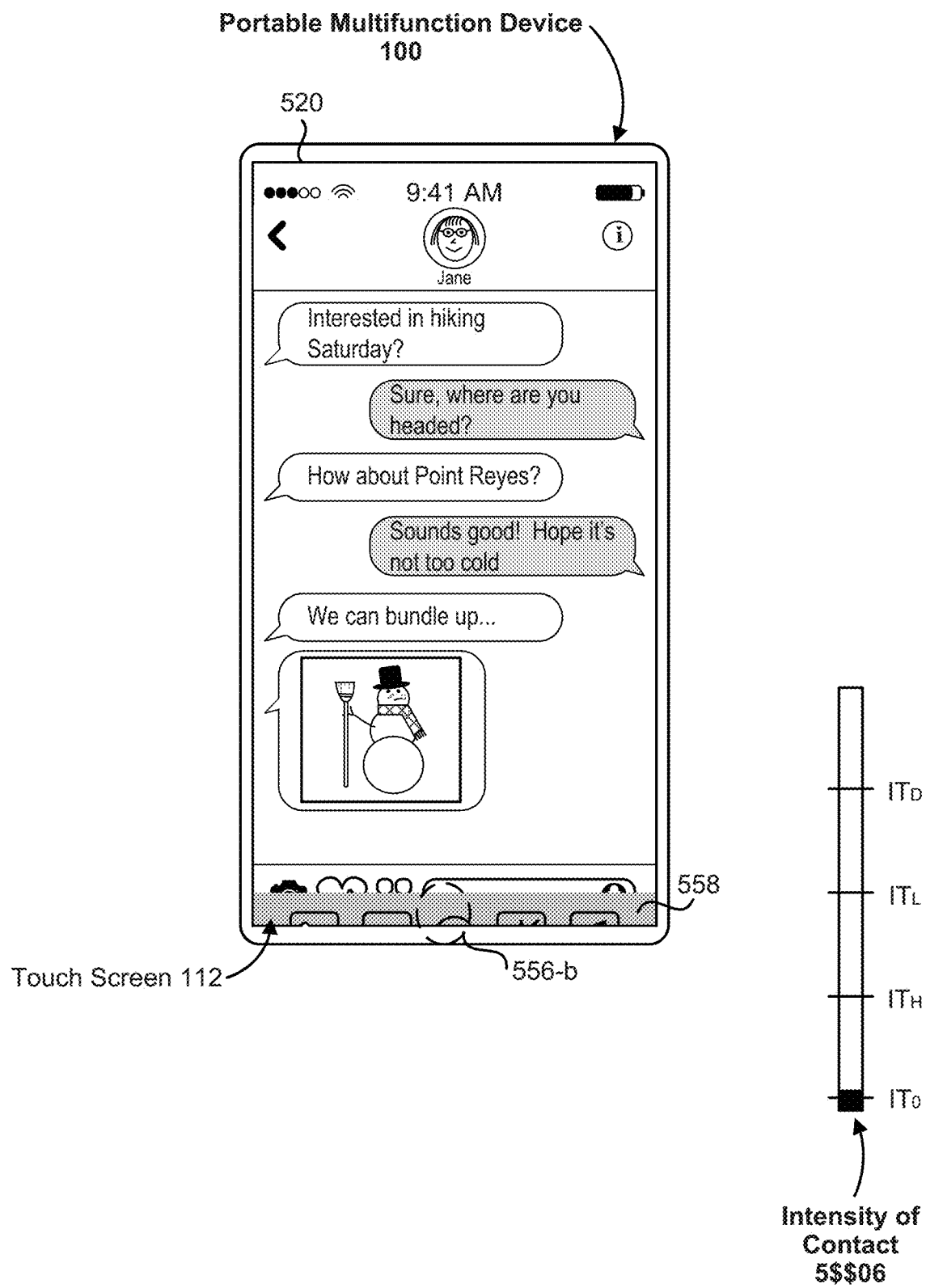
Figure 5C5

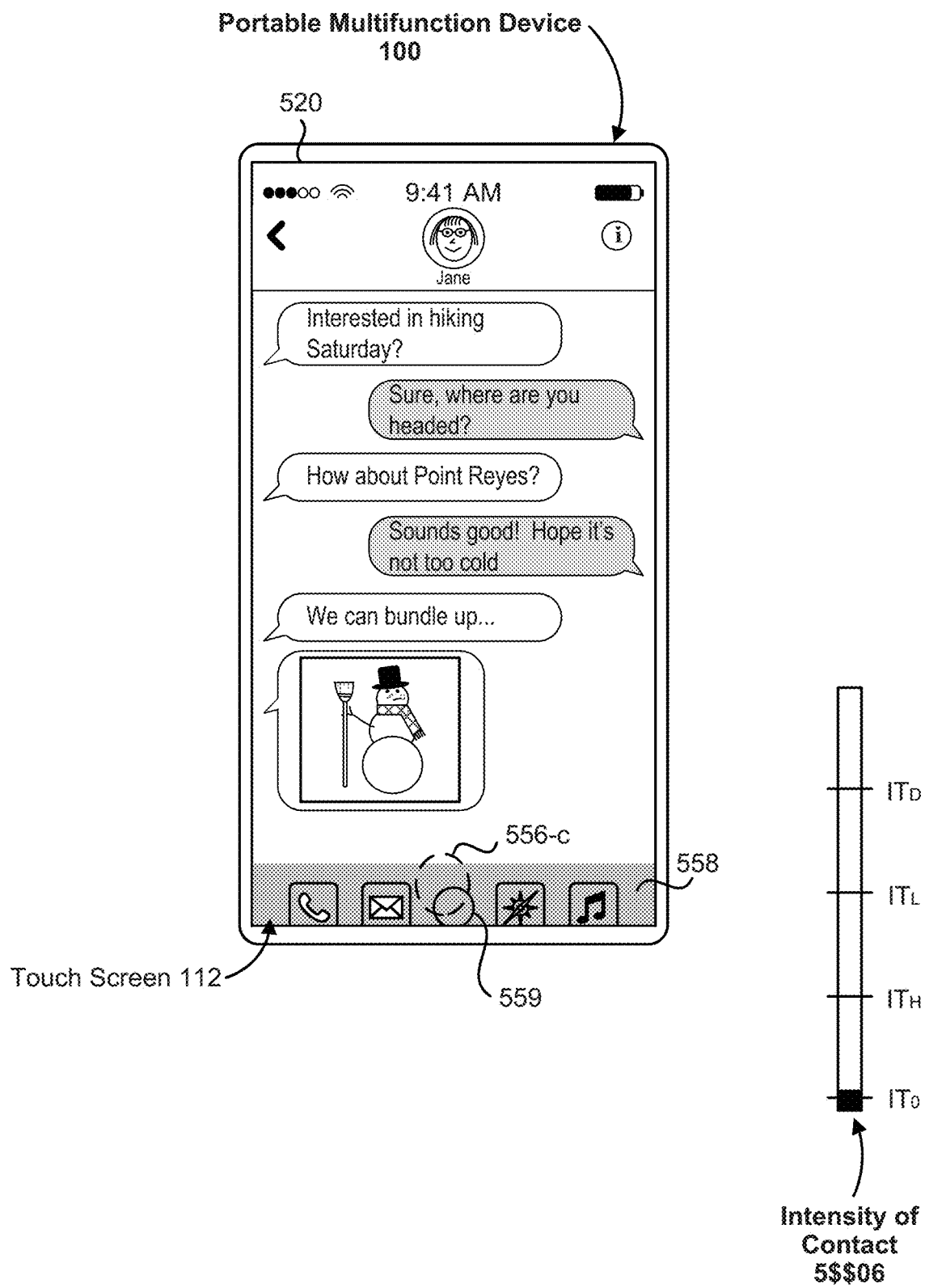
Figure 5C6

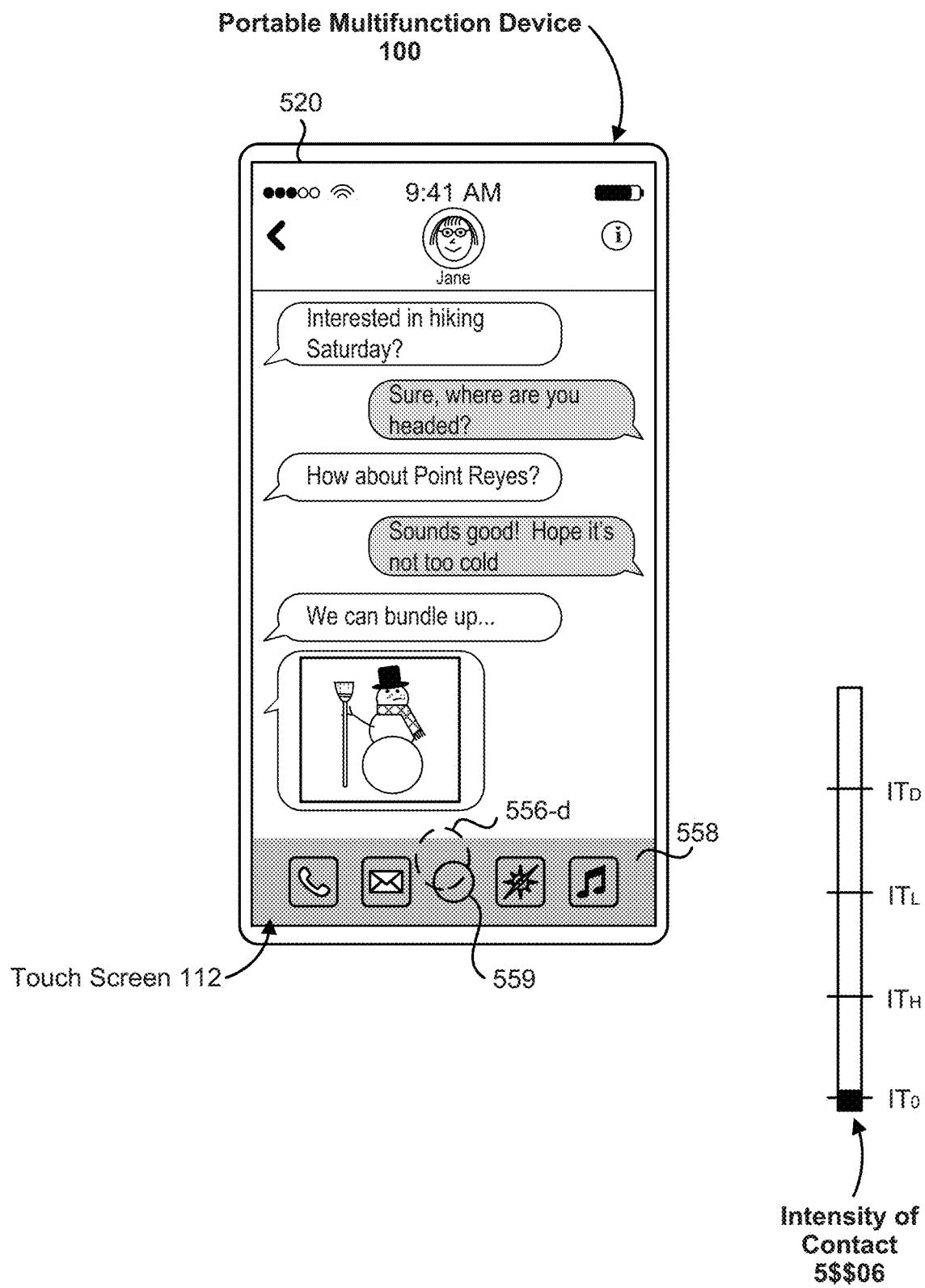
Figure 5C7

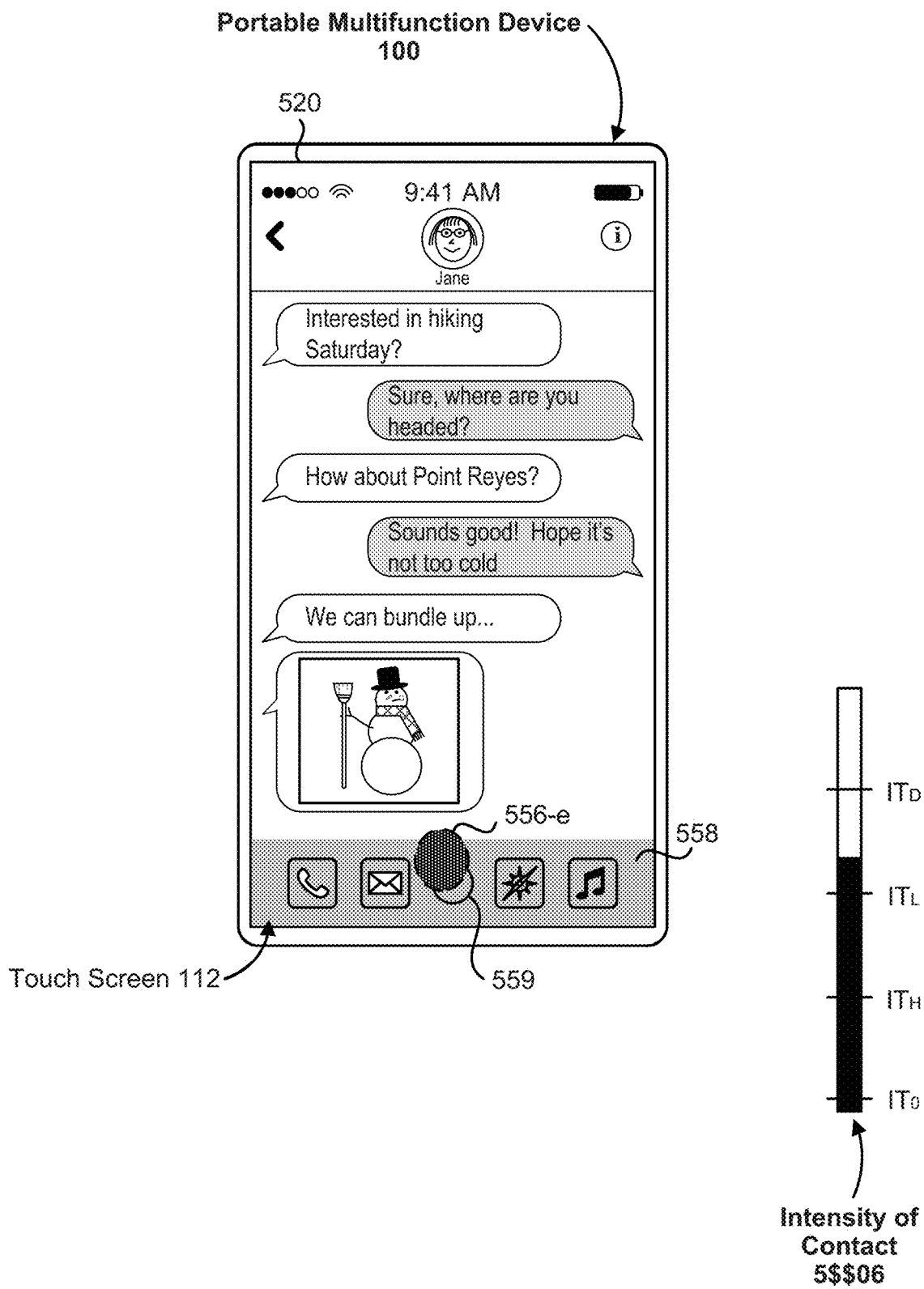
Figure 5C8

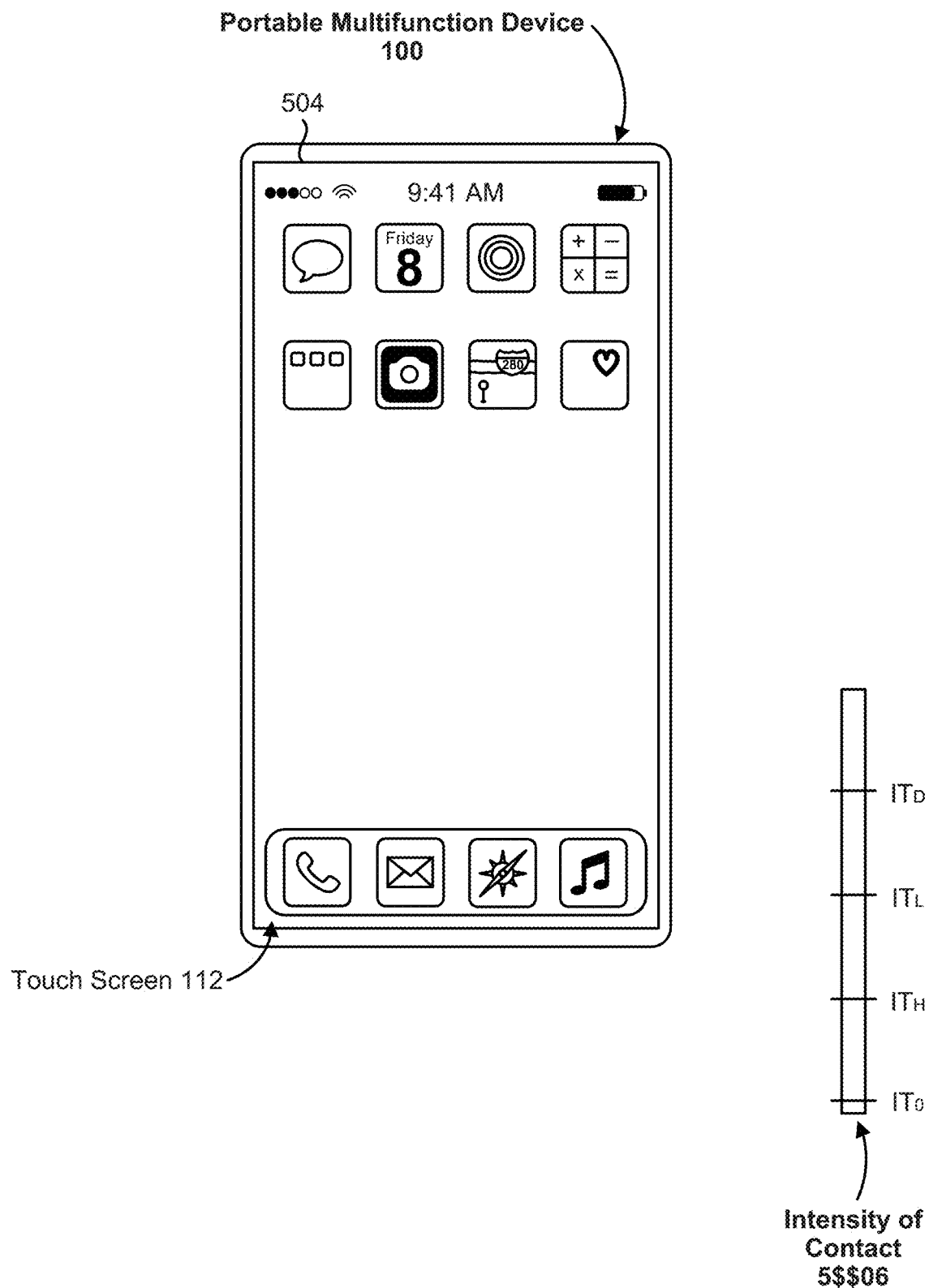
Figure 5C9

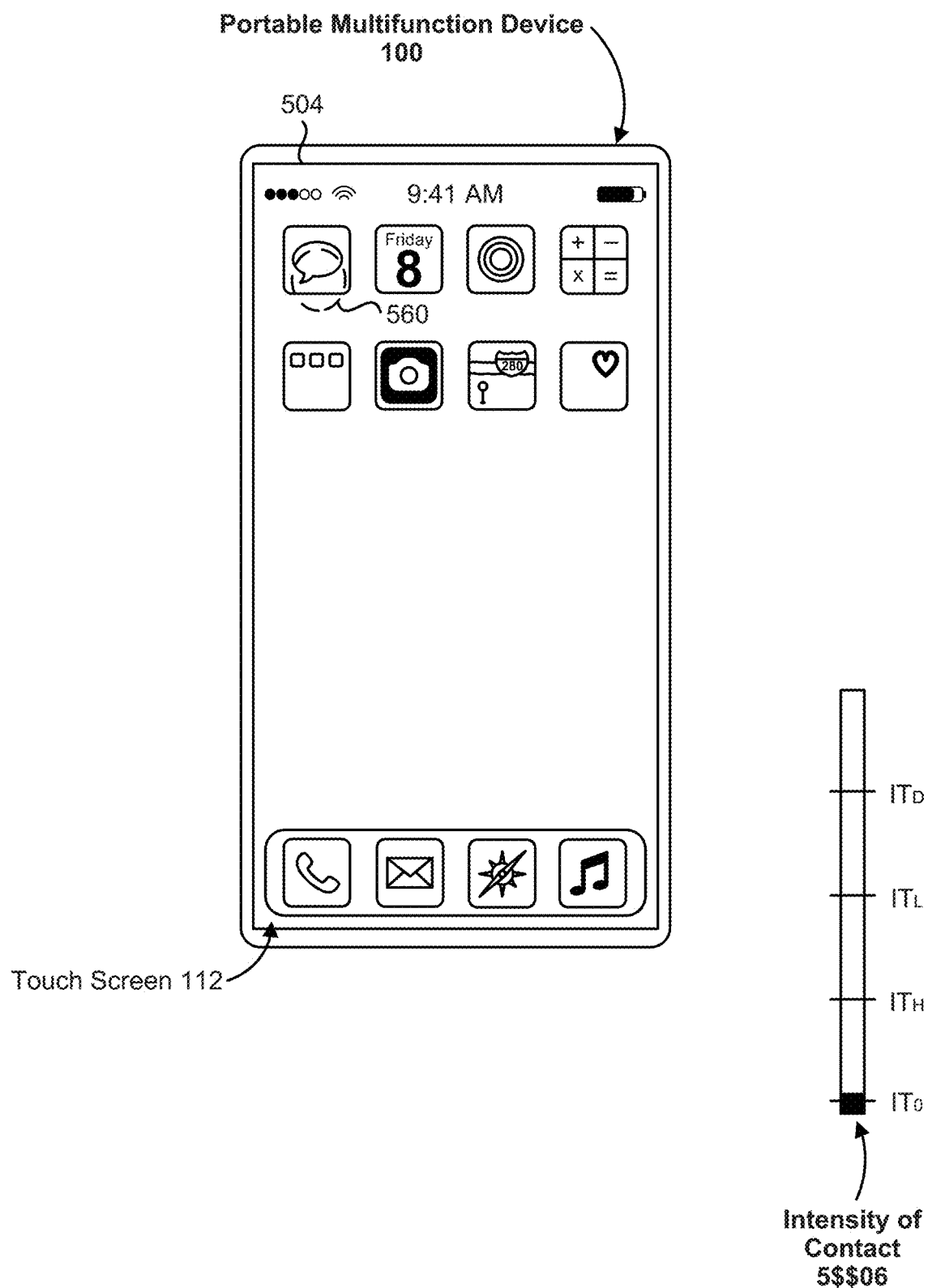
Figure 5C10

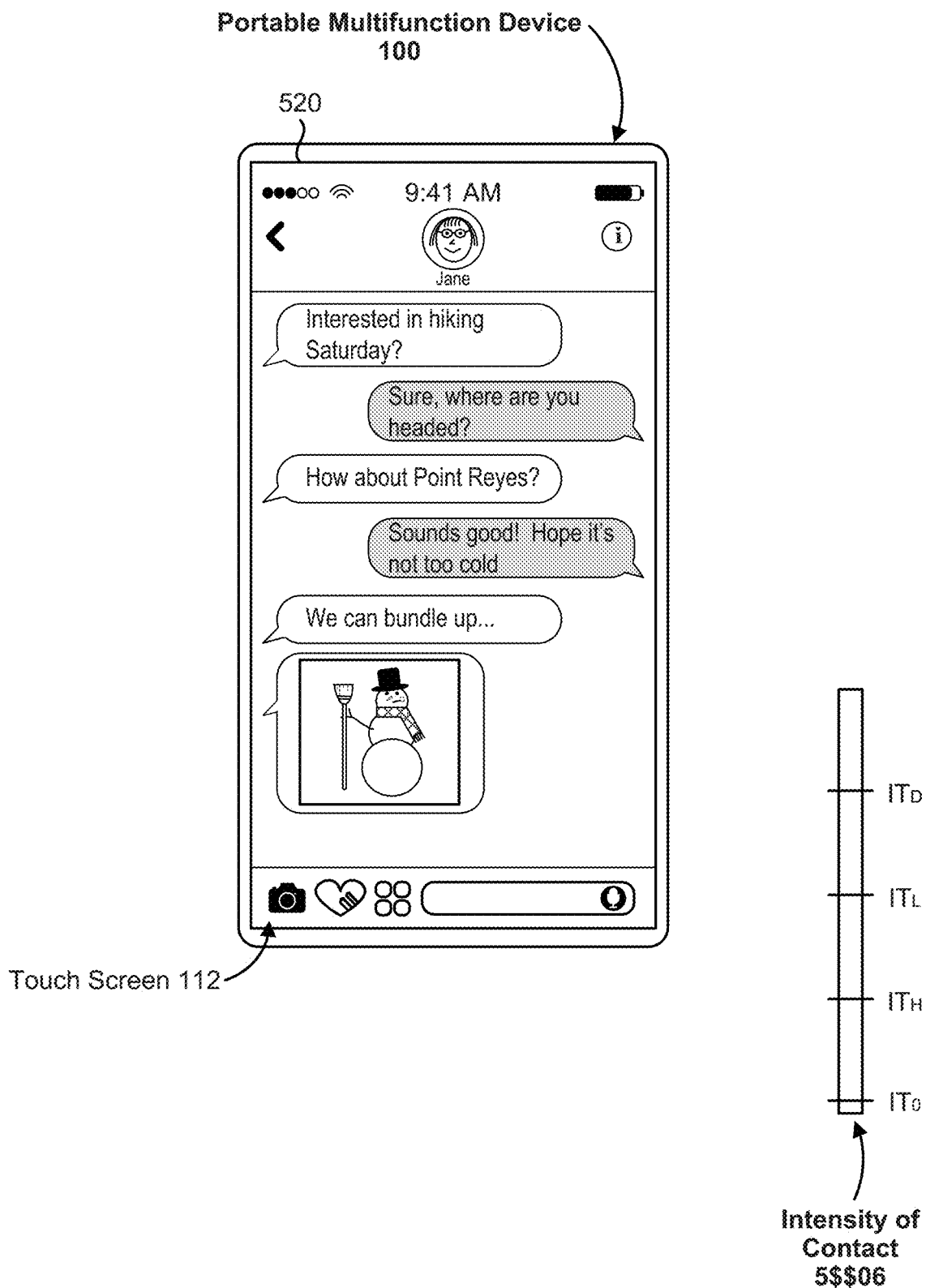
Figure 5C11

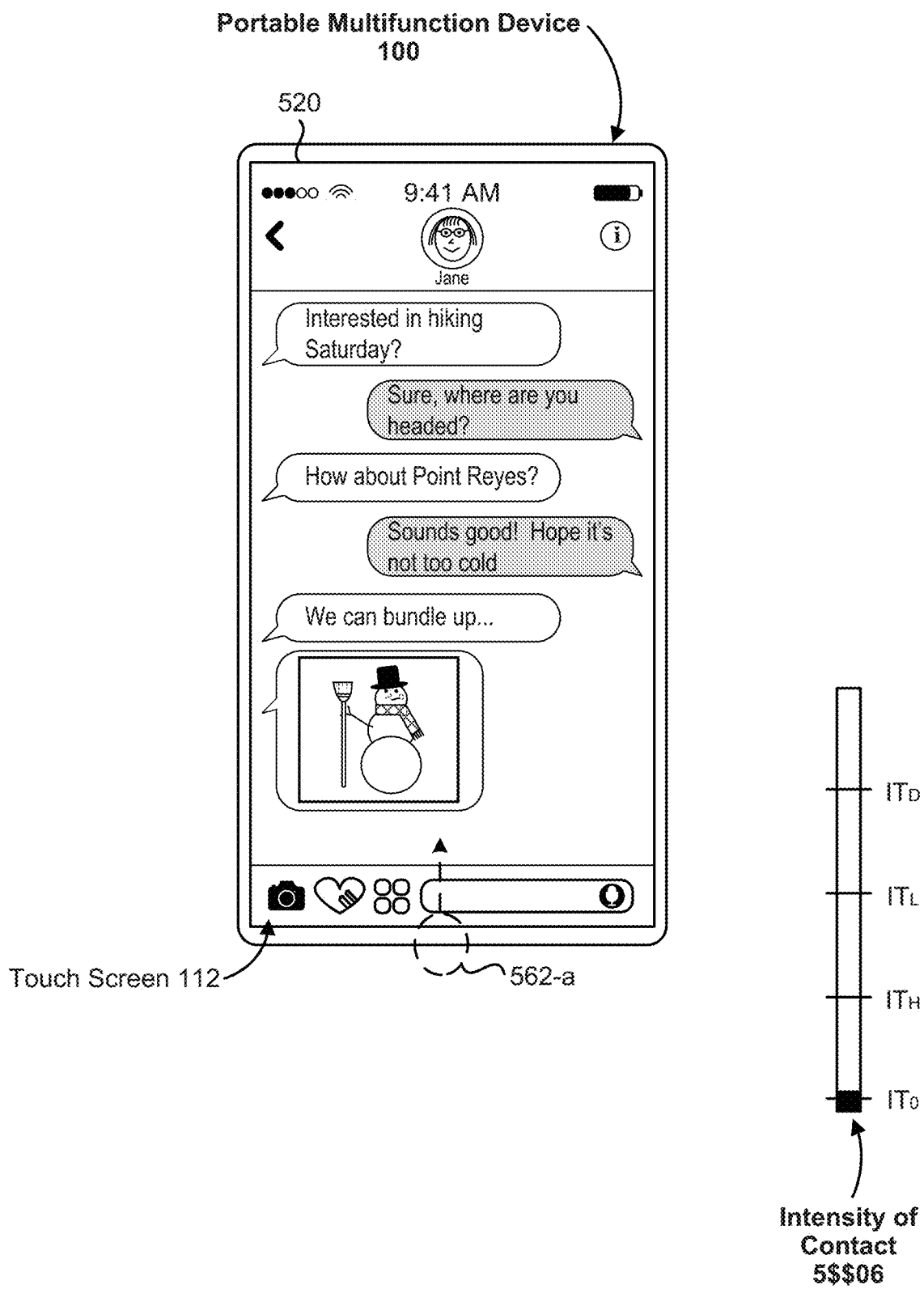
Figure 5C12

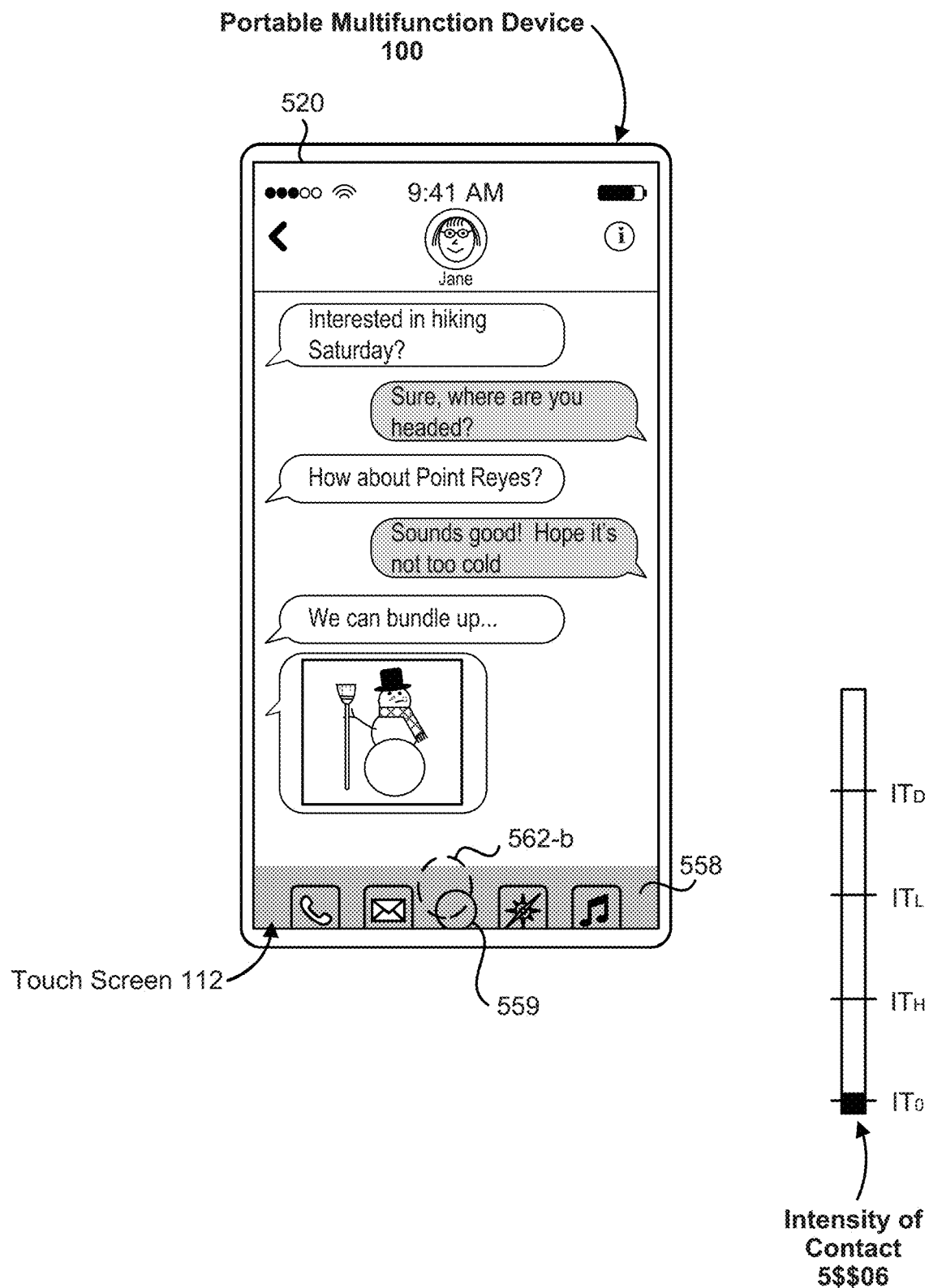
Figure 5C13

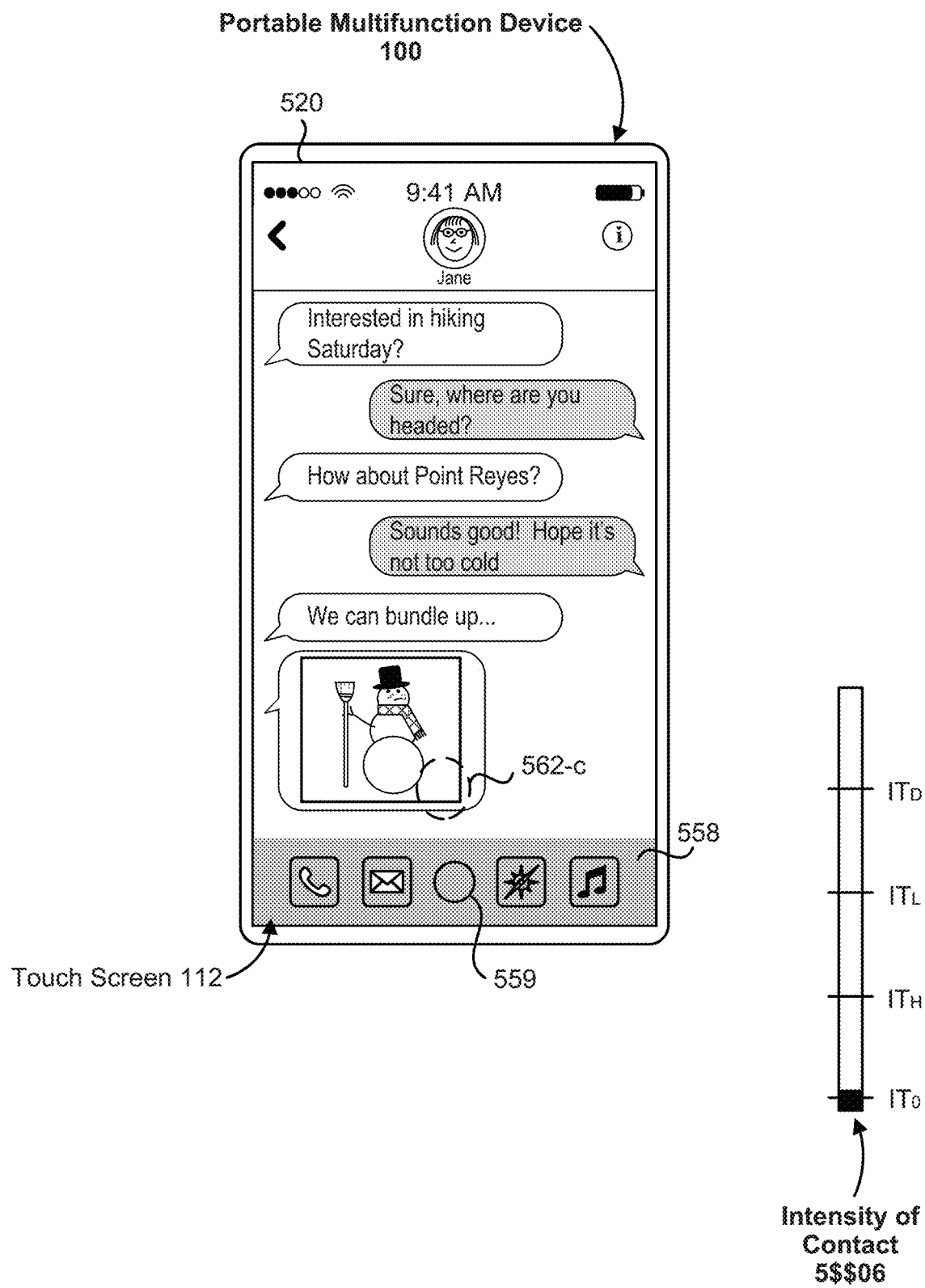
Figure 5C14

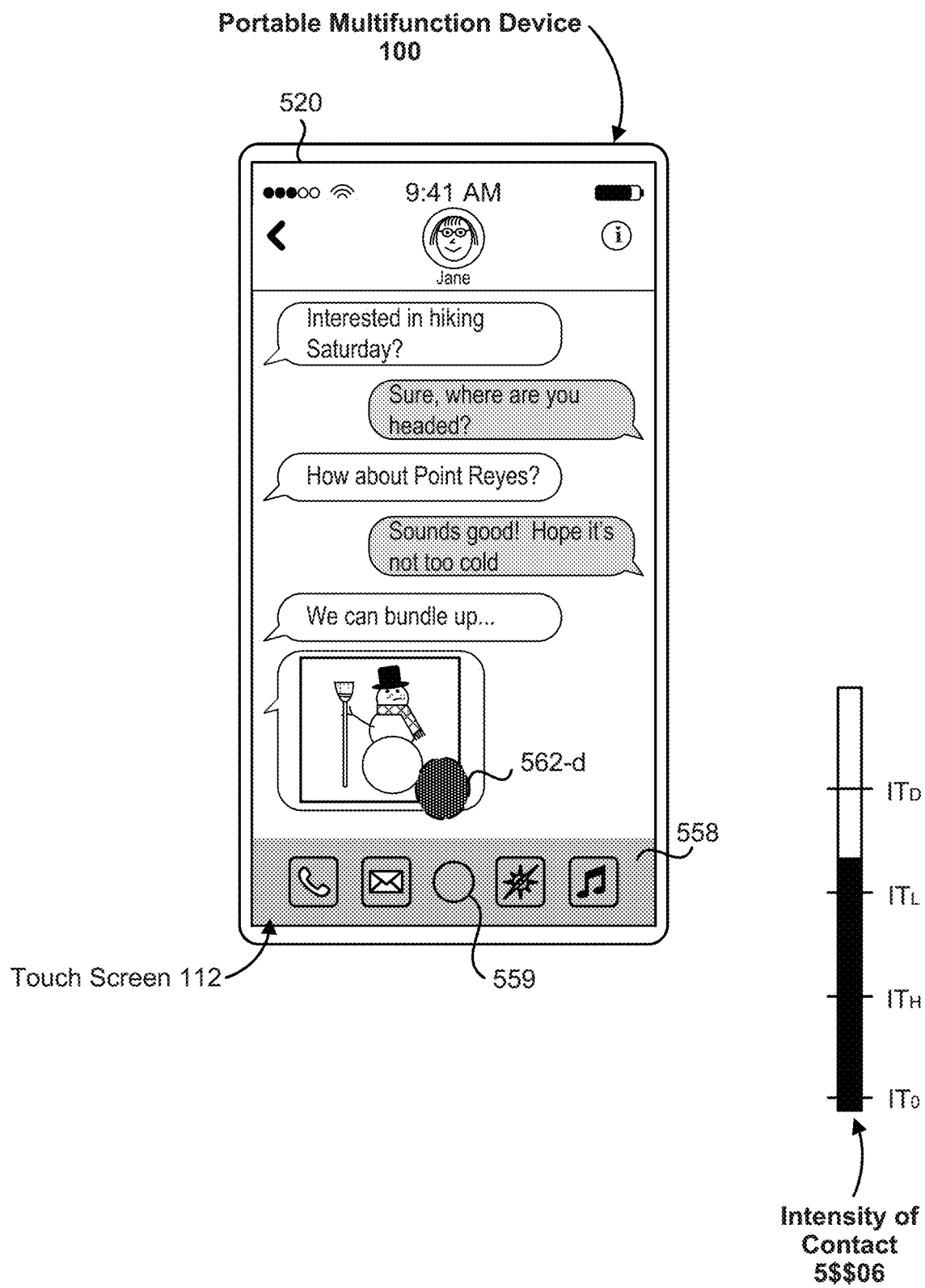
Figure 5C15

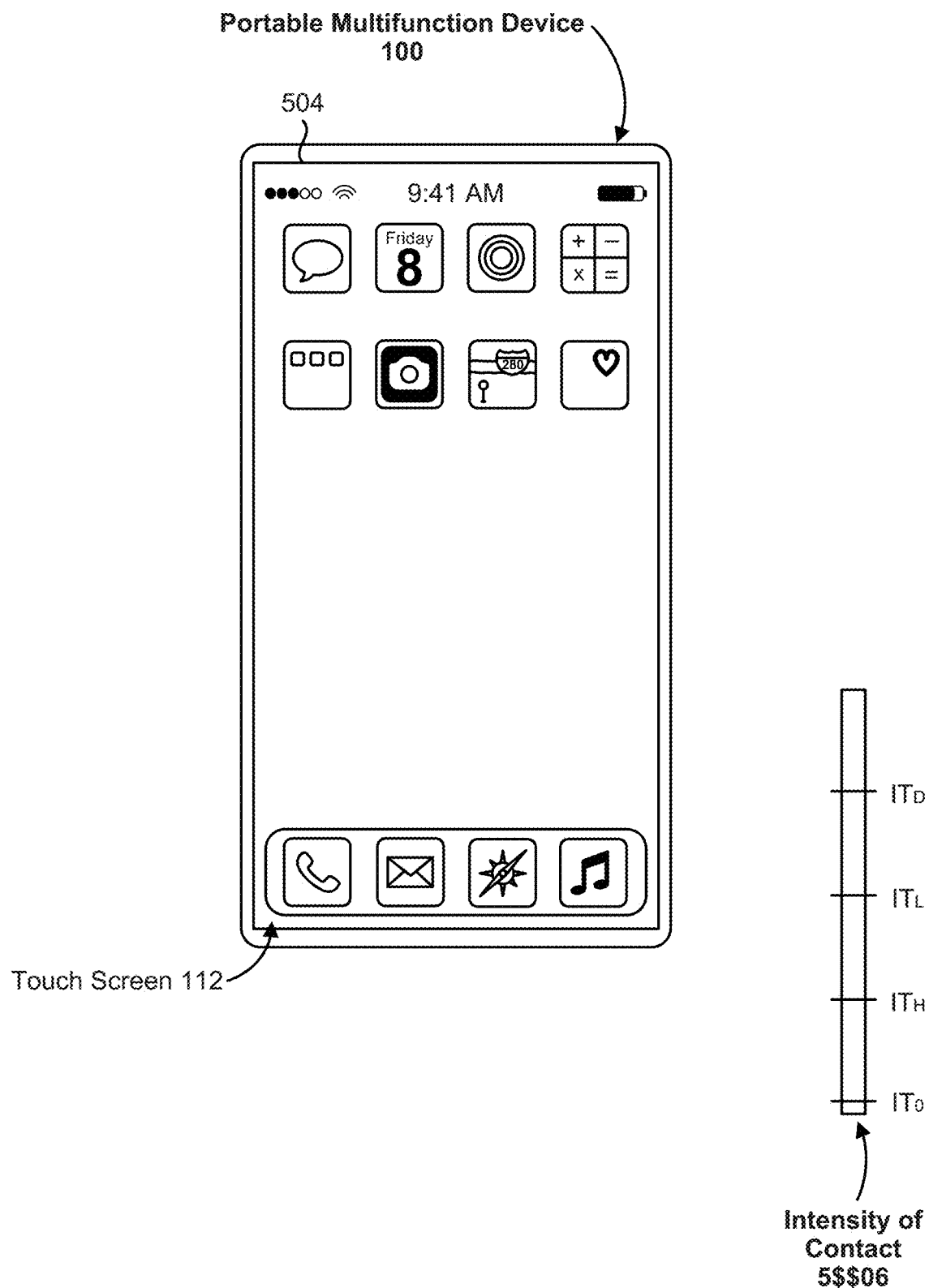
Figure 5C16

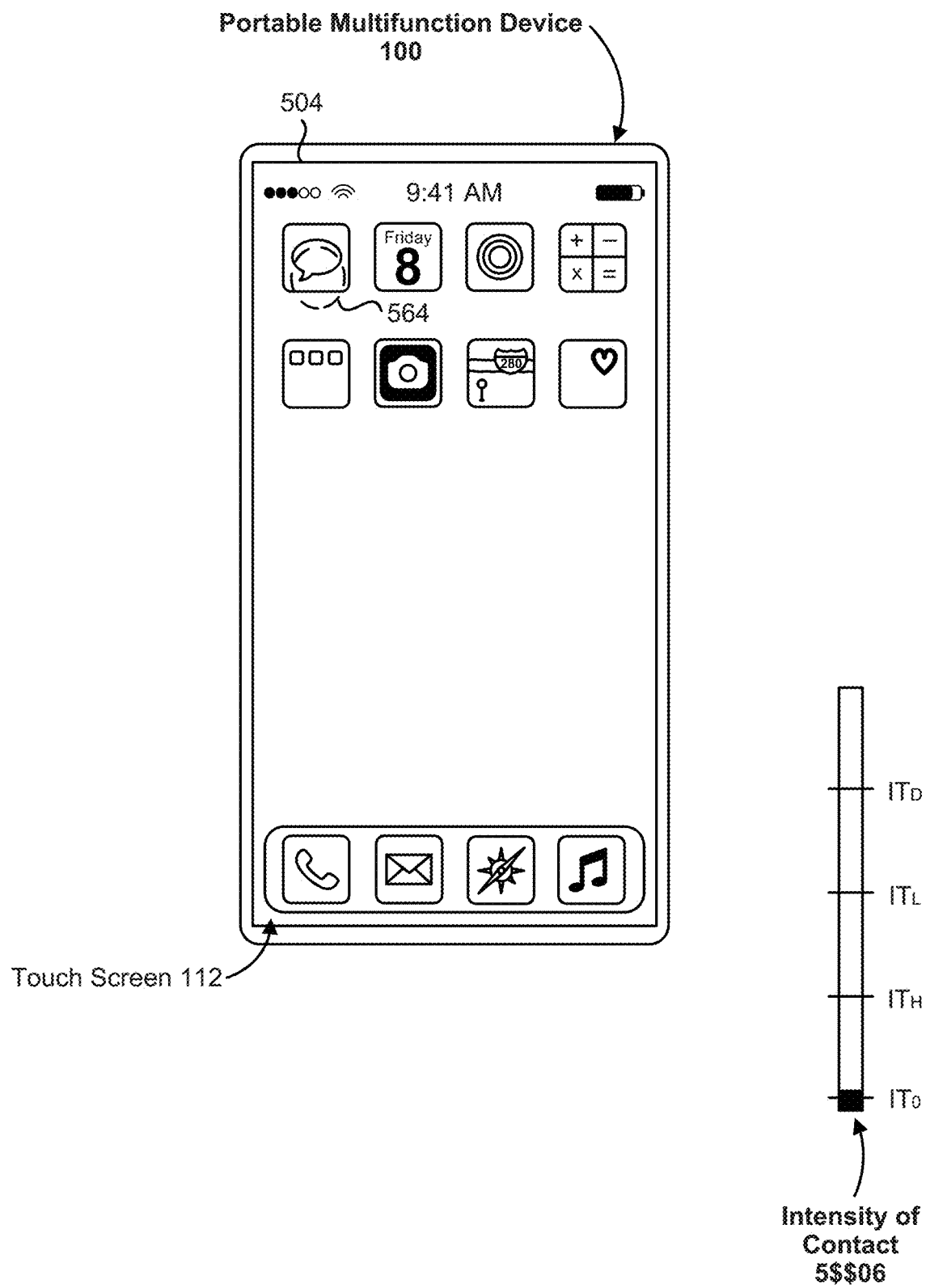
Figure 5C17

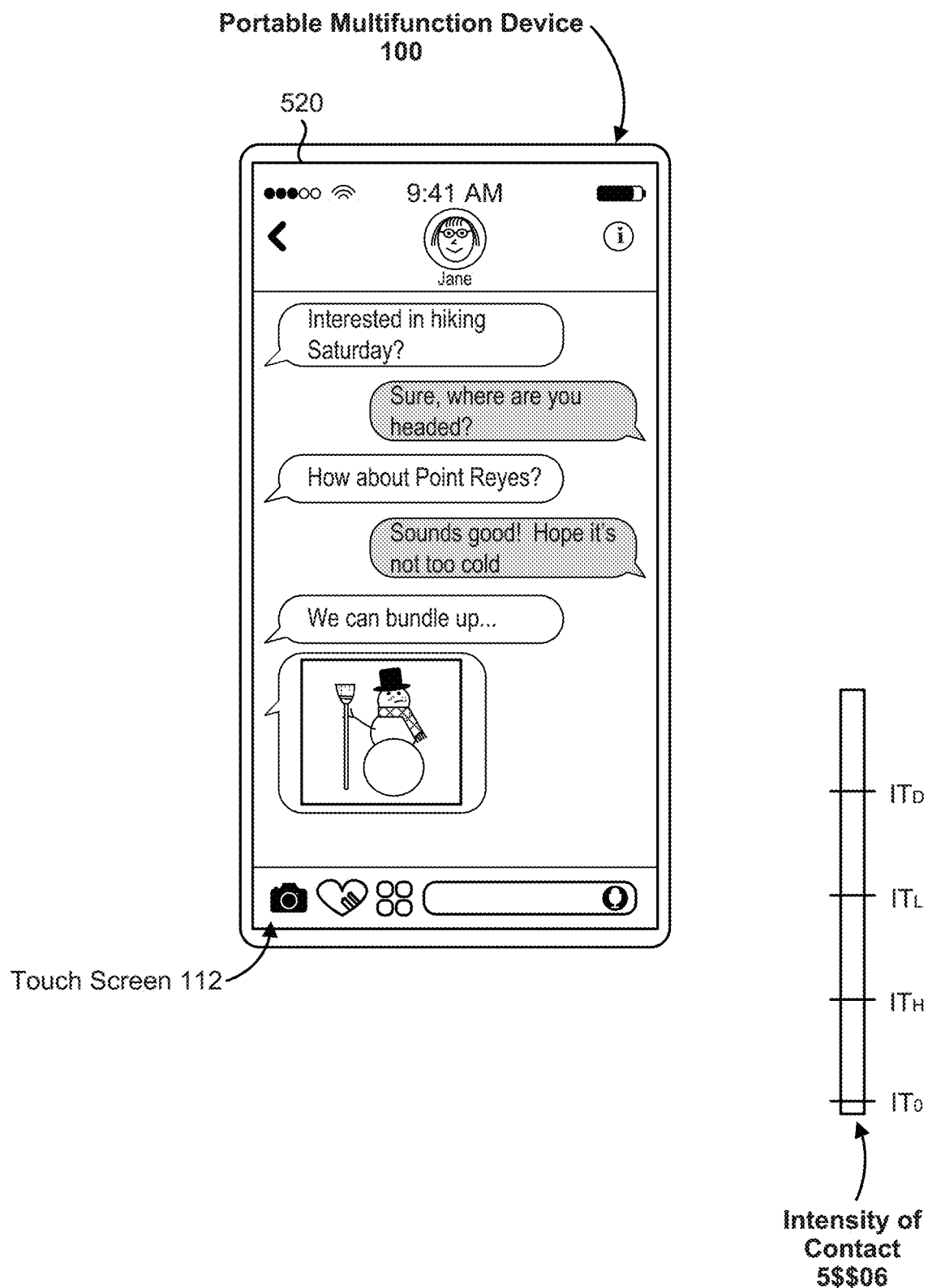
Figure 5C18

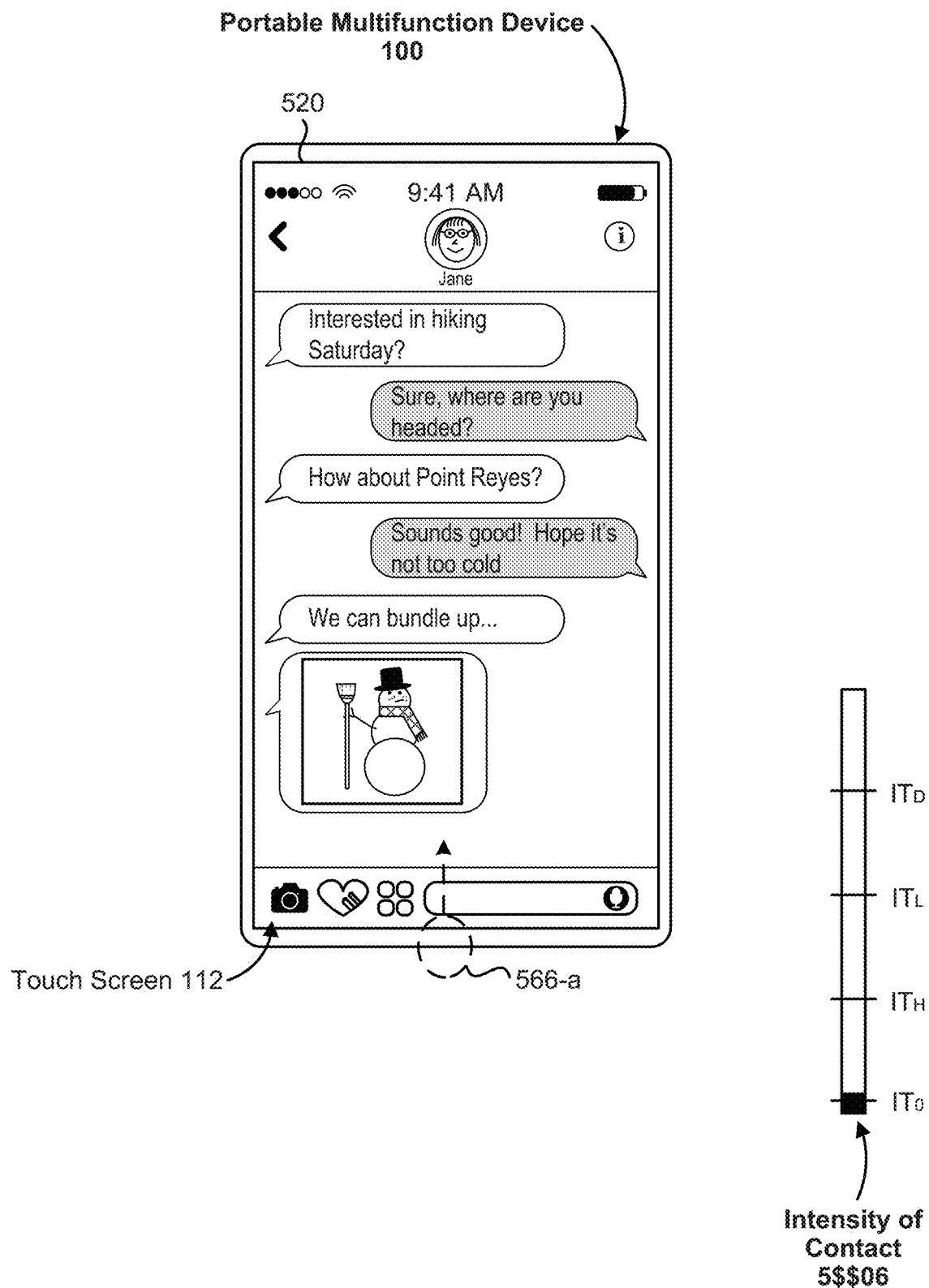
Figure 5C19

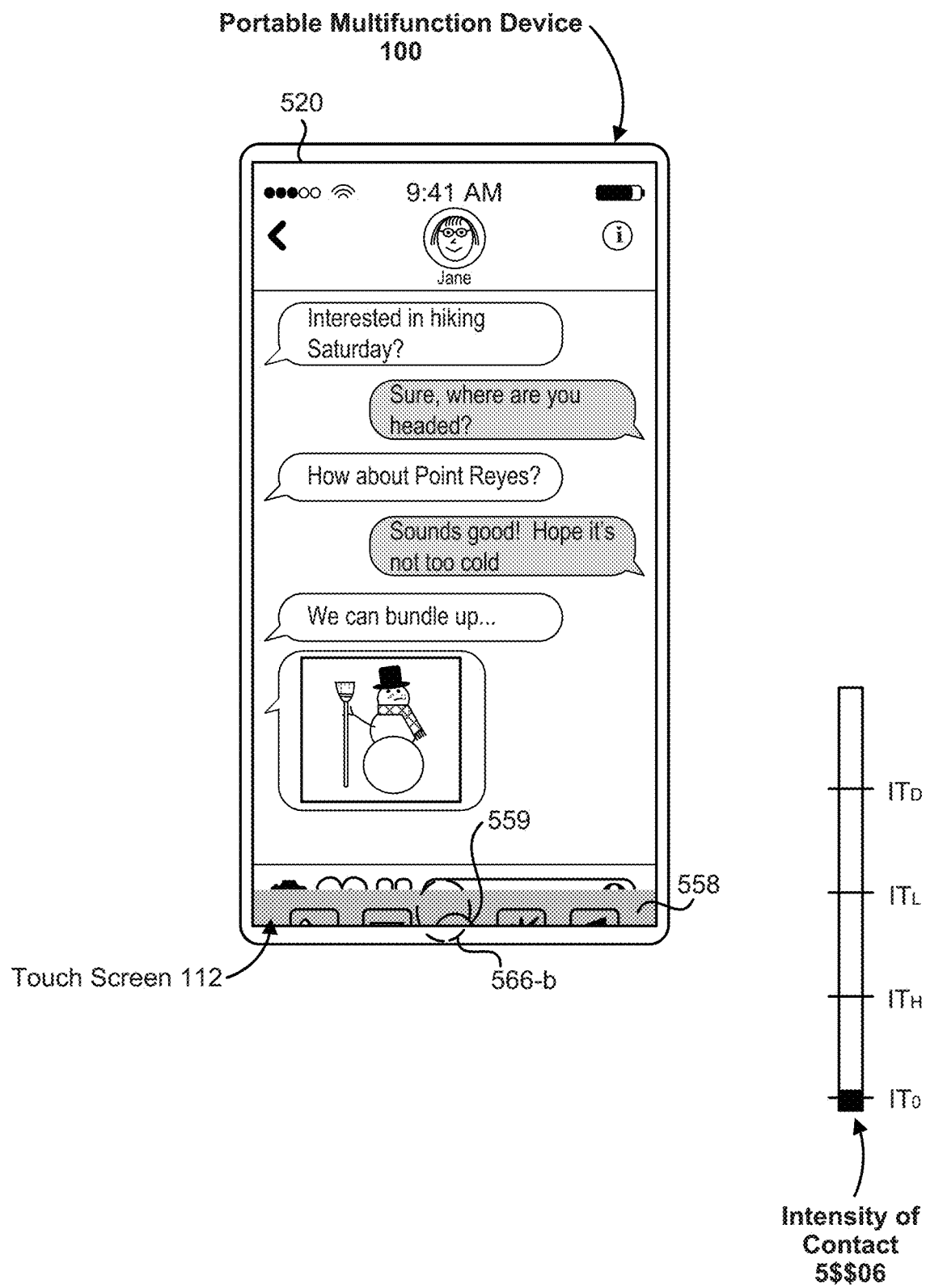
Figure 5C20

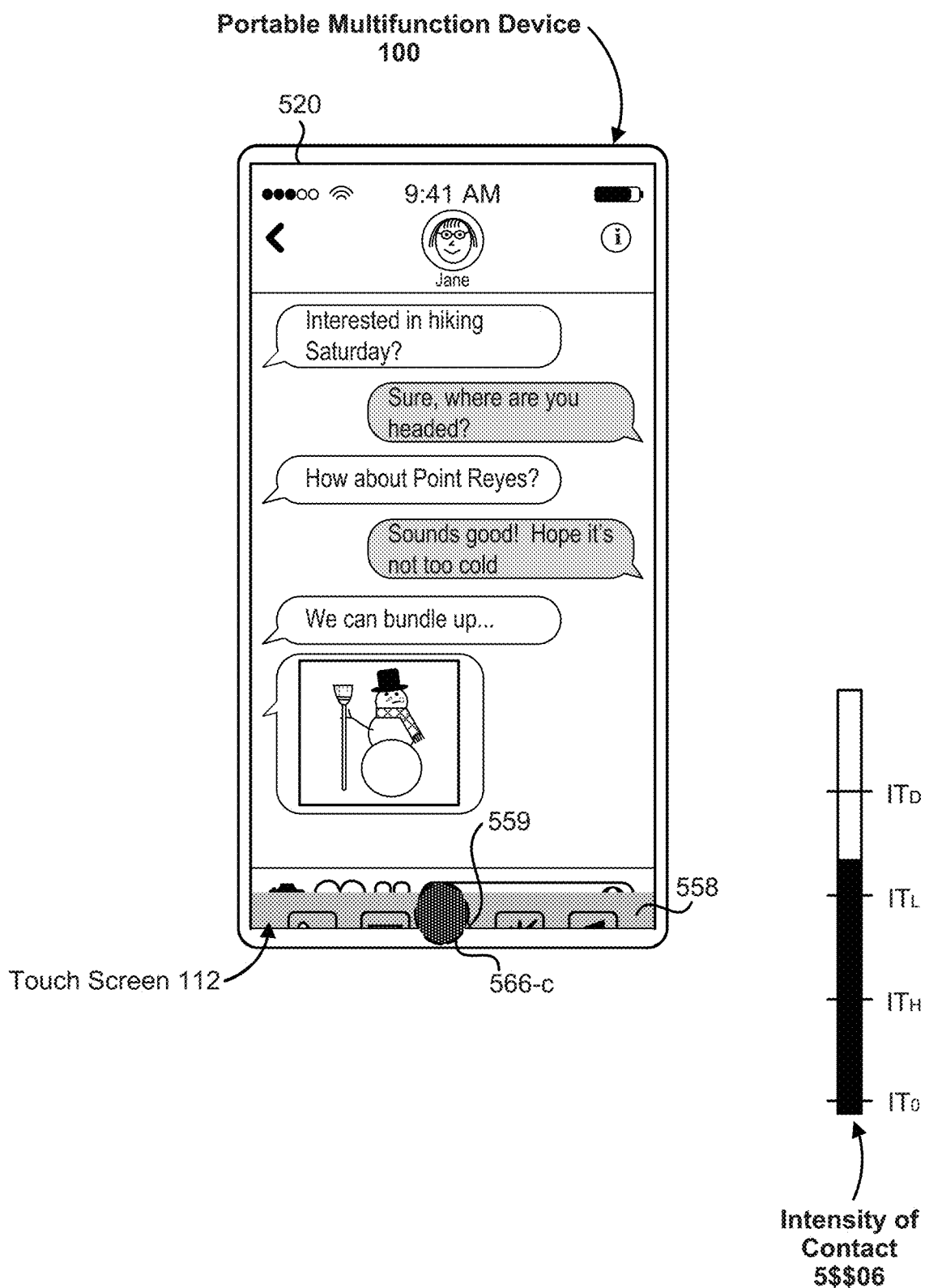
Figure 5C21

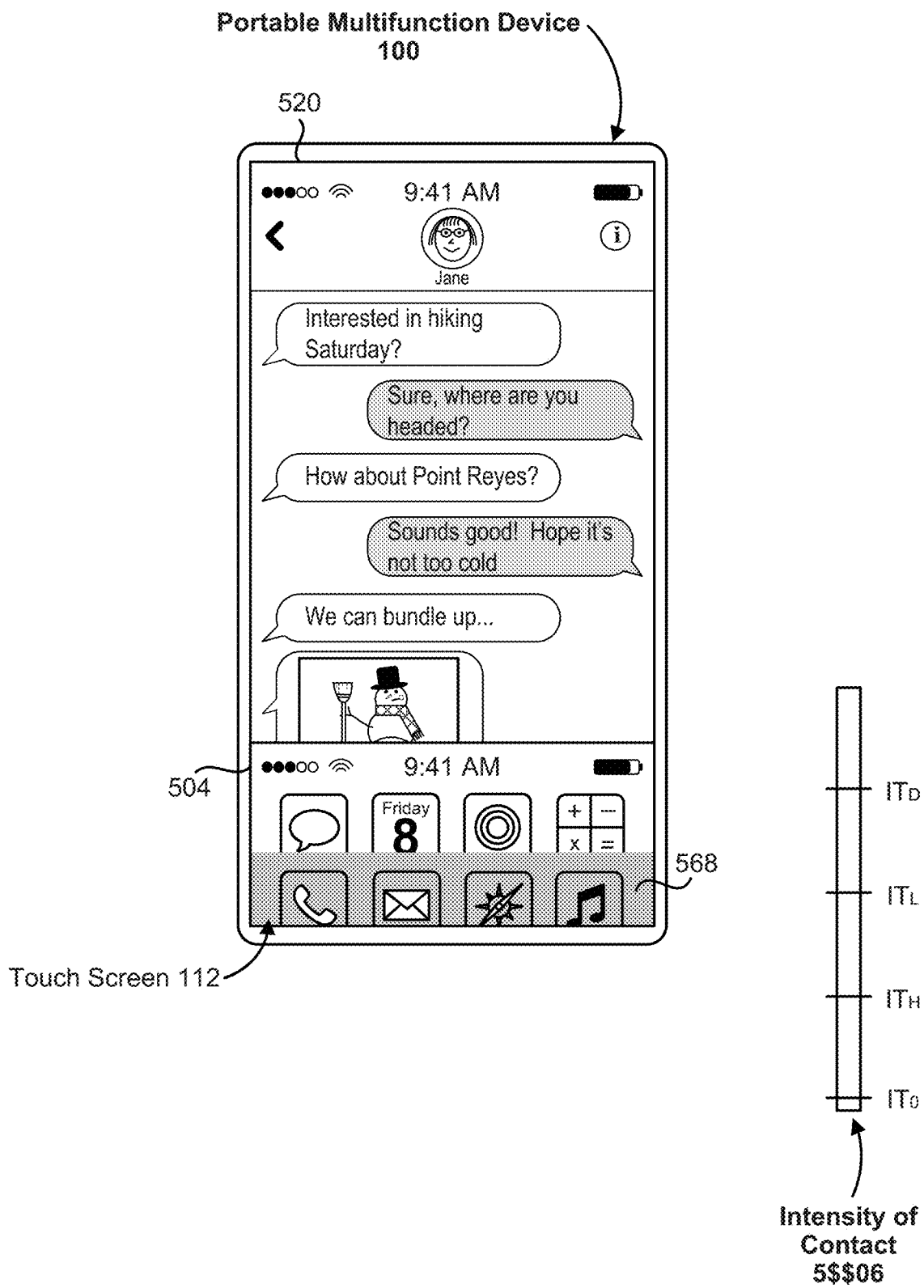
Figure 5C22

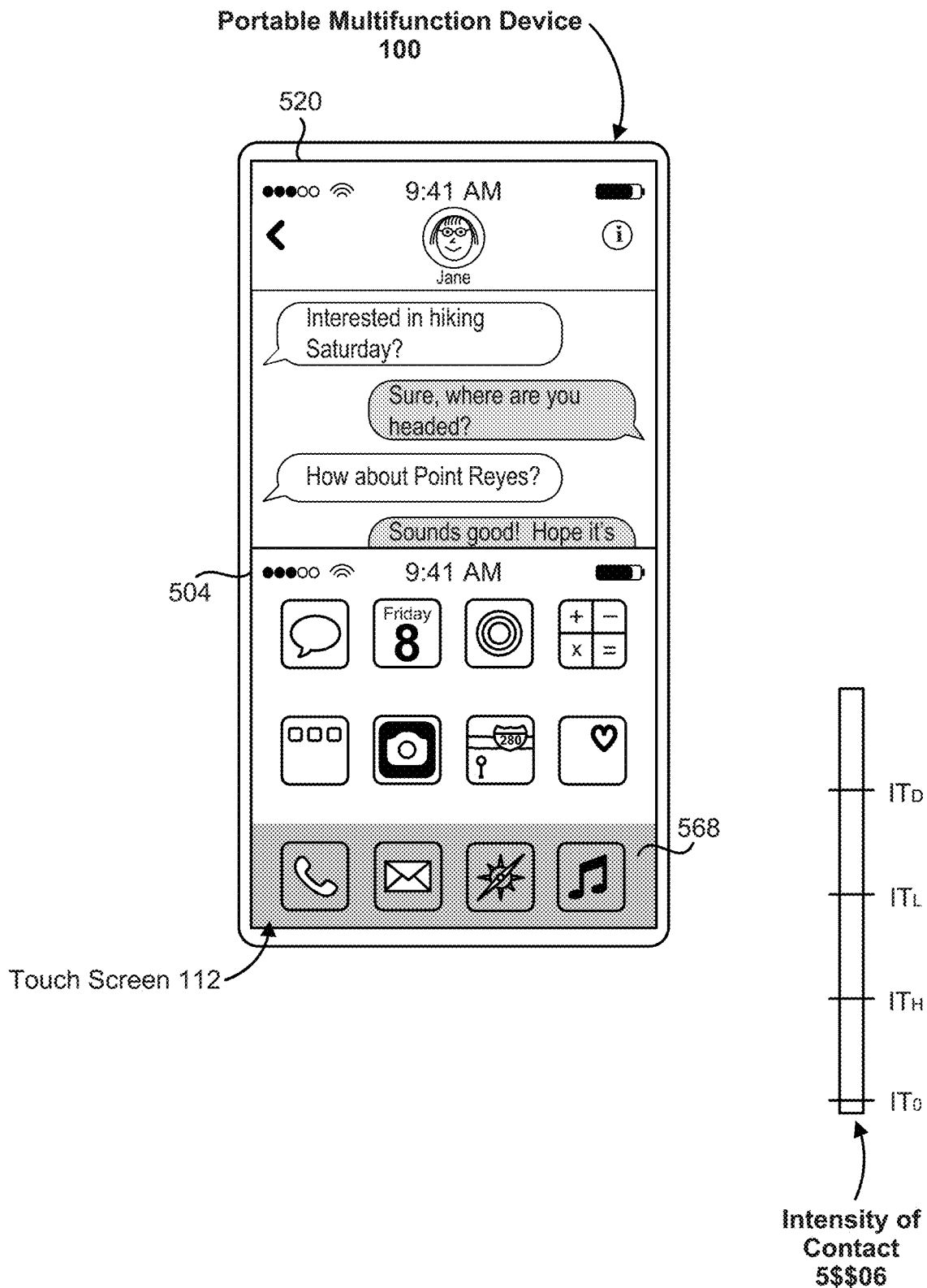
Figure 5C23

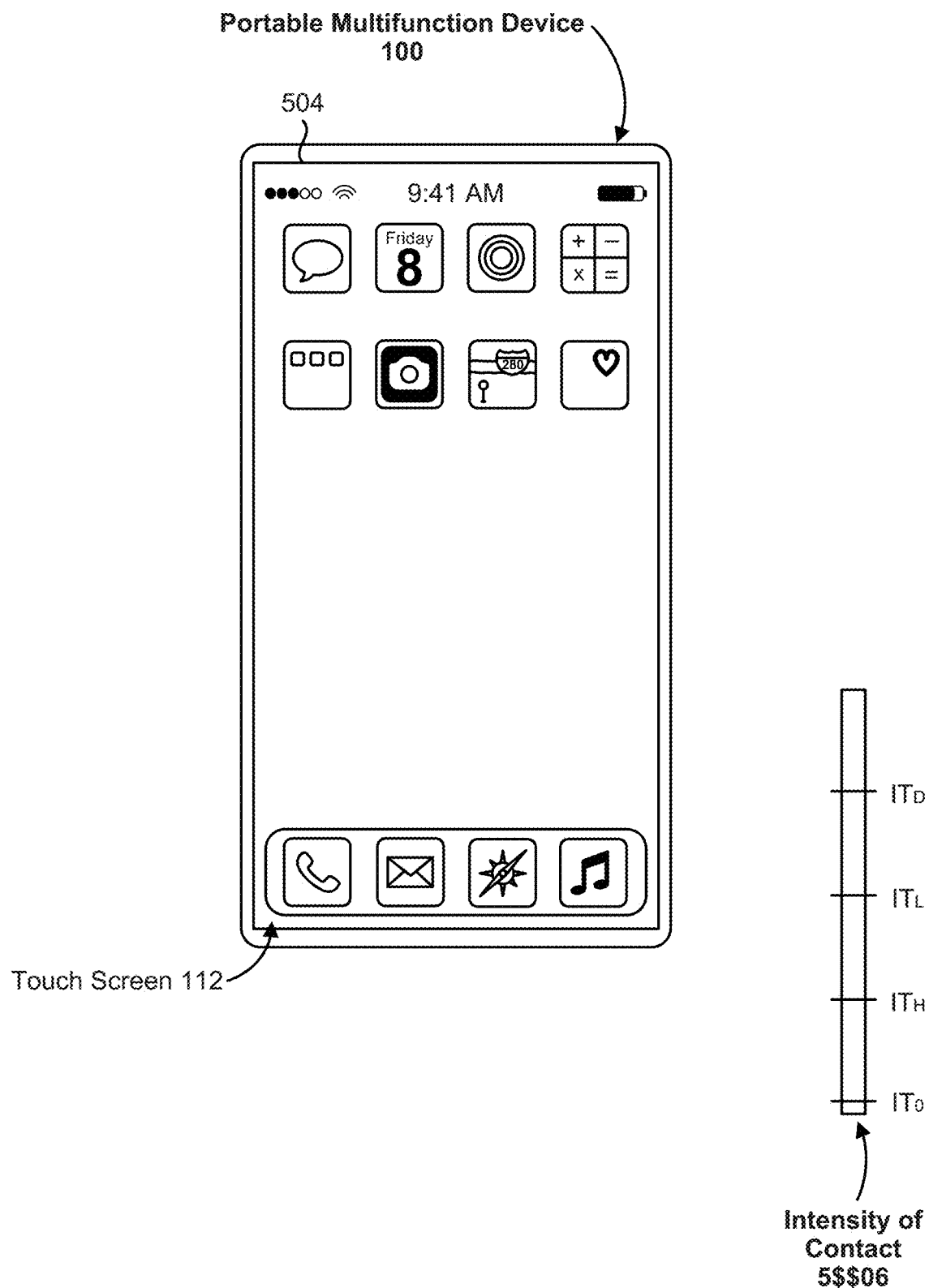
Figure 5C24

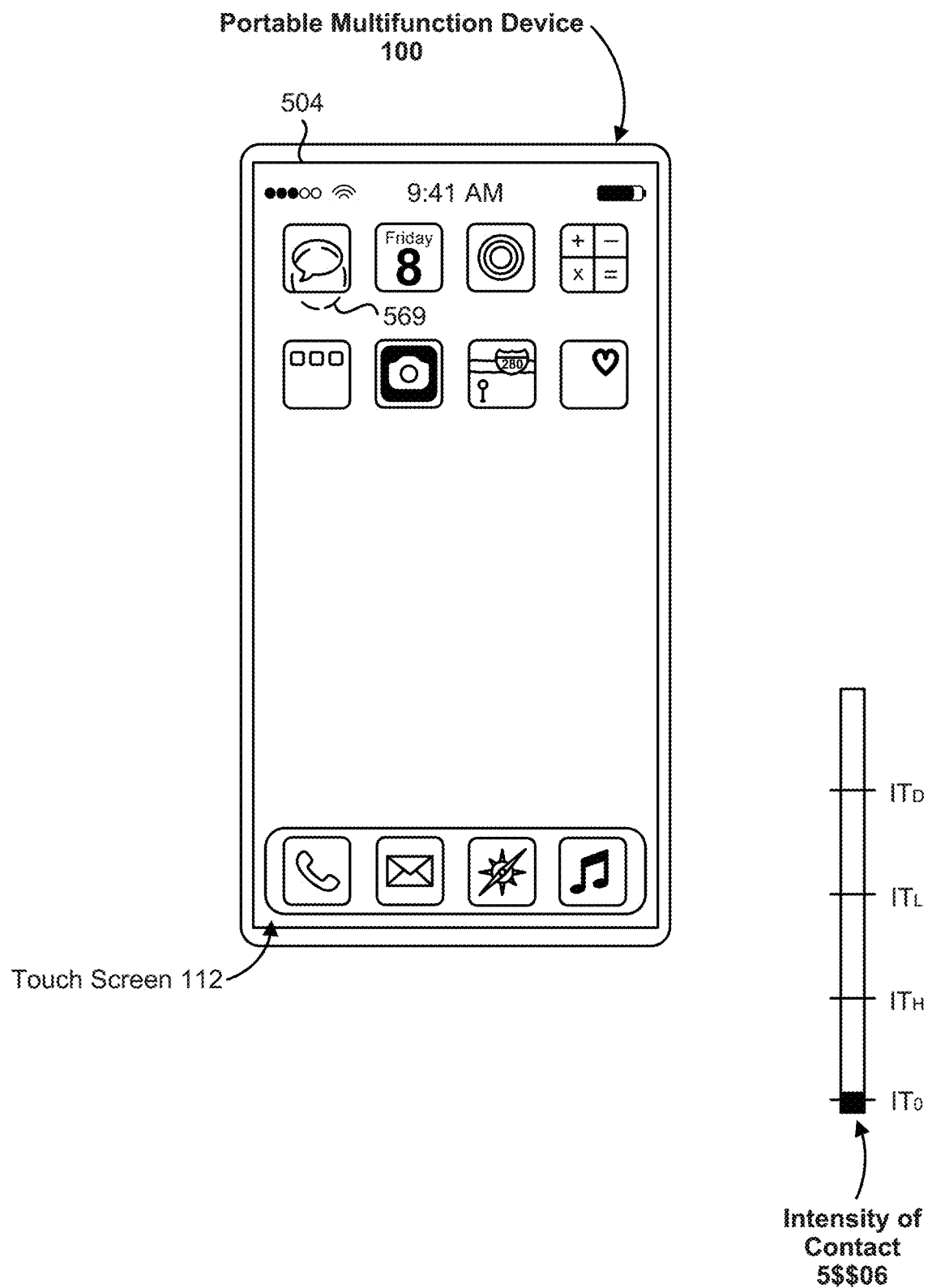
Figure 5C25

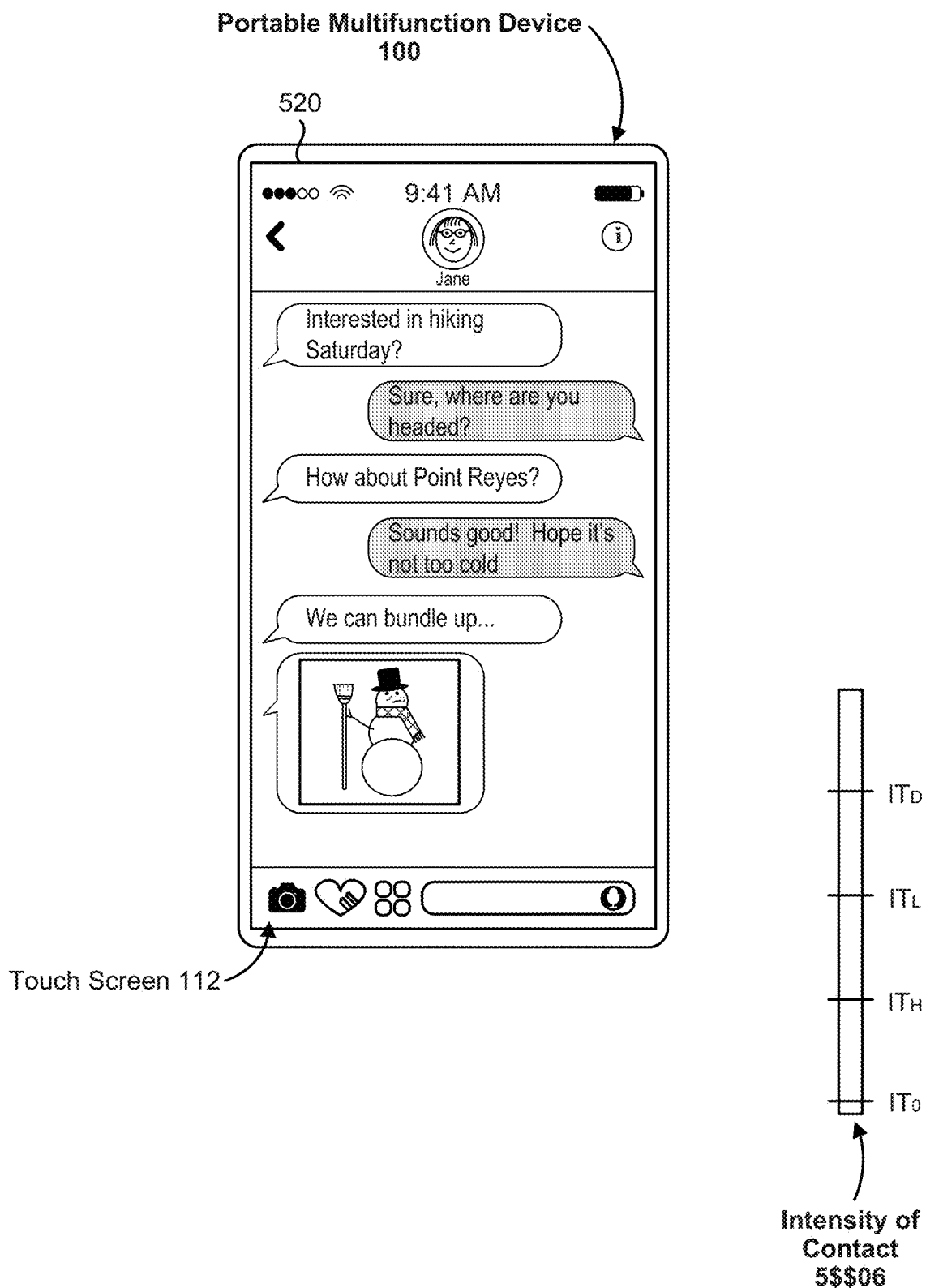
Figure 5C26

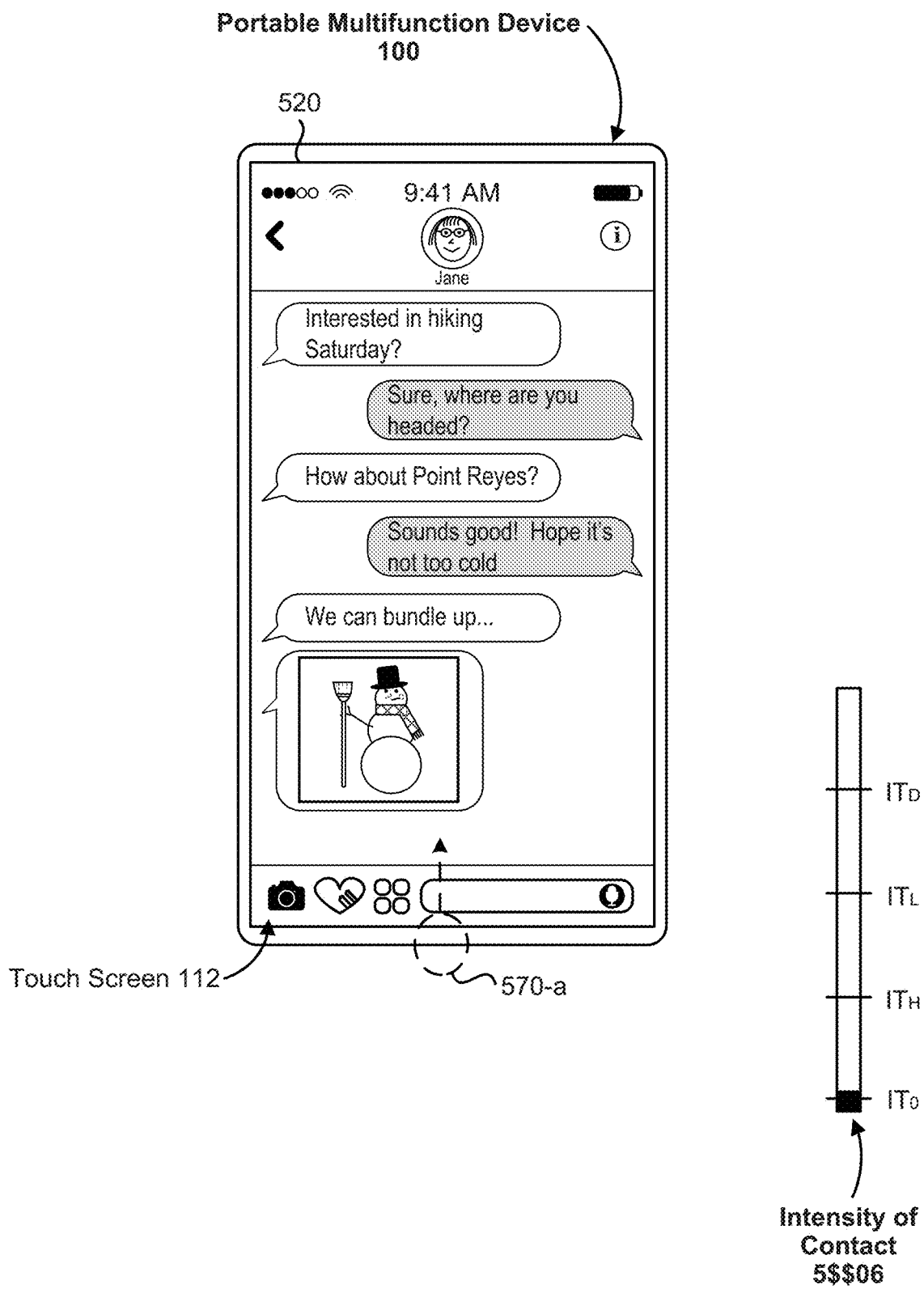
Figure 5C27

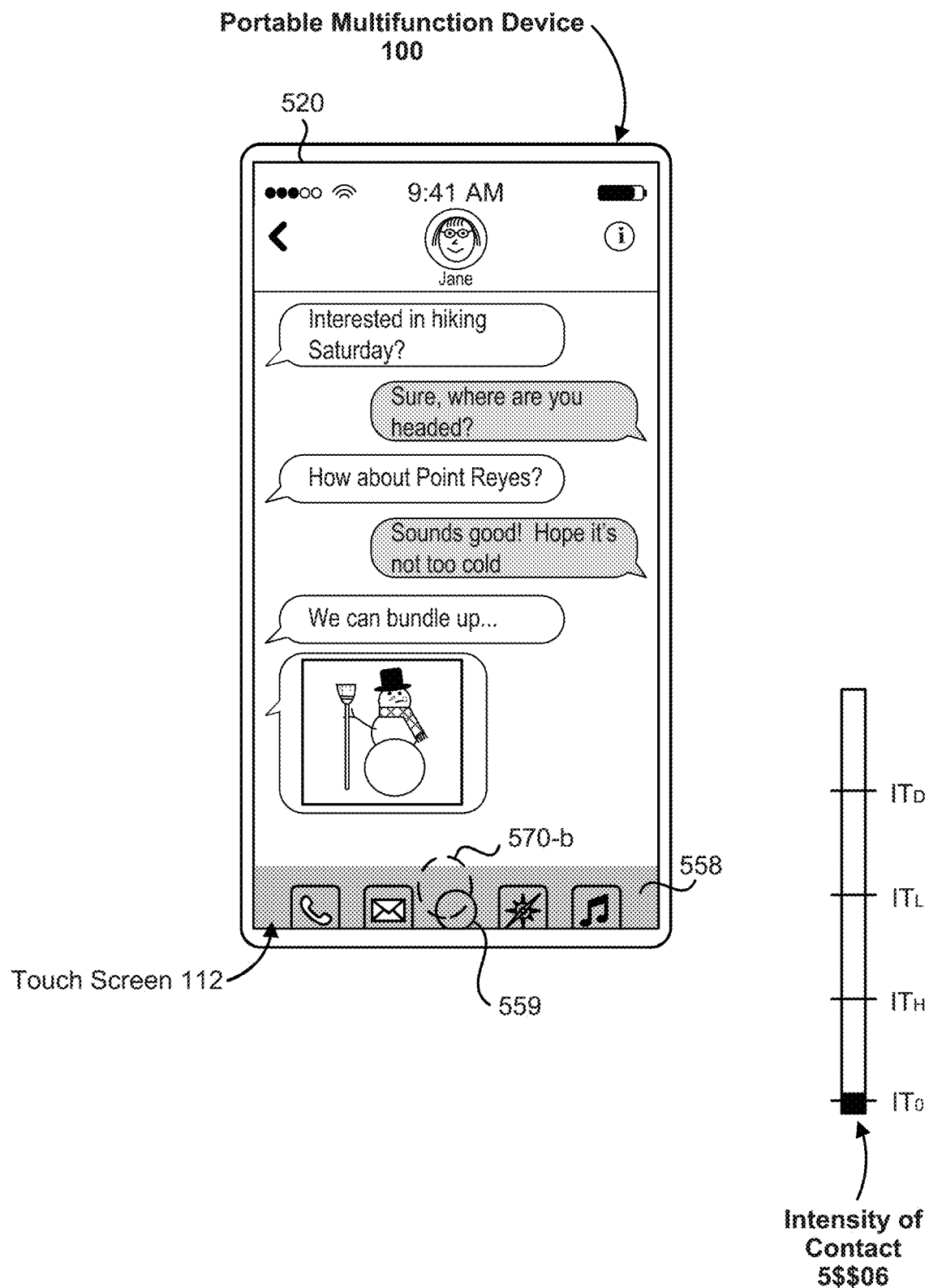
Figure 5C28

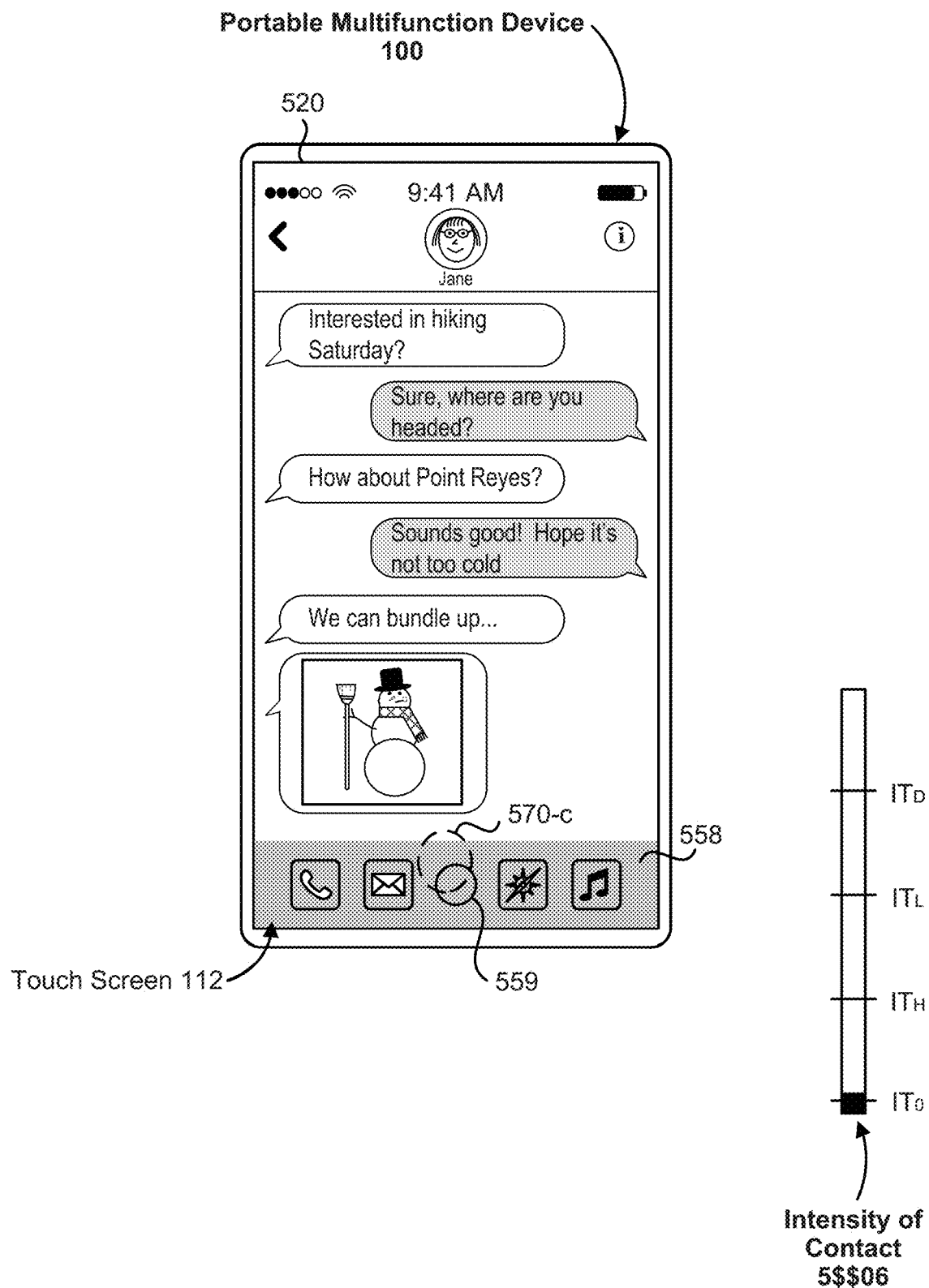
Figure 5C29

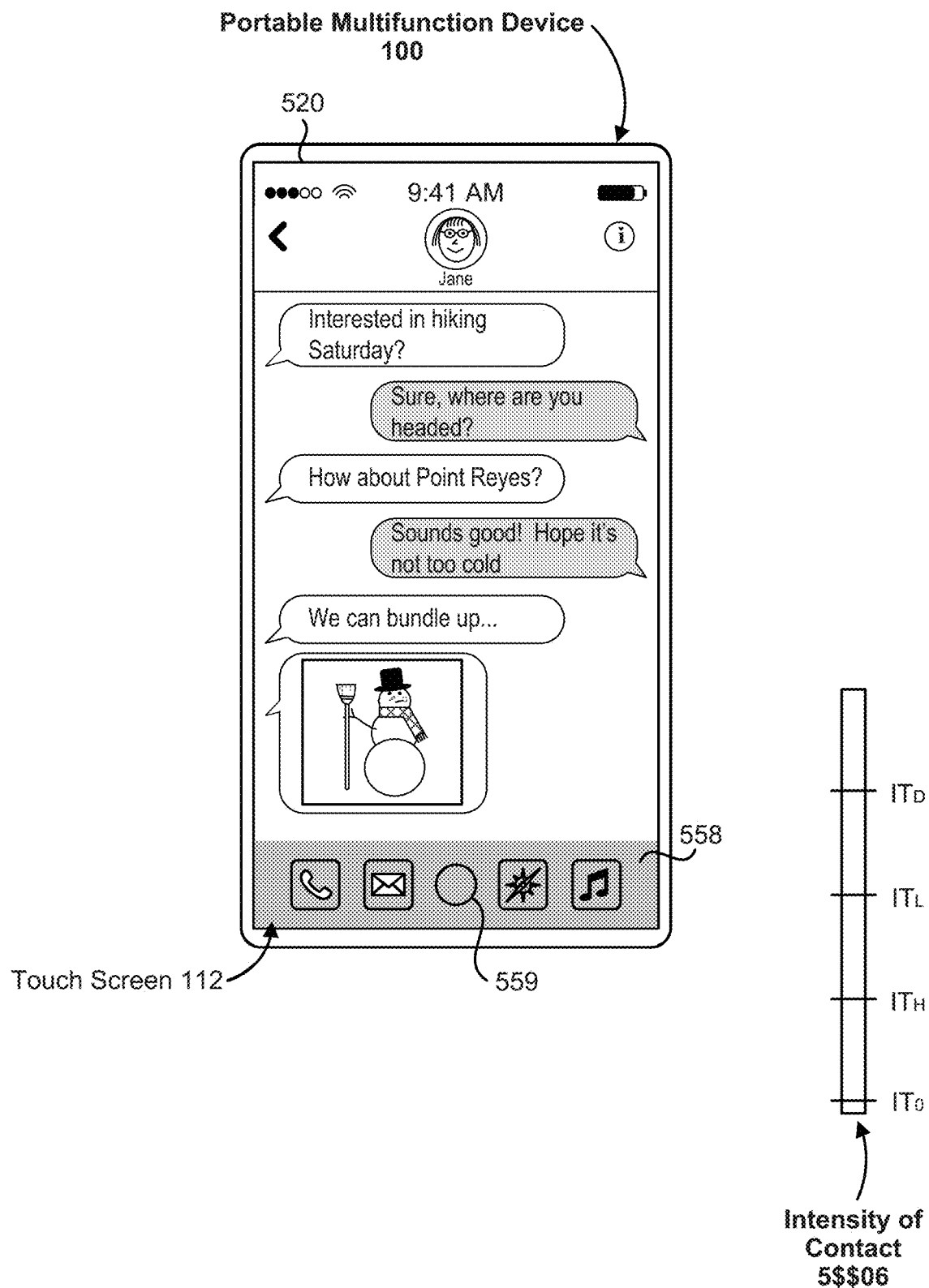
Figure 5C30

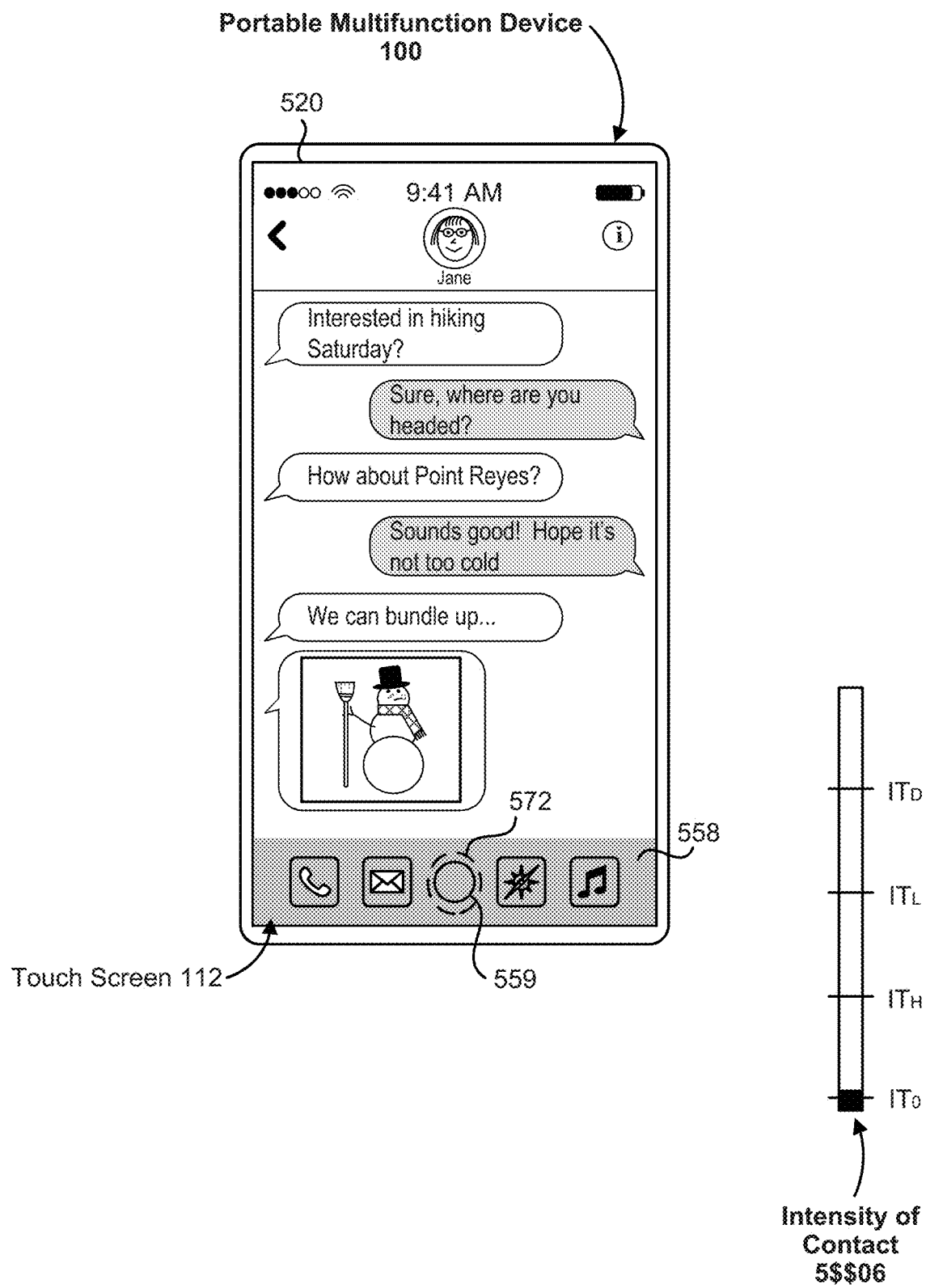
Figure 5C31

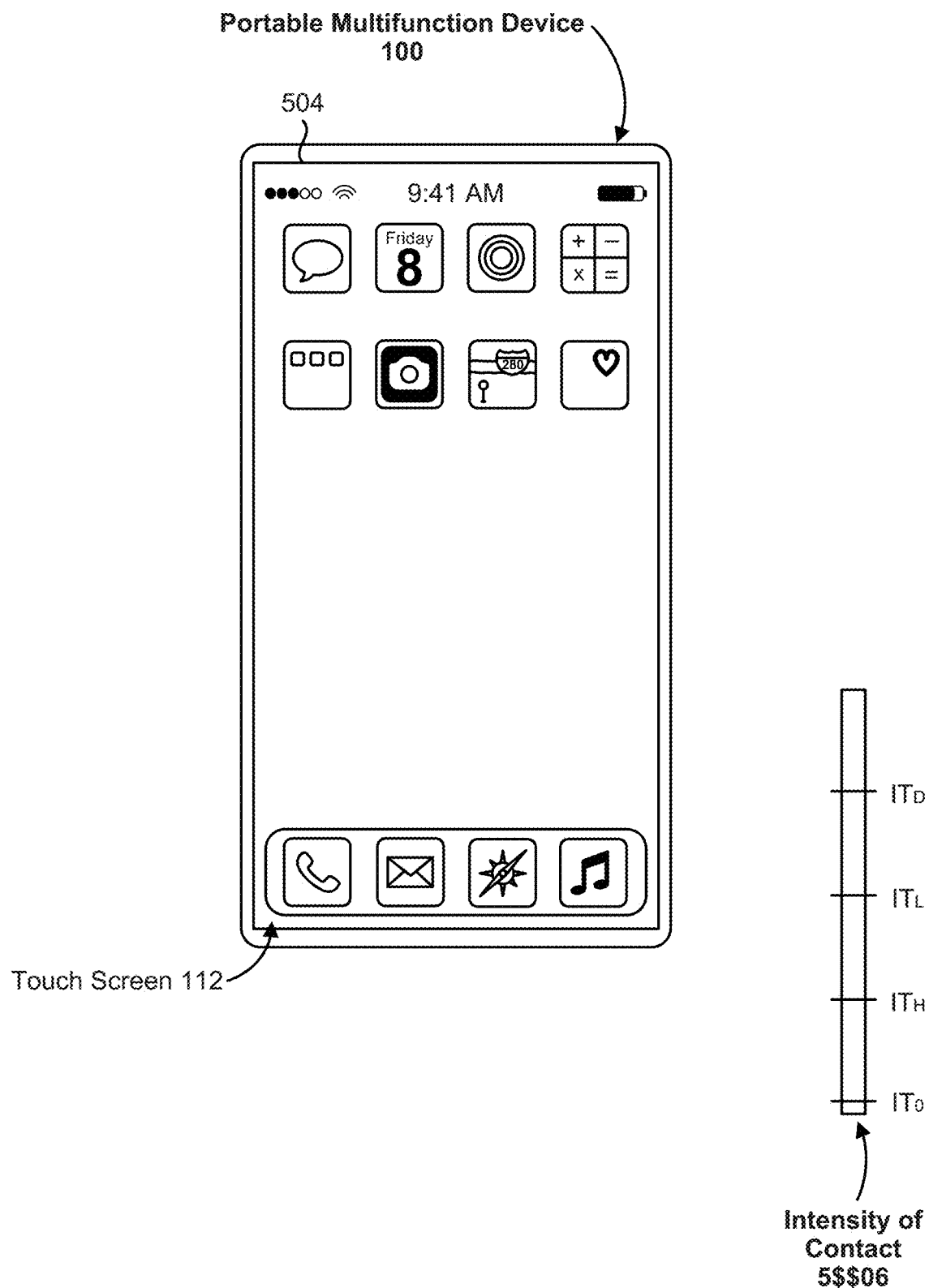
Figure 5C32

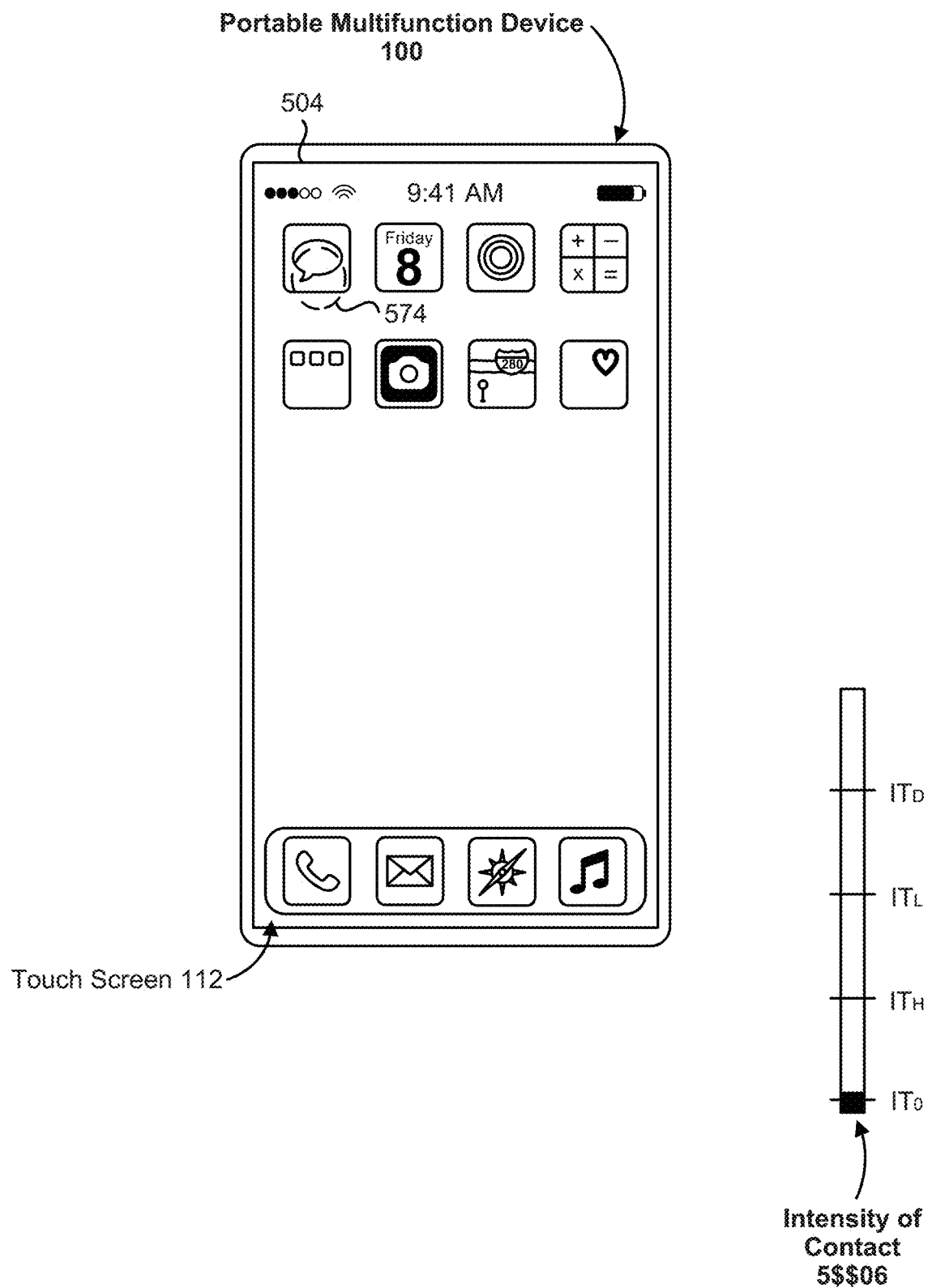
Figure 5C33

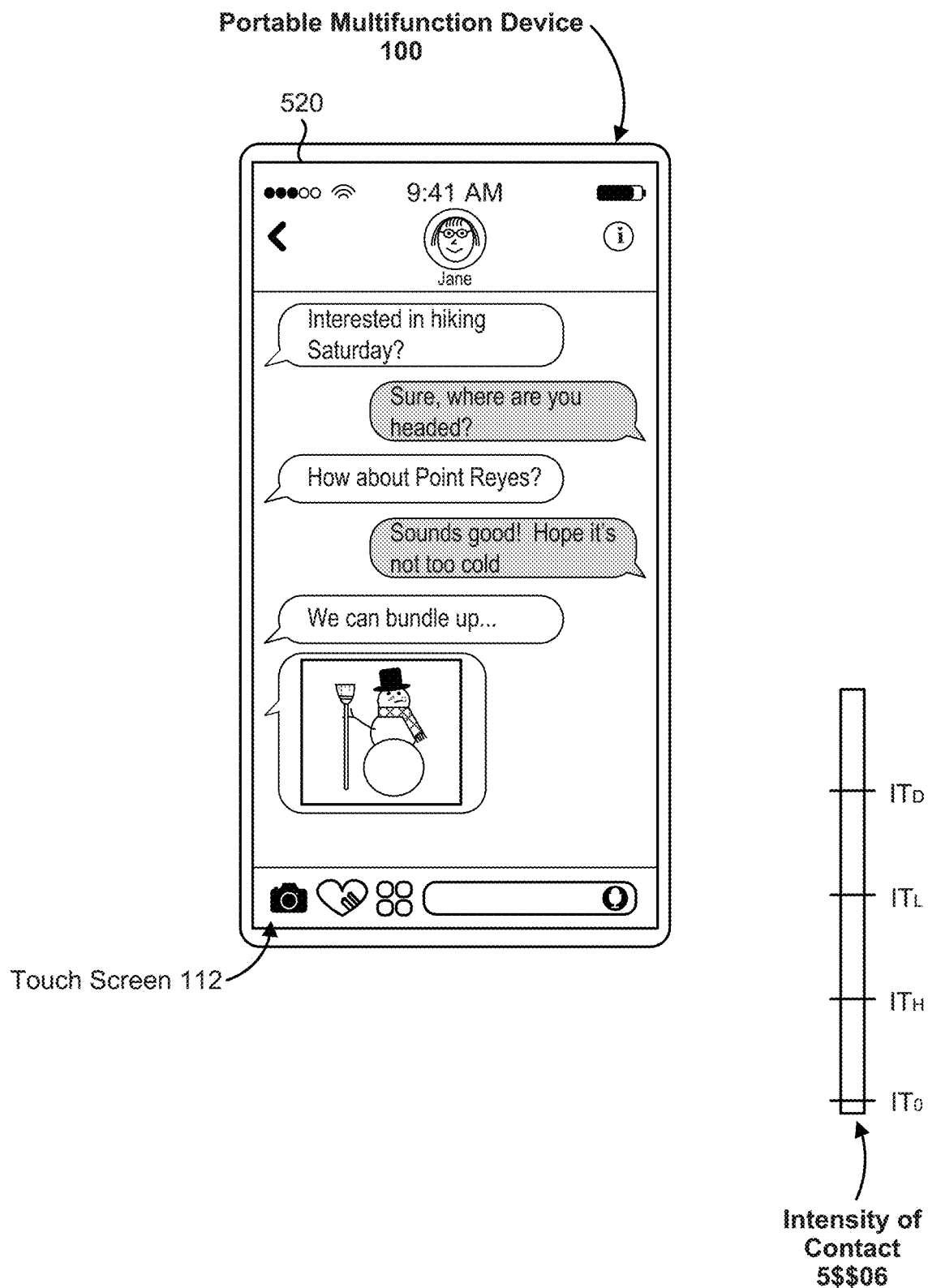
Figure 5C34

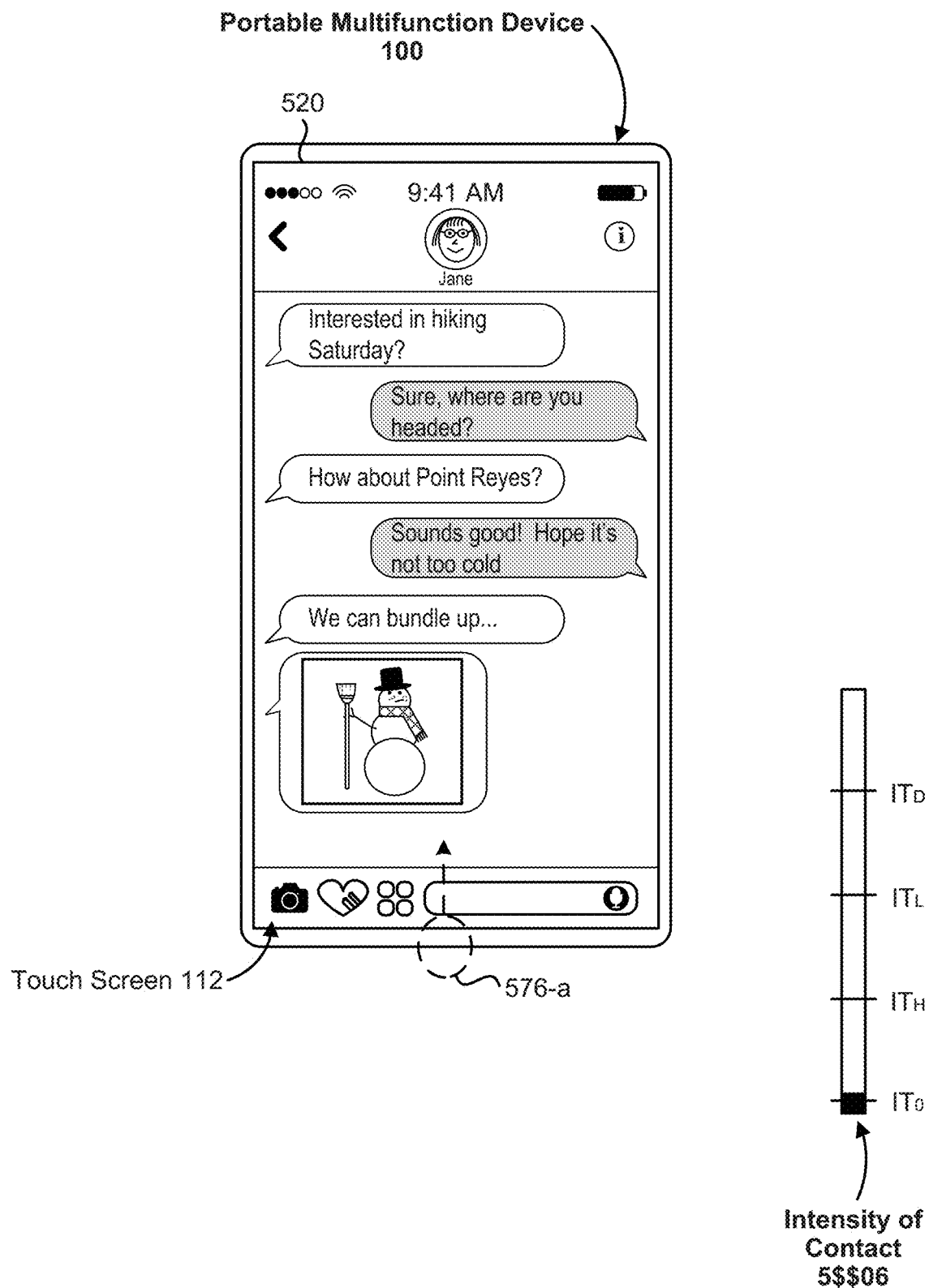
Figure 5C35

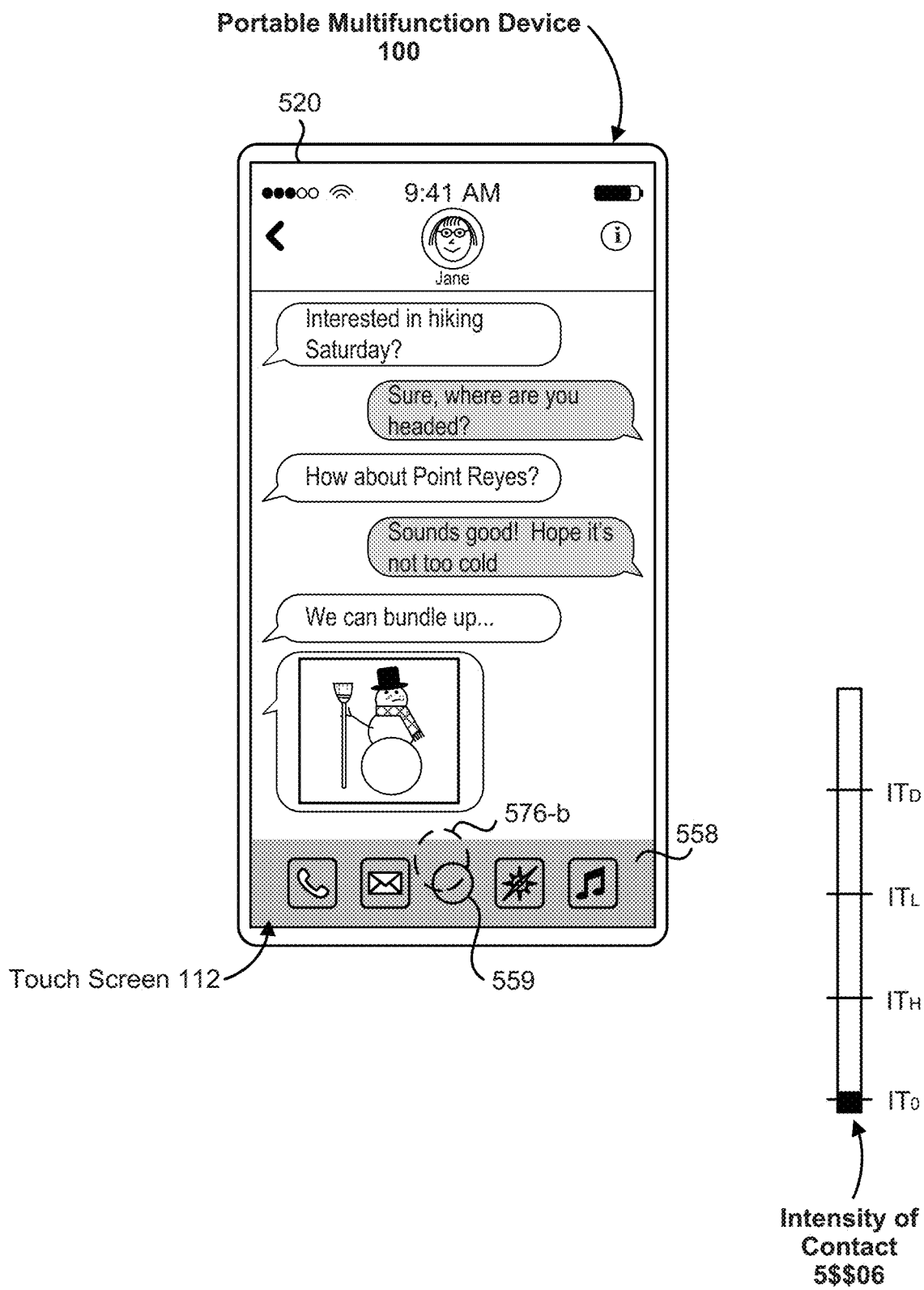
Figure 5C36

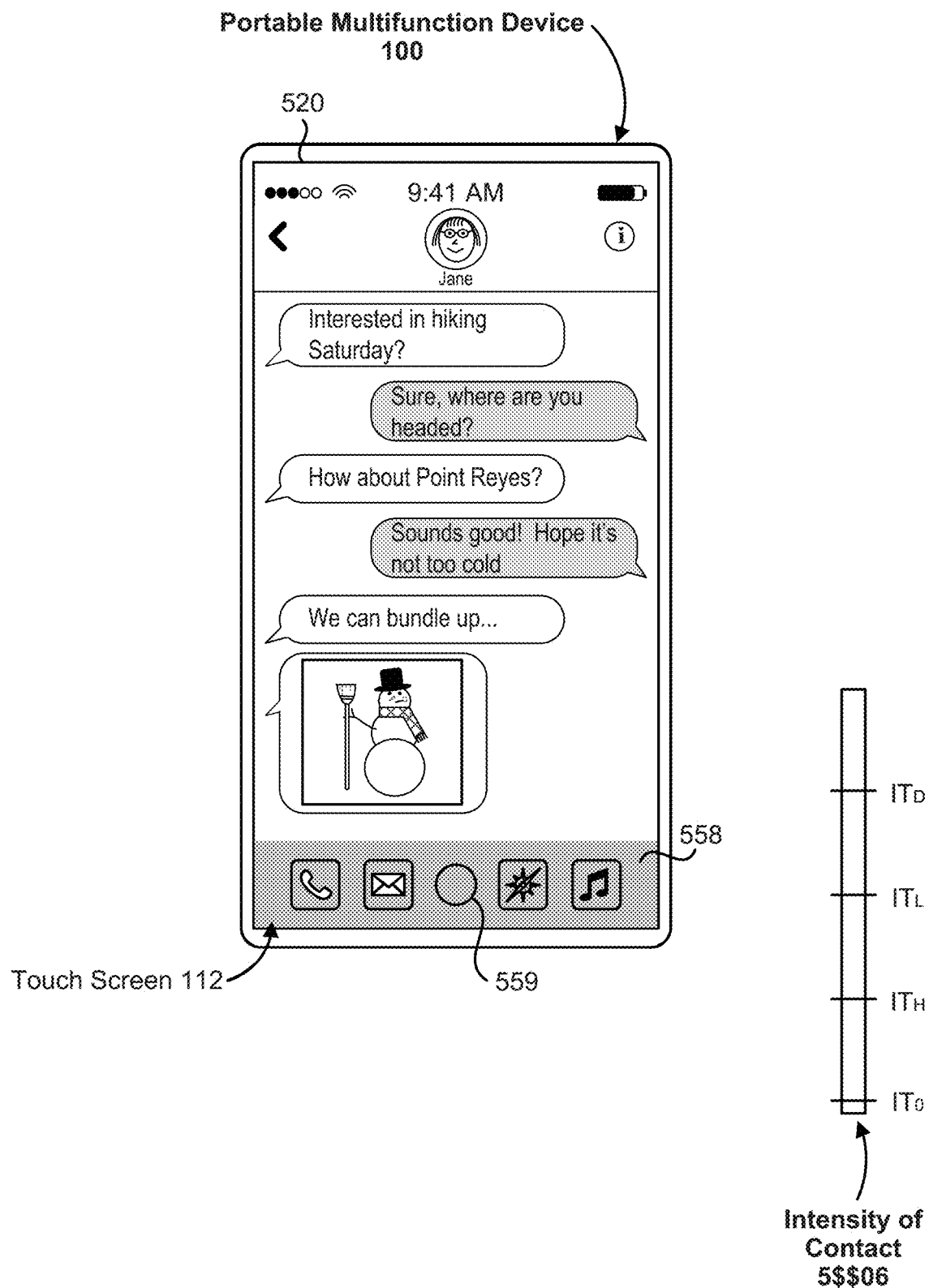
Figure 5C37

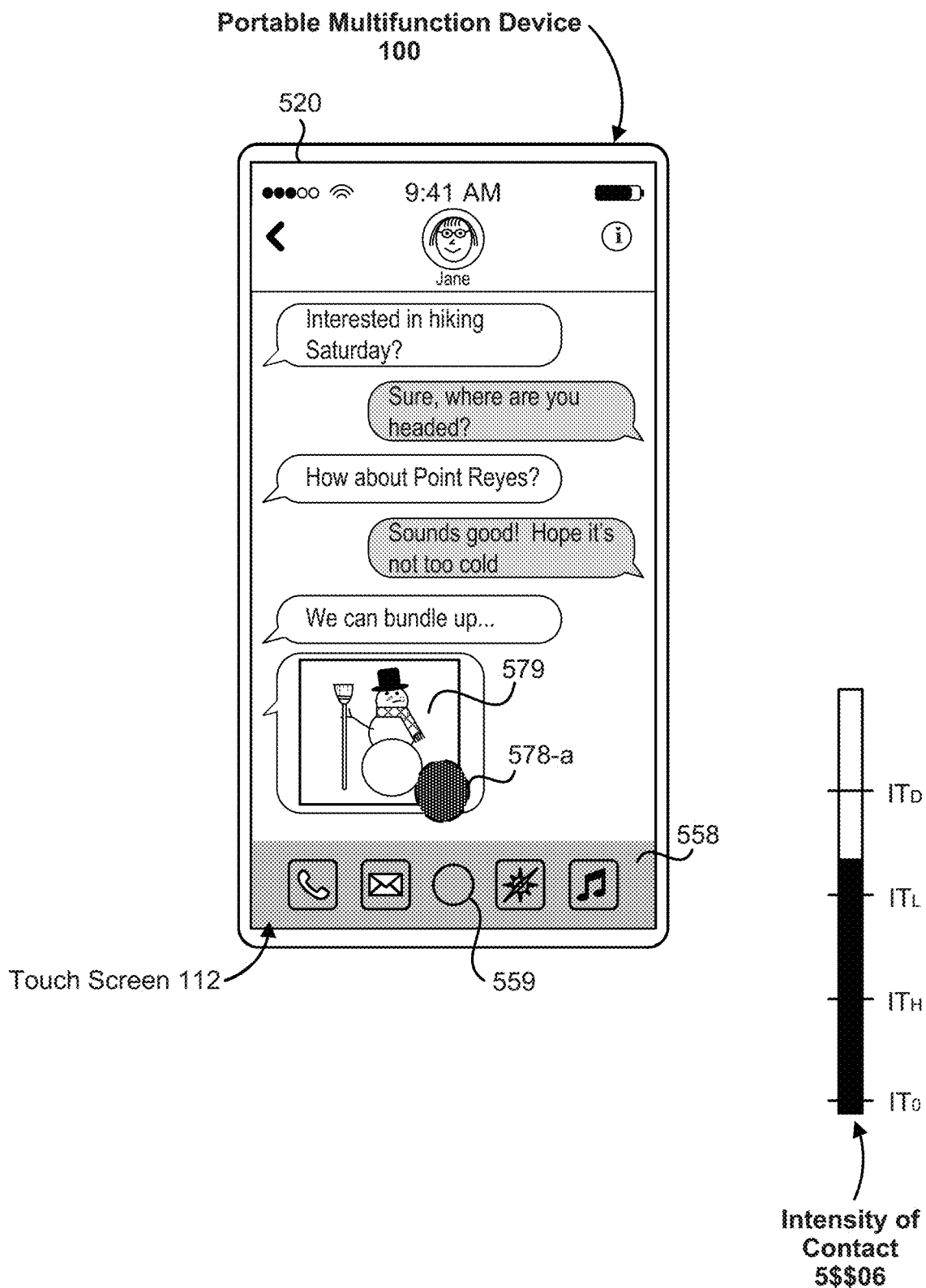
Figure 5C38

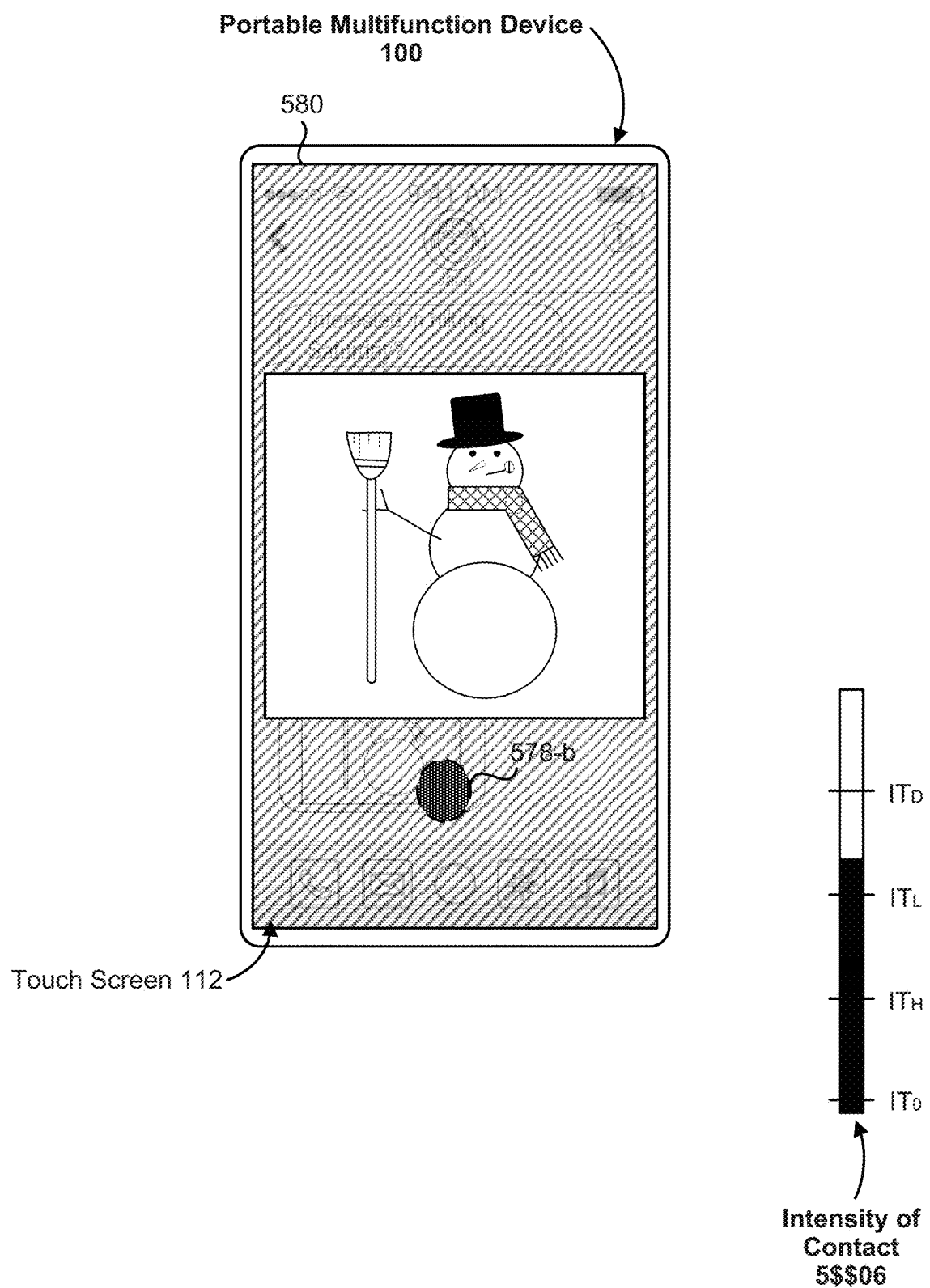
Figure 5C39

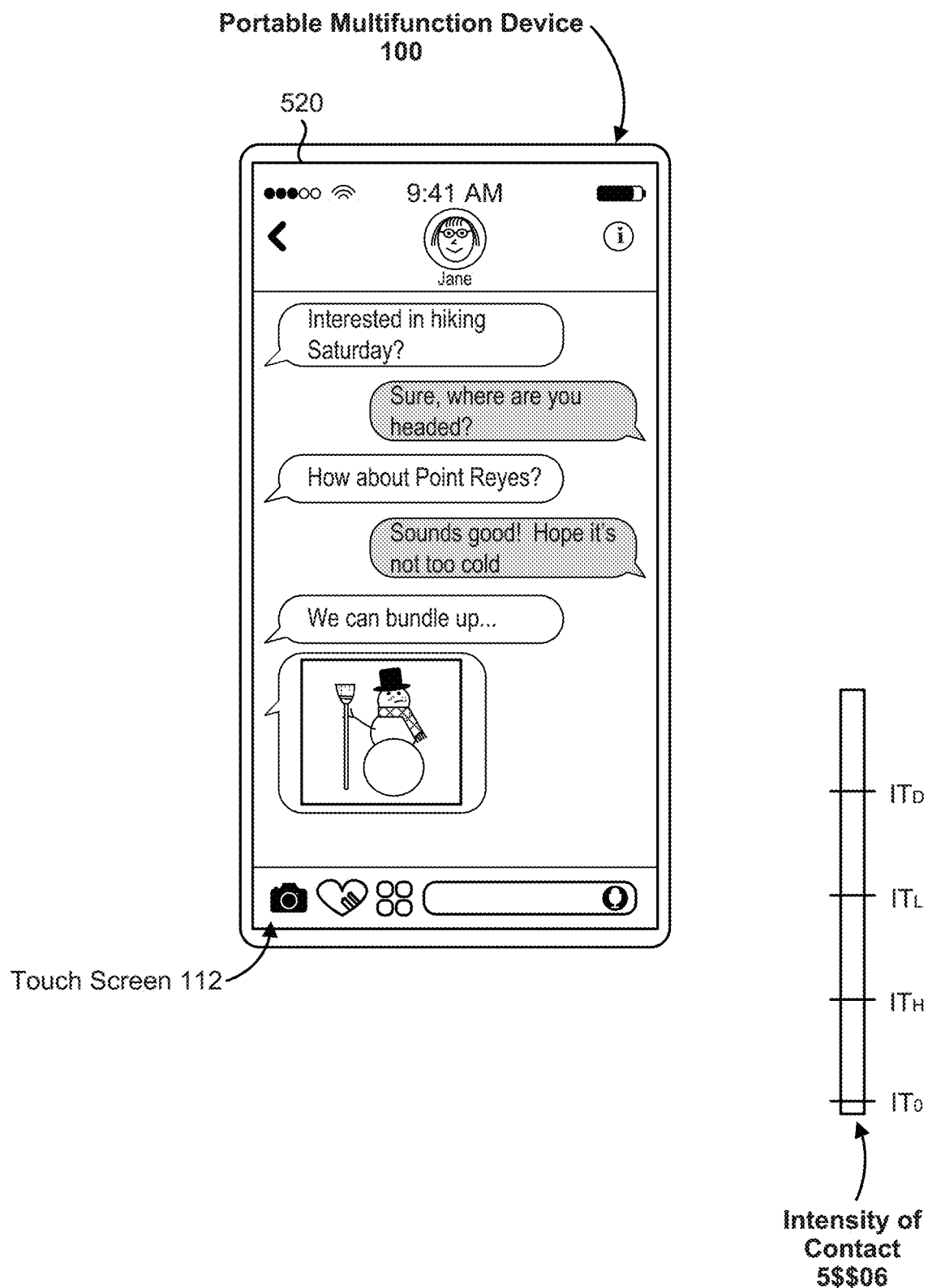
Figure 5C40

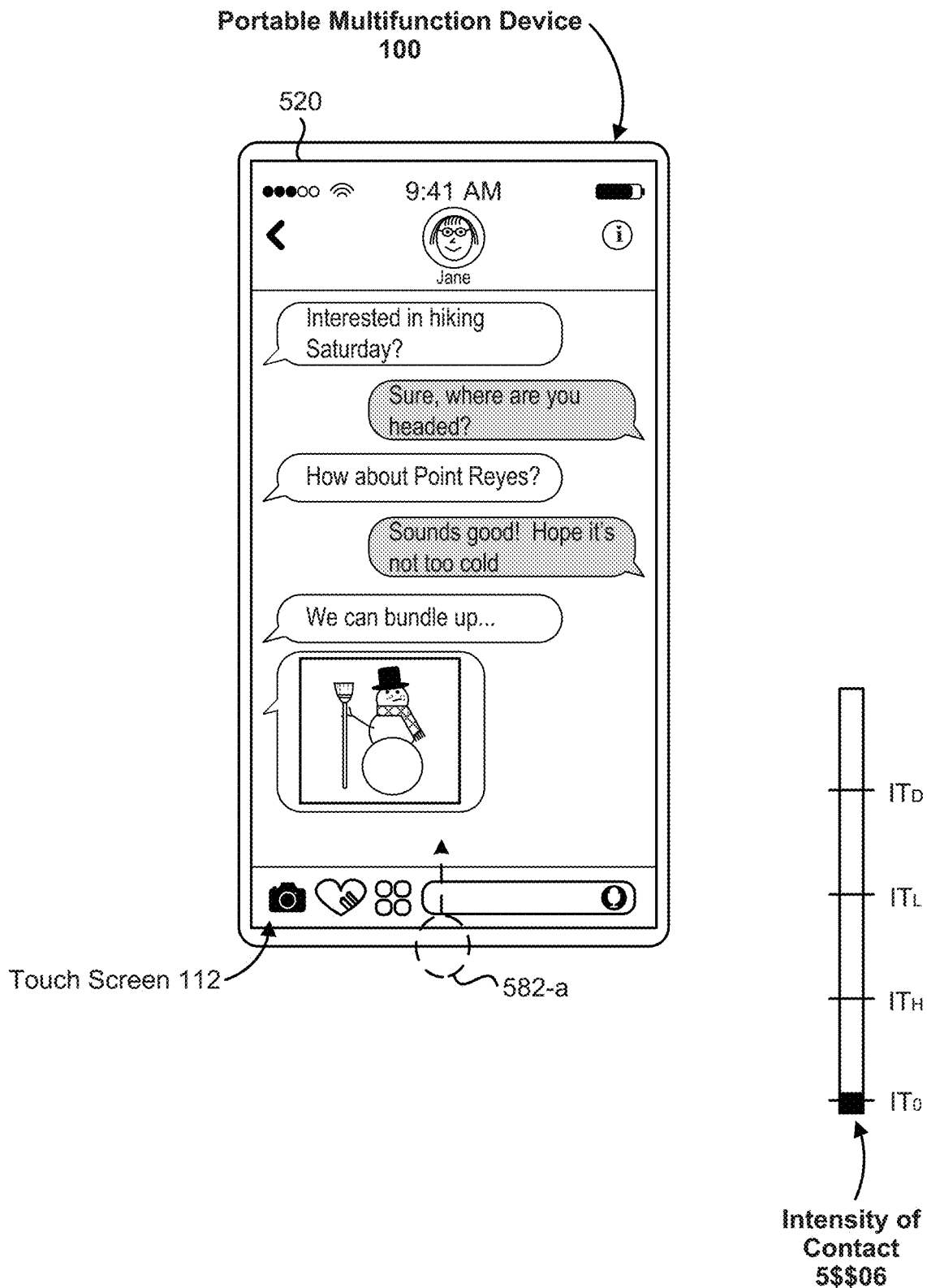
Figure 5C41

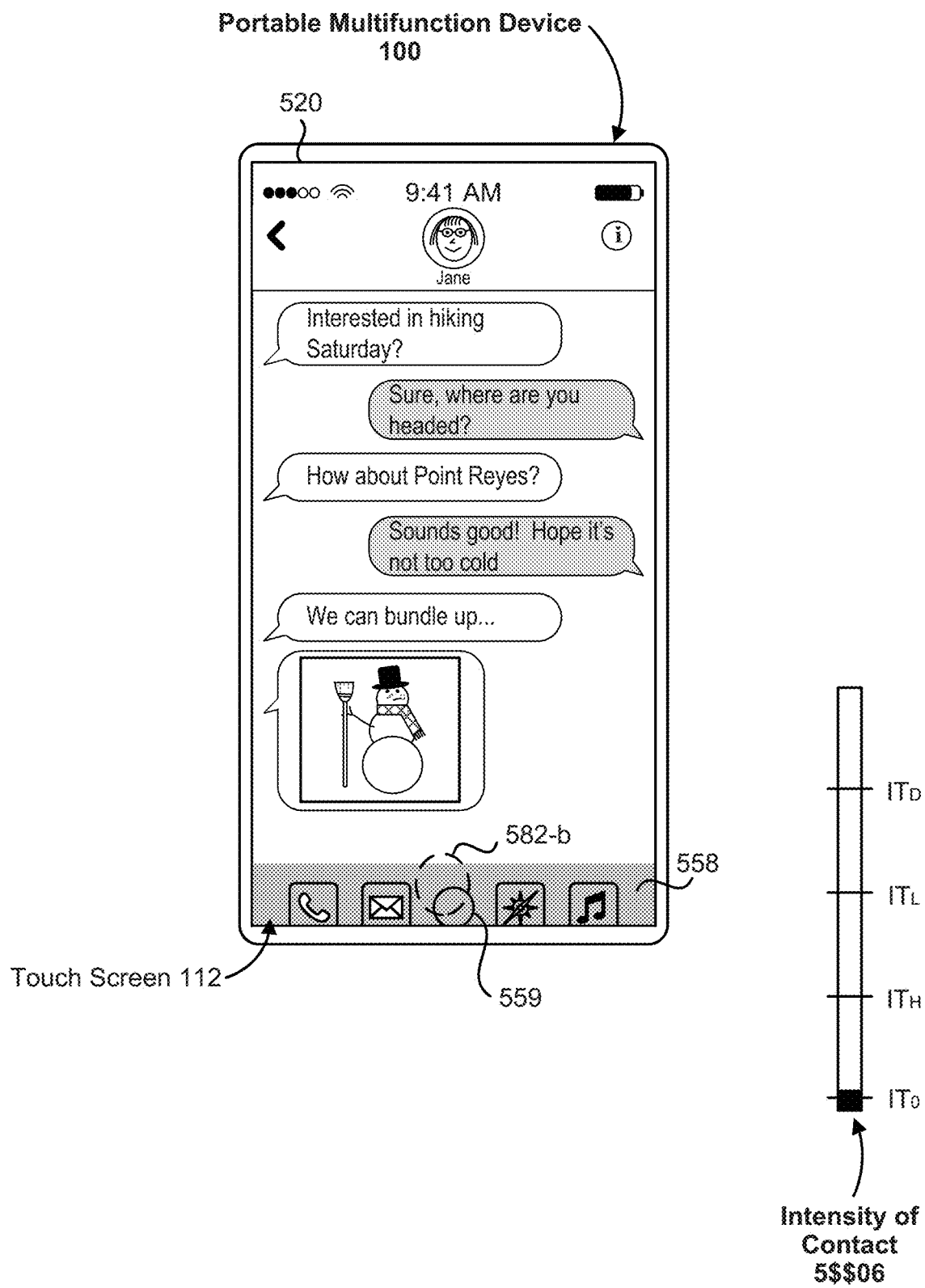
Figure 5C42

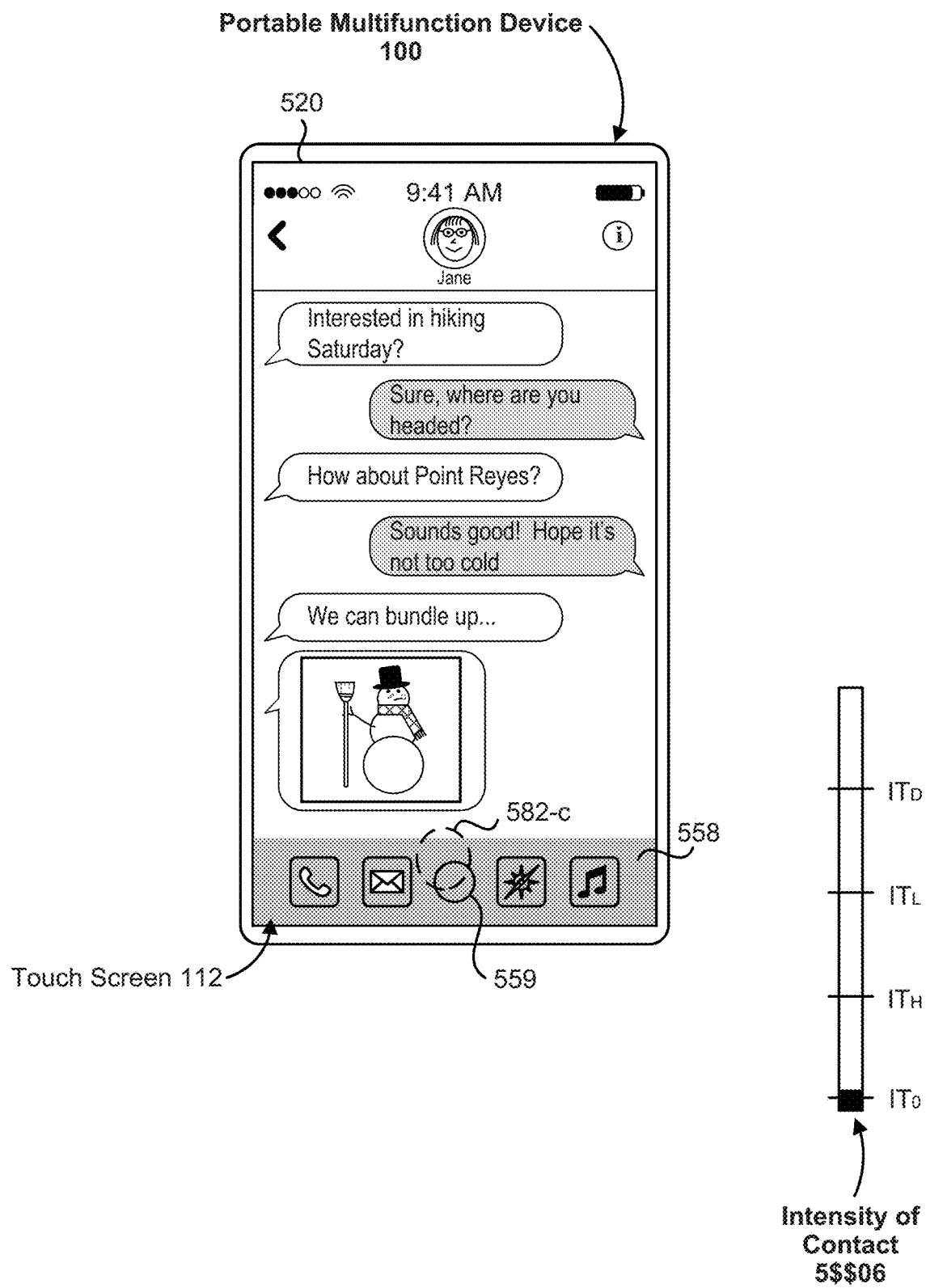
Figure 5C43

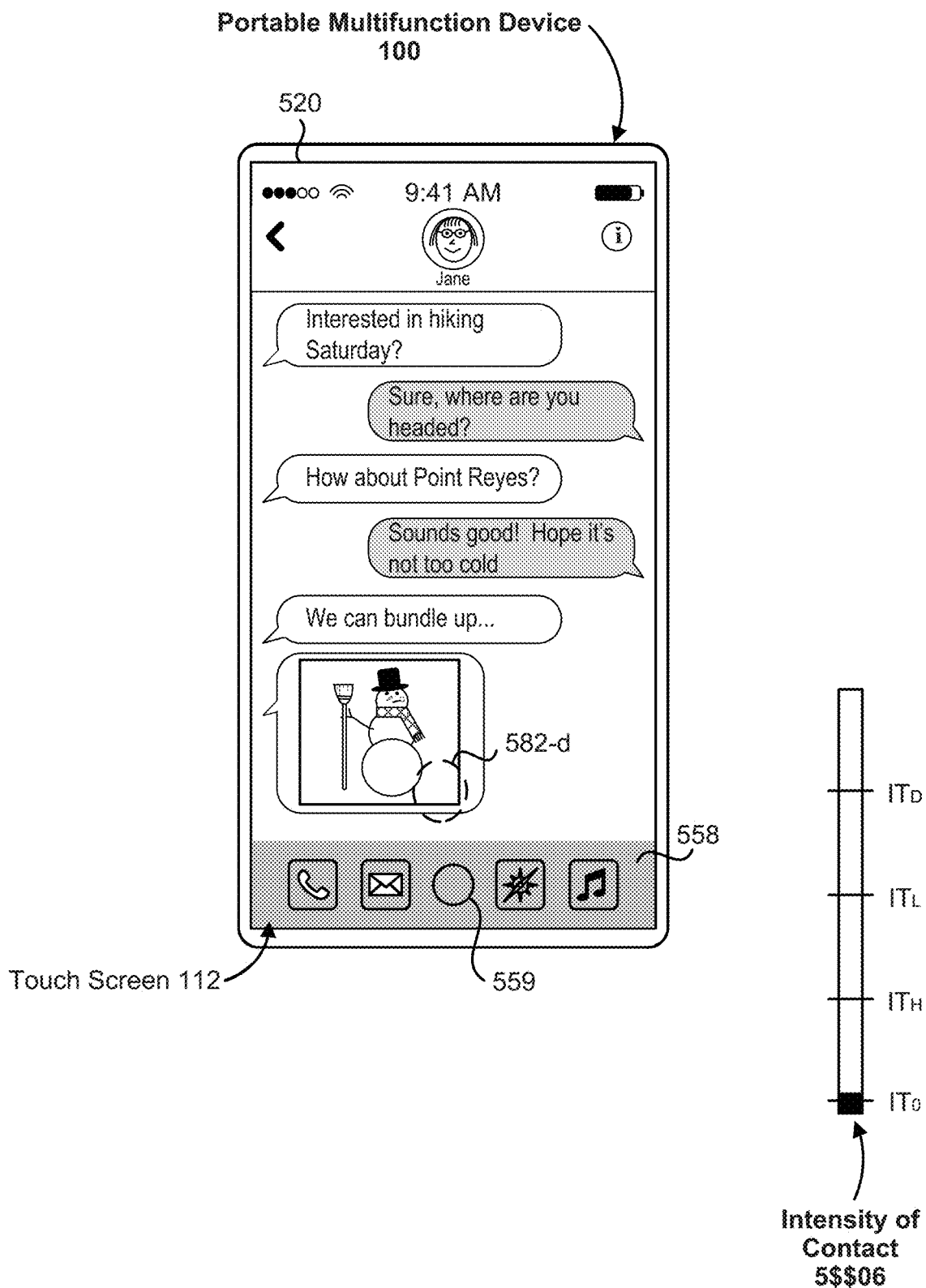
Figure 5C44

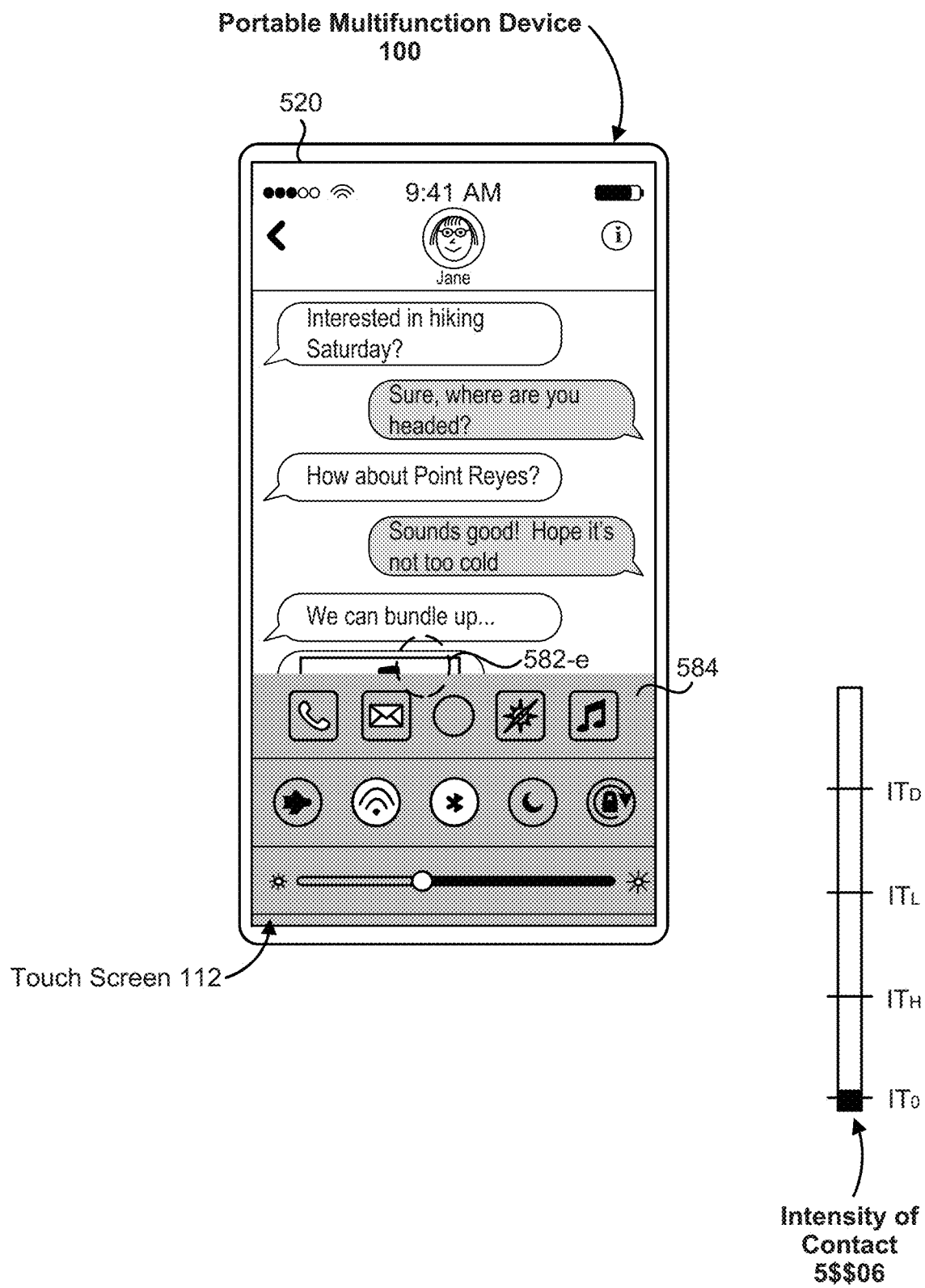
Figure 5C45

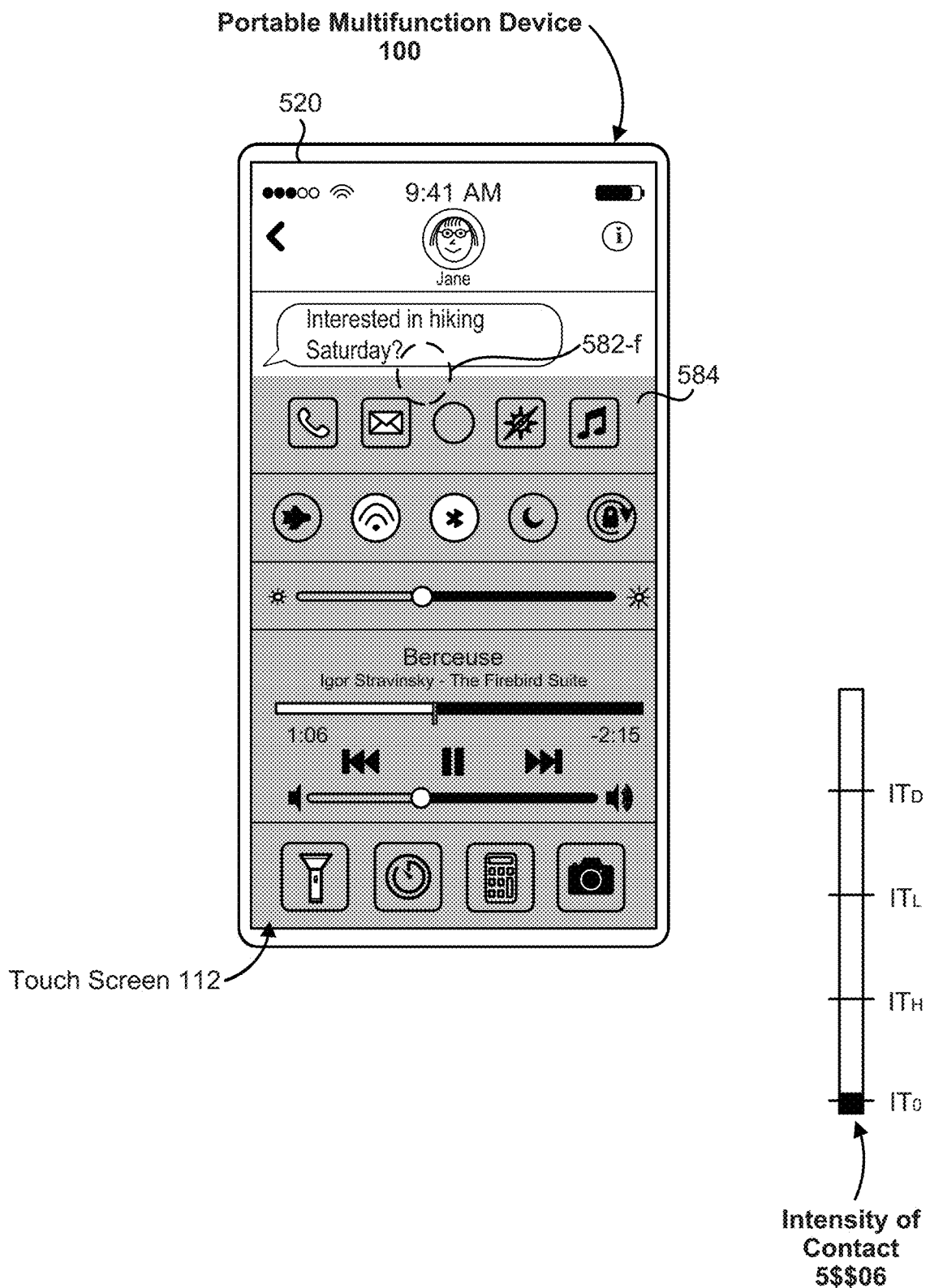
Figure 5C46

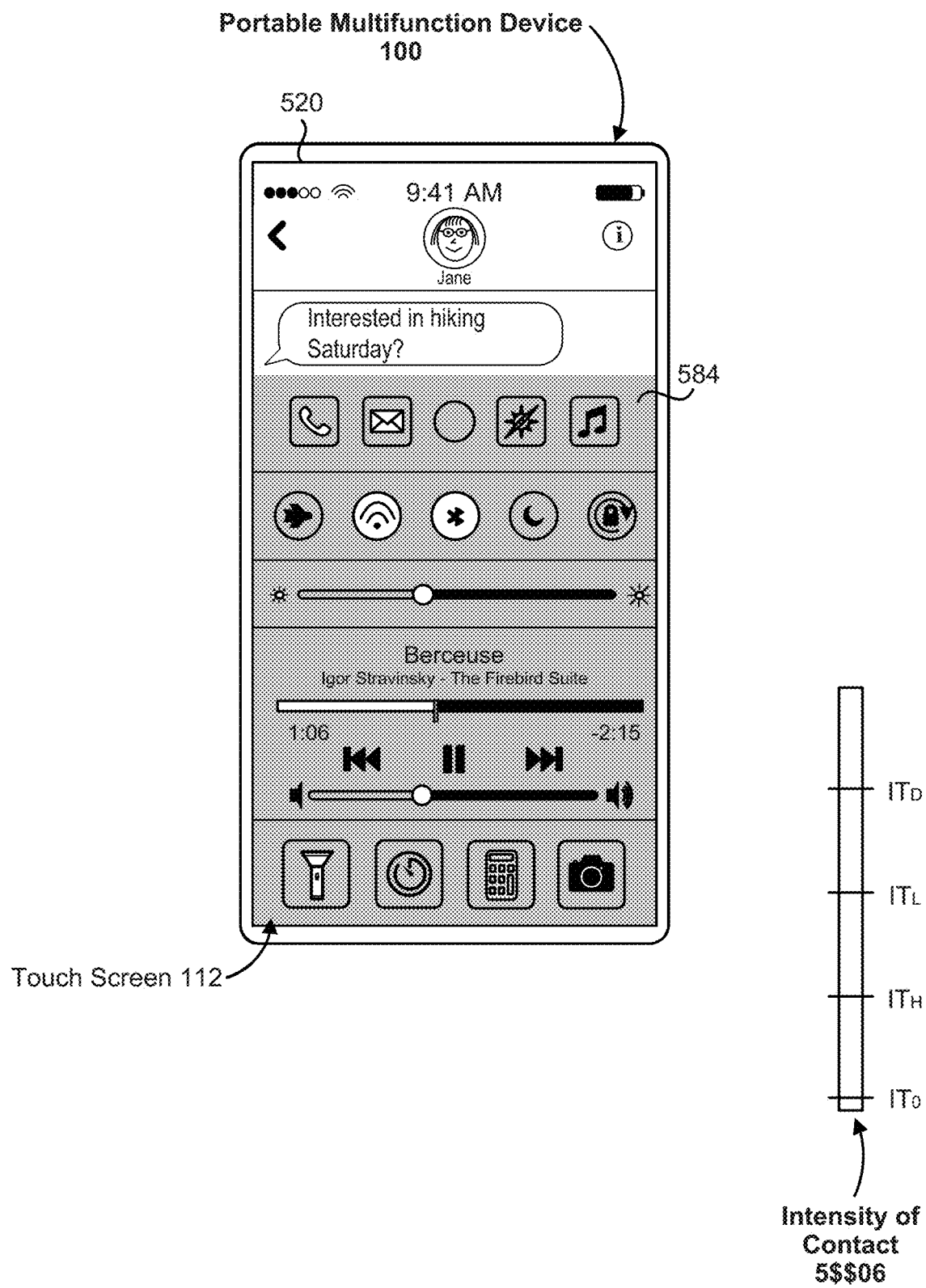
Figure 5C47

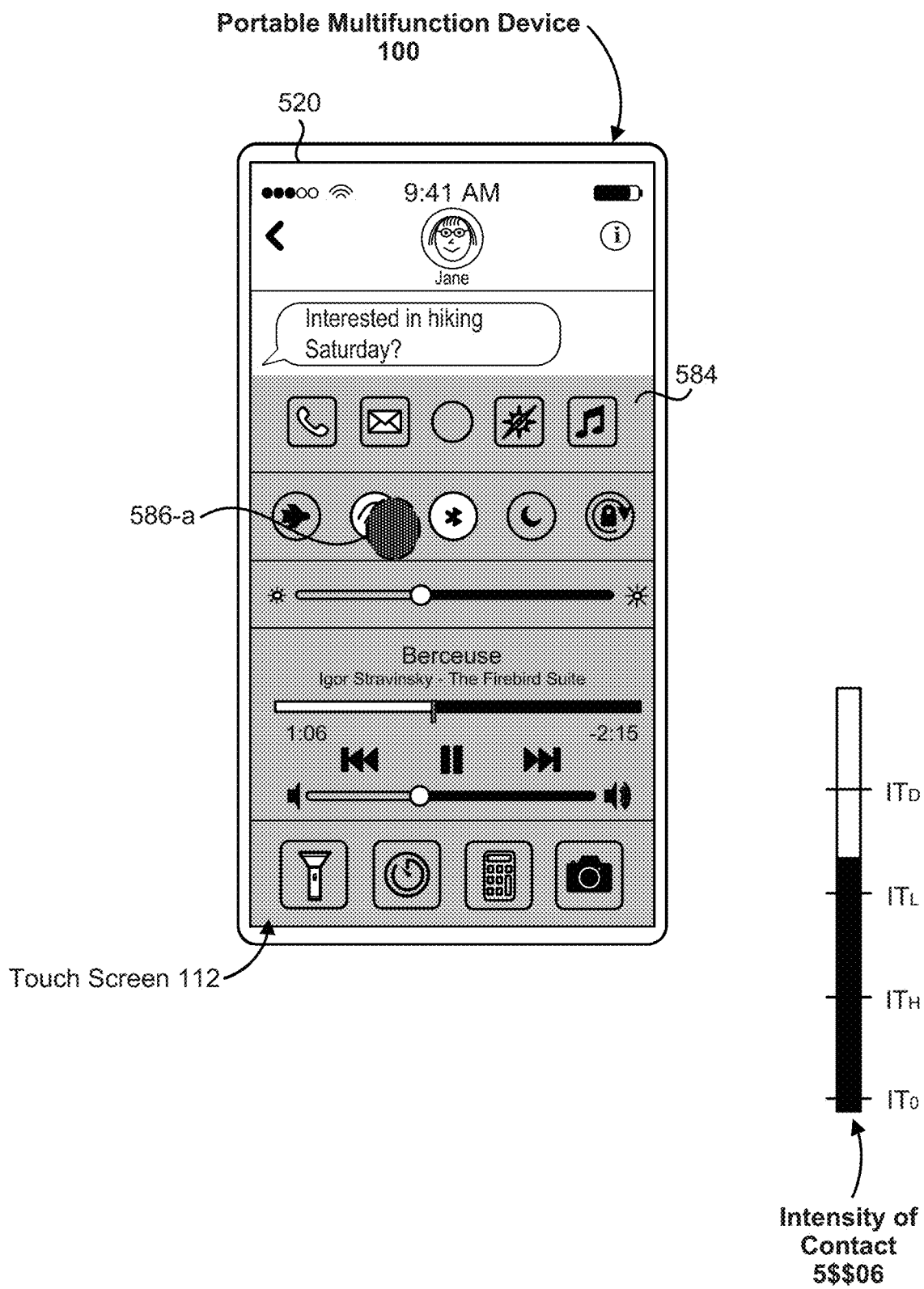
Figure 5C48

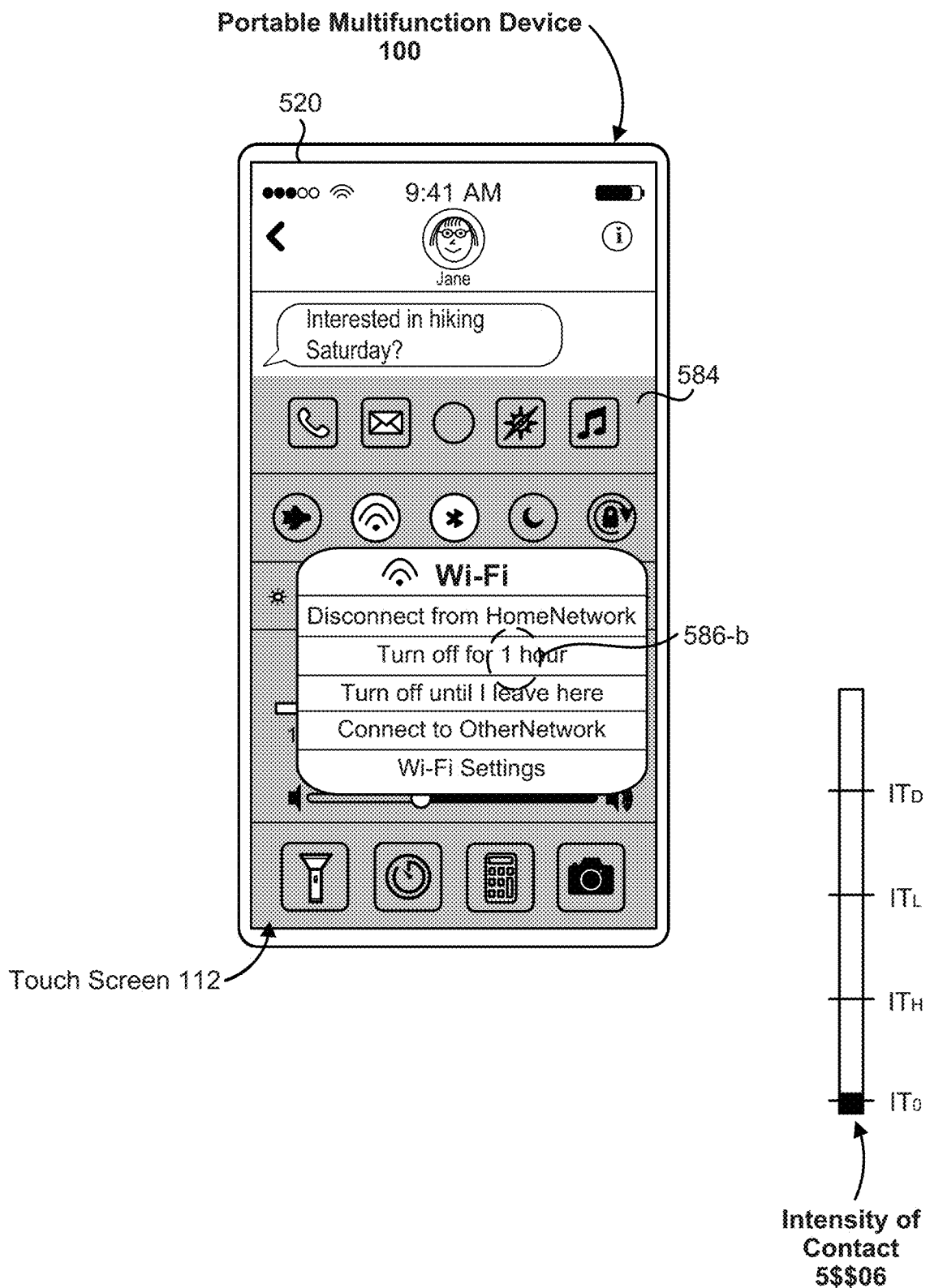
Figure 5C49

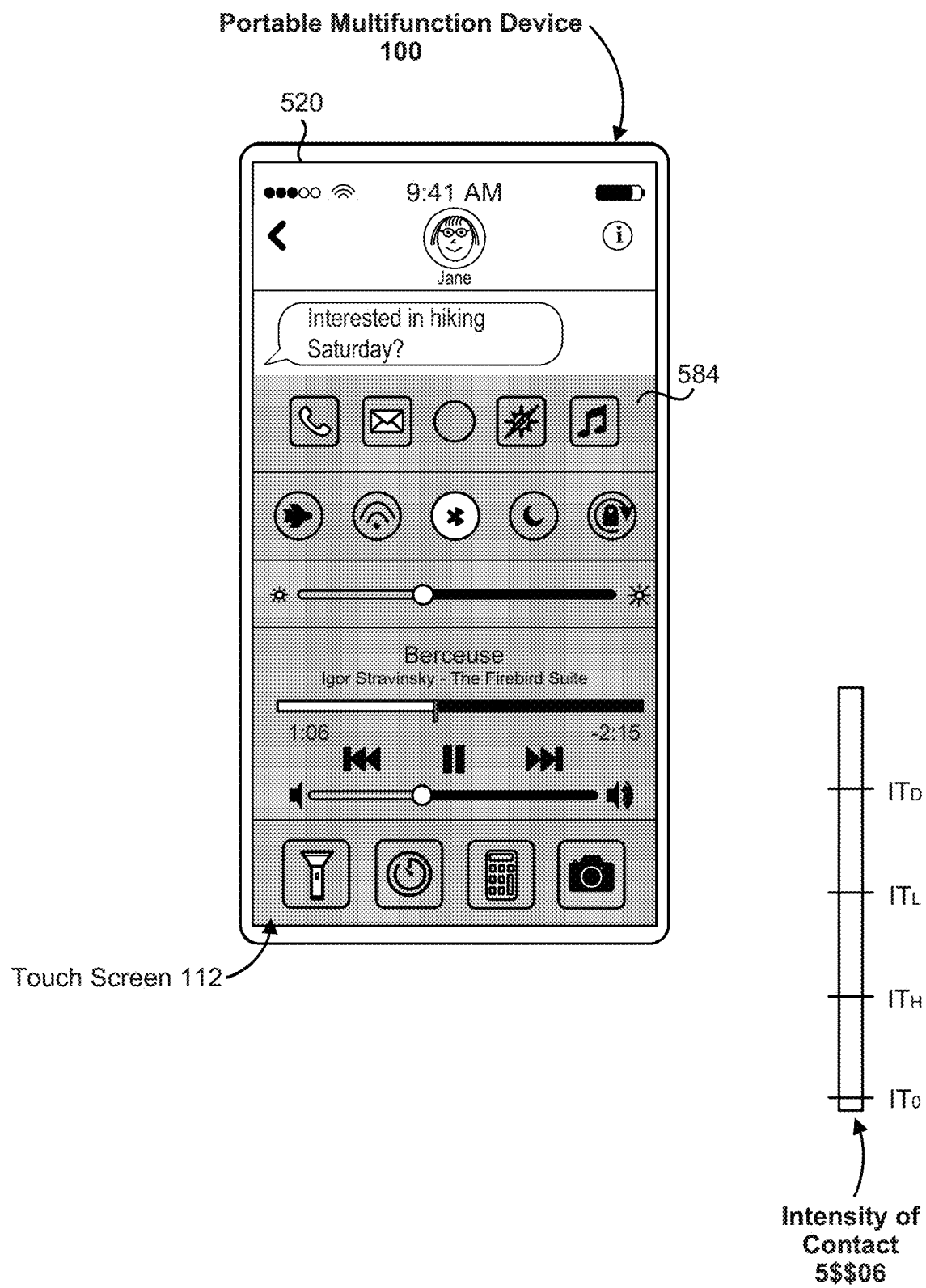
Figure 5C50

600

602 While the device is in an unlocked state, detect a sequence of one or more activations of a button of the device that includes at least a first activation of the button, wherein the first activation of the button is detected while a respective application user interface other than a home screen of the device is displayed on the display

604 In response to detecting the sequence of one or more activations of the button of the device:
    in accordance with a determination that the first activation of the button was detected without a second activation of the button being detected before a respective threshold amount of time from detecting the first activation of the button had elapsed, replace display of the respective application user interface with display of a home screen of the device while maintaining the device in the unlocked state; and
    in accordance with a determination that the first activation of the button was detected with a second activation of the button being detected before the respective threshold amount of time from detecting the first activation of the button had elapsed, switch the device from the unlocked state, in which the respective application user interface is displayed, to a locked state

606 Detecting the first activation of the button includes detecting a first press input on the button that meets first click criteria

608 Detecting the second activation of the button includes detecting a second press input on the button that meets second click criteria

610 Switching the device from the unlocked state, in which the respective application user interface is displayed, to the locked state includes switching from displaying the respective application user interface to displaying a lock screen user interface without displaying the home screen of the device

612 Switching the device from the unlocked state, in which the respective application user interface is displayed, to the locked state includes turning off the display without displaying the home screen of the device

Figure 6A

614 In response to detecting the sequence of one or more activations of the button of the device:
    in accordance with a determination that the first activation of the button was detected with a second activation of the button being detected after the respective threshold amount of time from detecting the first activation of the button had elapsed,
        display the home screen in response to detecting the first activation of the button, and
        while the home screen of the device is displayed on the display, switch the device from the unlocked state to the locked state in response to detecting the second activation of the button > 616 After the second activation of the button was detected and while the device is in the locked state, detect a third activation of the button that unlocks the device;
> in response to detecting the third activation of the button that unlocks the device:
>     in accordance with a determination that the second activation of the button was detected after the respective threshold amount of time from detecting the first activation of the button had elapsed, unlock the device to display the home screen of the device; and
>     in accordance with a determination that the second activation of the button was detected before the respective threshold amount of time from detecting the first activation of the button had elapsed, unlock the device to display the respective application user interface 618 In response to detecting the sequence of one or more activations of the button of the device:
    in accordance with a determination that detecting the first activation of the button meets long-press criteria, wherein the long press criteria require that the first activation of the button is maintained for at least a threshold duration without a second activation being detected in order for the long-press criteria to be met, initiate a process to turn off the device

Figure 6B

620 In response to detecting the sequence of one or more activations of the button of the device:
  display a beginning of an animated transition from the respective application user interface to the home screen of the device in response to detecting the first activation of the button; and
  after displaying the beginning of the animated transition from the respective application user interface to the home screen of the device, pause the animated transition from the respective application user interface to the home screen of the device, wherein:
    in accordance with a determination that the second activation of the button was not detected before the respective threshold amount of time from detecting the first activation of the button had elapsed, replacing display of the respective application user interface with display of the home screen of the device includes continuing the animated transition from the respective application user interface to the home screen of the device after the respective threshold amount of time has elapsed; and
    in accordance with a determination that the second activation of the button was detected before the respective threshold amount of time from detecting the first activation of the button had elapsed, switching the device from the unlocked state, in which the respective application user interface is displayed, to the locked state includes locking the device without resuming the animated transition 622 In response to detecting the sequence of one or more activations of the button of the device:
  in accordance with a determination that the second activation of the button was not detected before the respective threshold amount of time from detecting the first activation of the button had elapsed, replacing display of the respective application user interface with display of the home screen of the device includes displaying an animated transition from the respective application user interface to the home screen of the device that starts after the respective threshold amount of time has elapsed, and
  in accordance with a determination that the second activation of the button was detected before the respective threshold amount of time from detecting the first activation of the button had elapsed, lock the device without displaying the animated transition 624 In response to detecting the sequence of one or more activations of the button of the device:
  in accordance with a determination that detecting the one or more activations of the button includes detecting a first movement input that meets application-toggle criteria, replace the respective application user interface with a second user interface that corresponds to another application that was active on the device immediately prior to an application that corresponds to the respective application user interface

Figure 6C

626 Detect a fourth activation of the button;
in response to detecting the fourth activation of the button:
    in accordance with a determination that detecting the fourth activation of the button includes detecting a fourth input on the button that meets go-home criteria, wherein the go-home criteria require that the fourth input meets first click criteria and that the home screen of the device is not displayed when the fourth input is detected, in order for the go-home criteria to be met:
        display the home screen of the device;
    in accordance with a determination that detecting the fourth activation of the button includes detecting a fifth input on the button that meets go-to-application criteria, wherein the go-to-application criteria require that the fifth input meets first movement criteria in order for the go-to-application criteria to be met:
        display a user interface of a last active application on the device 628 In response to detecting the fourth activation of the button:
    in accordance with a determination that detecting the fourth activation of the button includes detecting an initial portion of the fifth input that meets preview criteria, wherein the preview criteria require that the initial portion of the fifth input meets second movement criteria in order for the preview criteria to be met, display a preview of the user interface of the last active application on the device

632

630 In response to detecting the fourth activation of the button:
    in accordance with a determination that detecting the fourth activation of the button includes detecting an initial portion of the fifth input that meets preview criteria, wherein the preview criteria require that the initial portion of the fifth input meets second movement criteria in order for the preview criteria to be met, display a preview of a lock screen user interface if the device is locked 632 While displaying the preview, detect termination of the fifth input on the button; and
in response to detecting the termination of the fifth input on the button:
    in accordance with a determination that the fifth input meets the preview criteria and does not meet the go-to-application criteria, cease to display the preview upon termination of the fifth input 634 In response to detecting the termination of the fifth input on the button:
    in accordance with a determination that the fifth input meets the preview criteria and does not meet the go-to-application criteria, turn off the display upon termination of the fifth input (A)

Figure 6D

626 Detect a fourth activation of the button;
in response to detecting the fourth activation of the button:
    in accordance with a determination that detecting the fourth activation of the button includes detecting a fourth input on the button that meets go-home criteria, wherein the go-home criteria require that the fourth input meets first click criteria and that the home screen of the device is not displayed when the fourth input is detected, in order for the go-home criteria to be met:
        display the home screen of the device;
    in accordance with a determination that detecting the fourth activation of the button includes detecting a fifth input on the button that meets go-to-application criteria, wherein the go-to-application criteria require that the fifth input meets first movement criteria in order for the go-to-application criteria to be met:
        display a user interface of a last active application on the device

636 In response to detecting the fourth activation of the button:
    in accordance with a determination that detecting the fourth activation of the button includes detecting a sixth input that meets application-switching criteria, wherein the application-switching criteria require that the sixth input includes a movement input that meets the first movement criteria and first duration criteria in order for the application-switching criteria to be met:
        display an application-switching user interface that includes representations of a currently active application and one or more suspended applications on the device

702 Display a home screen on the display, wherein the home screen includes a plurality of application launch icons that correspond to a plurality of applications that are installed on the device

704 While displaying the home screen, detect a first input by a first contact on a first application launch icon that meets application-launch criteria

706 In response to detecting the first input on the first application launch icon that meets the application-launch criteria, replace the home screen with a first user interface of a first application that corresponds to the first application launch icon

708 While displaying the first user interface, detect a second input by a second contact that includes movement across the display in a first direction

710 In response to detecting the second input:
    in accordance with a determination that the second input meets dock-display criteria, wherein the dock-display criteria require that the second input includes movement of the second contact with a magnitude of a movement parameter that is above a first movement threshold in order for the dock-display criteria to be met, display a user interface object overlaid on a portion of the first user interface, wherein the user interface object includes a first subset of application launch icons from the plurality of application launch icons; and
    in accordance with a determination that the second input meets home-display criteria, wherein the home-display criteria require that the second input includes movement of the second contact with a magnitude of the movement parameter that is above a second movement threshold that is greater than the first movement threshold, replace display of the first user interface with display of the home screen

---

712 Displaying the user interface object overlaid on the portion of the first user interface includes moving the user interface object onto the portion of the first user interface in accordance with the movement of the second contact

714 Replacing display of the first user interface with display of the home screen includes:
    displaying the user interface object overlaid on the portion of the first user interface; and
    displaying an animated transition of the home screen replacing display of the first user interface while continuing to display the user interface object 716 The animated transition of the home screen replacing display of the first user interface is displayed at a rate in accordance with the movement of the second contact 718 In response to detecting the second input:
    in accordance with a determination that the second input meets control-center criteria, wherein the control-center criteria require that the second input includes movement of the second contact with a magnitude of the movement parameter that is above a third movement threshold that is greater than the second movement threshold, display a control center user interface object that includes a plurality of controls for controlling different functions of the device 720 The user interface object includes a virtual home button while the user interface object is overlaid on the portion of the first user interface, wherein the virtual home button, when selected, causes the device to cease to display the first user interface and display a home screen of the device; and
    the user interface object ceases to include the virtual home button while the user interface object is overlaid on a portion of the home screen 722 The user interface object includes application launch icons corresponding to one or more recently used applications on the device 724 The user interface object is configurable by a user to include one or more of: a virtual home button, one or more control affordances for controlling respective system or device settings, and/or one or more application launch icons

Figure 7B

726 While displaying the user interface object, detect a third input by a third contact that meets user interface switching criteria, wherein the user interface switching criteria require that the third input includes movement of the third contact across the display with a magnitude of a movement parameter that is above a third movement threshold in order for the user interface switching criteria to be met; and
in response to detecting the third input:
in accordance with a determination that a respective application user interface is displayed when the third contact is detected, replace display of the respective application user interface with display of the home screen 728 In response to detecting the third input:
in accordance with a determination that the home screen is displayed when the third contact is detected, replace display of the home screen with display of a user interface of a last active application on the device 730 While displaying the user interface object, detect a fourth input by a fourth contact that meets user interface dismissal criteria, wherein the user interface dismissal criteria require that the fourth input includes movement of the fourth contact across the display in a second direction that is different from the first direction; and
in response to detecting the fourth input:
in accordance with a determination that a respective application user interface is displayed when the fourth contact is detected, cease to display the user interface object while maintaining display of the respective application user interface 732 In response to detecting the fourth input:
in accordance with a determination that the home screen is displayed when the fourth contact is detected, replace display of the home screen with display of a user interface of a last active application on the device 734 In response to detecting the fourth input, cease to display the user interface object when display of the user interface of the last active application has replaced display of the home screen 736 Displaying the user interface object includes:
in accordance with a determination that the user interface object is overlaid over a portion of the home screen, displaying the user interface object with a first appearance; and
in accordance with a determination that the user interface object is overlaid over a portion of the first user interface, displaying the user interface object with a second appearance

802 Display a home screen on the display, wherein the home screen includes a plurality of application launch icons that correspond to a plurality of applications that are installed on the device

804 While displaying the home screen, detect a first input by a first contact on a first application launch icon that meets application-launch criteria

806 In response to detecting the first input on the first application launch icon that meets the application-launch criteria, replace the home screen with a first user interface of a first application that corresponds to the first application launch icon

808 While displaying the first user interface, detect a sequence of one or more inputs performed by a second contact

810 In response to detecting the sequence of one or more inputs performed by the second contact:
    in accordance with a determination that the sequence of one or more inputs includes a second input by the second contact that meets home-button-display criteria, wherein the home-button-display criteria require that the second input includes an initial movement of the second contact across the touch-sensitive surface in a first direction in order for the home-button-display criteria to be met, display a user interface object overlaid on the first user interface, wherein the user interface object includes a home button that is associated with displaying the home screen of the device; and
    in accordance with a determination that the sequence of one or more inputs includes a third input by the second contact that meets display-home criteria, wherein the display-home criteria require that a characteristic intensity of the second contact increases above a first intensity threshold in order for the display-home criteria to be met, replace display of the first user interface with display of the home screen

Figure 8A

812 The display-home criteria further require that the third input includes an initial movement of the second contact across the touch-sensitive surface in the first direction before the characteristic intensity of the second contact increases above the first intensity threshold in order for the display-home criteria to be met 814 Replacing display of the first user interface with display of the home screen includes starting a transition from the first user interface to the home screen before the user interface object that includes the home button is fully revealed on the display 816 The second contact is detected at a first location on the display that corresponds to a display location of a first user interface object in the first user interface when the display-home criteria are met by the second input, and the method includes:
while displaying the first user interface and prior to detecting the sequence of one or more inputs performed by the second contact:
    detecting an input by a third contact that meets press-object-activation criteria while the third contact is detected at the first location on the display, wherein the press-object-activation criteria require that the input by the third contact does not include an initial movement of the third contact that meets the home-button-display criteria and that a characteristic intensity of the third contact exceeds the first intensity threshold, in order for the press-object-activation criteria to be met; and
    in response to detecting the input by the third contact that meets the press-object-activation criteria, performing an operation that corresponds to the first user interface object 818 The display-home criteria require that the home-button-display criteria are met by the second contact before the characteristic intensity of the second contact increases above the first intensity threshold in order for the display-home criteria to be met 820 The display-home criteria do not require that the home-button-display criteria are met by the second contact before the characteristic intensity of the second contact increases above the first intensity threshold in order for the display-home criteria to be met

Figure 8B

822 In response to detecting the sequence of one or more inputs performed by the second contact:
    in accordance with a determination that the sequence of one or more inputs includes the second input by the second contact that meets the home-button display criteria and does not include the third input by the second contact that meets the display-home criteria, maintain display of the user interface object that includes the home button overlaid on the first user interface > 824 While maintaining display of the user interface object that includes the home button, detect a fourth input by a fourth contact on the home button; and
>     in response to detecting the fourth input:
>         replace display of the first user interface with display of the home screen 826 In response to detecting the sequence of one or more inputs performed by the second contact:
    in accordance with a determination that the sequence of one or more inputs includes a fifth input by the second contact that meets swipe-control-center-display criteria, wherein the swipe-control-center-display criteria require that the fifth input includes a sustained movement of the second contact with a magnitude of a movement parameter that is above a first movement threshold after the home-button-display criteria have been met in order for the swipe-control-center-display criteria to be met, display a control center user interface object overlaid on a portion of the display > 828 The display-home criteria require that the swipe-control-center-display criteria are not met before the characteristic intensity of the second contact increases above the first intensity threshold in order for the display-home criteria to be met 830 In response to detecting the sequence of one or more inputs performed by the second contact:
    in accordance with a determination that the sequence of one or more inputs includes a sixth input by the second contact, wherein the sixth input includes movement in the first direction after the home-button-display criteria have been met and includes lift-off of the second contact:
        display a beginning of an animated transition to display the control center user interface object; and
        in accordance with a determination that the sixth input by the second contact does not meet the swipe-control-center-display criteria:
            display a reverse of the animated transition to display the control center user interface object; and
            maintain display of the user interface object that includes the home button

Figure 8C

832 Display a status bar on the display;
while displaying the status bar on the display, detect a seventh input by a fifth contact on the status bar; and
in response to detecting the seventh input by the fifth contact on the status bar:
in accordance with a determination that the seventh input by the fifth contact meets press-control-center-display criteria, wherein the press-control-center-display criteria require that a characteristic intensity of the fifth contact increases above the first intensity threshold in order for the press-control-center-display criteria to be met, display a control center user interface object overlaid on a portion of the display 834 While displaying the home button, detect an eighth input by a sixth contact on the home button; and
in response to detecting the eighth input by the sixth contact:
in accordance with a determination that the eighth input by the sixth contact meets home-button-activation criteria, dismiss a currently displayed user interface and display the home screen; and
in accordance with a determination that the eighth input by the sixth contact does not meet the home-button activation criteria and meets home-button-options criteria, display a first affordance, which when activated, causes display of a user interface other than the home screen 836 While displaying the home button overlaid on a respective user interface of a current application:
in accordance with a determination that the current application is an application of a first type, display the home button with a first transparency; and
in accordance with a determination that the current application is an application of a second type, display the home button with a second transparency that is distinct from the first transparency

Figure 8D

DEVICES, METHODS, AND GRAPHICAL USER INTERFACES FOR PROVIDING A HOME BUTTON REPLACEMENT

RELATED APPLICATION

This application is a continuation of U.S. application Ser. No. 17/203,667, filed Mar. 16, 2021, which is a continuation of U.S. application Ser. No. 16/521,433, filed Jul. 24, 2019, now U.S. Pat. No. 10,996,766, which is a continuation of U.S. application Ser. No. 15/814,051, filed Nov. 15, 2017, now U.S. Pat. No. 10,365,814, which claims priority to U.S. Provisional Application Ser. No. 62/506,837, filed May 16, 2017, which are incorporated by reference herein in their entireties.

TECHNICAL FIELD

This relates generally to electronic devices with touch-sensitive surfaces, including but not limited to electronic devices with touch-sensitive surfaces that provide a home button replacement.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. Example user interface objects include digital images, video, text, icons, and control elements such as buttons and other graphics.

Some electronic devices, such as handheld devices, include a permanent home button on the front face of the device that, when activated in a predetermined manner (e.g., when pressed for a single time), dismisses a currently displayed user interface and displays a home screen of the device. However, a home button on the front face of the device reduces the space available for the touch-sensitive surface (e.g., a touch-screen display) on the device, but removal of the home button from the front face of the device removes a convenient way for a user to access the home screen and other functions associated with the home button.

SUMMARY

Accordingly, there is a need for electronic devices with improved methods and interfaces for providing a home button replacement. Such methods and interfaces optionally complement or replace conventional methods for using a permanent home button on the front face of a device. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a device with a touch-sensitive surface and a display. The method includes: while the device is in an unlocked state, detecting a sequence of one or more activations of a button of the device that includes at least a first activation of the button, wherein the first activation of the button is detected while a respective application user interface other than a home screen of the device is displayed on the display; and in response to detecting the sequence of one or more activations of the button of the device: in accordance with a determination that the first activation of the button was detected without a second activation of the button being detected before a respective threshold amount of time from detecting the first activation of the button had elapsed, replacing display of the respective application user interface with display of a home screen of the device while maintaining the device in the unlocked state; and in accordance with a determination that the first activation of the button was detected with a second activation of the button being detected before the respective threshold amount of time from detecting the first activation of the button had elapsed, switching the device from the unlocked state, in which the respective application user interface is displayed, to a locked state.

In accordance with some embodiments, a method is performed at a device with a touch-sensitive surface and a display. The method includes: displaying a home screen on the display, wherein the home screen includes a plurality of application launch icons that correspond to a plurality of applications that are installed on the device; while displaying the home screen, detecting a first input by a first contact on a first application launch icon that meets application-launch criteria; in response to detecting the first input on the first application launch icon that meets the application-launch criteria, replacing the home screen with a first user interface of a first application that corresponds to the first application launch icon; while displaying the first user interface, detecting a second input by a second contact that includes movement across the display in a first direction; and in response to detecting the second input: in accordance with a determination that the second input meets dock-display criteria, wherein the dock-display criteria require that the second input includes movement of the second contact with a magnitude of a movement parameter that is above a first movement threshold in order for the dock-display criteria to be met, displaying a user interface object overlaid on a portion of the first user interface, wherein the user interface object includes a first subset of application launch icons from the plurality of application launch icons; and in accordance with a determination that the second input meets home-display criteria, wherein the home-display criteria require that the second input includes movement of the second contact with a magnitude of the movement parameter that is above a second movement threshold that is greater than the first movement threshold, replacing display of the first user interface with display of the home screen.

In accordance with some embodiments, a method is performed at a device with a touch-sensitive surface and a display. The method includes: displaying a home screen on the display, wherein the home screen includes a plurality of application launch icons that correspond to a plurality of applications that are installed on the device; while displaying the home screen, detecting a first input by a first contact on a first application launch icon that meets application-launch criteria; in response to detecting the first input on the first application launch icon that meets the application-launch criteria, replacing the home screen with a first user interface of a first application that corresponds to the first application launch icon; while displaying the first user interface, detecting a sequence of one or more inputs performed by a second contact; and in response to detecting the sequence of one or more inputs performed by the second contact: in accordance with a determination that the sequence of one or more inputs includes a second input by the second contact that meets home-button-display criteria, wherein the home-button-display criteria require that the second input includes an initial movement of the second contact across the touch-sensitive surface in a first direction in order for the home-button-display criteria to be met, displaying a user interface object overlaid on the first user interface, wherein the user interface object includes a home button that is associated with displaying the home screen of the device; and in accordance with a determination that the sequence of one or more inputs includes a third input by the second contact that meets display-home criteria, wherein the display-home criteria require that a characteristic intensity of the second contact increases above a first intensity threshold in order for the display-home criteria to be met, replacing display of the first user interface with display of the home screen.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with improved methods and interfaces for providing a home button replacement, thereby increasing the effectiveness, efficiency, and user satisfaction with such devices. Such methods and interfaces may complement or replace conventional methods for using a permanent home button on the front face of a device.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 5A1-5A7 illustrate example user interfaces for displaying different user interfaces and/or locking the device in response to different activations of a button in accordance with some embodiments.

FIGS. 5B1-5B22 illustrate example user interfaces for displaying a dock and/or the home screen of a device in response to a multi-stage gesture in accordance with some embodiments.

FIGS. 5C1-5C50 illustrate example user interfaces for displaying an on-demand virtual home button and activating the virtual home button to display the home screen in response to a continuous gesture in accordance with some embodiments.

FIGS. 6A-6E are flow diagrams illustrating a method of displaying the home screen without locking the device, or locking the device, depending on different activations of a button in accordance with some embodiments.

FIGS. 7A-7C are flow diagrams illustrating a method of displaying a dock and/or the home screen of a device in response to a multi-stage gesture in accordance with some embodiments.

FIGS. 8A-8D are flow diagrams illustrating a method of displaying an on-demand virtual home button and activating the virtual home button to display the home screen in response to a continuous gesture in accordance with some embodiments.

DESCRIPTION OF EMBODIMENTS

Figure 1A:
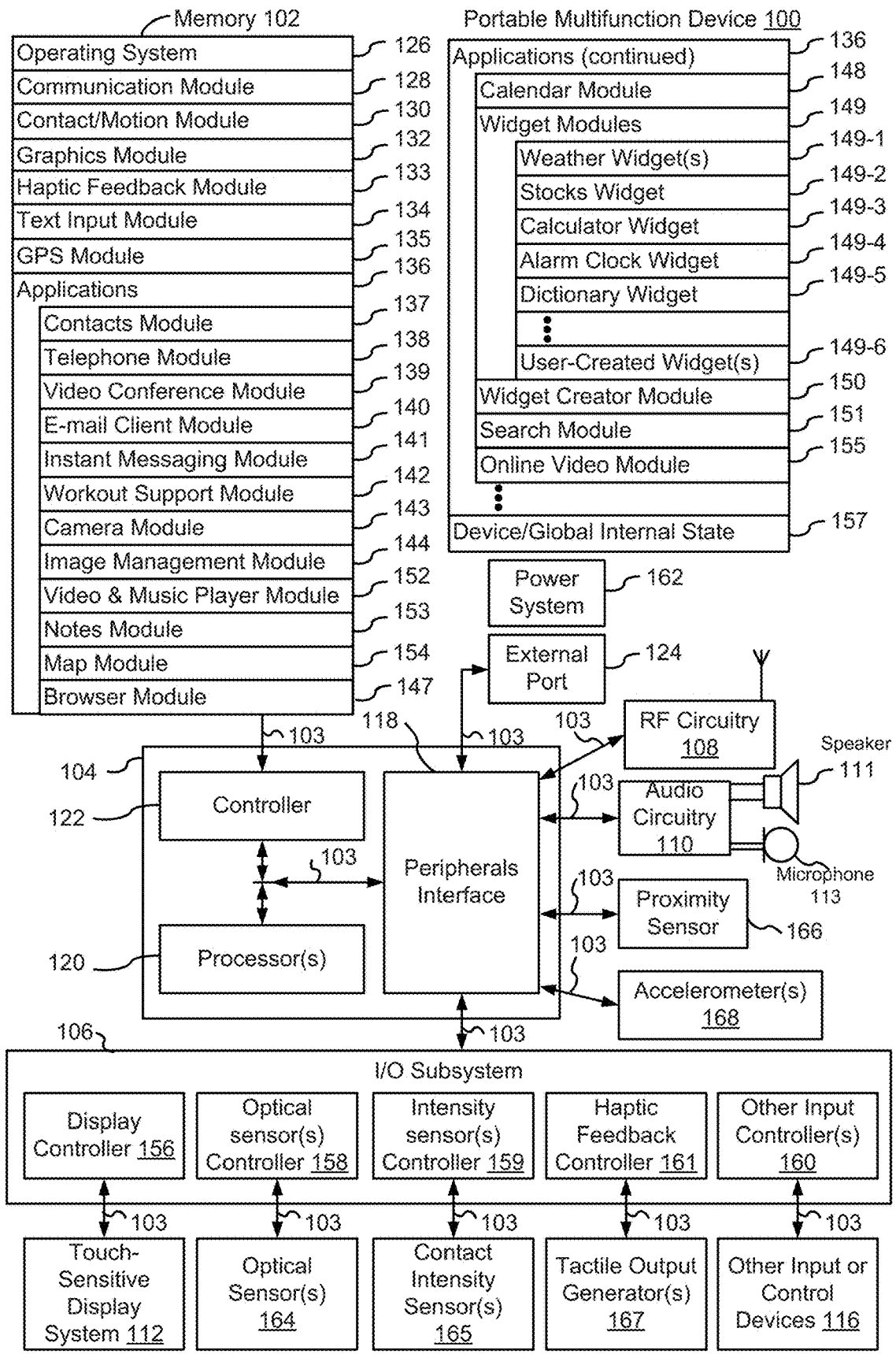
FIG. 1A is a block diagram illustrating a portable multifunction device with a touch-sensitive display in accordance with some embodiments.

Some electronic devices, such as handheld devices, include a permanent home button on the front face of the device that, when activated in a predetermined manner (e.g., when pressed for a single time), dismisses a currently displayed user interface and displays a home screen of the device. However, a home button on the front face of the device reduces the space available for the touch-sensitive surface (e.g., a touch-screen display) on the device, but removal of the home button from the front face of the device removes a convenient way for a user to access the home screen and other functions associated with the home button. The embodiments below address this problem by providing alternative ways to access and activate a home button without having a permanent home button on the front face of the device.

Below, FIGS. 1A-1B, 2, and 3 provide a description of example devices. FIGS. 4A-4B, 5A1-5A7, 5B1-5B22, and 5C1-5C50 illustrate example user interfaces for providing a home button replacement. FIGS. 6A-6E illustrate a flow diagram of a method of displaying the home screen without locking the device, or locking the device, depending on different activations of a button. FIGS. 7A-7C illustrate a flow diagram of a method of displaying a dock and/or the home screen of a device in response to a multi-stage gesture. FIGS. 8A-8D illustrate a flow diagram of a method of displaying an on-demand virtual home button and activating the virtual home button to display the home screen in response to a continuous gesture. The user interfaces in FIGS. 5A1-5A7, 5B1-5B22, and 5C1-5C50 are used to illustrate the processes in FIGS. 6A-6E, 7A-7C, and 8A-8D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" is physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" is a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an example embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an example embodiment, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
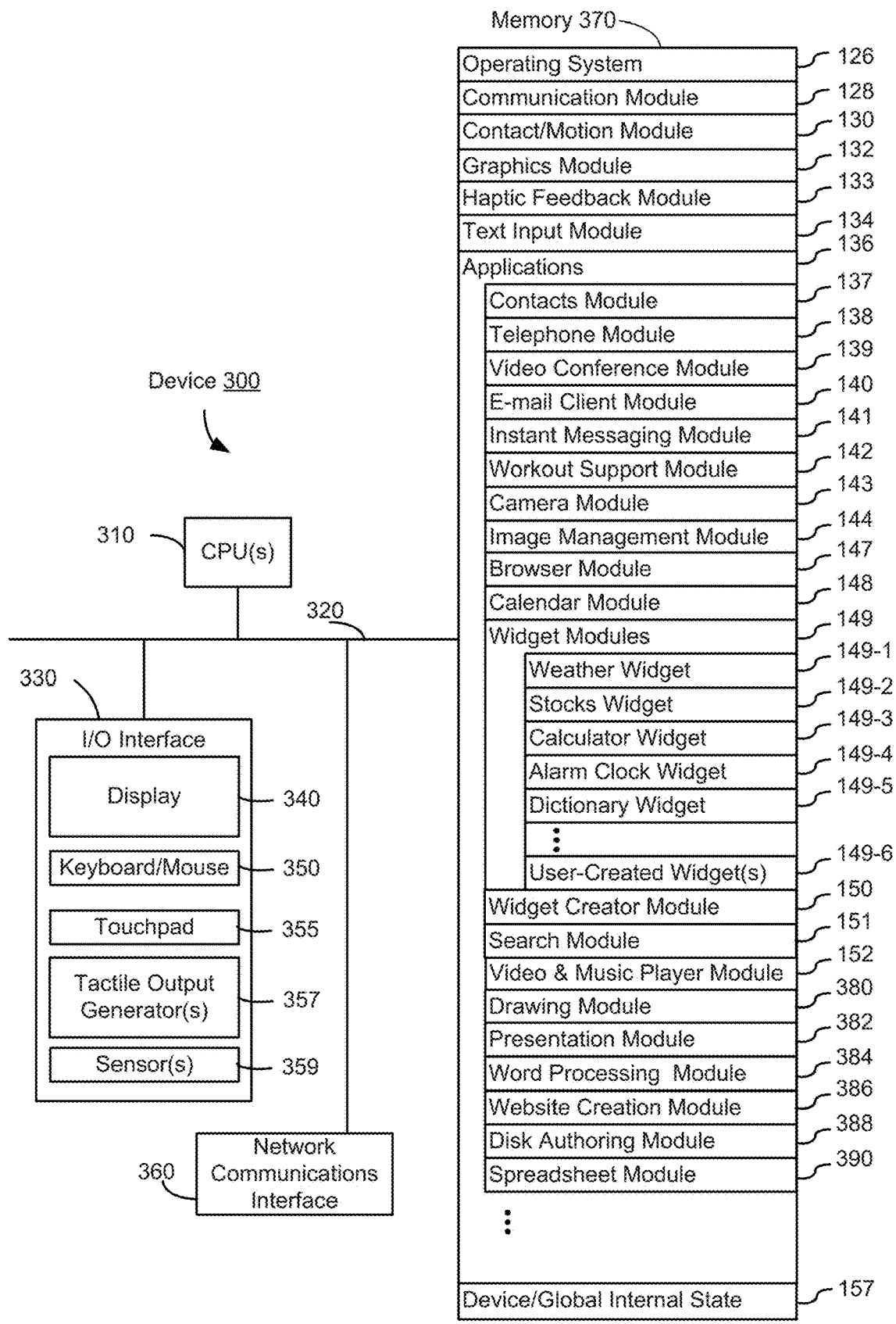
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture)

and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
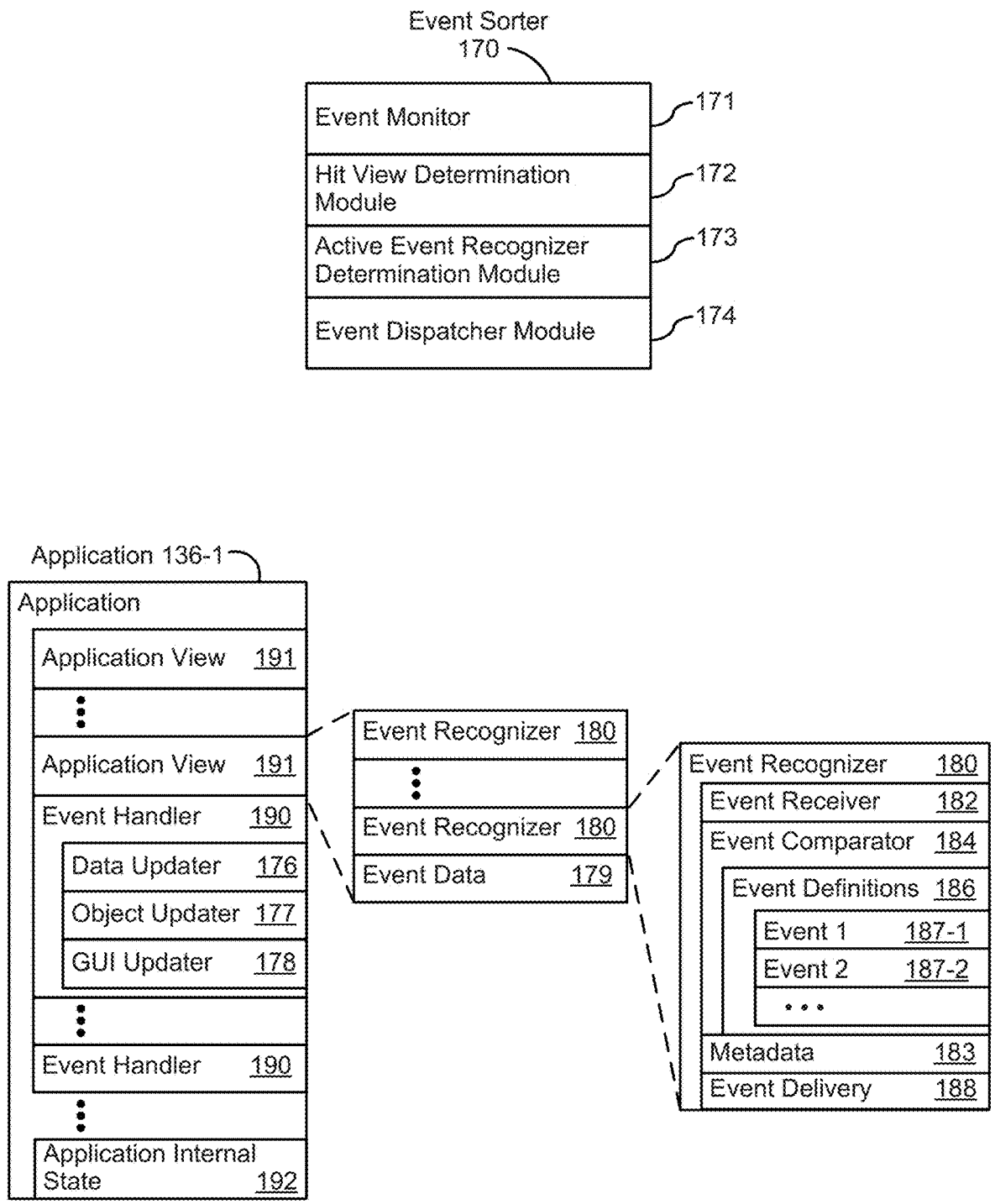
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
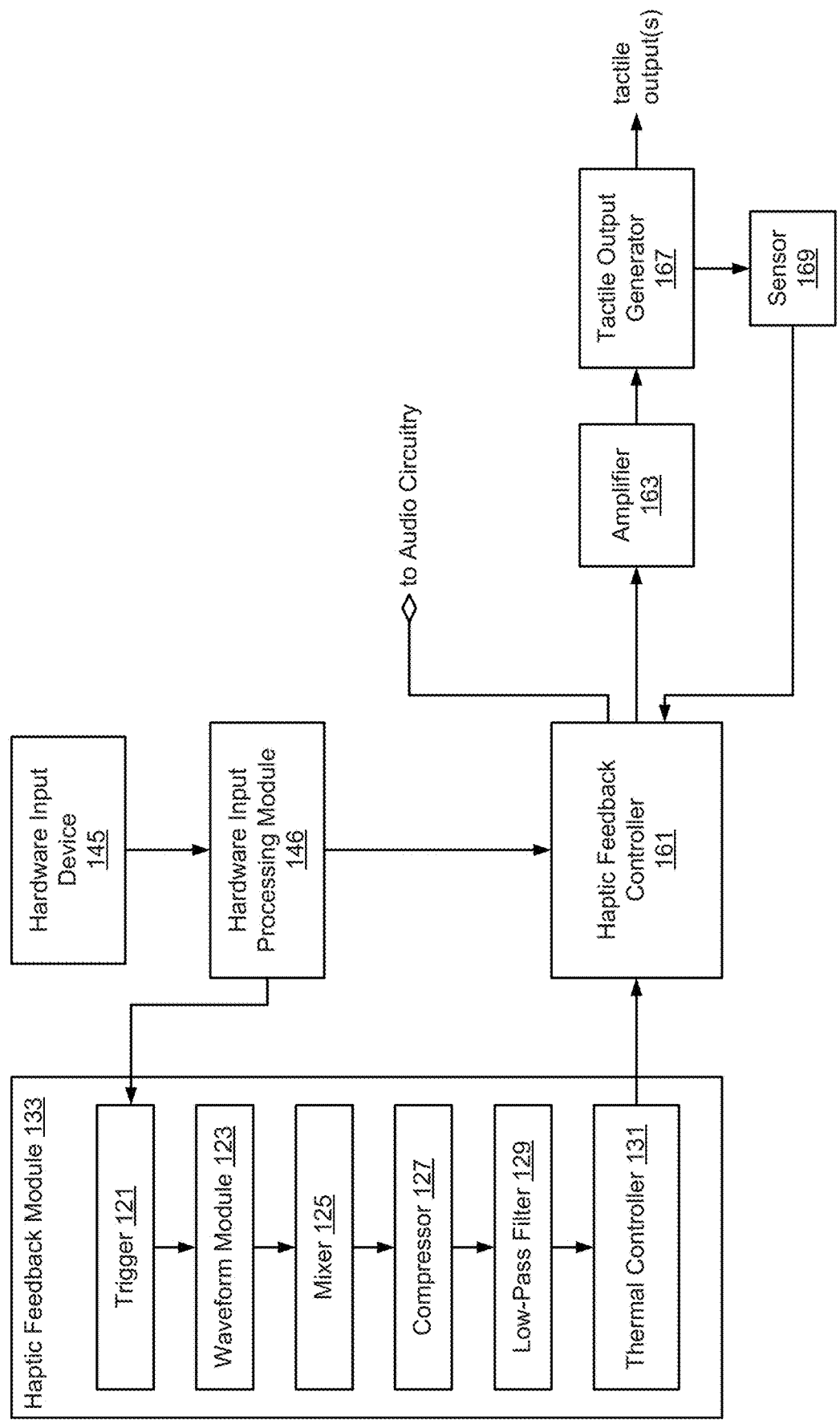
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of the hardware input device (e.g., a home button). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167)

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button (e.g., as shown in FIG. 2B or a home button with a mechanical actuator as illustrated in FIG. 2C). In some embodiments, hardware input device 145 consists of an intensity-sensitive home button (e.g., as shown in FIG. 2B or a home button with a mechanical actuator as illustrated in FIG. 2C), and not touch-sensitive display system 112 (FIG. 1A), keyboard/mouse 350 (FIG. 3), or touchpad 355 (FIG. 3). In some embodiments, in response to inputs from hardware input device 145, hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall Effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2A:
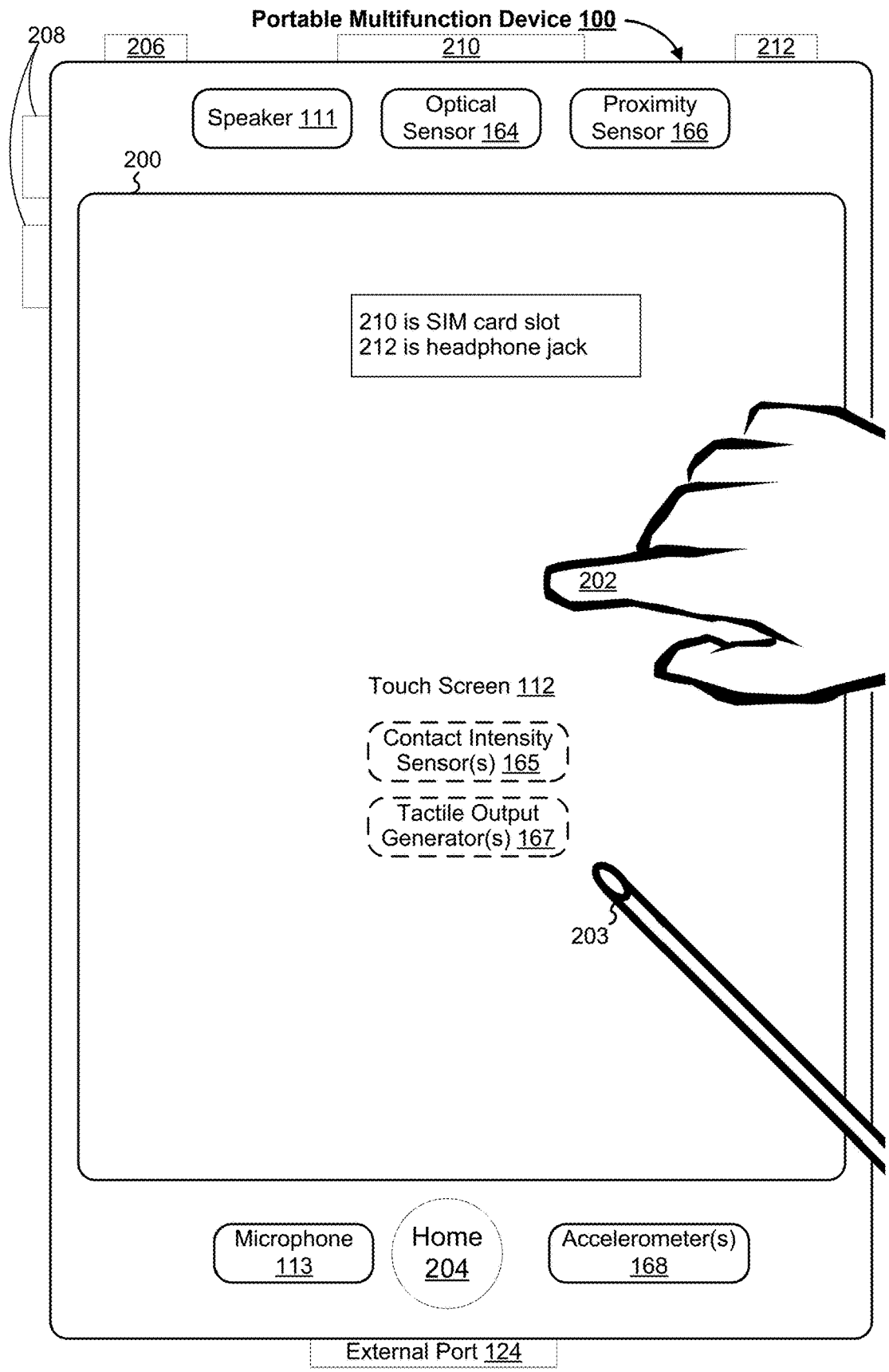
FIG. 2A illustrates a portable multifunction device having a touch screen in accordance with some embodiments.
Figure 2B:
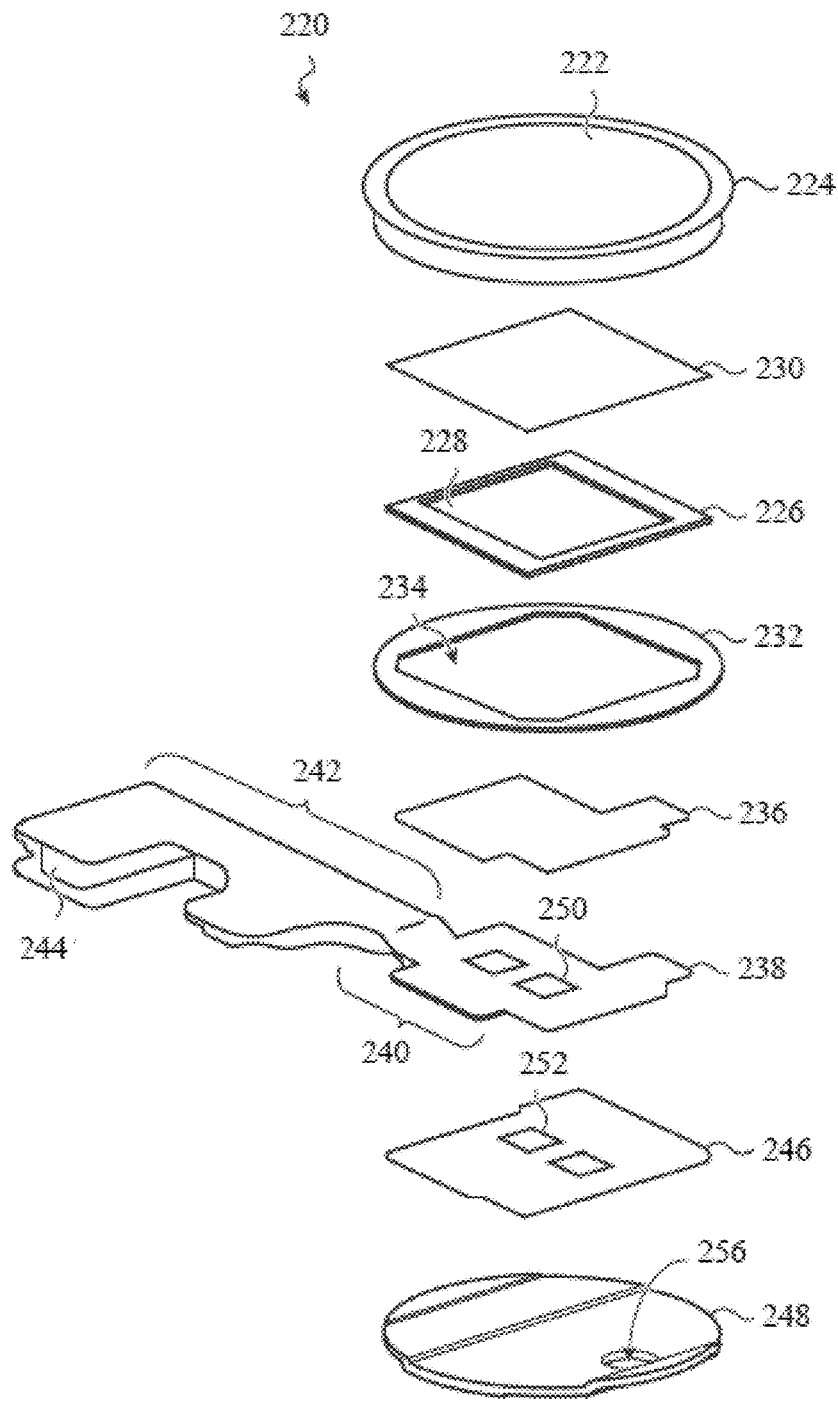
FIGS. 2B-2C show exploded views of a force-sensitive input device in accordance with some embodiments.
Figure 2C:
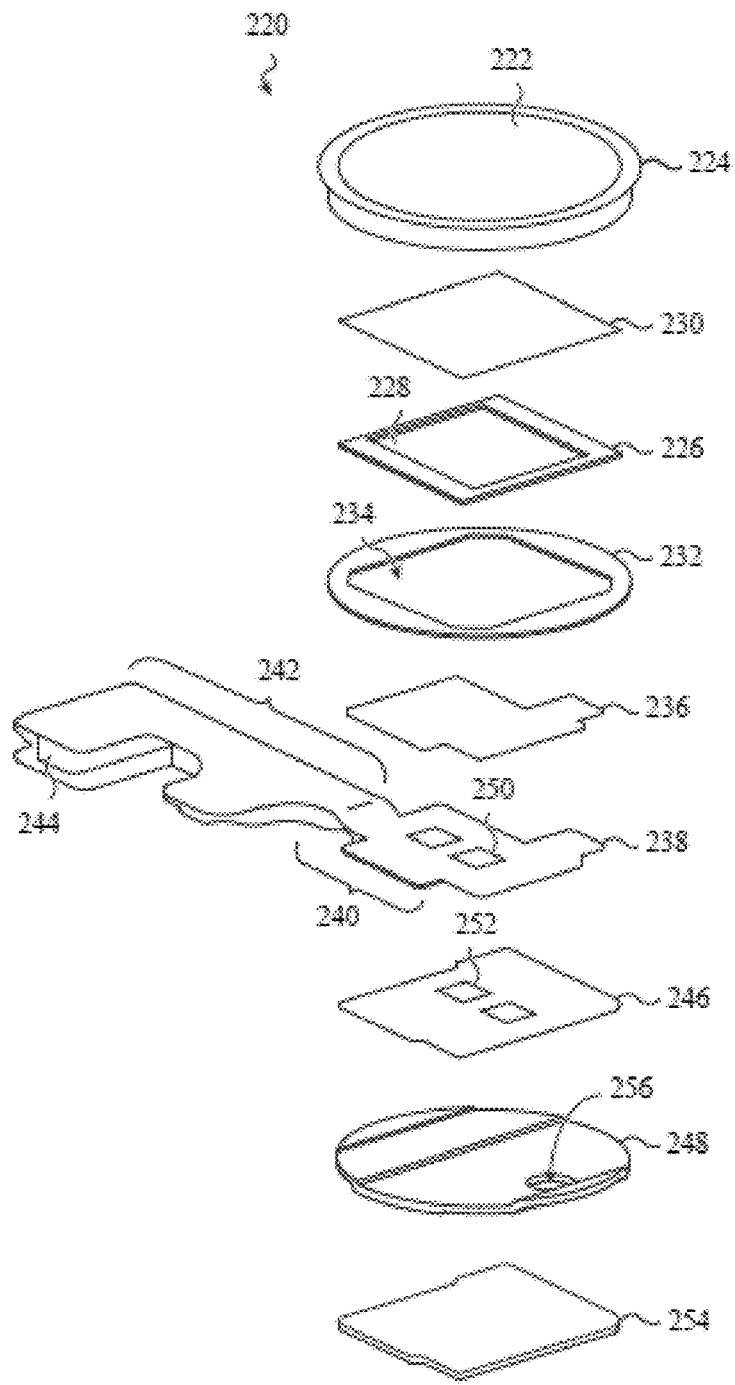

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIGS. 2B-2C show exploded views of a first input device suitable for use in the electronic devices shown in FIGS. 1A, 2A, 3, and/or 4A (e.g., as home button 204). FIG. 2B shows an example of an intensity-sensitive home button with capacitive sensors used to determine a range of intensity values that correspond to force applied to the intensity-sensitive home button. FIG. 2C shows an example of a home button with a mechanical switch element. With reference to FIG. 2B, the input device stack 220 includes a cover element 222 and a trim 224. In the illustrated embodiment, the trim 224 completely surrounds the sides of the cover element 222 and the perimeter of the top surface of the cover element 222. Other embodiments are not limited to this configuration. For example, in one embodiment the sides and/or top surface of the cover element 222 can be partially surrounded by the trim 224. Alternatively, the trim 224 can be omitted in other embodiments.

Both the cover element 222 and the trim 224 can be formed with any suitable opaque, transparent, and/or translucent material. For example, the cover element 222 can be made of glass, plastic, or sapphire and the trim 224 may be made of a metal or plastic. In some embodiments, one or more additional layers (not shown) can be positioned below the cover element 222. For example, an opaque ink layer can be disposed below the cover element 222 when the cover element 222 is made of a transparent material. The opaque ink layer can conceal the other components in the input device stack 220 so that the other components are not visible through the transparent cover element 222.

A first circuit layer 226 can be disposed below the cover element 222. Any suitable circuit layer may be used. For example, the first circuit layer 226 may be a circuit board or a flexible circuit. The first circuit layer 226 can include one or more circuits, signal lines, and/or integrated circuits. In one embodiment, the first circuit layer 226 includes a biometric sensor 228. Any suitable type of biometric sensor can be used. For example, in one embodiment the biometric sensor is a capacitive fingerprint sensor that captures at least one fingerprint when a user's finger (or fingers) approaches and/or contacts the cover element 222.

The first circuit layer 226 may be attached to the bottom surface of the cover element 222 with an adhesive layer 230. Any suitable adhesive can be used for the adhesive layer. For example, a pressure sensitive adhesive layer may be used as the adhesive layer 230.

A compliant layer 232 is disposed below the first circuit layer 226. In one embodiment, the compliant layer 232 includes an opening 234 formed in the compliant layer 232. The opening 234 exposes the top surface of the first circuit layer 226 and/or the biometric sensor 228 when the device stack 220 is assembled. In the illustrated embodiment, the compliant layer 232 is positioned around an interior perimeter of the trim 224 and/or around a peripheral edge of the cover element 222. Although depicted in a circular shape, the compliant layer 232 can have any given shape and/or dimensions, such as a square or oval. The compliant layer 232 is shown as a continuous compliant layer in FIGS. 2B and 2C, but other embodiments are not limited to this configuration. In some embodiments, multiple discrete compliant layers may be used in the device stack 220. Additionally, in some embodiments, the compliant layer 232 does not include the opening 234 and the compliant layer 232 extends across at least a portion of the input device stack 220. For example, the compliant layer 232 may extend across the bottom surface of the cover element 222, the bottom surface of the first circuit layer 226, or a portion of the bottom surface of the cover element 222 (e.g., around the peripheral edge of the cover element) and the bottom surface of the first circuit layer 226.

A second circuit layer 238 is positioned below the first circuit layer 226. A flexible circuit and a circuit board are examples of a circuit layer that can be used in the second circuit layer 238. In some embodiments, the second circuit layer 238 can include a first circuit section 240 and a second circuit section 242. The first and second circuit sections 240, 242 can be electrically connected one another other.

The first circuit section 240 can include a first set of one or more intensity sensor components that are included in an intensity sensor. In some embodiments, the first circuit section 240 can be electrically connected to the first circuit layer 226. For example, when the first circuit layer 226 includes a biometric sensor 228, the biometric sensor 228 may be electrically connected to the first circuit section 240 of the second circuit layer 238.

The second circuit section 242 can include additional circuitry, such as signal lines, circuit components, integrated circuits, and the like. In one embodiment, the second circuit section 242 may include a board-to-board connector 244 to electrically connect the second circuit layer 238 to other circuitry in the electronic device. For example, the second circuit layer 238 can be operably connected to a processing device using the board-to-board connector 244. Additionally or alternatively, the second circuit layer 238 may be operably connected to circuitry that transmits signals (e.g., sense signals) received from the intensity sensor component(s) in the first circuit section 240 to a processing device. Additionally or alternatively, the second circuit layer 238 may be operably connected to circuitry that provides signals (e.g., drive signals, a reference signal) to the one or more intensity sensor components in the first circuit section 240.

In some embodiments, the first circuit section 240 of the second circuit layer 238 may be attached to the bottom surface of the first circuit layer 226 using an adhesive layer 236. In a non-limiting example, a die attach film may be used to attach the first circuit section 240 to the bottom surface of the first circuit layer 226.

A third circuit layer 246 is disposed below the first circuit section 240 of the second circuit layer 238. The third circuit layer 246 may include a second set of one or more intensity sensor components that are included in an intensity sensor. The third circuit layer 246 is supported by and/or attached to a support element 248. In one embodiment, the support element 248 is attached to the trim 224 to produce an enclosure for the other components in the device stack 220. The support element 248 may be attached to the trim 224 using any suitable attachment mechanism.

The first set of one or more intensity sensor components in the first circuit section 240 and the second set of one or more intensity sensor components in the third circuit layer 246 together form an intensity sensor. The intensity sensor can use any suitable intensity sensing technology. Example sensing technologies include, but are not limited to, capacitive, piezoelectric, piezoresistive, ultrasonic, and magnetic.

In the examples shown in FIGS. 2B and 2C, the intensity sensor is a capacitive force sensor. With a capacitive force sensor, the first set of one or more intensity sensor components can include a first set of one or more electrodes 250 and the second set of one or more force sensor components a second set of one or more electrodes 252. Although shown in a square shape in FIGS. 2B and 2C each electrode in the first and second sets of one or more electrodes 250, 252 can have any given shape (e.g., rectangles, circles). Additionally, the one or more electrodes in the first and second sets 250, 252 may be arranged in any given pattern (e.g., one or more rows and one or more columns).

FIGS. 2B and 2C show two electrodes in the first and second sets of one or more electrodes 250, 252. However, other embodiments are not limited to this configuration. The first and second sets of one or more electrodes 250, 252 may each be a single electrode or multiple discrete electrodes. For example, if the first set of one or more electrodes is a single electrode, the second set of one or more electrodes comprises multiple discrete electrodes. In some embodiments, the second set of one or more electrodes can be a single electrode and the first set includes multiple discrete electrodes. Alternatively, both the first and second sets of one or more electrodes may each include multiple discrete electrodes.

Each electrode in the first set of one or more electrodes 250 is aligned in at least one direction (e.g., vertically) with a respective electrode in the second set of one or more electrodes 252 to produce one or more capacitors. When a force input is applied to the cover element 222 (e.g., the input surface of the input device), at least one electrode in the first set 250 moves closer to a respective electrode in the second set 252, which varies the capacitance of the capacitor (s). A capacitance signal sensed from each capacitor represents a capacitance measurement of that capacitor. A processing device (not shown) is configured to receive the capacitance signal(s) and correlate the capacitance signal(s) to an amount of intensity applied to the cover element 222.

In some embodiments the force sensor can replace a switch element and different intensity thresholds can be used to determine activation events.

In some embodiments, such as the embodiment shown in FIG. 2C, a switch element 254 can be positioned below the support element 248. The switch element 254 registers a user input when a force input applied to the cover element 222 exceeds a given amount of force (e.g., a force threshold associated with closing the distance between the first circuit section 240 and the third circuit layer 246). Any suitable switch element can be used. For example, the switch element 254 may be a dome switch that collapses when the force input applied to the cover element 222 exceeds the force threshold. When collapsed, the dome switch completes a circuit that is detected by a processing device and recognized as a user input (e.g., a selection of an icon, function, or application). In one embodiment, the dome switch is arranged such that the apex of the collapsible dome is proximate to the bottom surface of the support plate 248. In another embodiment, the base of the collapsible dome can be proximate to the bottom surface of the support plate 248.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
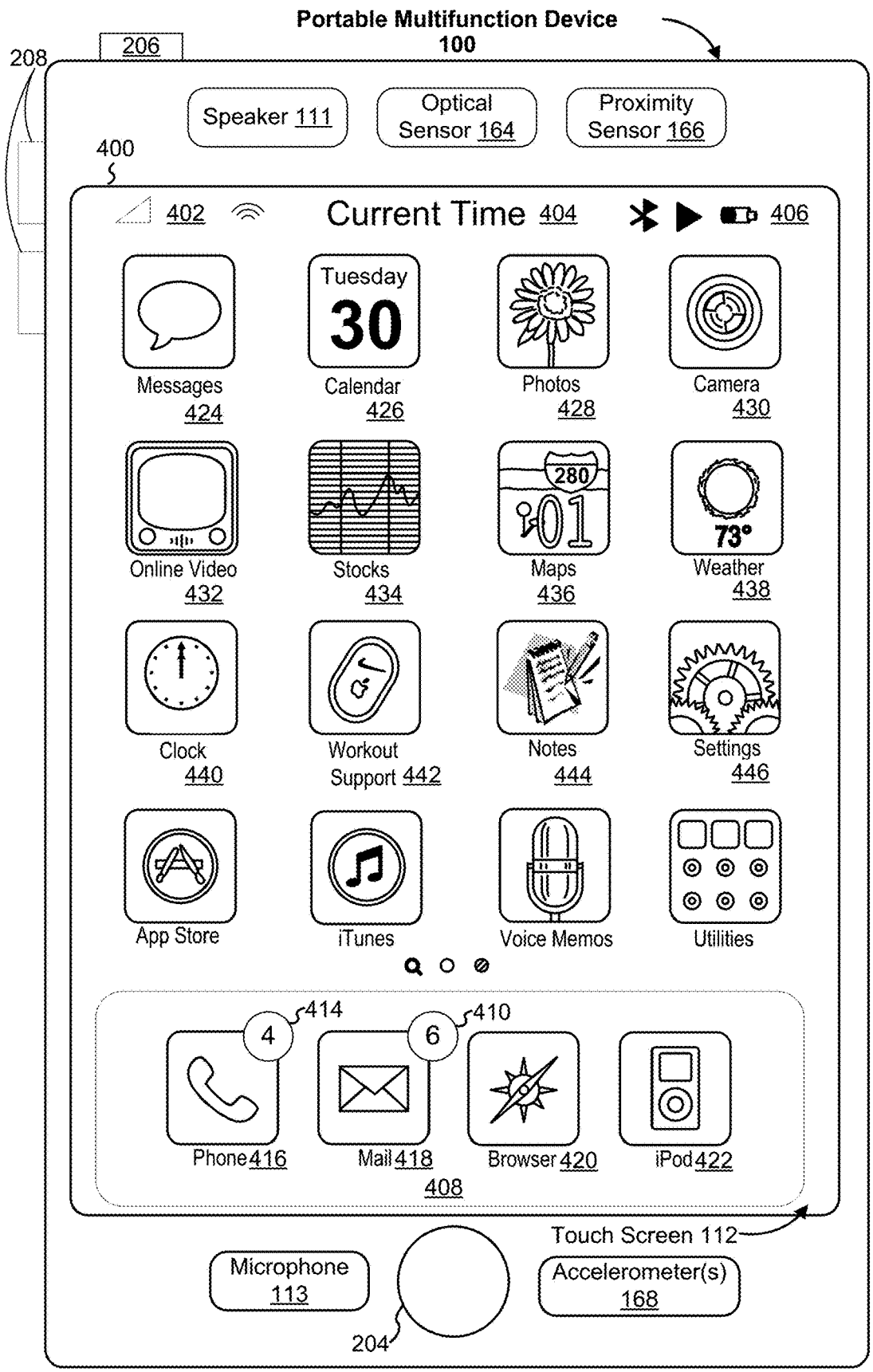
FIG. 4A illustrates an example user interface for a menu of applications on a portable multifunction device in accordance with some embodiments.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
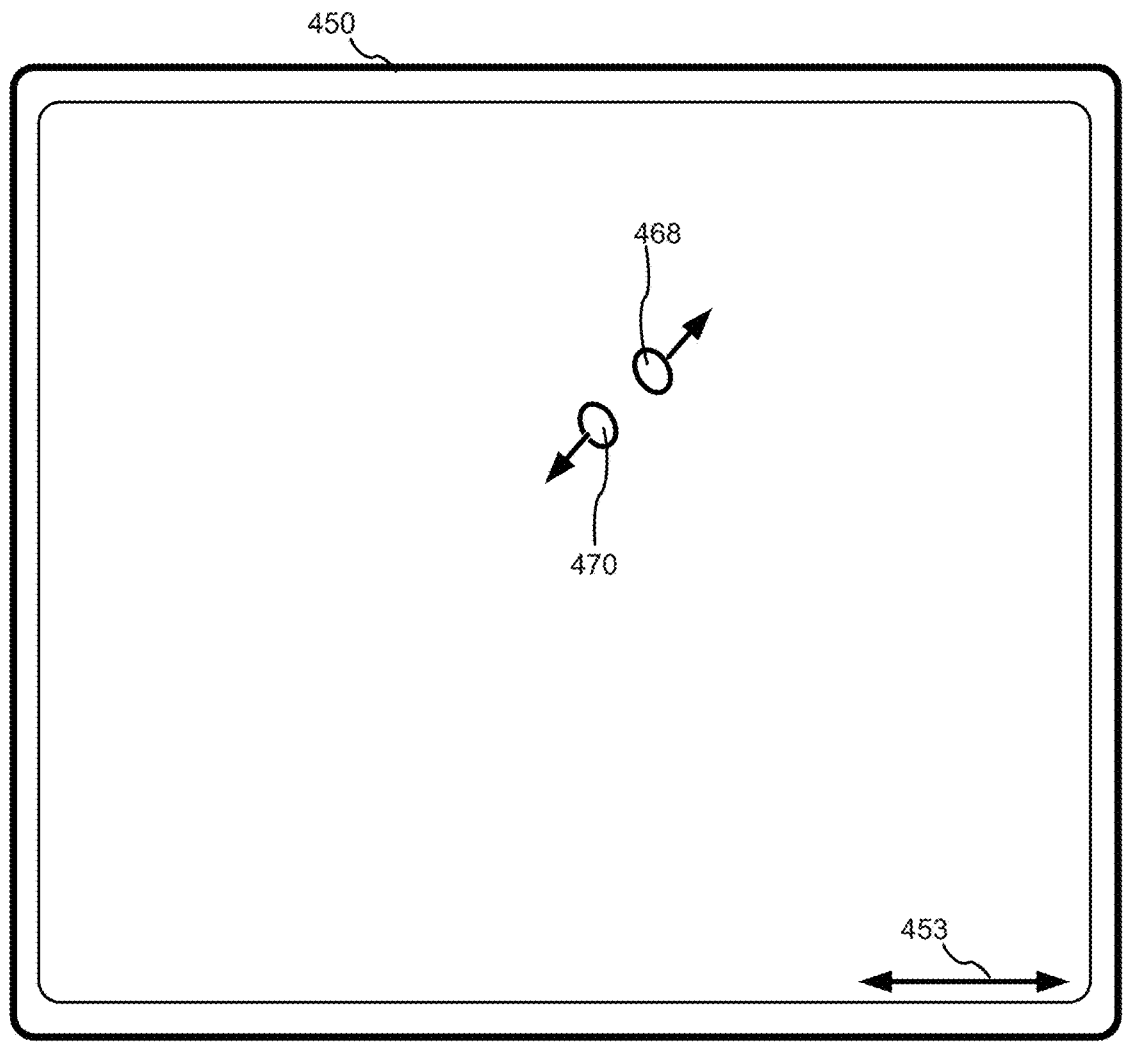
FIG. 4B illustrates an example user interface for a multifunction device with a touch-sensitive surface that is separate from the display in accordance with some embodiments.
Figure 4B:
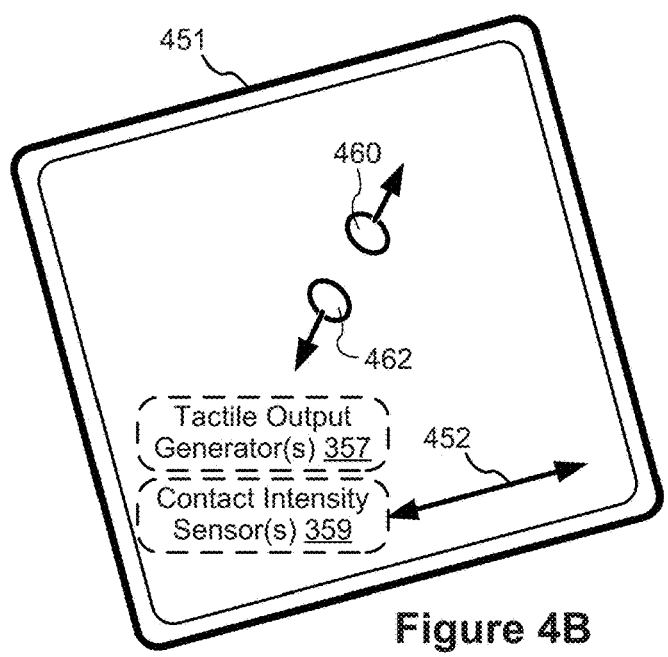

FIG. 4B illustrates an example user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" is an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface is the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact is a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

Figure 4C:
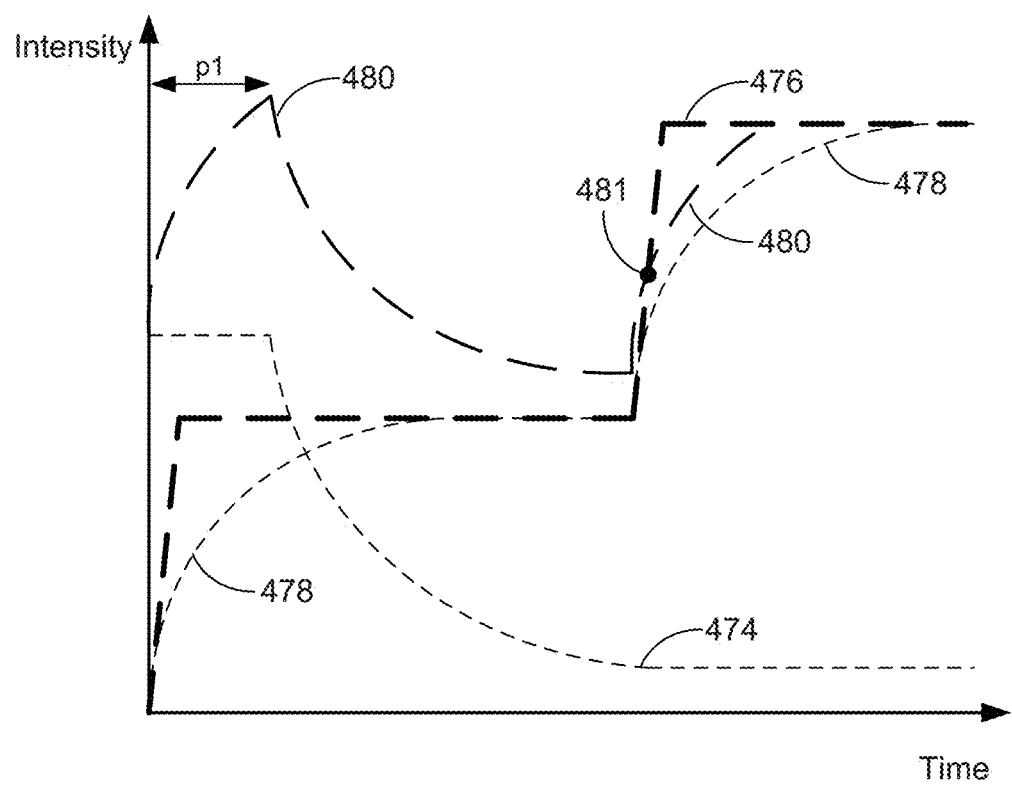
FIGS. 4C-4E illustrate examples of dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
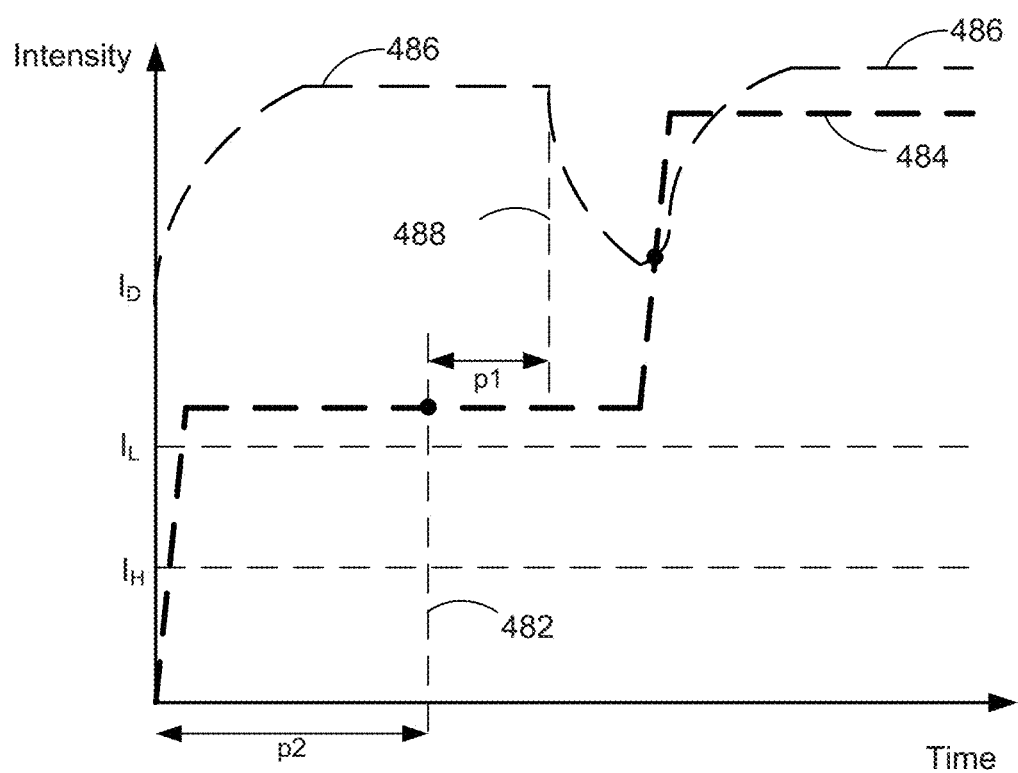

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
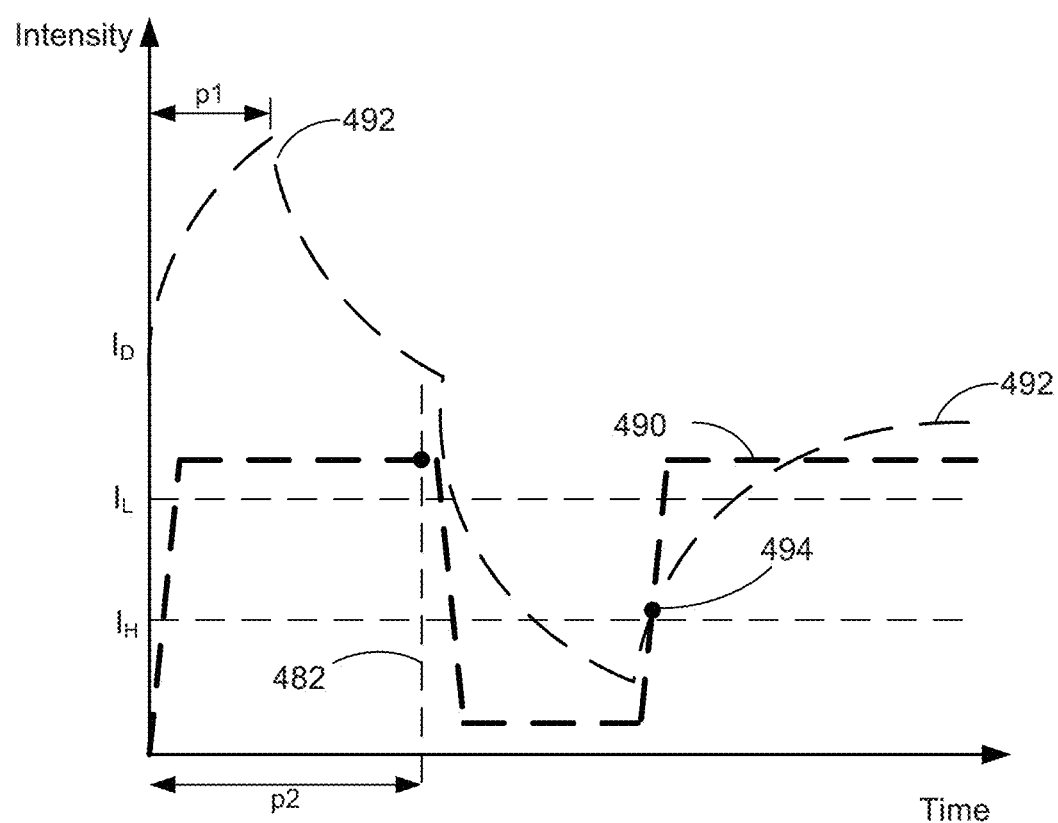

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and (optionally) one or more sensors to detect intensities of contacts with the touch-sensitive surface.

FIGS. 5A1-5A7 illustrate example user interfaces for displaying different user interfaces and/or locking the device in response to different activations of a button (e.g., a combined physical home/lock button) in accordance with some embodiments. The user interfaces in these figures are used to illustrate the processes described below, including the processes in FIGS. 6A-6E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

For convenience of explanation, some of the embodiments will be discussed with reference to operations performed on a device with a mechanical slider button (e.g., button 501). In FIGS. 5A1-5A7, the button (e.g., button 501) is shown as a mechanical slider button, located on the side of device 100, which can be pressed in, moved up, and/or moved down. Although not shown in FIGS. 5A1-5A7, in some embodiments, the button 501 is a mechanical button at another location on device 100 (e.g., on the top of device 100, on the face of device 100, etc.), a virtual button (e.g., a virtual home button on touch screen 112), or a solid-state button (e.g., a solid state home button located below touch screen 112). Analogous operations are, optionally, performed on a device with an alternative button. In some embodiments, button 501 in FIGS. 5A1-5A7 replaces home button 204 and/or push button 206 of device 100 in FIG. 4A.

FIG. 5A1 illustrates displaying the home screen without locking the device, or locking the device, depending on whether a second activation of a button 501 is detected after the initial activation of the button 501. In addition, FIG. 5A1 illustrates displaying the home screen before locking the device or skipping display of the home screen before locking the device, depending on whether the second activation of the button 501 is detected within a threshold time T of the initial activation of the button 501. As shown in FIG. 5A1, device 100 initially displays an application user interface (e.g., user interface 502). First, as shown in path "1" to the lock screen (e.g., user interface 506), when a first click and second click are detected on the button 501 within time T, device 100 replaces display of the application user interface (e.g., user interface 502) with display of the lock screen (e.g., user interface 506), without displaying the home screen. Alternatively, when a first click is detected on the button 501 and a second click is not detected with time T, device 100 replaces display of the application user interface (e.g., user interface 502) with display of the home screen (e.g., user interface 504). Then, as shown in path "2" to the lock screen (e.g., user interface 506), when the second click on the button 501 is detected after time T, device 100 replaces display of the home screen (e.g., user interface 504) with display of the lock screen (e.g., user interface 506).

FIG. 5A2 illustrates unlocking device 100 to display the most recently displayed user interface prior to locking. If device 100 was locked through path "1" in FIG. 5A1 (e.g., from user interface 502), then when unlocking device 100 from user interface 506, user interface 502 is displayed. Alternatively, if device 100 was locked through path "2" in FIG. 5A2 (e.g., from user interface 504), then when unlocking device 100 from user interface 506, user interface 504 is displayed.

FIG. 5A3 illustrates initiating a process to turn off device 100 in response to a long press on the button 501 (e.g., when liftoff of a contact on the button 501 is detected after a long-press time threshold, TLP). As shown in FIG. 5A3, while device 100 displays the application user interface (e.g., user interface 502), when the button 501 is pressed for at least TLP, device 100 initiates a process to turn off the device (e.g., by displaying user interface 508, a confirmation request for the user to confirm power off). Although not shown here, in some embodiments, when the button 501 is pressed for at least TLP, device 100 is turned off immediately, without first displaying user interface 508.

FIG. 5A4 illustrates displaying a prior application in response to a movement input on the button 501. In one example, while device 100 displays an application user interface (e.g., user interface 502 of a first application), contact 511 slides the button 501 upward along a predefined track, and in response, device 100 replaces the application user interface with another user interface (e.g., user interface 510 of a second application that was active on device 100 immediately prior to the first application). In another example, while device 100 displays the application user interface (e.g., user interface 502 of the first application), contact 513 slides the button 501 downward along a predefined track, and in response, device 100 replaces the application user interface with another user interface (e.g., user interface 512 of a third application that was active on device 100 immediately prior to the second application). Although not shown here, in some embodiments, when contact 513 slides the button 501 downward, device 100 ceases to display the current user interface and displays the home screen.

FIG. 5A5 illustrates displaying the home screen (e.g., user interface 504), displaying a previous application (e.g., user interface 510), or displaying an application-switching user interface (e.g., user interface 514), depending on different activations of the button 501. As shown in FIG. 5A5, device 100 initially displays an application user interface (e.g., user interface 502). When a press input is detected on the button 501, device 100 replaces display of the application user interface (e.g., user interface 502) with display of the home screen (e.g., user interface 504). Alternatively, when a slide input is detected on the button 501, device 100 replaces display of the application user interface (e.g., user interface 502) with display of a previous application (e.g., user interface 510). In yet another alternative, when a slide and hold input (or, alternatively, a press and hold input) is detected on the button 501, device 100 replaces display of the application user interface (e.g., user interface 502) with display of an application-switching user interface (e.g., user interface 514).

FIG. 5A6 illustrates displaying a preview of an application when starting an activation of the button 501 and then displaying the application when the activation of the button 501 is completed. As shown in FIG. 5A6, device 100 is initially in a locked state (e.g., with the screen turned off). When an initial portion of an input is detected on the button 501 (e.g., an initial portion of a slide input upward on the button 501), device 100 displays a preview of the last active application on the device (e.g., preview user interface 509). When the input is completed on the button 501 (e.g., the slide input on button 501 is completed (e.g., the button has reached a threshold position along the slider track) before the button is released), device 100 replaces the preview of the last active application (e.g., preview user interface 509) with the last active application (e.g., user interface 510). On the other hand, if the input is not completed on the button 501 (e.g., the slide input on button 501 is not completed (e.g., the button has not reached a threshold position along the slider track) before the button is released), device 100 ceases to display the preview of the last active application (e.g., preview user interface 509) and returns to the locked state (e.g., with the screen turned off).

Alternatively, FIG. 5A7 illustrates displaying a preview of a lock screen when starting an activation of the button 501 and then displaying the lock screen when the activation of the button 501 is completed. As shown in FIG. 5A7, device 100 is initially in a locked state (e.g., with the screen turned off). When an initial portion of an input is detected on the button 501 (e.g., an initial portion of a slide input upward on the button 501), device 100 displays a preview of the lock screen (e.g., preview user interface 505). When the input is completed on the button 501 (e.g., the slide input on button 501 is completed), device 100 replaces the preview of the lock screen (e.g., preview user interface 505) with the lock screen (e.g., user interface 506). On the other hand, if the input is not completed on the button 501 (e.g., the slide input on button 501 is not completed), device 100 ceases to display the preview of the lock screen (e.g., preview user interface 505) and returns to the locked state (e.g., with the screen turned off).

FIGS. 5B1-5B22 illustrate example user interfaces for displaying a dock and/or the home screen of a device in response to a multi-stage gesture in accordance with some embodiments. The user interfaces in these figures are used to illustrate the processes described below, including the processes in FIGS. 7A-7C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5B1-5B9 illustrate opening an application from the home screen and then displaying a dock (e.g., a container that includes a predefined set of application launch icons and that is usually displayed at the bottom portion of the home screen) and/or the home screen of a device in response to detecting a multi-stage gesture. As shown in FIGS. 5B4-5B9, the dock is displayed when the multi-stage gesture meets a first movement threshold (e.g., a short swipe up) and the home screen is displayed when the multi-stage gesture meets a second movement threshold that is greater than the first movement threshold (e.g., a longer and/or faster swipe up).

In FIGS. 5B1-5B3, device 100 detects an input on the messaging application launch icon 524, such as a tap gesture by contact 518, which launches the messaging application (e.g., user interface 520, FIG. 5B3).

FIGS. 5B4-5B9 illustrate movement of a contact 522 (e.g., in a swipe gesture) from the bottom edge of device 100 and across touch screen 112 in an upward direction. In FIGS. 5B4-5B6, as contact 522 moves upward, dock 540 moves onto user interface 520 with movement of contact 522. In FIGS. 5B7-5B9, as movement of contact 522 continues to move upward, the home screen (e.g., user interface 504) slides in behind dock 540 and replaces display of the messaging application (e.g., user interface 520). In FIGS. 5B4-5B6, when dock 540 is overlaid over the messaging application, dock 540 is semi-transparent, and in FIGS. 5B7-5B9, when dock 540 is overlaid over the home screen, dock 540 is opaque. In FIG. 5B9, when dock 540 is overlaid on the home screen, the application launch icons in dock 540 are updated to include the recently used application on the device (e.g., the messaging application), in accordance with some embodiments.

FIG. 5B10 illustrates an example of a control center user interface object 542 that is overlaid on a portion of the home screen (e.g., user interface 504). In the example of FIG. 5B10, the control center user interface object 542 includes a standard set of controls for controlling different functions of the device 100 (e.g., controls for turning on/off airplane mode, WiFi, Bluetooth, do-not-disturb mode, a screen brightness slider, etc.). In some embodiments, control center user interface object 542 is displayed when the multi-stage gesture meets a third movement threshold that is greater than the second movement threshold (e.g., an even longer and/or faster swipe up than the gesture to display the home screen). In some embodiments, control center user interface object 542 is displayed in response to another swipe gesture, such as a swipe gesture similar or identical to the swipe gesture by contact 522, after home screen (e.g., user interface 504) is displayed.

FIG. 5B11 illustrates an alternative example of a control center user interface object 544 that is overlaid on a portion of the home screen (e.g., user interface 504). In the example of FIG. 5B11, the control center user interface object 544 includes the standard set of controls for controlling different functions of the device 100 (e.g., like control center user interface object 542, FIG. 5B10), and control center user interface object 544 also includes a row for the dock. In some embodiments, control center user interface object 544 is displayed when the multi-stage gesture meets a third movement threshold that is greater than the second movement threshold (e.g., an even longer and/or faster swipe up than the gesture to display the home screen). In some embodiments, control center user interface object 544 is displayed in response to another swipe gesture, such as a swipe gesture similar or identical to the swipe gesture by contact 522, after home screen (e.g., user interface 504) is displayed.

FIG. 5B12 illustrates an example of a control center user interface object 546 that is overlaid on a portion of an application user interface (e.g., user interface 504 of a messaging application). In the example of FIG. 5B12, the control center user interface object 546 includes the standard set of controls for controlling different functions of the device 100 (e.g., like control center user interface object 542, FIG. 5B10), and control center user interface object 546 also includes a row for the dock. In some embodiments, the dock is displayed when the multi-stage gesture meets a first movement threshold (e.g., a short swipe up) and the control center user interface object 546 is displayed when the multi-stage gesture meets a third movement threshold that is greater than the first movement threshold (e.g., a longer and/or faster swipe up). In some embodiments, control center user interface object 546 is displayed in response to another swipe gesture, such as a swipe gesture similar or identical to the swipe gesture by contact 522, after dock 540 is displayed.

FIGS. 5B13-5B15 illustrate displaying an application user interface (e.g., user interface 520) with dock 540 (e.g., after contact 522-c lifts off from device 100 in FIG. 5B6), and in response to movement of a contact 548 (e.g., in a swipe gesture) from the bottom edge of device 100 and across touch screen 112 in an upward direction, replacing display of the application user interface 520 with display of the home screen (e.g., user interface 504), in accordance with some embodiments.

FIGS. 5B15-5B17 illustrate displaying the home screen (e.g., user interface 504), and in response to movement of a contact 550 (e.g., in a swipe gesture) across touch screen 112 in a downward direction, replacing display of the home screen (e.g., user interface 504) with display of the user interface of the last active application on the device (e.g., user interface 520). As shown in FIG. 5B17, in some embodiments, when the user interface of the last active application is displayed in response to a downward swipe gesture, dock 540 is not displayed overlaid on the user interface of the last active application (e.g., user interface 520). In some embodiments, when the user interface of the last active application is displayed in response to a downward swipe gesture, dock 540 remains displayed and is overlaid on the user interface of the last active application (e.g., user interface 520).

FIGS. 5B18-5B20 illustrate displaying the home screen (e.g., user interface 504), and in response to movement of a contact 552 (e.g., in a swipe gesture) across touch screen 112 in an upward direction, replacing display of the home screen (e.g., user interface 504) with display of the user interface of the last active application on the device (e.g., user interface 520). As shown in FIG. 5B20, in some embodiments, when the user interface of the last active application is displayed in response to an upward swipe gesture, dock 540 is displayed (e.g., with a semi-transparent appearance) overlaid on the user interface of the last active application (e.g., user interface 520).

FIGS. 5B20-5B22 illustrate displaying an application user interface (e.g., user interface 520) with dock 540, and in response to movement of a contact 554 (e.g., in a swipe gesture) across touch screen 112 in a downward direction, ceasing to display the dock.

FIGS. 5C1-5C50 illustrate example user interfaces for displaying an on-demand virtual home button and activating the virtual home button to display the home screen in response to a continuous gesture in accordance with some embodiments. The user interfaces in these figures are used to illustrate the processes described below, including the processes in FIGS. 8A-8D. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5C1-5C9 illustrate opening an application from the home screen and then displaying a dock (e.g., a container that includes a predefined set of application launch icons and that is usually displayed at the bottom portion of the home screen) that includes a home button and activating the home button. As shown in FIGS. 5C4-5C9, the dock with the home button is displayed when a contact meets home-button-display criteria (e.g., the contact moves from the bottom edge upward beyond a threshold position on the display) and the home screen is displayed when the contact meets display-home criteria (e.g., a characteristic intensity of the contact increases above an intensity threshold after the upward movement of the contact).

In FIGS. 5C1-5C3, device 100 detects an input on the messaging application launch icon 524, such as a tap gesture by contact 555, which launches the messaging application (e.g., user interface 520, FIG. 5C3).

FIGS. 5C4-5C7 illustrate movement of a contact 556 (e.g., in a swipe gesture) from the bottom edge of device 100 and across touch screen 112 in an upward direction. As contact 556 moves upward, dock 558 (with home button 559) moves onto user interface 520 with movement of contact 556.

When device 100 detects that the intensity of contact 556 (e.g., contact 556-*e* in FIG. 5C8) exceeds an intensity threshold (e.g., the light press intensity threshold $IT_L$), the home screen (e.g., user interface 504, FIG. 5C9) is displayed. In this example, contact 556-*e* (in FIG. 5C8) exceeds the intensity threshold while on home button 559 to activate the home button 559.

FIGS. 5C9-5C16 illustrate opening an application from the home screen and then displaying a dock that includes a home button and activating the home button. As shown in FIGS. 5C12-5C16, the dock with the home button is displayed when a contact meets home-button-display criteria (e.g., the contact moves from the bottom edge upward beyond a threshold position on the display) and the home screen is displayed when the contact meets display-home criteria (e.g., a characteristic intensity of the contact increases above an intensity threshold after the upward movement of the contact, even if the contact is not on the home button).

In FIGS. 5C9-5C11, device 100 detects an input on the messaging application launch icon 524, such as a tap gesture by contact 560, which launches the messaging application (e.g., user interface 520, FIG. 5C11).

FIGS. 5C12-5C14 illustrate movement of a contact 562 (e.g., in a swipe gesture) from the bottom edge of device 100 and across touch screen 112 in an upward direction. As contact 562 moves upward, dock 558 (with home button 559) moves onto user interface 520 with movement of contact 562.

When device 100 detects that the intensity of contact 562 (e.g., contact 562-*d* in FIG. 5C15) exceeds an intensity threshold (e.g., the light press intensity threshold $IT_L$), the home screen (e.g., user interface 504, FIG. 5C16) is displayed. Note that in this example, contact 562-*d* (in FIG. 5C15) exceeds the intensity threshold after the contact has moved past home button 559. However, in response to the continuous gesture of contact 562 (e.g., swiping up to bring up the home button and pressing without liftoff), device 100 displays the home screen (e.g., user interface 504, FIG. 5C16), without requiring the contact to be on the home button to activate it.

FIGS. 5C16-5C24 illustrate opening an application from the home screen and then displaying a dock that includes a home button and activating the home button. As shown in FIGS. 5C19-5C24, the dock with the home button is displayed when a contact meets home-button-display criteria (e.g., the contact moves from the bottom edge upward beyond a threshold position on the display) and the home screen is displayed when the contact meets display-home criteria (e.g., a characteristic intensity of the contact increases above an intensity threshold after the upward movement of the contact, even if the home button is not yet fully revealed).

In FIGS. 5C16-5C18, device 100 detects an input on the messaging application launch icon 524, such as a tap gesture by contact 564, which launches the messaging application (e.g., user interface 520, FIG. 5C18).

FIGS. 5C19-5C20 illustrate movement of a contact 566 (e.g., in a swipe gesture) from the bottom edge of device 100 and across touch screen 112 in an upward direction. As contact 566 moves upward, dock 558 (with home button 559) moves onto user interface 520 with movement of contact 566.

When device 100 detects that the intensity of contact 566 (e.g., contact 566-*c* in FIG. 5C21) exceeds an intensity threshold (e.g., the light press intensity threshold $IT_L$), the home screen (e.g., user interface 504, FIGS. 5C22-5C24) is displayed. FIGS. 5C22-5C23 illustrate an animated transition of the home screen (e.g., user interface 504) sliding in behind dock 568 to replace display of the messaging application (e.g., user interface 520). In some embodiments, as shown in FIGS. 5C22-5C24, home button 559 is not displayed in dock 568 when the home screen is displayed. Note that in this example, contact 566-*c* (in FIG. 5C21) exceeds the intensity threshold before home button 559 is fully revealed. However, in response to the continuous gesture of contact 566 (e.g., swiping up to bring up the home button and pressing without liftoff), device 100 displays the home screen (e.g., user interface 504, FIG. 5C24), without requiring the home button to be fully revealed in order to activate it.

In some embodiments, if the contact 566 (e.g., contact 566-b, FIG. 5C20) lifts off before the home-button-display criteria are met (e.g., contact 566 includes an initial upward movement to begin display of the dock, but does not include enough distance and/or speed to meet the home-button-display criteria to fully reveal the home button), dock 558 with home button 559 retracts (e.g., in a reverse of the animated transition to display the dock) and only user interface 520 is displayed.

FIGS. 5C24-5C32 illustrate opening an application from the home screen and then displaying a dock that includes a home button and activating the home button. As shown in FIGS. 5C19-5C24, the dock with the home button is displayed when a contact meets home-button-display criteria (e.g., the contact moves from the bottom edge upward to a threshold position on the display) and the home screen is displayed in response to a separate input (e.g., a tap input by another contact).

In FIGS. 5C24-5C26, device 100 detects an input on the messaging application launch icon 524, such as a tap gesture by contact 569, which launches the messaging application (e.g., user interface 520, FIG. 5C26).

FIGS. 5C27-5C29 illustrate movement of a contact 570 (e.g., in a swipe gesture) from the bottom edge of device 100 and across touch screen 112 in an upward direction. As contact 570 moves upward, dock 558 (with home button 559) moves onto user interface 520 with movement of contact 570. In FIG. 5C30, contact 570 lifts off and dock 558 with home button 559 remains displayed overlaid on user interface 520.

In FIGS. 5C31-5C32, device 100 detects an input on the home button 559, such as a tap gesture by contact 572, and the home screen (e.g., user interface 504, FIG. 5C32) is displayed.

FIGS. 5C32-5C40 illustrate opening an application from the home screen and then displaying a dock that includes a home button and performing an operation in response to a separate input (e.g., a press input by another contact). As shown in FIGS. 5C35-5C40, the dock with the home button is displayed when a first contact meets home-button-display criteria (e.g., the contact moves from the bottom edge upward to a threshold position on the display) and in response to detecting a press input (e.g., without an initial swipe up) by a second contact (e.g., after liftoff of the first contact), a preview of a photo is displayed.

In FIGS. 5C32-5C34, device 100 detects an input on the messaging application launch icon 524, such as a tap gesture by contact 574, which launches the messaging application (e.g., user interface 520, FIG. 5C34).

FIGS. 5C35-5C36 illustrate movement of a contact 576 (e.g., in a swipe gesture) from the bottom edge of device 100 and across touch screen 112 in an upward direction. As contact 576 moves upward, dock 558 (with home button 559) moves onto user interface 520 with movement of contact 576. In FIG. 5C37, contact 570 lifts off and dock 558 with home button 559 remains displayed overlaid on user interface 520.

In FIGS. 5C38-5C39, device 100 detects an input on the photo thumbnail 579, such as a press input by contact 578-a, and a preview of the photo (e.g., photo preview 581, FIG. 5C39) is displayed. When contact 578 lifts off, device 100 ceases to display photo preview 580, and the messaging application (e.g., user interface 520) is displayed (as shown in FIG. 5C40). In contrast to FIGS. 5C9-5C16, where in response to the continuous gesture of contact 562 (e.g., swiping up to bring up the home button and pressing without liftoff), device 100 displays the home screen in response to contact 562-d (in FIG. 5C15) exceeding the intensity threshold while on photo 579, in FIG. 5C38, contact 578-a is a separate contact from the contact that brought up the dock (and not part of a continuous gesture as in FIGS. 5C9-5C16). For illustrative purposes, the position of contact 578 in FIG. 5C39 is the same as the position of contact 562 in FIG. 5C15, but because the press inputs by these contacts are part of different gestures, they produce different outcomes.

FIGS. 5C40-5C50 illustrate displaying a dock that includes a home button, displaying a control center that includes the dock, and activating a control in the control center. As shown in FIGS. 5C40-5C47, the dock with the home button is displayed when a contact meets home-button-display criteria (e.g., the contact includes a swipe up) and the control center is displayed when the contact meets a swipe-control-center-display criteria (e.g., the contact includes a sustained movement that is greater than the home-button-display criteria).

FIGS. 5C41-5C44 illustrate movement of a contact 582 (e.g., in a swipe gesture) from the bottom edge of device 100 and across touch screen 112 in an upward direction. As contact 582 moves upward, dock 558 (with home button 559) moves onto user interface 520 with movement of contact 582.

As shown in FIGS. 5C45, when device 100 detects that contact 582 continues to swipe up (e.g., above a movement threshold, such as 1/7 of the display height) after dock 558 (with home button 559) is displayed, a control center 584 (that optionally, includes dock 558) is displayed, overlaid on user interface 520. In some embodiments, as shown in FIG. 5C46, as contact 582 moves upward (e.g., in a continuation of the swipe gesture), control center 584 moves onto user interface 520 with movement of contact 582. In FIG. 5C47, contact 582 lifts off and control center 584 remains displayed overlaid on user interface 520.

In FIGS. 5C48-5C50, device 100 detects an input on the Wi-Fi control setting in control center 584, such as a press input by contact 586-a (in FIG. 5C48), which opens a Wi-Fi settings menu (in FIG. 5C49), and in response to the selection to turn off Wi-Fi for one hour (e.g., by lift off of contact 586-b in FIG. 5C49 on the "Turn off for 1 hour" option), Wi-Fi is turned off (in FIG. 5C50).

FIGS. 6A-6E are flow diagrams illustrating a method 600 of displaying the home screen without locking the device, or locking the device, depending on different activations of a button in accordance with some embodiments. The method 600 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

This method relates to displaying the home screen without locking the device, or locking the device, depending on whether a second activation of a button is detected after the initial activation of the button. Specifically, after an initial activation of the button, if a second activation of the button is not detected within a threshold amount of time, the home screen is displayed without locking the device; and if a second activation of the button is detected within the threshold amount of time, the device is locked (e.g., without displaying the home screen first). Responding to different activations of a single button to display the home screen without locking the device (e.g., when the button is activated a first way) and to lock the device without displaying the home screen (e.g., when the button is activated a second way) provides an intuitive and efficient way for the user to access these often-used functions and avoids unintended locking of the device when going to the home screen and unnecessary user interface switching when locking the device, thereby enhancing the operability of the device and making the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

The device (e.g., device 100, FIG. 5A1), while the device is in an unlocked state, detects (602) a sequence of one or more activations of a button of the device (e.g., button 501, FIG. 5A1, or in other embodiments, the button is a virtual home button, a solid-state home button, or a mechanical home button) (e.g., a home button of the device that, when activated in a predetermined manner (e.g., when pressed for a single time), dismisses a currently displayed user interface and displays a home screen of the device, such as user interface 504, FIG. 5A1) that includes at least a first activation of the button (e.g., a tap or light press input), wherein the first activation of the button is detected while a respective application user interface other than a home screen of the device is displayed on the display (e.g., user interface 502, FIG. 5A1) (e.g., a state in which one or more functions that are disabled in a locked state of the device are enabled). In some embodiments, a locked state of the device is a state in which the device is prevented from performing one or more functions such as displaying a home screen, launching an application, accessing personal information such as a photo library, electronic messages, electronic documents, contact information, etc. In some embodiments, an unlocked state of the device is a state in which the device is enabled to perform the one or more functions that are prevented while in the locked state of the device. In some embodiments, the device is restricted to providing limited access to a class of information in the locked state (e.g., subjects and/or snippets of recently received electronic messages, photos taken while the device is the locked state, upcoming calendar events), while the device provides more than the limited access (e.g., full access) to the class of information in the unlocked state (e.g., the full content of a larger set of electronic messages, all photos stored on the device, all calendar events stored on the electronic device, etc.). In some embodiments, destructive actions that are permitted in the unlocked state are prevented in the locked state (e.g., in the locked state, electronic messages, photos, contacts and/or electronic documents cannot be deleted from the device, while in the unlocked state electronic messages, photos, contacts and/or electronic documents can be deleted from the device.) In some embodiments, user authentication (e.g., biometric authentication such as a fingerprint, facial detection, iris scan or input pattern authentication such as a password, passcode, or touch input pattern) is required by the device in order to transition from the locked state to the unlocked state. In some embodiments, the locked state is used to prevent unintentional input instead of or in addition to preventing unauthorized access to the device and a predefined unlock input is required to unlock the device (e.g., placing a finger on a fingerprint sensor, pressing a hardware button, a swipe on a display, activating an intensity-sensitive input element, etc.). The device, in response to detecting the sequence of one or more activations of the button of the device (604): in accordance with a determination that the first activation of the button was detected without a second activation of the button being detected before a respective threshold amount of time (e.g., a double-click time threshold, such as time T in FIG. 5A1) from detecting the first activation of the button had elapsed, replaces (e.g., upon expiration of the respective threshold amount of time) display of the respective application user interface (e.g., user interface 502, FIG. 5A1) with display of a home screen of the device (e.g., user interface 504, FIG. 5A1) while maintaining the device in the unlocked state (e.g., a single press input on the home button causes the home screen to be displayed, as shown in FIG. 5A1); and in accordance with a determination that the first activation of the button was detected with a second activation of the button being detected before the respective threshold amount of time from detecting the first activation of the button had elapsed, switches the device from the unlocked state, in which the respective application user interface (e.g., user interface 502, FIG. 5A1) is displayed, to a locked state (e.g., user interface 506, FIG. 5A1) (e.g., a double press detected within the double click time threshold causes the device to turn off the screen or lock the screen without first going to the home screen, as shown in path "1" of FIG. 5A1). In some embodiments, detecting the first activation of the button includes (606) detecting a first press input on the button (e.g., button 501, FIG. 5A1) that meets first click criteria (e.g., the first click criteria include a requirement that is met when the intensity of contact in the first input is above a first intensity threshold (e.g., a down-click intensity threshold). In some embodiments, the first click criteria further require that the contact in the first activation is substantially stationary (e.g., the contact moves less than a threshold amount of movement) before liftoff of the contact is detected or within a threshold amount of time after initial detection of the contact. In some embodiments, the first click criteria further require that the contact is not maintained for more than a second threshold amount of time (e.g., the long-press time threshold, such as TLP, as shown in FIG. 5A3) that is greater than the first threshold amount of time (e.g., the double-click time threshold, such as T, as shown in FIG. 5A1). In some embodiments, the first click criteria further require that the intensity of the contact decreases below a second intensity threshold that is equal to or lower (e.g., lighter) than the first intensity threshold after the intensity had increased above the first intensity threshold (e.g., when both a down-click and an up-click have been detected). Displaying the home screen of the device in response to a first way of activating the button (e.g., with a down click) (and locking the device in response to a second way of activating the button) enhances the operability of the device and makes the user-device interface more efficient (e.g., by eliminating the user's need to find and activate an additional button/affordance and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, detecting the second activation of the button includes (608) detecting a second press input on the button (e.g., button 501, FIG. 5A1) that meets second click criteria. In some embodiments, the second click criteria are the same as the first click criteria, or have a lower intensity requirement than the first click criteria (e.g., the second press input is a lighter press input than the first press input), or have a higher intensity requirement than the first click criteria (e.g., the second press input is a harder press input than the first press input). In some embodiments, the first activation and the second activation of the button are by the same continuous contact. In some embodiments, the first activation and the second activation of the button are by two separate contacts. In some embodiments, the first click criteria require that both a down-click and an up-click to be detected, and the second click criteria do not require the up-click of the second click to be detected. Locking the device in response to a second way of activating the button (e.g., with a double press or double click) (and displaying the home screen in response to a first way of activating the button) enhances the operability of the device and makes the user-device interface more efficient (e.g., by eliminating the user's need to find and activate an additional button/affordance and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, switching the device from the unlocked state, in which the respective application user interface is displayed, to the locked state includes (610) switching from displaying the respective application user interface (e.g., user interface 502, FIG. 5A1) to displaying a lock screen user interface (e.g., user interface 506, FIG. 5A1) without displaying the home screen of the device (e.g., the respective application user interface does not transition to the home screen before the lock screen is displayed when switching from the respective application user interface to displaying the lock screen user interface, as shown in path "1" of FIG. 5A1). Locking the device by displaying the lock screen user interface without displaying the home screen of the device improves the visual feedback provided to the user (e.g., by making the device appear more responsive to user input) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, switching the device from the unlocked state, in which the respective application user interface is displayed, to the locked state includes (612) turning off the display without displaying the home screen of the device (e.g., the respective application user interface does not transition to the home screen before the display is turned off when switching from the respective application user interface to turning off the display). Locking the device by turning off the display without displaying the home screen of the device improves the visual feedback provided to the user (e.g., by making the device appear more responsive to user input) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more activations of the button of the device (614): in accordance with a determination that the first activation of the button was detected with a second activation of the button being detected after the respective threshold amount of time (e.g., time T, FIG. 5A1) from detecting the first activation of the button had elapsed, the device displays the home screen in response to detecting the first activation of the button, and while the home screen of the device is displayed on the display, the device switches the device from the unlocked state to the locked state in response to detecting the second activation of the button (e.g., two separate clicks on the home button cause the device to display the home screen after the first click and then go to the locked state (e.g., displaying a lock screen or turning off the display) after the second click, as shown in path "2" of FIG. 5A1). In some embodiments, detecting the second activation of the button includes detecting the down-click of the button without detecting the up-click of the button. In some embodiments, the second activation of the button includes both the down-click and the up-click of the button. When two separate clicks on the button are detected, displaying the home screen after the first click and locking the device after the second click improves the visual feedback provided to the user (e.g., by making the device appear more responsive to user input) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, after the second activation of the button was detected and while the device is in the locked state, the device detects (616) a third activation of the button that unlocks the device (e.g., as shown in FIG. 5A2) (e.g., detecting the third activation of the button includes detecting a third press input that meets the first click criteria and that meets authentication criteria (e.g., the contact matches the authentication fingerprint)); in response to detecting the third activation of the button that unlocks the device: in accordance with a determination that the second activation of the button was detected after the respective threshold amount of time from detecting the first activation of the button had elapsed (e.g., the home screen of the device was displayed immediately prior to the locking of the device, as shown in path "2" of FIG. 5A1), the device unlocks the device to display the home screen of the device (e.g., as shown in path "2" of FIG. 5A2) (e.g., if the user had used a slow double click (that is interpreted as two separate single click inputs) to lock the device, then, the home screen is displayed upon unlocking by the third activation of the button); and in accordance with a determination that the second activation of the button was detected before the respective threshold amount of time from detecting the first activation of the button had elapsed (e.g., the respective application user interface was displayed immediately prior to the locking of the device, as shown in path "1" of FIG. 5A1), the device unlocks the device to display the respective application user interface (e.g., as shown in path "1" of FIG. 5A2) (e.g., if the user had used a fast double click (that is interpreted as a single one double click input) to lock the device, then the user interface of the last active application is displayed upon unlocking by the third activation of the button). Unlocking the device to display the most recently displayed user interface (prior to locking) allows the user to quickly get back to the home screen or the application without requiring further user input. Performing an operation when a set of conditions has been met without requiring further user input enhances the operability of the device and makes the user-device interface more efficient (e.g., by helping the user to achieve an intended outcome with the required inputs and reducing user mistakes when operating/ interacting with the device) which, additionally, reduces power usage and improves battery life of the device by enabling the user to use the device more quickly and efficiently.

In some embodiments, in response to detecting the sequence of one or more activations of the button of the device (618): in accordance with a determination that detecting the first activation of the button meets long-press criteria, wherein the long press criteria require that the first activation of the button is maintained for at least a threshold duration (e.g., a long-press time threshold, such as TLP in FIG. 5A3, that is longer than the double-click time threshold) without a second activation being detected in order for the long-press criteria to be met (e.g., the contact is maintained for more than the threshold amount of time after an intensity of the contact exceeded the first intensity threshold or when the intensity of the contact is maintained above the first intensity threshold for more than the threshold amount of time, or a physical button mechanism is depressed for the threshold duration), the device initiates a process to turn off the device (e.g., as shown in FIG. 5A3) (e.g., turning off the device immediately or displaying a confirmation request for the user to confirm before turning off the device). Turning off the device in response to a third way of activating the button (e.g., with a long press) (and displaying the home screen or locking the device in response to different ways of activating the button) enhances the operability of the device and makes the user-device interface more efficient (e.g., by eliminating the user's need to find and activate an additional button/ affordance and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more activations of the button of the device (620): the device displays a beginning of an animated transition from the respective application user interface (e.g., user interface 502, FIG. 5A1) to the home screen of the device (e.g., user interface 504, FIG. 5A1) in response to detecting the first activation of the button (e.g., activation by a first press input that meets the first click criteria); and after displaying the beginning of the animated transition from the respective application user interface to the home screen of the device, the device pauses the animated transition from the respective application user interface to the home screen of the device, wherein: in accordance with a determination that the second activation of the button was not detected before the respective threshold amount of time from detecting the first activation of the button had elapsed, replacing display of the respective application user interface with display of the home screen of the device includes continuing the animated transition from the respective application user interface to the home screen of the device after the respective threshold amount of time has elapsed (e.g., animated transition is resumed when the second click is not detected within the double-click interval); and in accordance with a determination that the second activation of the button was detected before the respective threshold amount of time from detecting the first activation of the button had elapsed, switching the device from the unlocked state, in which the respective application user interface is displayed, to the locked state includes locking the device (e.g., displaying user interface 506, FIG. 5A1) without resuming the animated transition (e.g., animated transition is not resumed when the second click is detected within the double-click interval). Starting the animated transition before the sequence of activations of the button is completely determined improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more activations of the button of the device (622): in accordance with a determination that the second activation of the button was not detected before the respective threshold amount of time from detecting the first activation of the button had elapsed (e.g., time T, FIG. 5A1), replacing display of the respective application user interface (e.g., user interface 502, FIG. 5A1) with display of the home screen of the device (e.g., user interface 504, FIG. 5A1) includes displaying an animated transition from the respective application user interface to the home screen of the device that starts after the respective threshold amount of time has elapsed (e.g., animated transition is started after the device has ascertained that no second click is detected within the double-click interval), and in accordance with a determination that the second activation of the button was detected before the respective threshold amount of time from detecting the first activation of the button had elapsed, the device locks the device (e.g., displaying user interface 506, FIG. 5A1) without displaying the animated transition (e.g., no animated transition is displayed when the second click is detected within the double-click interval). Displaying an animated transition to the home screen (when accessing the home screen) or locking the device without displaying the animated transition (when locking the device) improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more activations of the button of the device (624): in accordance with a determination that detecting the one or more activations of the button includes detecting a first movement input that meets application- toggle criteria (e.g., the application-toggle criteria require that the home button is moved along a predefined track by more than a first threshold distance (e.g., 20 pixels or 5 mms), in order for the application-toggle criteria to be met; or the application-toggle criteria require that a contact moves on the home button in a respective direction by more than a threshold distance in order for the application-toggle criteria to be met), the device replaces the respective application user interface (e.g., user interface 502, FIG. 5A4) with a second user interface (e.g., user interface 510, FIG. 5A4) that corresponds to another application that was active on the device immediately prior to an application that corresponds to the respective application user interface (e.g., as shown in FIG. 5A4). In some embodiments, detecting the first movement input includes detecting movement of the button (e.g., button 501, FIG. 5A4) along a predefined track on the device. For example, the first movement input slides the home button upward along a predefined track of the slider button (e.g., disposed on an edge of the device that is adjacent to the display) (e.g., as shown by contact 511 in FIG. 5A4). In some embodiments, movement of the button is not necessary, and movement of a contact on the button or along an edge (e.g., a side of the device that is adjacent to the display) of the device (e.g., a swipe upward along a touch-sensitive (e.g., capacitive) edge of the device) performs the same function. In some embodiments, a swipe downward on the button (e.g., as shown by contact 513 in FIG. 5A4) or along the touch-sensitive (e.g., capacitive) edge of the device causes the device to cease to display the current user interface (e.g., user interface 502, FIG. 5A4) and to display another user interface (e.g., user interface 512, FIG. 5A4) or to display the home screen. In some embodiments, the currently displayed application user interface shrinks toward its corresponding application icon to show the home screen (a reverse of the animation that is played when the application icon is clicked to launch the application), when an upward swipe on the home button or along the touch-sensitive (e.g., capacitive) edge of the device is detected. Displaying a prior application in response to a movement input on the button (and displaying another application or displaying the home screen or locking the device in response to different ways of activating the button) enhances the operability of the device and makes the user-device interface more efficient (e.g., by eliminating the user's need to find and activate an additional button/affordance and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, (while displaying the respective user interface (e.g., a user interface other than the home screen, such as user interface 502, FIG. 5A5) or while the device is in the locked state (e.g., while the screen is turned off or displaying a lock screen user interface)), the device detects (626) a fourth activation of the button; in response to detecting the fourth activation of the button: in accordance with a determination that detecting the fourth activation of the button includes detecting a fourth input on the button that meets go-home criteria, wherein the go-home criteria require that the fourth input meets first click criteria and that the home screen of the device is not displayed when the fourth input is detected, in order for the go-home criteria to be met (e.g., the go-home criteria require that the fourth input is a press input on the home button that is detected when the display is off or when a user interface other than the home screen is displayed): the device displays the home screen of the device (e.g., user interface 504, FIG. 5A5) (and optionally, unlocks the device if the device was locked); in accordance with a determination that detecting the fourth activation of the button includes detecting a fifth input on the button meets go-to-application criteria, wherein the go-to-application criteria require that the fifth input meets first movement criteria (e.g., the go-to-application criteria require that that the fifth input is an upward movement of the home button along a slider track of the home button for more than a first threshold distance, or that the fifth input is an upward movement on the home button by more than a threshold distance) in order for the go-to-application criteria to be met: the device displays a user interface of a last active application on the device (e.g., user interface 510, FIG. 5A5) (e.g., the application that was active immediately prior to the screen being turned off, or the application that was active immediately prior to switching to the application that corresponds to the currently displayed user interface, or the application that was active immediately prior to switching to the home screen if the home screen is the currently displayed user interface) (and optionally, unlocks the device if the device was locked). In some embodiments, the go-to-application criteria may also be met with an upward swipe along a touch-sensitive (e.g., capacitive) edge of the device for more than a respective threshold distance. In some embodiments, in response to detecting release of the button (e.g., by reducing the intensity of the contact to below a release threshold intensity, or by lift-off of the contact), or detecting the button being restored to its default position, the device maintains display of the user interface of the last active application. Displaying the home screen of the device in response to a first way of activating the button (e.g., with a down click) and displaying the last active application on the device in response to a different way of activating the button (e.g., with a movement input) enhances the operability of the device and makes the user-device interface more efficient (e.g., by eliminating the user's need to find and activate an additional button/affordance and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the fourth activation of the button: in accordance with a determination that detecting the fourth activation of the button includes detecting an initial portion of the fifth input that meets preview criteria, wherein the preview criteria require that the initial portion of the fifth input meets second movement criteria (e.g., the second movement criteria requires a smaller threshold movement (e.g., 5 pixels or 2 mms) than the first movement criteria) in order for the preview criteria to be met, the device displays (628) a preview of the user interface of the last active application (e.g., preview user interface 509, FIG. 5A6) on the device (e.g., displaying at least a portion of a snapshot of the last active application on the device) (if the device is not locked, or optionally unlocking the device if the device is locked). Displaying a preview of the last active application on the device when starting an activation of the button that would go to the last active application improves the visual feedback provided to the user (e.g., by making the device appear more responsive to user input and permitting the user to decide whether to continue the current input after seeing the preview) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the fourth activation of the button: in accordance with a determination that detecting the fourth activation of the button includes detecting an initial portion of the fifth input that meets preview criteria, wherein the preview criteria require that the initial portion of the fifth input meets second movement criteria (e.g., the second movement criteria requires a smaller threshold movement (e.g., 5 pixels or 2 mms) than the first movement criteria) in order for the preview criteria to be met, the device displays (630) a preview of a lock screen user interface (e.g., preview user interface 505, FIG. 5A7) if the device is locked (e.g., displaying at least a portion of the lock screen user interface). Displaying a preview of the lock screen user interface when starting an activation of the button that would go to the lock screen user interface improves the visual feedback provided to the user (e.g., by making the device appear more responsive to user input and allowing the user to decide whether to continue the current input after seeing the preview) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while displaying the preview, the device detects (632) termination of the fifth input on the button (e.g., detecting release of the home button with reduction of intensity of contact below a respective threshold intensity (e.g., a release intensity threshold or up-click intensity threshold) or with lift-off of the contact); in response to detecting the termination of the fifth input on the button: in accordance with a determination that the fifth input meets the preview criteria and does not meet the go-to-application criteria (e.g., the fifth input does not meet the first movement criteria), the device ceases to display the preview (e.g., the preview of the user interface of the last active application on the device or the preview of the lock screen user interface upon termination of the fifth input) upon termination of the fifth input (e.g., as shown by the return arrow to user interface 516 from preview user interface 509 and preview user interface 505 in FIGS. 5A6 and 5A7, respectively). In some embodiments, in response to detecting the termination of the fifth input on the button, in accordance with a determination that the fifth input meets the go-to-application criteria after having met the preview criteria, the device ceases to display the preview and displays the user interface of the last active application (e.g., user interface 510, FIG. 5A6) or the lock screen (e.g., user interface 506, FIG. 5A7). Displaying a preview of a user interface when starting an activation of the button that would go to the user interface and ceasing to display the preview when activation of the button is not completed improves the visual feedback provided to the user (e.g., by making the device appear more responsive to user input and allowing the user to decide whether to continue with the current input after seeing the preview) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the termination of the fifth input on the button: in accordance with a determination that the fifth input meets the preview criteria and does not meet the go-to-application criteria, the device turns off (634) the display upon termination of the fifth input (e.g., as shown by the return arrow to user interface 516 from preview user interface 509 and preview user interface 505 in FIGS. 5A6 and 5A7, respectively). In some embodiments, in response to detecting the termination of the fifth input on the button, in accordance with a determination that the fifth input meets the go-to-application criteria after having met the preview criteria, the device ceases to display the preview and turns off the display. Turning off the display on the device when activation of the button is not completed improves the visual feedback provided to the user (e.g., by making the device appear more responsive to user input and allowing the user to decide whether to continue the current input after seeing the preview) and enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the fourth activation of the button: in accordance with a determination that detecting the fourth activation of the button includes detecting a sixth input that meets application-switching criteria, wherein the application-switching criteria require that the sixth input includes a movement input that meets the first movement criteria and first duration criteria (e.g., the home button is held at or beyond the threshold position (e.g., 20 pixels or 5 mms) away from its default position for more than a threshold amount of time (e.g., 1 second)) in order for the application-switching criteria to be met: optionally, the device ceases to display the user interface of the last active application (e.g., user interface 502, FIG. 5A5); the device displays (636) an application-switching user interface (e.g., user interface 514, FIG. 5A5) that includes representations (e.g., live previews or snapshots that are, optionally, reduced in size) of a currently active application and one or more suspended applications on the device (and optionally, a representation of the home screen). Displaying an application-switching user interface in response to a movement input on the button that meets movement and duration criteria (and displaying the home screen or locking the device in response to different ways of activating the button) enhances the operability of the device and makes the user-device interface more efficient (e.g., by eliminating the user's need to find and activate an additional button/affordance and by helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 6A-6E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 800) are also applicable in an analogous manner to method 600 described above with respect to FIGS. 6A-6E. For example, the contacts, gestures, user interface objects, tactile outputs, intensity thresholds, focus selectors, and/or animations described above with reference to method 600 optionally have one or more of the characteristics of the contacts, gestures, user interface objects, tactile outputs, intensity thresholds, focus selectors, and/or animations described herein with reference to other methods described herein (e.g., methods 700 and 800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6E are, optionally, implemented by components depicted in FIGS. 1A-1B. For example, detection operation 602 and replace/switch operation 604 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 7A-7C are flow diagrams illustrating a method 700 of displaying a dock and/or the home screen of a device in response to a multi-stage gesture in accordance with some embodiments. The method 700 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

This method relates to displaying a dock (e.g., a container that includes a predefined set of application launch icons and that is usually displayed at the bottom portion of the home screen) and/or the home screen of a device in response to detecting a multi-stage gesture in which the dock is displayed when the multi-stage gesture meets a first movement threshold (e.g., a short swipe up) and the home screen is displayed when the multi-stage gesture meets a second movement threshold that is greater than the first movement threshold (e.g., a longer and/or faster swipe up). The gestures to bring up the dock and the home screen are optionally two separate gestures or a single continuous gesture. Providing either the dock or the home screen depending on a movement parameter of a movement input allows the user to arrive at a desired user interface state (e.g., displaying the dock only or displaying the home screen) by controlling the movement parameter of a single movement input. Reducing the number of inputs needed to perform these operations (e.g., displaying the dock or displaying the home screen) enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

The device (e.g., device 100, FIG. 5B1) displays (702) a home screen (e.g., user interface 504, FIG. 5B1) on the display (e.g., touch screen 112, FIG. 5B1), wherein the home screen includes a plurality of application launch icons (e.g., application launch icons 524-538, FIG. 5B1) that correspond to a plurality of applications that are installed on the device (e.g., the plurality of application launch icons are arranged in a grid on the home screen and, optionally, one or more widgets are also included on the home screen). While displaying the home screen, the device detects (704) a first input by a first contact (e.g., tap gesture by contact 518, FIG. 5B2) on a first application launch icon (e.g., messaging application launch icon 524, FIG. 5B2) that meets application-launch criteria (e.g., the first input is a tap on the first application launch icon, as shown in FIG. 5B2). In response to detecting the first input on the first application launch icon that meets the application-launch criteria (e.g., an input such as a tap input), the device replaces (706) the home screen (e.g., user interface 504, FIG. 5B2) with a first user interface of a first application that corresponds to the first application launch icon (e.g., user interface 520, FIG. 5B3). While displaying the first user interface (e.g., user interface 520, FIG. 5B4), the device detects (708) a second input by a second contact (e.g., contact 522, FIGS. 5B4-5B9) that includes movement across the display in a first direction (e.g., upward). In response to detecting the second input (710): in accordance with a determination that the second input meets dock-display criteria, wherein the dock-display criteria require that the second input includes movement of the second contact with a magnitude of a movement parameter (e.g., distance and/or speed) that is above a first movement threshold (e.g., a distance greater than ⅒ of the screen height, or a speed greater than 200 pixels per second) in order for the dock-display criteria to be met, the device displays a user interface object (e.g., dock 540, FIGS. 5B5-5B6) overlaid on a portion of the first user interface (e.g., user interface 520, FIGS. 5B5-5B6), wherein the user interface object (e.g., a dock) includes a first subset of application launch icons from the plurality of application launch icons (without including a virtual home button); and in accordance with a determination that the second input meets home-display criteria, wherein the home-display criteria require that the second input includes movement of the second contact with a magnitude of the movement parameter (e.g., distance and/or speed) that is above a second movement threshold (e.g., a distance greater than ⅕ of the screen height, or a speed greater than 400 pixels per second) that is greater than the first movement threshold, the device replaces display of the first user interface (e.g., user interface 520, FIGS. 5B7-5B8) with display of the home screen (e.g., user interface 504, FIG. 5B9) (e.g., while the user interface object, dock 540 in FIGS. 5B7-5B9, continues to be displayed). In some embodiments, the dock display criteria and the home display criteria are met by the same input (e.g., a swipe input that starts from below or at a bottom edge of the touch-sensitive display or some other predefined position and that moves in a predefined direction (e.g., upward) for more than a first threshold distance, such as swipe input by contact 522 in FIGS. 5B4-5B9). In some embodiments, an input meets the dock display criteria but does not meet the home display criteria (e.g., a swipe input that starts from below or at a bottom edge of the touch-sensitive display or some other predefined position and that moves in a predefined direction (e.g., upward) for more than a second threshold distance that is smaller than the first threshold distance, such as swipe input by contact 522-*a* through 522-*c* in FIGS. 5B4-5B6). In some embodiments, an input meets both the dock display criteria and the home display criteria without meeting the distance requirement, when the input meets a speed requirement (e.g., a swipe input that starts from below or at a bottom edge of the touch-sensitive display or some other predefined position and that moves in a predefined direction (e.g., upward) for more than a second threshold distance that is smaller than the first threshold distance) with more than a first threshold speed). In some embodiments, a long upward swipe and a short fast flick can both meet the dock display criteria and the home-display criteria. In some embodiments, when the second input does not meet the dock display criteria, a portion of the dock is, optionally, displayed in response to movement of the second contact, but the portion of the dock will cease to be displayed (e.g., retracted) when the termination of the second input is detected without having met the dock display criteria. In some embodiments, if the second input meets the dock display criteria and does not meet the home-display criteria, the dock is displayed and the home screen is not displayed (e.g., as shown in FIGS. 5B4-5B6). While the dock is displayed, a third input by a third contact that meets the home-display criteria (e.g., an upward swipe on the dock) can also bring up the home screen from behind the dock and over the first user interface (e.g., as shown in FIGS. 5B13-5B15). In some embodiments, once the dock is concurrently displayed with the home screen, it becomes part of the home screen and is dismissed with the home screen when a gesture for dismissing the home screen is detected (e.g., as shown in FIGS. 5B15-5B17).

In some embodiments, displaying the user interface object overlaid on the portion of the first user interface includes (712) moving the user interface object (e.g., dock 540, FIGS. 5B5-5B6) onto the portion of the first user interface (e.g., user interface 520, FIGS. 5B5-5B6) in accordance with the movement of the second contact (e.g., contact 522-*b* and 522-*c*, FIGS. 5B5-5B6) (e.g., the dock slides over the first user interface at a rate based on movement of the second contact). For example, the dock slides on more quickly when the movement of the second contact is faster and the dock slides on more slowly when the movement of the second contact is slower. In some embodiments, lift-off of the second contact is detected before the dock is fully revealed, and the dock continues to slide in over the first user interface due to simulated inertia after the lift-off of the second contact is detected. The initial speed of the dock after the lift-off of the second contact is based on the speed of the second contact prior to the lift-off of the second contact. Moving the dock over the first user interface at a rate based on movement of the second contact improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, replacing display of the first user interface with display of the home screen includes (714): displaying the user interface object overlaid on the portion of the first user interface; and displaying an animated transition of the home screen replacing display of the first user interface while continuing to display the user interface object (e.g., the dock remains on the display and the home screen slides in behind the dock) (e.g., as shown in FIGS. 5B5-5B8). Displaying an animated transition of the home screen replacing the first user interface while continuing to display the dock improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the animated transition of the home screen replacing display of the first user interface is (716) displayed at a rate in accordance with the movement of the second contact (e.g., contact 522, FIGS. 5B7-5B9) (e.g., the home screen slides onto the display at a rate based on movement of the second contact). For example, the home screen slides on more quickly when the movement of the second contact is faster and the home screen slides on more slowly when the movement of the second contact is slower. In some embodiments, the rate of movement of the home screen is selected to simulate direct manipulation of the home screen, so that the home screen slides onto the display at the same rate as the second contact moves on the display. In some embodiments, lift-off of the second contact is detected before the home screen is fully revealed, and the home screen continues to slide in over the first user interface due to simulated inertia after the lift-off of the second contact is detected. In some embodiments, lift-off of the second contact is detected before the home screen is revealed at all, and the home screen slides in over the first user interface after the lift-off of the second contact is detected (e.g., when the second contact has a speed above a predetermined threshold speed (e.g., 400 pixels per second) before lift-off). In some embodiments, the initial speed of the home screen sliding in after the lift-off of the second contact is based on the speed of the second contact prior to the lift-off of the second contact. In some embodiments, the home screen slides upward relative to the second contact (e.g., the home screen moves upward from behind the dock faster than the upward movement of the second contact once the dock has been fully revealed) (e.g., as shown in FIGS. 5B7-5B9). Displaying the animated transition of the home screen replacing the first user interface at a rate based on movement of the second contact improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the second input (718): in accordance with a determination that the second input meets control-center criteria, wherein the control-center criteria require that the second input includes movement of the second contact with a magnitude of the movement parameter (e.g., distance and/or speed) that is above a third movement threshold (e.g., a distance greater than ⅓ of the screen height, or a speed greater than 500 pixels per second) that is greater than the second movement threshold, the device displays a control center user interface object (e.g., control center user interface object 542, 544, or 546 in FIGS. 5B10-5B12, respectively) that includes a plurality of controls for controlling different functions of the device (e.g., controls for turning on/off WiFi, Bluetooth, flashlight, do-not-disturb mode, airplane mode, the screen brightness slider, and other controls which may also be accessed through a settings user interface or application on the device). In some embodiments, the control center user interface is overlaid on a portion of the home screen (e.g., on top of the dock) after replacing display of the first user interface with display of the home screen (e.g., as shown in FIG. 5B10). The home screen remains displayed when the control center is brought up over the home screen. In some embodiments, when the movement of the second contact has met the second movement threshold, the home screen slides in over the first user interface from behind the dock at a speed that is faster than the movement speed of the second contact, and as the movement of the second contact continues and meets the third movement threshold (e.g., the home screen is fully revealed at this point), the control center slides in from the bottom edge of the display over the dock and then over a portion of the home screen. In some embodiments, if the second input ends after the home screen is revealed and before the third movement threshold is met, the control center can be brought in from the bottom edge of the display by a third input that starts from the below or at the bottom edge of the display, but not from a location above the bottom edge of the display. In some embodiments, the second input with a sustained contact that starts from a predetermined position (e.g., at or below the bottom edge of the display) and moving in a predetermined direction (e.g., upward) can pull up objects in different display layers (e.g., the dock, the home screen, and the control center are all on different display layers (on different z-layers relative to the surface of the display)) during the course of its movement, while if separate inputs with separate contacts are to pull up these different objects, the inputs have to all start from the predetermined position (e.g., at or below the bottom edge of the display). Displaying the control center in response to detecting a multi-stage gesture that meets a third movement threshold (where the third movement threshold is greater than a second movement threshold for displaying the home screen, which is greater than a first movement threshold for displaying the dock) enhances the operability of the device and makes the user-device interface more efficient (e.g., by reducing the number of user inputs needed to access the control center and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the user interface object includes (720) a virtual home button while the user interface object is overlaid on the portion of the first user interface (e.g., as shown in FIG. 5C7), wherein the virtual home button, when selected, causes the device to cease to display the first user interface and display a home screen of the device; and the user interface object ceases to include the virtual home button while the user interface object is overlaid on a portion of the home screen (e.g., as shown in FIGS. 5C22-5C23). In some embodiments, a tap input on the virtual home button also causes the first user interface to be replaced with the display of the home screen if the second input only met the dock display criteria and did not meet the home-display criteria (e.g., as shown in FIGS. 5C27-5C32). Displaying a home button on the dock if the dock is accessed in an application (e.g., the first application with the first user interface) and not displaying the home button on the dock if the dock is accessed in the home screen provides the additional control option of the home button when needed (e.g., when in an application) and does not clutter the dock with the additional control option of the home button when not needed (e.g., when already on the home screen). Providing control options only when needed reduces clutter on the dock, enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the user interface object includes (722) application launch icons corresponding to one or more recently used applications on the device (e.g., as shown in FIGS. 5B7-5B9, where dock 540 in FIG. 5B9 is updated to include the recently used messaging application) (e.g., the dock includes the N most recent applications used on the device, the dock includes N favorite applications specified by the user, or the dock includes a combination of favorite applications and recent applications and/or suggested applications). Including one or more recently used applications on the dock provides improved accessibility to applications, enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the user interface object is (724) configurable by a user to include one or more of: a virtual home button, one or more control affordances for controlling respective system or device settings, and/or one or more application launch icons. In some embodiments, the device removes one or more of the above from the user interface object in response to detecting touch-and hold input on a particular item in the user interface object and a dragging input that corresponds to movement of the item out of the user interface object followed by liftoff of the contact from the touch-sensitive surface. Allowing a user to configure the dock provides improved accessibility to control affordances and/or applications of the user's choosing and provides an efficient way for the user to access often-used functions. Providing improved accessibility enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while displaying the user interface object, the device detects (726) a third input by a third contact (e.g., a swipe gesture by contact 548, FIG. 5B14) that meets user interface switching criteria, wherein the user interface switching criteria require that the third input includes movement of the third contact across the display with a magnitude of a movement parameter (e.g., distance and/or speed) that is above a third movement threshold (e.g., with more than ⅓ of the screen height, or with a speed greater than 500 pixels per second, etc.) in order for the user interface switching criteria to be met (in some embodiments, the user interface switching criteria also require that the movement is in the first direction (e.g., upward) and/or that the movement starts from a predetermined position (e.g., at or below the bottom edge of the display); and in response to detecting the third input: in accordance with a determination that a respective application user interface (e.g., that is not the home screen) is displayed when the third contact is detected, the device replaces display of the respective application user interface with display of the home screen (e.g., as shown in FIGS. 5B14-5B15) (e.g., the respective application user interface is reduced in size as the swipe progresses, first to make room for the dock and then to make room for the home screen). Replacing display of the application with display of the home screen in response to detecting another swipe while the dock is displayed provides an efficient way to access the home screen, enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the third input (728): in accordance with a determination that the home screen is displayed when the third contact is detected (e.g., a swipe gesture by contact 552, FIG. 5B19), the device replaces display of the home screen with display of a user interface of a last active application on the device (e.g., as shown in FIGS. 5B19-5B20) (e.g., the previous application that had been active immediately before the home screen was displayed). In some embodiments, in response to a first upward swipe gesture, the home screen slides down, and UI for the most recently used application comes toward user from bottom edge of the display to occupy the whole screen (e.g., as shown in FIGS. 5B19-5B20), and in response to a next upward swipe gesture, the home screen slides back up, and the application UI recedes from screen and toward the bottom of screen (e.g., as shown in FIGS. 5B14-5B15). Replacing display of the home screen with display of the last active application in response to detecting another swipe while the dock is displayed provides an efficient way to access the most recently used application, enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while displaying the user interface object, the device detects (730) a fourth input by a fourth contact (e.g., swipe gesture by contact 554, FIG. 5B21) that meets user interface dismissal criteria, wherein the user interface dismissal criteria require that the fourth input includes movement of the fourth contact across the display in a second direction (e.g., downward) that is different from the first direction; and in response to detecting the fourth input: in accordance with a determination that a respective application user interface (e.g., that is not the home screen) is displayed when the fourth contact is detected, the device ceases to display the user interface object (e.g., swipe down while displaying dock to hide dock) while maintaining display of the respective application user interface (e.g., as shown in FIGS. 5B21-5B22). Ceasing to display the dock in response to detecting an input in a second direction (e.g., a swipe down) while the dock is displayed provides an efficient way to dismiss the dock, enhances the operability of the device, and makes the user-device interface more efficient (e.g., by reducing the number of inputs needed to perform an operation and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the fourth input (732): in accordance with a determination that the home screen is displayed when the fourth contact is detected (e.g., swipe gesture by contact 550, FIG. 5B16), the device replaces display of the home screen with display of a user interface of a last active application on the device (e.g., the previous application that had been active immediately before the home screen was displayed) (e.g., as shown in FIGS. 5B16-5B17). Replacing display of the home screen with display of the last active application in response to detecting an input in a second direction (e.g., a swipe down) while the dock is displayed provides an efficient way to access the most recently used application, enhances the operability of the device, and makes the user-device interface more efficient (e.g., by reducing the number of inputs needed to perform an operation and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the fourth input, the device ceases (734) to display the user interface object when display of the user interface of the last active application has replaced display of the home screen (e.g., as shown in FIG. 5B17). Ceasing to display the dock when display of the last active application replaces display of the home screen provides immediate access to the full user interface of the application without requiring further user input to dismiss the dock. Performing an operation when a set of conditions has been met without requiring further user input enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, displaying the user interface object (e.g., the dock) includes (736): in accordance with a determination that the user interface object is overlaid over a portion of the home screen, displaying the user interface object with a first appearance (e.g., the first appearance is opaque and blocks the portion of the home screen or forms part of the home screen, as shown in FIG. 5B15); and in accordance with a determination that the user interface object is overlaid over a portion of the first user interface (e.g., that is not the home screen), displaying the user interface object with a second appearance (wherein the second appearance allows the portion of the first user interface to be partially visible from behind the user interface object (e.g., the dock is semi-transparent, as shown in FIG. 5B14)). Displaying the dock with a first appearance (e.g., opaque) over the home screen and displaying the dock with a second appearance (e.g., semi-transparent) over an application user interface provides improved visual feedback to the user and allows the full user interface of the application to be visible to the user. Providing improved feedback enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 800) are also applicable in an analogous manner to method 700 described above with respect to FIGS. 7A-7C. For example, the contacts, gestures, user interface objects, tactile outputs, intensity thresholds, focus selectors, and/or animations described above with reference to method 700 optionally have one or more of the characteristics of the contacts, gestures, user interface objects, tactile outputs, intensity thresholds, focus selectors, and/or animations described herein with reference to other methods described herein (e.g., methods 600 and 800). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7C are, optionally, implemented by components depicted in FIGS. 1A-1B. For example, display operation 702, detection operation 704, replace operation 706, detection operation 708, and display operation 710 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

FIGS. 8A-8D are flow diagrams illustrating a method 800 of displaying an on-demand virtual home button and activating the virtual home button to display the home screen in response to a continuous gesture in accordance with some embodiments. The method 800 is performed at an electronic device (e.g., device 300, FIG. 3, or portable multifunction device 100, FIG. 1A) with a display and a touch-sensitive surface. In some embodiments, the electronic device includes one or more sensors to detect intensity of contacts with the touch-sensitive surface. In some embodiments, the touch-sensitive surface and the display are integrated into a touch-sensitive display. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

This method relates to displaying an on-demand virtual home button in response to detecting an initial movement of an input (e.g., a swipe up), and in response to detecting an increase in the characteristic intensity of the input above an intensity threshold, activating the virtual home button to display the home screen (e.g., without requiring the input to be on the virtual home button). Displaying an on-demand virtual home button and activating the virtual home button to display the home screen in response to a continuous gesture provides an efficient way to access the home screen. Reducing the number of inputs needed to perform an operation enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

The device (e.g., device 100, FIG. 5C1) displays (802) a home screen (e.g., user interface 504, FIG. 5C1) on the display (e.g., touch screen 112, FIG. 5C1), wherein the home screen includes a plurality of application launch icons (e.g., application launch icons 524-538) that correspond to a plurality of applications that are installed on the device (e.g., the plurality of application launch icons are arranged in a grid on the home screen and, optionally, one or more widgets are also included on the home screen). While displaying the home screen, the device detects (804) a first input by a first contact (e.g., tap gesture by contact 555, FIG. 5C2) on a first application launch icon (e.g., messaging application launch icon 524, FIG. 5C2) that meets application-launch criteria (e.g., the first input is a tap on the first application launch icon, as shown in FIG. 5C2). In response to detecting the first input on the first application launch icon that meets the application-launch criteria (e.g., an input such as a tap input), the device replaces (806) the home screen (e.g., user interface 504, FIG. 5C2) with a first user interface of a first application that corresponds to the first application launch icon (e.g., user interface 520, FIG. 5C3). While displaying the first user interface (e.g., user interface 520, FIG. 5C4), the device detects (808) a sequence of one or more inputs performed by a second contact (e.g., a contact that is continuously detected on the touch-sensitive surface during the sequence of one or more inputs, and that is distinct from the first contact) (e.g., contact 556, FIG. 5C4-5C8). In response to detecting the sequence of one or more inputs performed by the second contact (810): in accordance with a determination that the sequence of one or more inputs includes a second input by the second contact that meets home-button-display criteria, wherein the home-button-display criteria require that the second input includes an initial movement of the second contact across the touch-sensitive surface in a first direction (e.g., upward) in order for the home-button-display criteria to be met, the device displays a user interface object (e.g., a dock or a launch pad with application launch icons for a set of preselected applications or frequently used applications) overlaid on the first user interface (e.g., as shown in FIGS. 5C5-5C7), wherein the user interface object includes a home button (e.g., home button 559, FIGS. 5C6-5C7) that is associated with displaying the home screen of the device (e.g., the home button dismisses a currently displayed user interface regardless of what that currently displayed user interface is, and displays the home screen); and in accordance with a determination that the sequence of one or more inputs includes a third input by the second contact that meets display-home criteria, wherein the display-home criteria require that a characteristic intensity of the second contact increases above a first intensity threshold in order for the display-home criteria to be met (e.g., above $IT_L$, as shown in FIG. 5C8), the device replaces display of the first user interface with display of the home screen (e.g., as shown in FIGS. 5C8-5C9). In some embodiments, the home-button-display criteria require that the second input includes an initial movement of the second contact with a magnitude of a movement parameter (e.g., distance and/or speed) that is above a first movement threshold in order for the home-button-display criteria to be met. For example, in some embodiments, the home-button-display criteria are met by a swipe input that starts from below or at a bottom edge of the touch-sensitive display or some other predefined position and that moves in a predefined direction (e.g., upward) for more than a first threshold distance (e.g., 1/10 of the display height). In some embodiments, when the second input meets a threshold speed requirement (e.g., greater than 200 pixels per second), the movement requirement can be lowered (e.g., to 1/15 of the display height). For example, in some embodiments, the home-button-display criteria are also met by a swipe input that starts from below or at a bottom edge of the touch-sensitive display or some other predefined position and that moves in a predefined direction (e.g., upward) for more than a second threshold distance (e.g., 1/15 of the display height) that is smaller than the first threshold distance with more than a first threshold speed (e.g., more than 200 pixels per second). In some embodiments, a long upward swipe and a short fast flick both meet the home-button-display criteria. In some embodiments, when the second input does not meet the home-button-display criteria or the display-home criteria, a portion of the user interface object with the home button may be displayed in accordance with the movement of the second contact, but the portion of the user interface object with the home button will cease to be displayed (e.g., retracted) when the termination of the second input (e.g., lift-off of the second contact) is detected without having met either the home-button-display criteria or the display-home criteria. In some embodiments, if the home-button-display criteria are met and the display-home criteria are not meet, the user interface object with the home button remains displayed and a transition to the home screen is not displayed after the lift-off of the second contact is detected. In such a case, while the user interface object with the home button is displayed, another input by a separate contact that activates the home button can also bring up the home screen (e.g., from behind the user interface object and over the first user interface).

In some embodiments, the display-home criteria further require (812) that the third input includes an initial movement of the second contact across the touch-sensitive surface in the first direction before the characteristic intensity of the second contact increases above the first intensity threshold in order for the display-home criteria to be met (e.g., as shown in FIGS. 5C4-5C8). For example, the user swipes up from the predetermined position (e.g., at or below the bottom edge of the display) to bring up at least a portion of the user interface object that includes the virtual home button (e.g., dock 558 with home button 559, FIGS. 5C6-5C7), and then presses against the touch-sensitive display to activate the virtual home button without lifting up the finger from the touch-sensitive display (e.g., as shown in FIG. 5C8). In response to the swipe-press gesture, the home screen replaces the first user interface before lift-off of the second contact is detected. In some embodiments, the device replaces the first user interface with the home screen after lift-off of the second contact is detected. Displaying the home screen in response to a swipe-press gesture provides an efficient way to access the home screen, enhances the operability of the device, and makes the user-device interface more efficient (e.g., by reducing the number of inputs needed to perform an operation and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, replacing display of the first user interface with display of the home screen includes (814) starting a transition from the first user interface to the home screen before the user interface object that includes the home button is fully revealed on the display (e.g., as shown in FIGS. 5C21-5C22). For example, as the user swipes up from the bottom of the touch-sensitive display and after at least a threshold portion of the user interface object that includes the virtual home button is revealed in accordance with the upward movement of the second contact (or after at least the second contact has reached a predefined threshold position on the display), the transition to display the home screen can start at any time when the user's input meets the first intensity threshold, regardless of whether the user interface object or the home button has been fully revealed at that time (e.g., as shown in FIG. 5C21). In some embodiments, the user interface object that includes the home button is fully revealed after the transition to the home screen has already started (e.g., as shown in FIG. 5C23). Starting the transition from the first user interface to the home screen before the user interface object that includes the home button is fully revealed on the display improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the second contact is (816) detected at a first location on the display that corresponds to a display location of a first user interface object (e.g., photo thumbnail 579, FIG. 5C38) in the first user interface (e.g., user interface 520, FIG. 5C38) (e.g., an email item in an email listing user interface or image thumbnail in an chat user interface) when the display-home criteria are met by the second input (and optionally, before the first location is occupied by the home button or the user interface object with the home button). In some embodiments, while displaying the first user interface and prior to detecting the sequence of one or more inputs performed by the second contact: the device detects an input by a third contact that meets press-object-activation criteria while the third contact is detected at the first location on the display (e.g., press input by contact 578, FIG. 5C38), wherein the press-object-activation criteria require that the input by the third contact does not include an initial movement of the third contact that meets the home-button-display criteria and that a characteristic intensity of the third contact exceeds the first intensity threshold (e.g., the light press intensity threshold $IT_L$), in order for the press-object-activation criteria to be met; and in response to detecting the input by the third contact that meets the press-object-activation criteria, the device performs an operation that corresponds to the first user interface object (e.g., displaying a preview of the object, as shown in FIG. 5C39) (without displaying the home button or the home screen). In other words, the press input that is detected at the first location that corresponds to the first user interface object triggers performance of an operation that corresponds to the first user interface object (e.g., displaying a preview of the object such as a portion of an email corresponding to the user interface object or menu that corresponds to the first user interface object such as a quick action menu with a plurality of selectable options that are associated with the first user interface object) if the user input is a press input without an initial swipe (e.g., as shown in FIGS. 5C38-5C39), or triggers display of the home screen if the user input is a press input that is preceded by an initial swipe to bring up the dock (e.g., as shown in FIGS. 5C15-5C16) (even if the dock is not fully revealed to cover the first location when the press input is detected, as shown in FIG. 5C21). Performing an operation in response to a press input (and displaying the home screen in response to a swipe-press input) provides additional control options without cluttering the user interface with additional displayed controls, enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the display-home criteria require (818) that the home-button-display criteria are met by the second contact before the characteristic intensity of the second contact increases above the first intensity threshold (e.g., the light press intensity threshold $IT_L$) in order for the display-home criteria to be met (e.g., as shown in FIGS. 5C4-5C8). For example, if the home-button-display criteria require that an initial movement of the second contact exceed a predetermined threshold distance, and/or a threshold position on the display, and/or a threshold speed, and/or start from a predetermined position (e.g., below the bottom edge of the display), in order for the home-button-display criteria to be met, the display-home criteria include these requirements and the additional requirement that the characteristic intensity of the second contact exceeds the predetermined intensity threshold after the home-button-display criteria are met. Requiring that the home-button-display criteria are met before the characteristic intensity of the second contact increases in order for the display-home criteria to be met provides improved feedback to the user (e.g., by displaying the home button and indicating that pressing harder will cause the device to go to the home screen), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the display-home criteria do not require (820) that the home-button-display criteria are met by the second contact before the characteristic intensity of the second contact increases above the first intensity threshold (e.g., the light press intensity threshold $IT_L$) in order for the display-home criteria to be met (e.g., as shown in FIGS. 5C19-5C21). For example, if the home-button-display criteria require that an initial movement of the second contact to exceed a predetermined threshold distance (e.g., ¹/₁₀ of display height), and/or a threshold position on the display (e.g., ¹/₁₀ of display height from the bottom edge of the display), and/or a threshold speed (e.g., 200 pixels per second), and/or start from a predetermined position (e.g., below the bottom edge of the display), in order for the home-button-display criteria to be met, the display-home criteria can be met by a second contact that meets these requirements and the additional requirement that the characteristic intensity of the second contact exceeds the predetermined intensity threshold (e.g., the light press intensity threshold $IT_L$) after the home-button-display criteria are met. However, the display-home criteria can also be met when the second contact does not meet all of the requirements for the home-button-display criteria, but meets some of the requirements or meets relaxed versions of some of the requirements in the home-button-display criteria, as long as the characteristic intensity of the second contact exceeds the predetermined intensity threshold (e.g., as shown in FIG. 5C21). In some embodiments, if the user's input does not end in a press input that triggers the display of the home screen (e.g., the user's input does not end with an increase in intensity above the required threshold intensity), the user will need to swipe a little further (e.g., ¹/₁₅ of screen height) or a little faster (e.g., 300 pixels per second) in order to bring up the user interface object that includes the home button and have the user interface object and home button remain displayed on the screen after lift-off of the second contact. Not requiring that the home-button-display criteria are met before the characteristic intensity of the second contact increases, but allowing some flexibility in order for the display-home criteria to be met provides improved feedback and reduces the number of inputs needed to perform an operation (e.g., by displaying the home screen when the input is close enough to the swipe-press gesture), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more inputs performed by the second contact (822): in accordance with a determination that the sequence of one or more inputs includes the second input by the second contact that meets the home-button display criteria and does not include the third input by the second contact that meets the display-home criteria, the device maintains display of the user interface object that includes the home button overlaid on the first user interface (without replacing display of the first user interface with the display of the home screen) (e.g., as shown in FIGS. 5C27-5C30). For example, when a user swipes up from the bottom edge of the screen to bring up the user interface object that includes the home button, if the user does not provide a press input that meets the intensity requirement of the home-display criteria, the user interface object that includes the home button remains displayed after lift-off of the second contact (e.g., as shown in FIG. 5C30). In some embodiments, the lift-off of the second contact is detected before the user interface object is fully revealed, and the user interface object with the home button continues to slide onto the display after the lift-off of the second contact with movement due to simulated inertia, and remains displayed after it is fully revealed on the display. Maintaining display of the user interface object that includes the home button when the second contact does not meet display-home criteria improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while maintaining display of the user interface object that includes the home button, the device detects (824) a fourth input by a fourth contact on the home button (e.g., the fourth input is a tap on the home button by the third contact after liftoff from the second contact, as shown in FIG. 5C31); and in response to detecting the fourth input: the device replaces display of the first user interface with display of the home screen (e.g., as shown in FIGS. 5C31-5C32) (e.g., in response to detecting the activation of the virtual home button, the device switches from displaying a current user interface to displaying the home screen). In some embodiments, when the home screen is displayed, the device ceases to display the home button in the user interface object (e.g., as shown in FIG. 5C32). Displaying the home screen in response to activation of the virtual home button improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more inputs performed by the second contact (826): in accordance with a determination that the sequence of one or more inputs includes a fifth input by the second contact that meets swipe-control-center-display criteria, wherein the swipe-control-center-display criteria require that the fifth input includes a sustained movement of the second contact with a magnitude of a movement parameter (e.g., distance and/or speed) that is above a first movement threshold (e.g., ⅐ of display height) after the home-button-display criteria have been met in order for the swipe-control-center-display criteria to be met, the device displays a control center user interface object (e.g., control center 584, FIG. 5C45) overlaid on a portion of the display (e.g., as shown in FIGS. 5C45-5C47). In some embodiments, the control center user interface object includes one or more affordances to control one or more applications and/or settings on the device. For example, in some embodiments, affordances in the control center user interface object include controls a brightness control, an orientation control, a volume control, a do-not-disturb setting, a Bluetooth setting, a Wi-Fi setting, and/or airplane mode control, and other controls that are also accessible through a device settings user interface or application. In some embodiments, the control user interface also includes one or more quick launch icons for launching one or more applications without going to the home screen. In some embodiments, the control center user interface object is displayed as an extension of the user interface object with the home button. In some embodiments, the control center user interface slides in over the user interface object with the home button and obscures at least a portion of the user interface object with the home button. In some embodiments, the control center user interface slides in at a rate based on movement of the second contact and is directly manipulated by the second contact (e.g., as shown in FIGS. 5C45-5C46). In some embodiments, the control center user interface overtakes the movement of the second contact in reaching its final position, once the second contact has met the swipe-control-center-display criteria. Displaying the control center in response to detecting a gesture after displaying the user interface object with the home button enhances the operability of the device and makes the user-device interface more efficient (e.g., by reducing the number of user inputs needed to access the control center and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the display-home criteria require (828) that the swipe-control-center-display criteria are not met before the characteristic intensity of the second contact increases above the first intensity threshold (e.g., the light press intensity threshold $IT_L$) in order for the display-home criteria to be met. For example, in response to detecting that the characteristic intensity of the second contact has increased above the first intensity threshold, the device starts the transition from the first user interface to the home screen in accordance with a determination that the home-button-display criteria have been met and that the swipe-control-center-display criteria have not been met. In accordance with a determination that both the home-button-display criteria and the swipe-control-center-display criteria have been met, the device does not start the transition from the first user interface to the home screen, and optionally, performs a function associated with the control center user interface (e.g., activating a control in control center the user interface) in response to the press input. Displaying the home screen in response to the characteristic intensity of the second contact increasing above the first intensity threshold only when the swipe-control-center-display criteria are not met improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, in response to detecting the sequence of one or more inputs performed by the second contact (830): in accordance with a determination that the sequence of one or more inputs includes a sixth input by the second contact, wherein the sixth input includes movement in the first direction after the home-button-display criteria have been met and includes lift-off of the second contact: the device displays a beginning of an animated transition to display the control center user interface object; and in accordance with a determination that the sixth input by the second contact does not meet the swipe-control-center-display criteria (e.g., sixth input includes movement beyond the initial movement of the second contact to display the dock, but not enough distance and/or speed to meet the swipe-control-center-display criteria to fully reveal the control center user interface): the device displays a reverse of the animated transition to display the control center user interface object (e.g., the control center user interface object slides back off of the display); and the device maintains display of the user interface object that includes the home button. Displaying an animated transition to display the control center user interface object and then reversing the animated transition if the second contact does not meet the swipe-control-center-display criteria improves the visual feedback provided to the user (e.g., by making the device appear more responsive to user input), enhances the operability of the device, and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, the device displays (832) a status bar (e.g., along the bottom edge of the display, or next to the upper left or right corner of the display) on the display (e.g., the status bar including status information such as the current time, WiFi and cellular signal strengths, battery level, etc.); while displaying the status bar on the display, the device detects a seventh input by a fifth contact on the status bar; and in response to detecting the seventh input by the fifth contact on the status bar: in accordance with a determination that the seventh input by the fifth contact meets press-control-center-display criteria, wherein the press-control-center-display criteria require that a characteristic intensity of the fifth contact increases above the first intensity threshold in order for the press-control-center-display criteria to be met, the device displays a control center user interface object (e.g., control center 584, FIG. 5C47) overlaid on a portion of the display. In some embodiments, in accordance with a determination that the seventh input by the fifth contact does not meet press-control-center-display criteria (e.g., the characteristic intensity of the fifth contact does not increase above the first intensity threshold), the control center user interface object is not displayed. In some embodiments, the control center user interface object includes the home button that is associated with displaying the home screen of the device. In some embodiments, the home button is separate from the control center user interface object and is brought up by an upward swipe from the bottom edge of the display (e.g., as described above in 810). In some embodiments, the control center user interface object is overlaid on a portion of an application user interface (e.g., when the application user interface is displayed while detecting the seventh input by the fifth contact on the status bar). In some embodiments, the control center user interface object is overlaid on a portion of the home screen (e.g., when the home screen is displayed while detecting the seventh input by the fifth contact on the status bar). Displaying the control center in response to a force press input on the status bar enhances the operability of the device and makes the user-device interface more efficient (e.g., by reducing the number of user inputs needed to access the control center and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while displaying the home button (e.g., in the user interface object or independent of the user interface object), the device detects (834) an eighth input by a sixth contact on the home button; and in response to detecting the eighth input by the sixth contact: in accordance with a determination that the eighth input by the sixth contact meets home-button-activation criteria (e.g., lift-off of the sixth contact is detected with less than a threshold amount of movement to the left or right or before having been maintained for more than a threshold amount of time, or before having met a second intensity threshold, etc.), the device dismisses a currently displayed user interface and displays the home screen; and in accordance with a determination that the eighth input by the sixth contact does not meet the home-button activation criteria and meets home-button-options criteria (e.g., the home-button-options criteria require that the sixth contact is held for a first threshold amount of time or exceeds a second intensity threshold, or includes a movement to the left or right, before lift-off of the sixth contact is detected), the device displays a first affordance, which when activated (e.g., activated in response to a tap input on the first affordance or activated in response to movement of the contact toward the first affordance followed by liftoff of the contact), causes display of a user interface other than the home screen (e.g., the first affordance is for displaying a multi-tasking UI, the widget screen, the voice-activated digital assistant screen, or the lock screen). In some embodiments, when the home-button-options criteria are met by the eighth input, the device concurrently displays the first affordance (e.g., to the left of the home button) and a second affordance (e.g., to the right of the home button), which when activated, displays another user interface other than the home screen and the screen that corresponds to the first affordance. In some embodiments, while displaying the home button, the first affordance, and the second affordance, the device detects a ninth input that includes movement of the sixth contact and lift-off of the sixth contact. In response to detecting the ninth input by the sixth contact, in accordance with a determination that the ninth input includes movement of the sixth contact toward the first affordance, the device transitions to a second user interface (e.g., a digital assistant user interface) and in accordance with a determination that the ninth input includes movement of the sixth contact toward the second affordance, the device displays a third user interface (e.g., a multitasking user interface). Displaying the affordance for accessing a user interface other than the home screen (e.g., a multi-tasking user interface, a widget screen, a voice-activated digital assistant screen, or a lock screen) in response to a contact that meets home-button-options criteria enhances the operability of the device and makes the user-device interface more efficient (e.g., by reducing the number of user inputs needed to access alternate user interfaces and by helping the user to achieve an intended outcome with the required inputs and reducing user mistakes when operating/interacting with the device) which, additionally, reduces power usage and improves battery life of the device by enabling the user to use the device more quickly and efficiently.

In some embodiments, while displaying the home button (e.g., as part of the dock or separately from the dock) overlaid on a respective user interface of a current application (e.g., at a later time after the user has interacted with the device to display user interfaces of other applications) (836): in accordance with a determination that the current application is an application of a first type (e.g., a maps application) (e.g., an application of which the user interface includes interactive elements or variable content at the location that is occupied by the home button when the dock or home button is not displayed), the device displays the home button with a first transparency (e.g., home button is substantially transparent over a maps application UI to reveal the content in the portion of the maps application UI that is below the home button); and in accordance with a determination that the current application is an application of a second type (e.g., a voice-based digital assistant) (e.g., an application of which the user interface does not include interactive elements or variable content at the location that is occupied by the home button when the dock or home button is not displayed), the device displays the home button with a second transparency that is distinct from the first transparency (e.g., the home button is substantially solid over the user interface of the digital assistant). Displaying the home button with a first transparency (e.g., transparent) over a first type of application (e.g., an application with interactive elements, such as a maps application) and displaying the home button with a second transparency (e.g., substantially solid) over a second type of application (e.g., an application without interactive elements, such as a voice-based digital assistant) provides improved visual feedback to the user and allows the full user interface of the interactive application to be visible to the user. Providing improved feedback enhances the operability of the device and makes the user-device interface more efficient (e.g., by helping the user to achieve an intended outcome with the required inputs and reducing user mistakes when operating/interacting with the device) which, additionally, reduces power usage and improves battery life of the device by enabling the user to use the device more quickly and efficiently.

It should be understood that the particular order in which the operations in FIGS. 8A-8D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600 and 700) are also applicable in an analogous manner to method 800 described above with respect to FIGS. 8A-8D. For example, the contacts, gestures, user interface objects, tactile outputs, intensity thresholds, focus selectors, and/or animations described above with reference to method 800 optionally have one or more of the characteristics of the contacts, gestures, user interface objects, tactile outputs, intensity thresholds, focus selectors, and/or animations described herein with reference to other methods described herein (e.g., methods 600 and 700). For brevity, these details are not repeated here.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8D are, optionally, implemented by components depicted in FIGS. 1A-1B. For example, display operation 802, detection operation 804, replace operation 806, detection operation 808, and display operation 810 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
  at a computer system with a display and an input mechanism:
    displaying a first user interface on the display that corresponds to a locked state of the computer system;
    while displaying the first user interface, detecting, via the input mechanism, a first user input; and
    in response to detecting the first user input via the input mechanism:
      in accordance with a determination that the first user input includes a first type of interaction with the input mechanism and that the first user input meets fingerprint authentication criteria, replacing display of the first user interface with display of a second user interface that is different from the first user interface, wherein the second user interface is a most recently displayed user interface that was displayed before the computer system entered the locked state; and
      in accordance with a determination that the first user input includes a second type of interaction with the input mechanism, wherein the second type of interaction is different from the first type of interaction, initiating a process to power off the computer system.

2. The method of claim 1, wherein the input mechanism is a power button.

3. The method of claim 1, wherein the first type of interaction with the input mechanism includes a touch gesture on the input mechanism.

4. The method of claim 1, wherein the first type of interaction with the input mechanism includes a slide input on the input mechanism.

5. The method of claim 1, wherein the second type of interaction with the input mechanism includes a press input on the input mechanism.

6. The method of claim 1, wherein the first user interface is an application user interface.

7. The method of claim 1, wherein the second user interface is an application user interface corresponding to an application that was previously displayed.

8. The method of claim 1, wherein replacing display of the first user interface with display of the second user interface includes switching the computer system from the locked state to an unlocked state.

9. The method of claim 1, wherein:
the second user interface corresponds to an unlocked state of the computer system.

10. The method of claim 1, wherein:
the second user interface corresponds to a home screen user interface, wherein the home screen user interface includes a plurality of application launch icons.

11. The method of claim 1, wherein:
the second user interface corresponds to an application user interface.

12. The method of claim 1, wherein:
the first type of interaction with the input mechanism includes a touch gesture on the input mechanism; and
the second type of interaction with the input mechanism includes a press input on the input mechanism.

13. The method of claim 1, wherein:
the first user interface is a first application user interface; and
the second user interface is a second application user interface, different from the first application user interface, corresponding to an application that was previously displayed.

14. The method of claim 1, wherein the second type of interaction with the input mechanism includes depressing a physical button of the input mechanism.

15. The method of claim 1, wherein:
the first type of interaction with the input mechanism includes a touch gesture on the input mechanism; and
the second type of interaction with the input mechanism includes depressing a physical button of the input mechanism.

16. The method of claim 1, wherein initiating the process to power off the computer system includes displaying a confirmation request to power off the computer system.

17. The method of claim 1, including:
in response to detecting the first user input via the input mechanism:
in accordance with a determination that the first user input includes a third type of interaction with the input mechanism, wherein the third type of interaction is different from the first type of interaction and the second type of interaction, replacing display of the first user interface with display of a third user interface that is different from the first user interface and the second user interface.

18. A computer system, comprising:
a display;
an input mechanism;
one or more processors;
memory; and
one or more programs, wherein the one or more programs are stored in the memory and configured to be executed by the one or more processors, the one or more programs including instructions for:
displaying a first user interface on the display that corresponds to a locked state of the computer system;
while displaying the first user interface, detecting, via the input mechanism, a first user input; and
in response to detecting the first user input via the input mechanism:
in accordance with a determination that the first user input includes a first type of interaction with the input mechanism and that the first user input meets fingerprint authentication criteria, replacing display of the first user interface with display of a second user interface that is different from the first user interface, wherein the second user interface is a most recently displayed user interface that was displayed before the computer system entered the locked state; and
in accordance with a determination that the first user input includes a second type of interaction with the input mechanism, wherein the second type of interaction is different from the first type of interaction, initiating a process to power off the computer system.

19. The computer system of claim 18, wherein the input mechanism is a power button.

20. The computer system of claim 18, wherein the first type of interaction with the input mechanism includes a touch gesture on the input mechanism.

21. The computer system of claim 18, wherein the second type of interaction with the input mechanism includes a press input on the input mechanism.

22. The computer system of claim 18, wherein the second user interface is an application user interface corresponding to an application that was previously displayed.

23. The computer system of claim 18, wherein replacing display of the first user interface with display of the second user interface includes switching the computer system from the locked state to an unlocked state.

24. The computer system of claim 18, wherein:
the second user interface corresponds to a home screen user interface, wherein the home screen user interface includes a plurality of application launch icons.

25. The computer system of claim 18, wherein:
the first type of interaction with the input mechanism includes a touch gesture on the input mechanism; and
the second type of interaction with the input mechanism includes a press input on the input mechanism.

26. The computer system of claim 18, wherein:
the first user interface is a first application user interface; and
the second user interface is a second application user interface, different from the first application user interface, corresponding to an application that was previously displayed.

27. The computer system of claim 18, wherein initiating the process to power off the computer system includes displaying a confirmation request to power off the computer system.

28. The computer system of claim 18, the one or more programs including instructions for:
in response to detecting the first user input via the input mechanism:
in accordance with a determination that the first user input includes a third type of interaction with the input mechanism, wherein the third type of interaction is different from the first type of interaction and the second type of interaction, replacing display of the first user interface with display of a third user interface that is different from the first user interface and the second user interface.

29. A non-transitory computer readable storage medium storing one or more programs, the one or more programs comprising instructions which, when executed by a computer system with a display and an input mechanism, cause the computer system to:
display a first user interface on the display that corresponds to a locked state of the computer system;
while displaying the first user interface, detect, via the input mechanism, a first user input; and
in response to detecting the first user input via the input mechanism:
in accordance with a determination that the first user input includes a first type of interaction with the input mechanism and that the first user input meets fingerprint authentication criteria, replace display of the first user interface with display of a second user interface that is different from the first user interface, wherein the second user interface is a most recently displayed user interface that was displayed before the computer system entered the locked state; and
in accordance with a determination that the first user input includes a second type of interaction with the input mechanism, wherein the second type of interaction is different from the first type of interaction, initiate a process to power off the computer system.

30. The non-transitory computer readable storage medium of claim 29, wherein the input mechanism is a power button.

31. The non-transitory computer readable storage medium of claim 29, wherein the first type of interaction with the input mechanism includes a touch gesture on the input mechanism.

32. The non-transitory computer readable storage medium of claim 29, wherein the second type of interaction with the input mechanism includes a press input on the input mechanism.

33. The non-transitory computer readable storage medium of claim 29, wherein the second user interface is an application user interface corresponding to an application that was previously displayed.

34. The non-transitory computer readable storage medium of claim 29, wherein replacing display of the first user interface with display of the second user interface includes switching the computer system from the locked state to an unlocked state.

35. The non-transitory computer readable storage medium of claim 29, wherein:
the second user interface corresponds to a home screen user interface, wherein the home screen user interface includes a plurality of application launch icons.

36. The non-transitory computer readable storage medium of claim 29, wherein:
the first type of interaction with the input mechanism includes a touch gesture on the input mechanism; and
the second type of interaction with the input mechanism includes a press input on the input mechanism.

37. The non-transitory computer readable storage medium of claim 29, wherein:
the first user interface is a first application user interface; and
the second user interface is a second application user interface, different from the first application user interface, corresponding to an application that was previously displayed.

38. The non-transitory computer readable storage medium of claim 29, wherein initiating the process to power off the computer system includes displaying a confirmation request to power off the computer system.

39. The non-transitory computer readable storage medium of claim 29, the one or more programs comprising instructions which, when executed by the computer system with the display and the input mechanism, cause the computer system to:
in response to detecting the first user input via the input mechanism:
in accordance with a determination that the first user input includes a third type of interaction with the input mechanism, wherein the third type of interaction is different from the first type of interaction and the second type of interaction, replace display of the first user interface with display of a third user interface that is different from the first user interface and the second user interface.

* * * * *